(12) United States Patent
Hanagata

(10) Patent No.: US 7,478,104 B2
(45) Date of Patent: Jan. 13, 2009

(54) INFORMATION PROCESSING APPARATUS, INFORMATION PROCESSING METHOD, AND INFORMATION PROCESSING PROGRAM

(75) Inventor: Osamu Hanagata, Tokyo (JP)

(73) Assignee: Sony Corporation, Tokyo (JP)

( * ) Notice: Subject to any disclaimer, the term of this patent is extended or adjusted under 35 U.S.C. 154(b) by 225 days.

(21) Appl. No.: 11/421,255

(22) Filed: May 31, 2006

(65) Prior Publication Data
US 2006/0282443 A1  Dec. 14, 2006

(30) Foreign Application Priority Data
Jun. 9, 2005 (JP) ............................. 2005-169092

(51) Int. Cl.
*G06F 17/30* (2006.01)
(52) U.S. Cl. .......................... 707/101; 707/1; 707/100; 707/102; 707/103 R
(58) Field of Classification Search .................. 707/1–3, 707/100–103
See application file for complete search history.

(56) References Cited

U.S. PATENT DOCUMENTS

| 2002/0021841 | A1 | 2/2002 | Yoshii |
| 2003/0212659 | A1 | 11/2003 | Ban |
| 2005/0044091 | A1* | 2/2005 | Nakamura et al. .......... 707/100 |

* cited by examiner

*Primary Examiner*—Cam-Linh Nguyen
(74) *Attorney, Agent, or Firm*—Oblon, Spivak, McClelland, Maier & Neustadt, P.C.

(57) ABSTRACT

The present invention provides an information processing apparatus for clustering a plurality of pieces of data in clusters corresponding respectively to nodes on layers in a tree structure by assigning each of the pieces of data to a leaf node of the tree structure. The information processing apparatus includes: metadata acquisition means for acquiring metadata of the pieces of data; and tree-structure processing means for finding a first distance and a second distance on the basis of the metadata and adding a new node to the tree structure on the basis of the first and second distances as a node having an attention node, which is assigned to attention data placed at an attention-receiving position in an array of the pieces of data arranged on the basis of the metadata of the pieces of data, as a child node.

9 Claims, 41 Drawing Sheets

FIG.3

| CLUSTER $C_{11}$ | pic1,pic2,pic3,pic4, pic5,pic6,pic7 |
|---|---|

| CLUSTER $C_{21}$ | pic1,pic2,pic3,pic4, |
|---|---|
| CLUSTER $C_{22}$ | pic5,pic6,pic7 |

| CLUSTER $C_{31}$ | pic1,pic2,pic3 |
|---|---|
| CLUSTER $C_{32}$ | pic4, |
| CLUSTER $C_{33}$ | pic5,pic6 |
| CLUSTER $C_{34}$ | pic7 |

| CLUSTER $C_{41}$ | pic1 |
|---|---|
| CLUSTER $C_{42}$ | pic2,pic3 |
| CLUSTER $C_{32}$ | pic4, |
| CLUSTER $C_{43}$ | pic5 |
| CLUSTER $C_{44}$ | pic6 |
| CLUSTER $C_{34}$ | pic7 |

| CLUSTER $C_{41}$ | pic1 |
|---|---|
| CLUSTER $C_{51}$ | pic2 |
| CLUSTER $C_{52}$ | pic3 |
| CLUSTER $C_{32}$ | pic4 |
| CLUSTER $C_{43}$ | pic5 |
| CLUSTER $C_{44}$ | pic6 |
| CLUSTER $C_{34}$ | pic7 |

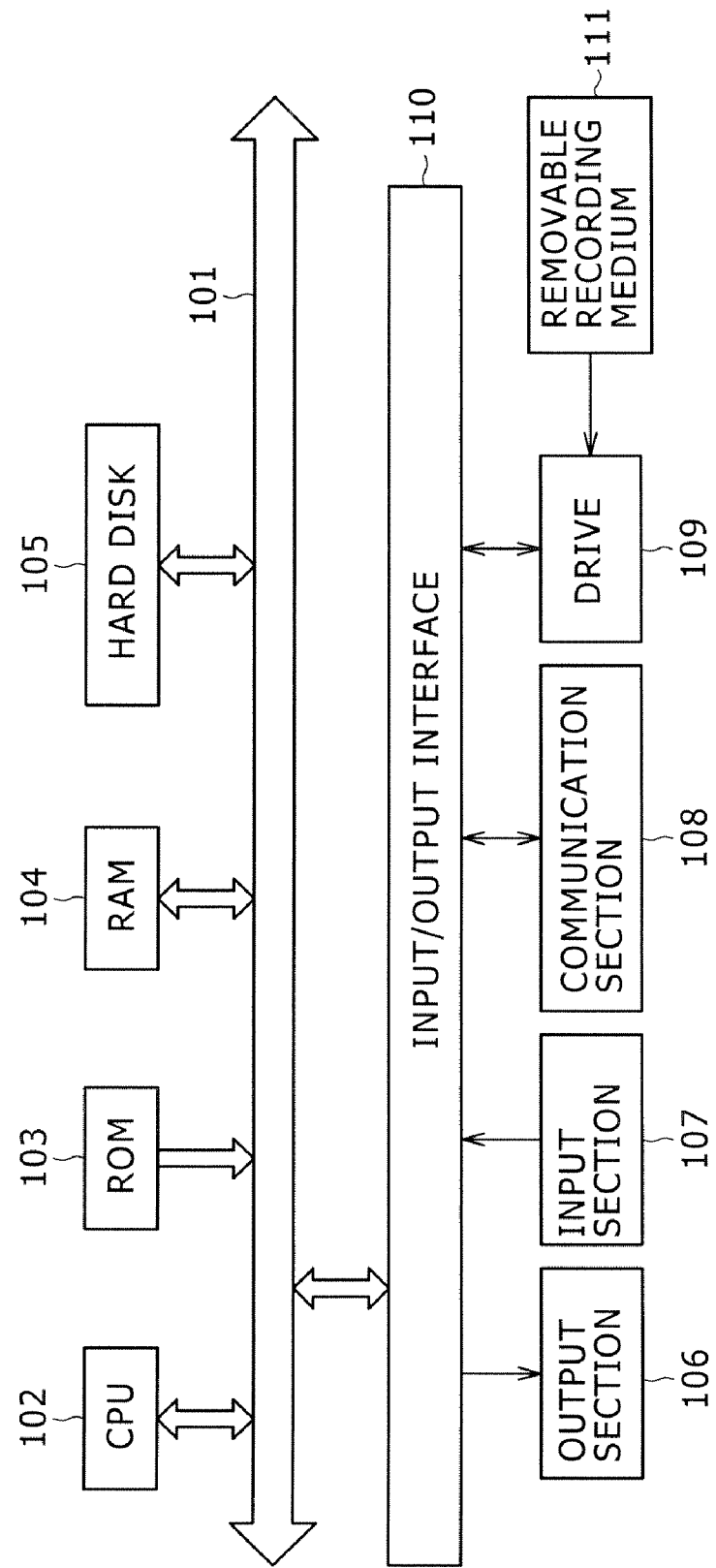

INFORMATION PROCESSING APPARATUS, INFORMATION PROCESSING METHOD, AND INFORMATION PROCESSING PROGRAM

CROSS REFERENCES TO RELATED APPLICATIONS

The present invention contains subject matter related to Japanese Patent Application JP 2005-169092 filed in the Japanese Patent Office on Jun. 9, 2005 the entire contents of which being incorporated herein by reference.

BACKGROUND OF THE INVENTION

1. Field of the Invention

The present invention relates to an information processing apparatus, an information processing method and an information processing program. More particularly, the present invention relates to an information processing apparatus, an information processing method, and an information processing program capable of easily searching data such as image data obtained as a result of a photographing operation carried out by using a digital camera for desired data by clustering the data to be searched.

2. Description of Related Art

For example, a digital camera stores digital image data in a memory along with metadata such as a date/time at which the image data is generated as a picture resulting from a photographing operation.

With popularization of the digital camera, a variety of applications for managing pieces of image data in a computer is also provided (or put in the market). For example, a management application clusters pieces of image data in a layer structure based on photographing dates, which are included in metadata. A photographing date includes a year, a month and a day, on which photographing operations are carried out to generate pieces of image data.

In addition, documents such as Japanese Patent Laid-Open No. 2001-228528 discloses an image photographing apparatus for managing pieces of picture data by clustering (or classifying) the pieces of picture data into groups on the basis of photographing dates/times and photographing locations.

SUMMARY OF THE INVENTION

There has been a demand for a proposal of a new clustering technology for clustering pieces of picture data in such a way that the user is capable of searching the clustered pieces of picture data for a desired picture with ease.

Addressing the demand described above, inventors of the present invention have devised a new clustering technology that allows the user to easily carry out operations including a process to search clustered pieces of picture data for a desired one such as a desired picture.

The present invention includes tree-structure processing means for(or a tree-structure processing step of) finding a first distance and a second distance on the basis of the metadata and adding a new node to the tree structure on the basis of the first and second distances as a node having an attention node, which is assigned to attention data placed at an attention-receiving position in an array of the pieces of picture data arranged on the basis of the metadata of the pieces of picture data, as a child node. In the tree-structure processing means or the tree-structure processing step, the first distance is a distance based on a predetermined distance scale as the distance between two adjacent pieces of picture data selected among pieces of picture data pertaining to a cluster selected among clusters corresponding to nodes of the tree structure as a cluster adjacent to the attention data placed at the attention-receiving position; and the second distance is a distance based on the predetermined distance scale as the distance between the attention data and a piece of picture data selected among the pieces of picture data pertaining to the cluster adjacent to the attention data as a piece of picture data adjacent to the attention data.

As described above, in accordance with the present invention, the first and second distances are found on the basis of the metadata. Then, a new node is added to the tree structure on the basis of the first and second distances as a node having an attention node, which is assigned to attention data placed at an attention-receiving position in an array of the pieces of picture data arranged on the basis of the metadata of the pieces of picture data, as a child node. As explained above, the first distance is a distance based on a predetermined distance scale as the distance between two adjacent pieces of picture data selected among pieces of picture data pertaining to a cluster selected among clusters corresponding to nodes of the tree structure as a cluster adjacent to the attention data placed at the attention-receiving position. On the other hand, the second distance is a distance based on the predetermined distance scale as the distance between the attention data and a piece of picture data selected among the pieces of picture data pertaining to the cluster adjacent to the attention data as a piece of picture data adjacent to the attention data.

In accordance with the present invention, a tree structure can be used as a structure for layer clustering. As a result, the user is capable of easily carrying out operations including a process to search clustered pieces of picture data for a desired one such as a desired picture.

BRIEF DESCRIPTION OF THE DRAWINGS

FIG. 3 is a diagram showing results of a clustering process carried out on the basis of the cluster tree;

FIG. 48 is a diagram showing a typical embodiment implementing a computer to which one embodiment of the present invention is applied.

DETAILED DESCRIPTION OF THE PREFERRED EMBODIMENTS

Before preferred embodiments of the present invention are explained, relations between disclosed inventions and the embodiments are explained in the following comparative description. The following comparative description verifies that each embodiment supporting the present invention is explained in detailed description of the present invention. Thus, even if there is an embodiment described in the detailed description but not included in the following comparative description as an embodiment corresponding to an invention, such an embodiment is not to be interpreted as an embodiment not corresponding to an invention. Conversely, an embodiment included in the following comparative description as an embodiment corresponding to a specific invention is not to be interpreted as an embodiment not corresponding to an invention other than the specific invention.

Figure 1:
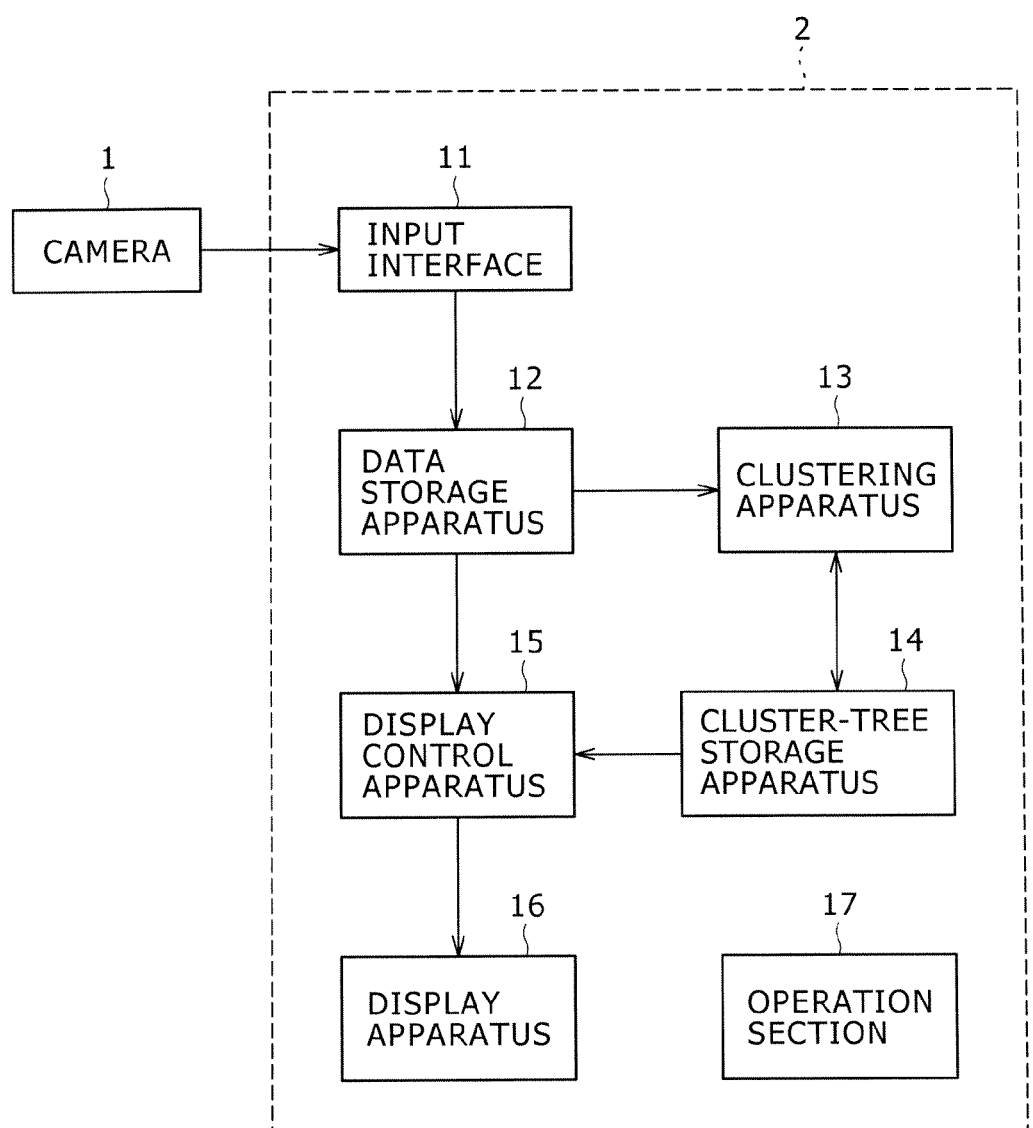
FIG. 1 is a diagram showing a typical configuration of an embodiment implementing an information processing system to which the present invention is applied.
Figure 2:
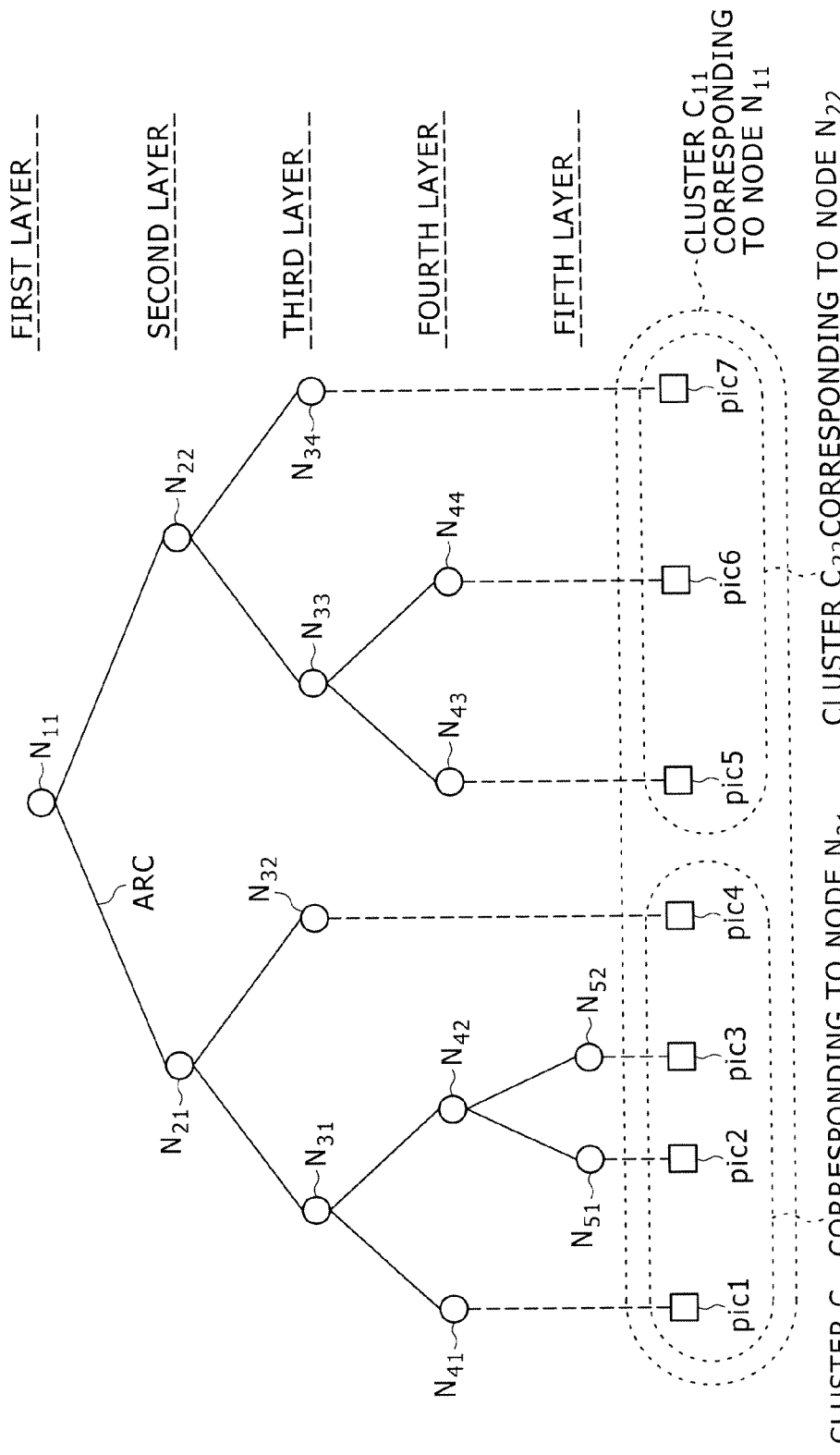
FIG. 2 is a diagram showing a typical cluster tree.

Accordance to an embodiment of the present invention, an information processing apparatus (such as an information processing apparatus 2 shown in FIG. 1) includes for clustering a plurality of pieces of picture data (such as picture data pic1 to picture data pic7, which are shown in FIG. 2) in clusters (such as clusters $C_{11}$ and $C_{22}$ shown in FIG. 2) corresponding respectively to nodes on layers in a tree structure (such as a cluster tree shown in FIG. 2) by assigning each of the pieces of picture data to a leaf node (such as a leaf node $N_{41}$ or $N_{51}$ shown in FIG. 2) of the tree structure. The information processing apparatus includes: metadata acquisition means (such as a metadata reading section 20 employed in a clustering apparatus 13 shown in FIG. 16) for acquiring metadata of the pieces of picture data; and tree-structure processing means (such as a tree-structure processing section 22 shown in FIG. 16) for finding a first distance and a second distance on the basis of the metadata and adding a new node (such as a new node $N_{in}$ shown in FIG. 22) to the tree structure on the basis of the first and second distances as a node having an attention node (such as an attention node $N_{new}$ shown in FIG. 21), which is assigned to attention data placed at an attention-receiving position in an array of the pieces of picture data arranged on the basis of the metadata of the pieces of picture data, as a child node. In the processing apparatus, the first distance (such as a distance $d_q$ shown in FIG. 22) is a distance based on a predetermined distance scale as the distance between two adjacent pieces of picture data selected among pieces of picture data pertaining to a cluster selected among clusters corresponding to nodes of the tree structure as a cluster(such as a cluster $C_l$ shown in FIG. 21) adjacent to the attention data placed at the attention-receiving position; and the second distance (such as a distance $d_n$ shown in FIG. 22) is a distance based on the predetermined distance scale as the distance between the attention data and a piece of picture data selected among the pieces of picture data pertaining to the cluster adjacent to the attention data as a piece of picture data adjacent to the attention data.

Figure 21:
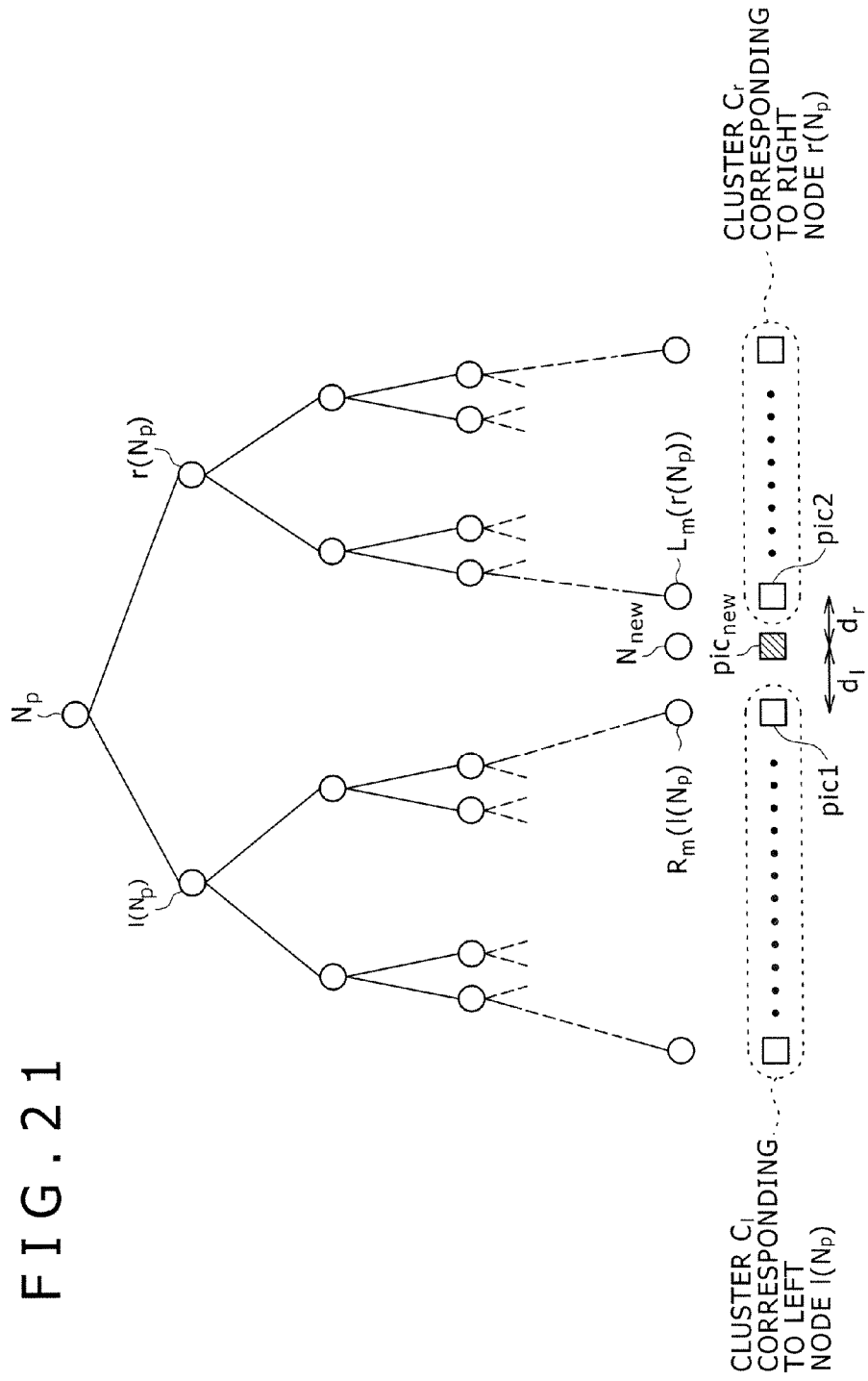
FIG. 21 is an explanatory diagram referred to in describing node addition processing.
Figure 22:
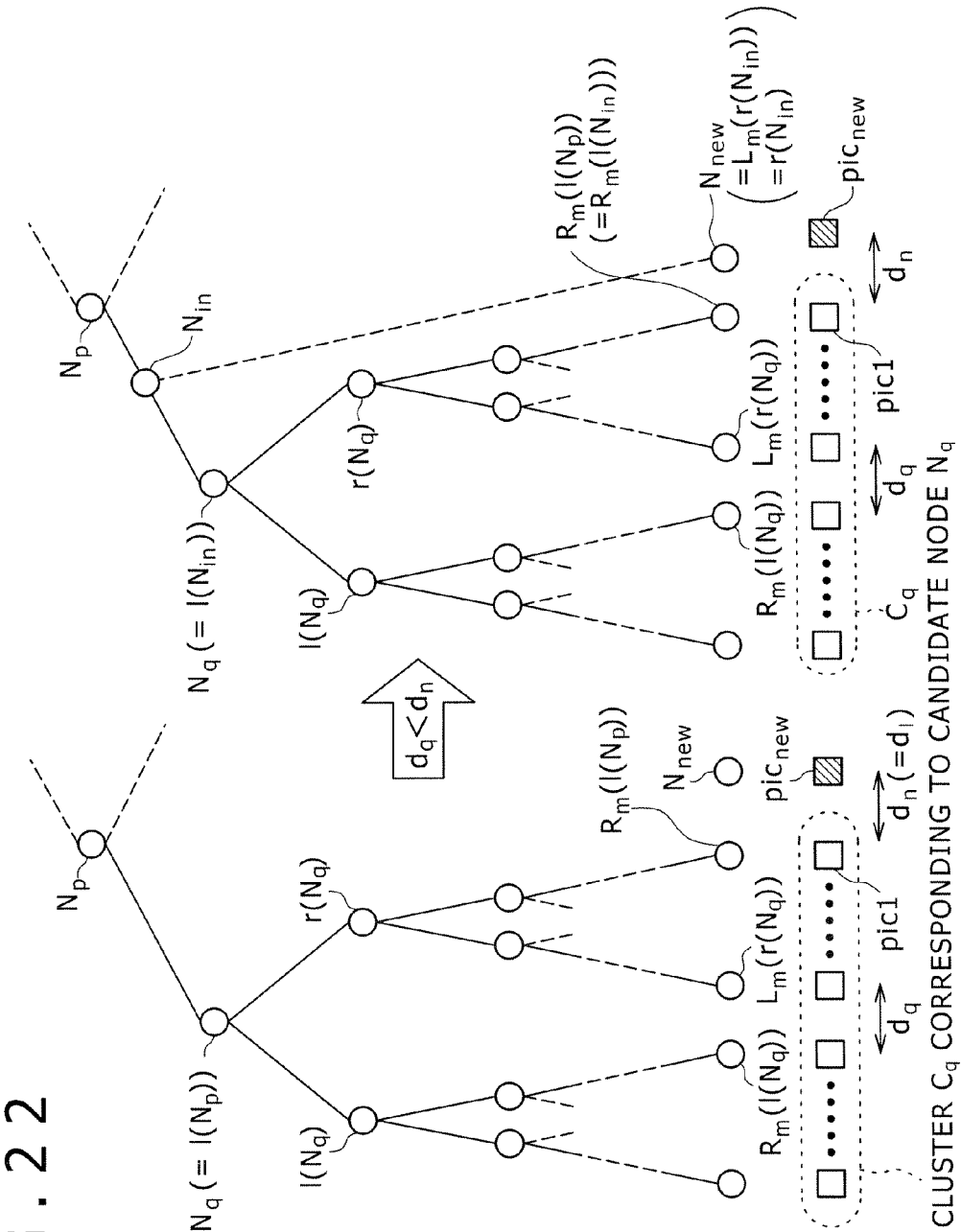
FIG. 22 is another explanatory diagram referred to in describing node addition processing.

Accordance to an embodiment of the present invention, in the information processing apparatus, the tree structure is a two-node structure including nodes each perceived as a parent node having two child nodes and the tree-structure processing means includes:

branch-node searching means (such as a branch-node searching section 31 shown in FIG. 19) for searching the tree structure for a branch node (such as a branch node $N_p$ shown in FIG. 21) defined as a node, one of the child nodes of which is either a node (such as a left node $l(N_p)$ shown in FIG. 21) corresponding to a largest adjacent cluster(such as the cluster $C_l$ shown in FIG. 21) located on one of the sides adjacent to the attention data placed at the attention-receiving position or a node (such as a right node r ($N_p$) shown in FIG. 21) corresponding to a largest adjacent cluster(such as a cluster $C_r$ shown in FIG. 21) located on the other side adjacent to the attention data; and distance computation means (such as a distance computation section 41 shown in FIG. 19) for computing first and second distances where: the first distance is a maximum (such as the distance $d_q$ shown in FIG. 22) of distances each based on a predetermined distance scale as the distance between any two adjacent pieces of picture data selected among pieces of picture data pertaining to a cluster (such as a cluster $C_q$ shown in FIG. 22) corresponding to a candidate node (such as a candidate node $N_q$ shown in FIG. 22); the second distance is a distance (such as the distance $d_n$ shown in FIG. 22) based on the predetermined distance scale as the distance between the attention data and a piece of picture data selected among the pieces of picture data pertaining to the cluster corresponding to the candidate node as a piece of picture data adjacent to the attention data; and the candidate node sharing the same parent node with a node corresponding to a cluster including the attention data is a node corresponding to a cluster selected among the largest adjacent clusters each corresponding to the child node of the branch node as a largest adjacent cluster including a piece of picture data having a distance based on the predetermined distance scale as the shortest distance to the attention data placed at the attention-receiving position among all pieces of picture data pertaining to the selected largest adjacent cluster. The tree-structure processing means further includes: distance determination means (such as a determination section 42 shown in FIG. 19) for comparing the first and second distances with each other in order to produce a determination result indicating a relation between the magnitudes of the first and second distances; and node addition means (such as a node addition section 43 shown in FIG. 19) for adding a new node (such as the new node $N_{in}$ shown in FIG. 22) to the tree structure on the basis of a comparison result produced by the distance determination means and placing the new node between the branch node (such as a branch node $N_p$ shown in FIG. 22) and the candidate node (such as the candidate node $N_q$ shown in FIG. 22) as a node having the branch node as a parent node and the candidate node as well as the node corresponding to the cluster including the attention data as child nodes.

Accordance to an embodiment of the present invention, in the information processing apparatus, if a comparison result produced by the distance determination means indicates that the second distance (such as the distance $d_n$ shown in FIG. 22) is longer than the first distance (such as the distance $d_q$ shown in FIG. 22) (for example, as is the case with the cluster tree shown in FIG. 22), the node addition means adds a new node (such as the new node $N_{in}$ shown in FIG. 22) to the tree structure, placing the new node between the branch node and the candidate node as a node having the branch node as a parent node and the candidate node as well as the node corresponding to the cluster including the attention data as child nodes. If a comparison result produced by the distance determination means indicates that the second distance (such as a distance $d_n$ shown in FIG. 23) is not longer than the first distance (such as a distance $d_q$ shown in FIG. 23) (for example, as is the case with the cluster tree shown in FIG. 23), on the other hand, as long as the comparison result produced by the distance determination means indicates that the second distance is not longer than the first distance, the information processing apparatus repeatedly executes the steps of: replacing the branch node with the candidate node to serve as a new branch node and replacing the candidate node with one of the child nodes of the candidate node to serve as a new candidate node; driving the distance computation node to compute a first distance representing a maximum of distances between any two adjacent pieces of picture data selected among pieces of picture data pertaining to a cluster corresponding to the new candidate node and compute a second distance between the attention data and a piece of picture data selected among the pieces of picture data pertaining to the cluster corresponding to the new candidate node as a piece of picture data adjacent to the attention data; and driving the distance determination means to compare the first and second distances with each other in order to produce a determination result indicating a relation between the magnitudes of the first and second distances.

Accordance to an embodiment of the present invention, an information processing method includes the steps of clustering a plurality of pieces of picture data (such as the picture data pic1 to the picture data pic7, which are shown in FIG. 2) in clusters (such as the clusters $C_{11}$ and $C_{22}$ shown in FIG. 2) corresponding respectively to nodes on layers in a tree structure (such as the cluster tree shown in FIG. 2) by assigning each of the pieces of picture data to a leaf node (such as the leaf node $N_{41}$ or $N_{51}$ shown in FIG. 2) of the tree structure. The information processing method includes: a metadata acquisition step (such as a step S11 of a flowchart shown in FIG. 18) of acquiring metadata of the pieces of picture data; and a tree-structure processing step (such as a step S12 of the flowchart shown in FIG. 18) of finding a first distance and a second distance on the basis of the metadata and adding a new node (such as the new node $N_{in}$ shown in FIG. 22) to the tree structure on the basis of the first and second distances as a node having an attention node (such as the attention node $N_{new}$ shown in FIG. 21), which is assigned to attention data placed at an attention-receiving position in an array of the pieces of picture data arranged on the basis of the metadata of the pieces of picture data, as a child node. In the program, the first distance (such as the distance $d_q$ shown in FIG. 22) is a distance based on a predetermined distance scale as the distance between two adjacent pieces of picture data selected among pieces of picture data pertaining to a cluster selected among clusters corresponding to nodes of the tree structure as a cluster(such as a cluster $C_l$ shown in FIG. 21) adjacent to the attention data placed at the attention-receiving position; and the second distance (such as the distance $d_n$ shown in FIG. 22) is a distance based on the predetermined distance scale as the distance between the attention data and a piece of picture data selected among the pieces of picture data pertaining to the cluster adjacent to the attention data as a piece of picture data adjacent to the attention data.

Preferred embodiments of the present invention are explained by referring to diagrams as follows.

FIG. 1 is a diagram showing a typical configuration of an embodiment implementing an information processing system to which the present invention is applied. The information processing system is the configuration of a logical confluence including a plurality of apparatus, which do not have to be accommodated in a box.

As shown in the figure, the information processing system includes a camera 1 and an information-processing apparatus 2. To be more specific, the camera 1 is a digital still camera.

In accordance with an operation carried out by the user, the camera 1 performs a photographing process to take a picture of a photographing object and stores picture data obtained as a result of the photographing process in a memory. In addition, as metadata of the picture data, the camera 1 also stores metadata, which includes a photographing date/time of the photographing process and a photographing location of the process, in the memory. Typically, the photographing date/time includes a photographing date expressed in terms of a year, a month, and a day as well as a photographing time expressed in terms of hours and minutes. The camera 1 is also capable of transferring (or outputting) the stored picture data and the stored metadata to an external destination.

The camera 1 typically has an embedded clock for measuring the present time. On the basis of the present time measured by the clock, the camera 1 acquires a photographing time, which is a part of metadata of the picture data. In addition, the camera 1 also has an embedded receiver section for receiving a signal typically from a satellite provided for a GPS (Global Positioning System) and, on the basis of the signal received by the receiver section from the satellite, the camera 1 acquires a photographing location, which is another part of metadata of the picture data.

As shown in FIG. 1, the information-processing apparatus 2 includes an input interface 11, a data storage apparatus 12, a clustering apparatus 13, a cluster-tree storage apparatus 14, a display control apparatus 15, a display apparatus 16, and an operation unit 17. The information-processing apparatus 2 can be (electrically) connected to the camera 1.

The input interface 11 functions as an interface between the information-processing apparatus 2 and the camera 1. That is to say, when the information-processing apparatus 2 and the camera 1 are connected to each other by a cable, for example, the input interface 11 reads out (or retrieves) image data and metadata of the image data from the camera 1, and provides the pieces of picture data in the data storage apparatus 12.

The data storage apparatus 12 typically includes a hard disk or a semiconductor memory and is used for storing picture data and metadata, which are read out by the input interface 11 from the camera 1.

The clustering apparatus 13 clusters pieces of picture data stored in the data storage apparatus 12 into a cluster corresponding to a node of a cluster tree having a tree structure as will be described later in order to put the pieces of picture data in a layer structure by assigning the pieces of picture data to clusters on the basis of metadata also stored in the data storage apparatus 12. Then, the clustering apparatus 13 stores information on the cluster tree, which is obtained as a result of the process to cluster the pieces of picture data, in the cluster-tree storage apparatus 14.

The cluster-tree storage apparatus 14 is a memory used for storing information received from the clustering apparatus 13 as information on a cluster tree as described above.

The display control apparatus 15 is a controller for controlling the display apparatus 16 to display pieces of picture data stored in the data storage apparatus 12 in the so-called layer format on the basis of a cluster tree stored in the cluster-tree storage apparatus 14.

The display apparatus 16 is typically a CRT (Cathode Ray Tube) display unit or an LCD (Liquid Crystal Display) unit. Controlled by the display control apparatus 15 as described above, the display apparatus 16 displays information including pieces of picture data.

The operation unit 17 is a unit operated by the user to output an operation signal representing an operation carried out by the user to other functional blocks requiring the signal. For example, the input interface 11 retrieves picture data and metadata of the picture data from the camera 1 in accordance with an operation signal received from the operation unit 17. As another example, the clustering apparatus 13 clusters pieces of picture data stored in the data storage apparatus 12 in accordance with an operation signal received from the operation unit 17. As a further example, the display control apparatus 15 controls an operation to display pieces of picture data on the display apparatus 16 in accordance with an operation signal received from the operation unit 17.

With the camera 1 and the information-processing apparatus 2 connected to each other in the information processing system having the configuration described above, when the user operates the operation unit 17 to retrieve picture data from the camera 1, the input interface 11 reads out the picture data and metadata of the picture data from the camera 1 and stores the pieces of picture data in the data storage apparatus 12.

As described above, the clustering apparatus 13 clusters pieces of picture data stored in the data storage apparatus 12 into a cluster corresponding to a node of a cluster tree having a tree structure as will be described later in order to put the pieces of picture data in a layer structure by assigning the pieces of picture data to the cluster on the basis of metadata also stored in the data storage apparatus 12. Then, the clustering apparatus 13 stores information on the cluster tree, which is obtained as a result of the process to cluster the pieces of picture data, in the cluster-tree storage apparatus 14.

As a result of the clustering process carried out by the clustering apparatus 13 as described above, a cluster tree having a tree structure (or a layer structure) is obtained. In the following description, a layer clustering process to result in a cluster tree having a tree structure is properly referred to simply as a layer clustering process.

When the user operates the operation unit 17 in order to display pieces of picture data stored in the data storage apparatus 12, on the other hand, the display control apparatus 15 displays in layers the pieces of picture data on the display apparatus 16 on the basis of the cluster tree stored in the cluster-tree storage apparatus 14.

FIG. 2 is a diagram showing a typical cluster tree obtained as a result of a layer clustering process carried out by the clustering apparatus 13 employed in the information-processing apparatus 2 as shown in FIG. 1.

As shown in FIG. 2, the cluster tree is composed of nodes each corresponding to a cluster and arcs each used for connecting two adjacent nodes. Each of the nodes is data (or information) included in the tree structure clustering in layers pieces of picture data.

In FIG. 2 and any other diagram showing a cluster tree, a circle mark denotes a node and a line connecting two adjacent circle marks denotes an arc.

A node can be connected to another node by using an arc. To be more specific, a node on a layer at a higher level can be connected to a node on a layer at a level lower than the higher-level layer by one layer. In this case, the node on the layer at the lower level is referred to as a child node, whereas the node on the layer at the higher level is referred to as a parent node.

In the typical cluster tree shown in the figure, a node can have only two child nodes. That is to say, a parent node can be connected to two child nodes. Thus, the typical cluster tree is a two-branch tree.

The cluster tree has a node not connected to a parent node (The parent node does not exist). The node without the parent node is referred to as the root node. On the other hand, the cluster tree also has a node not connected to a child node (The child node does not exist.) The node without the child node is referred to as a leaf node. A piece of picture data is assigned to a leaf node. A leaf node also holds metadata of a piece of picture data assigned to the leaf node.

In the following description, the layer placed at the highest level in the cluster tree as the layer of the root node is properly referred to as the first layer. By the same token, the layer of child nodes of the root node is properly referred to as the second layer. The child nodes of the root node are each a node findable by tracing down through an arc of the cluster tree from the root node by one level. The layer of nodes each findable by tracing down through arcs of the cluster tree from the root node by k levels in the same way is properly referred to as the (k+1)th layer.

In the typical cluster tree shown in FIG. 2, the root node $N_{11}$ on the first layer has two child nodes, i.e., nodes $N_{21}$ and $N_{22}$ on the second layer. By the same token, the node $N_{21}$ on the second layer has two child nodes, i.e., nodes $N_{31}$ and $N_{32}$ on the third layer. In the same way, the node $N_{31}$ on the third layer has two child nodes, i.e., nodes $N_{41}$ and $N_{42}$ on the fourth layer. Likewise, the node $N_{42}$ on the fourth layer has two child nodes, i.e., nodes $N_{51}$ and $N_{52}$ on the fifth layer.

Similarly to the node $N_{21}$, the node $N_{22}$ on the second layer has two child nodes, i.e., nodes $N_{33}$ and $N_{34}$ on the third layer. Similarly to the node $N_{31}$, the node $N_{33}$ on the third layer has two child nodes, i.e., nodes $N_{43}$ and $N_{44}$ on the fourth layer.

In the cluster tree shown in FIG. 2, the node $N_{41}$ on the fourth layer, the nodes $N_{51}$ and $N_{52}$ on the fifth layer, the node $N_{32}$ on the third layer, the nodes $N_{43}$ and $N_{44}$ on the fourth layer as well as the node $N_{34}$ on the third layer are each a leaf node. Being leaf nodes, the node $N_{41}$, the nodes $N_{51}$, $N_{52}$, $N_{32}$, $N_{43}$, $N_{44}$, and $N_{34}$ have respectively picture data pic1, pic2, pic3, pic4, pic5, pic6, and pic7 assigned thereto.

In FIG. 2 and other diagrams showing picture data, a square mark denotes a piece of picture data.

As described above, each node of the cluster tree corresponds to a cluster. Picture data assigned to a leaf node pertain a cluster corresponding to a node, which can be found by tracing up through arcs of the cluster tree from the leaf node. Thus, pieces of picture data assigned to leaf nodes are clustered in a large-size cluster corresponding to a node placed on a layer at a high level. On the other hand, pieces of picture data assigned to leaf nodes are clustered in a small-size cluster corresponding to a node placed on a layer at a low level.

To put it concretely, for example, the cluster tree shown in FIG. 2 has the node $N_{11}$ on the first layer as the only root node from which the cluster tree can be traced down through arcs to all leaf nodes, i.e., the node $N_{41}$, the nodes $N_{51}$, $N_{52}$, $N_{32}$, $N_{43}$, $N_{44}$, and $N_{34}$. Thus, picture data pic1, pic2, pic3, pic4, pic5, pic6, and pic7 assigned respectively to the leaf nodes, i.e., the node $N_{41}$, $N_{51}$, $N_{52}$, $N_{32}$, $N_{43}$, $N_{44}$, and $N_{34}$ each findable by tracing down the cluster tree through arcs from the root node $N_{11}$ on the first layer in the cluster tree are clustered in a large-size cluster $C_{11}$ corresponding to the root node $N_{11}$.

As another example, on the second layer, the cluster tree has the node $N_{21}$ from which the cluster tree can be traced down through arcs to the leaf nodes $N_{41}$, $N_{51}$, $N_{52}$ and $N_{32}$. On the same second layer, the cluster tree has the node $N_{22}$ from which the cluster tree can be traced down through arcs to the leaf nodes $N_{43}$, $N_{44}$, and $N_{34}$. Thus, the picture data pic1, pic2, pic3, and pic4 assigned to respectively the leaf nodes $N_{41}$, $N_{51}$, $N_{52}$, and $N_{32}$ each findable by tracing down the cluster tree through arcs from the node $N_{21}$ on the second layer in the cluster tree are clustered in a small-size Cluster $C_{21}$ corresponding to the node $N_{21}$. By the same token, picture data pic5, pic6, and pic7 assigned to respectively the leaf nodes $N_{43}$, $N_{44}$, and $N_{34}$ each findable by tracing down the cluster tree through arcs from the node $N_{22}$ on the second layer in the cluster tree are clustered in a small-size Cluster $C_{22}$ corresponding to the node $N_{22}$.

FIG. 3 is a diagram showing results of a clustering process carried out on the picture data pic1 to pic7 on the basis of the cluster tree shown in FIG. 2.

The first block from the top of FIG. 3 shows a result of the clustering process on the first layer and the second block from the top of FIG. 3 shows a result of the clustering process on the second layer.

As described earlier, all the picture data pic1 to pic7 are clustered in the cluster $C_{11}$ corresponding to the root node $N_{11}$ on the first layer in the cluster tree as shown in the first block from the top of FIG. 3. The picture data pic1 to pic4 are clustered in the Cluster $C_{21}$ corresponding to the node $N_{21}$ on the second layer in the cluster tree as shown in the second block from the top of FIG. 3. The picture data pic5 to pic7 are clustered in a Cluster $C_{22}$ corresponding to the node $N_{22}$ on the second layer in the cluster tree also as shown in the second block from the top of FIG. 3.

On the third layer, the picture data pic1 to pic3 assigned to respectively the leaf nodes $N_{41}$, $N_{51}$, and $N_{52}$ each findable by tracing down the cluster tree through arcs from the node $N_{31}$, which is one of the nodes $N_{31}$, $N_{32}$, $N_{33}$, and $N_{34}$ on the third layer in the cluster tree, are also clustered in a cluster $C_{31}$ corresponding to the node $N_{31}$ as shown in the third block from the top of FIG. 3. In addition, the picture data pic4 assigned to a leaf node findable by tracing down the cluster tree through arcs from the node $N_{32}$ on the third layer in the cluster tree is also clustered in a cluster $C_{32}$ corresponding to the node $N_{32}$ as shown in the third block from the top of FIG. 3. Moreover, the picture data pic5 and pic6 assigned to respectively the leaf nodes $N_{43}$ and $N_{44}$ each findable by tracing down the cluster tree through arcs from the node $N_{33}$ on the third layer in the cluster tree are clustered in a cluster $C_{33}$ corresponding to the node $N_{33}$ as shown in the third block from the top of FIG. 3. Furthermore, the picture data pic7 assigned to a leaf node findable by tracing down the cluster tree through arcs from the node $N_{34}$ on the third layer in the cluster tree is also clustered in a cluster $C_{34}$ corresponding to the node $N_{34}$ as shown in the third block from the top of FIG. 3.

On the fourth layer, the picture data pic1 assigned to a leaf node findable by tracing down the cluster tree through arcs from the node $N_{41}$ selected among the nodes $N_{41}$, $N_{42}$, $N_{43}$, and $N_{44}$ on the fourth layer in the cluster tree is also clustered in a Cluster $C_{41}$ corresponding to the node $N_{41}$ as shown in the fourth block from the top of FIG. 3. Furthermore, the picture data pic2 and pic3 assigned to respectively the leaf nodes $N_{51}$ and $N_{52}$ each findable by tracing down the cluster tree through arcs from the node $N_{42}$ on the fourth layer in the cluster tree is also clustered in a Cluster $C_{42}$ corresponding to the node $N_{42}$ as shown in the fourth block from the top of FIG. 3. Moreover, the picture data pic5 assigned to a leaf node findable by tracing down the cluster tree through arcs from the node $N_{43}$ on the fourth layer in the cluster tree is also clustered in a Cluster $C_{43}$ corresponding to the node $N_{43}$ as shown in the fourth block from the top of FIG. 3. Furthermore, the picture data pic6 assigned to a leaf node findable by tracing down the cluster tree through arcs from the node $N_{44}$ on the fourth layer in the cluster tree is also clustered in a Cluster $C_{44}$ corresponding to the node $N_{44}$ as shown in the fourth block from the top of FIG. 3.

It is to be noted that a cluster corresponding to a leaf node inherits clustering from the parent node of the leaf node to the lower layer of the leaf node. For example, in FIG. 2, the cluster $C_{32}$ corresponding to the leaf node $N_{32}$ on the third layer inherits clustering from the second layer of the node $N_{21}$ serving as the parent node of the leaf node $N_{32}$. By the same token, the cluster $C_{34}$ corresponding to the leaf node $N_{34}$ on the third layer inherits clustering from the second layer of the node $N_{22}$ serving as the parent node of the leaf node $N_{34}$. As a result, on the fourth layer, the piece of picture data pic4 assigned to the leaf node $N_{32}$ is clustered in the cluster $C_{32}$ corresponding to the leaf node $N_{32}$. The piece of picture data pic7 assigned to the leaf node $N_{34}$ is clustered in the cluster $C_{34}$ corresponding to the leaf node $N_{34}$.

In the same way, on the fifth layer, the picture data pic1 assigned to the leaf node $N_{41}$ is clustered in the Cluster $C_{41}$ corresponding to the leaf node $N_{41}$, the picture data pic2 assigned to the leaf node $N_{51}$ is clustered in the cluster $C_{51}$ corresponding to the leaf node $N_{51}$, the picture data pic3 assigned to the leaf node $N_{52}$ is clustered in the cluster $C_{52}$ corresponding to the leaf node $N_{52}$, the picture data pic4 assigned to the leaf node $N_{32}$ is clustered in the cluster $C_{32}$ corresponding to the leaf node $N_{32}$, the picture data pic5 assigned to the leaf node $N_{43}$ is clustered in the Cluster $C_{43}$ corresponding to the leaf node $N_{43}$, the picture data pic6 assigned to the leaf node $N_{44}$ is clustered in the Cluster $C_{44}$ corresponding to the leaf node $N_{44}$, and the picture data pic7 assigned to the leaf node $N_{34}$ is clustered in the cluster $C_{34}$ corresponding to the leaf node $N_{34}$ as shown in the fifth block (or the bottom block) of FIG. 3.

In accordance with the results of the clustering process based on the cluster tree described above, a cluster corresponding to any specific node includes clusters each corresponding to a node findable by tracing down the cluster tree from the specific node as a node at a level lower than the specific node. In other words, for example, the cluster corresponding to the node, which is not the leaf node, includes each cluster corresponding to the two child nodes of the node. Thus, a cluster can be smaller or larger than another cluster. In the results of the clustering process based on the cluster tree described above, the largest cluster is a cluster corresponding to the node on the first layer, which is the layer at the highest level. That is to say, the largest cluster is a cluster corresponding to the root node.

Figure 4:
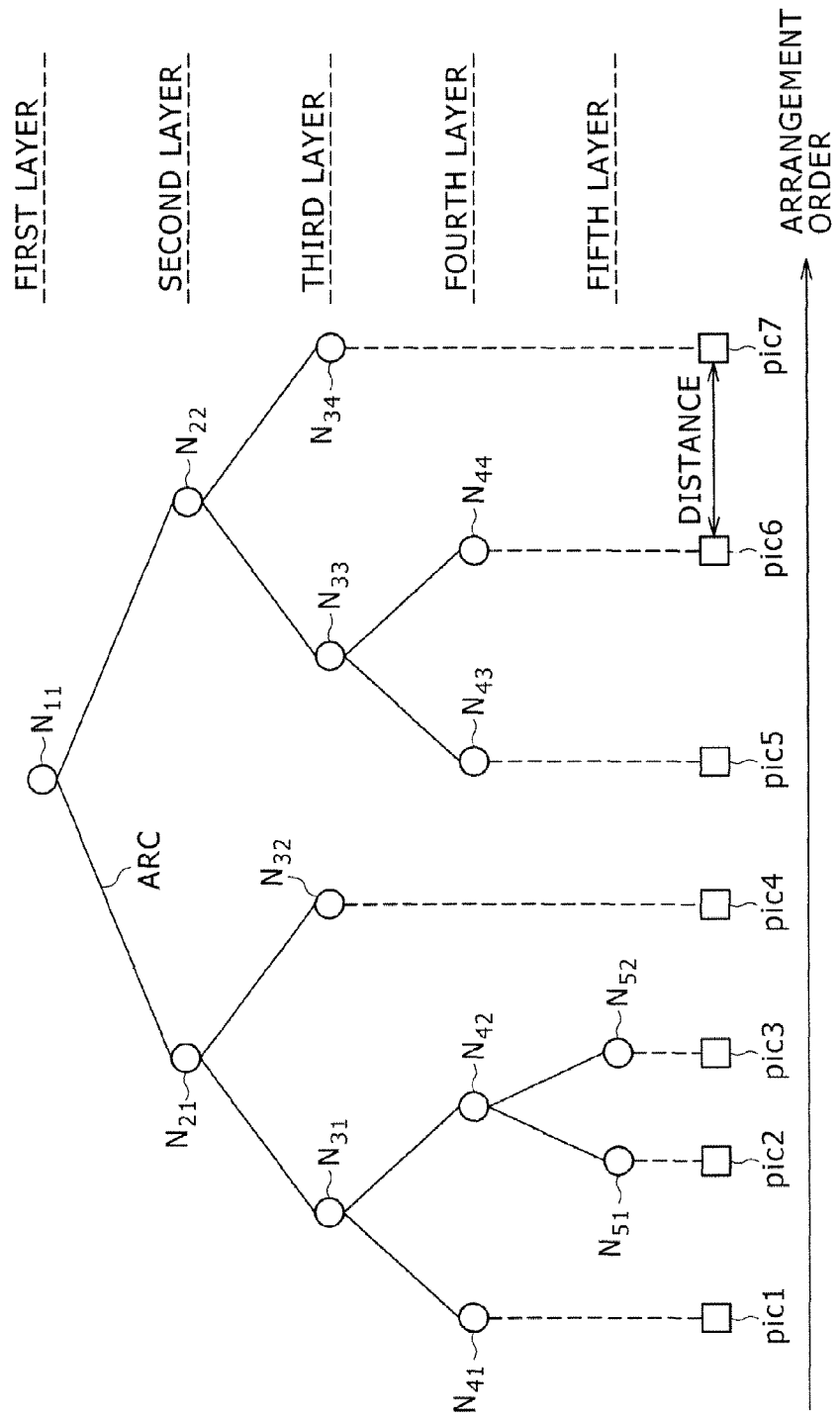
FIG. 4 is a diagram showing a typical cluster tree.
Figure 5:
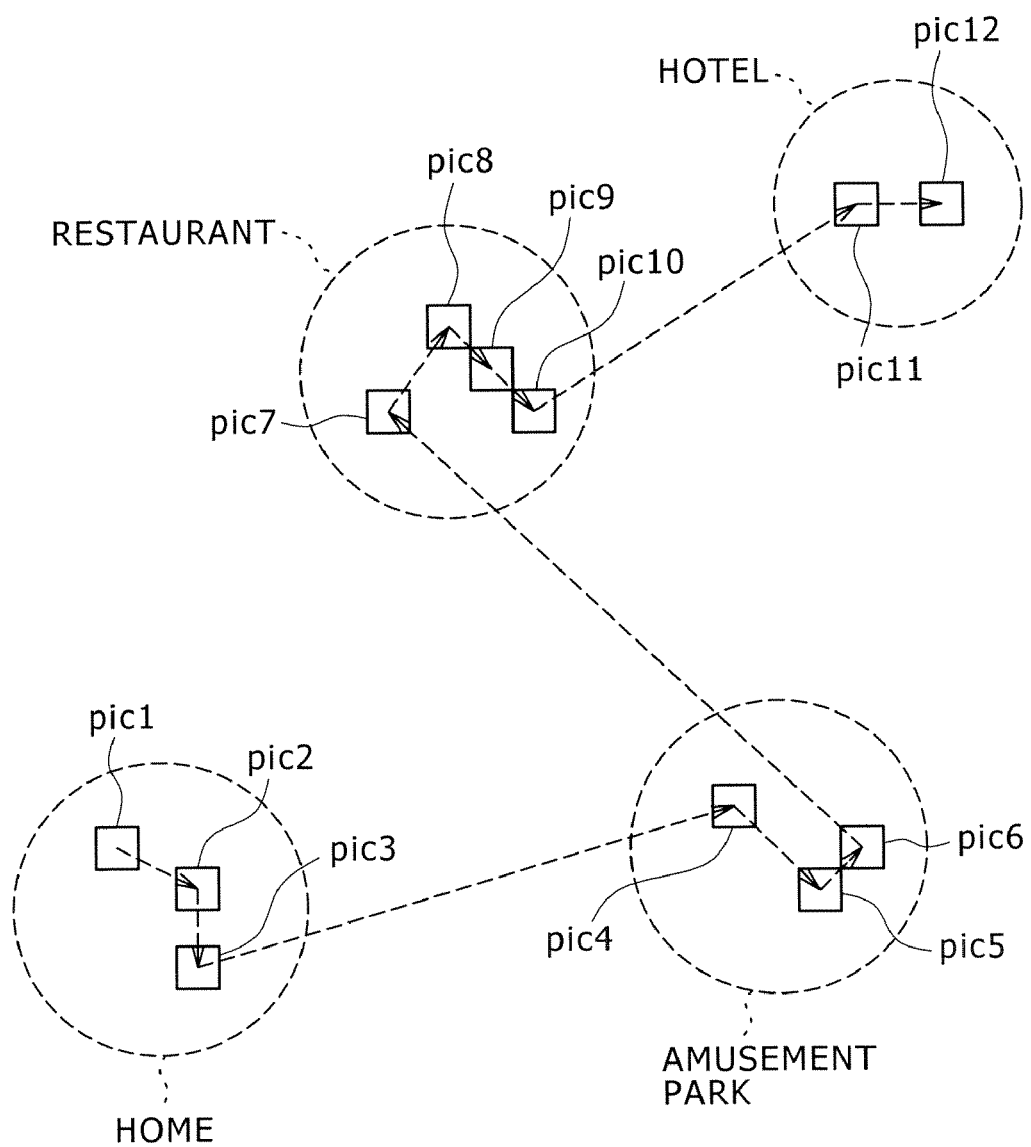
FIG. 5 is a diagram showing typical photographing locations at which photographing operations are carried out by using a camera.
Figure 6:
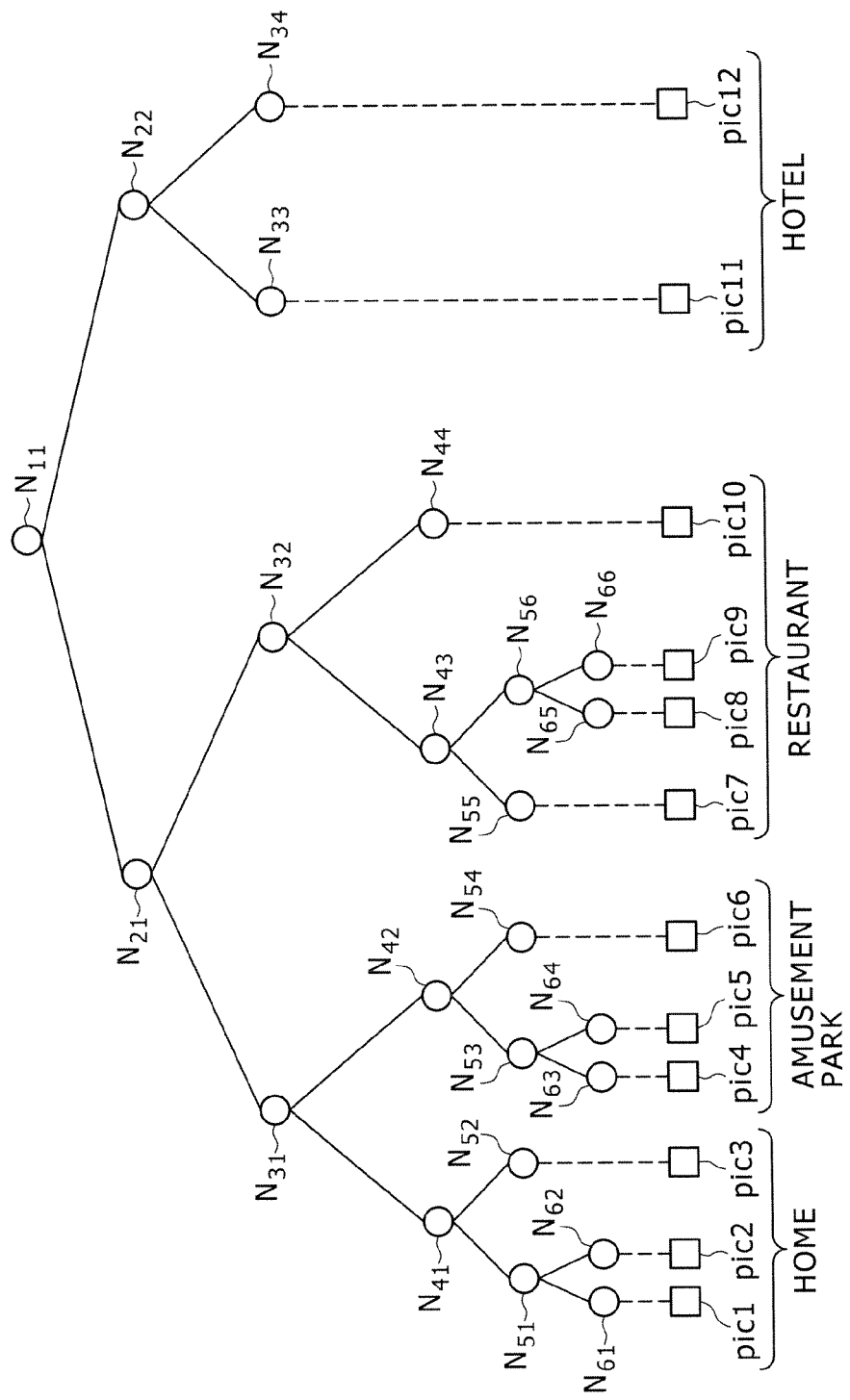
FIG. 6 is a diagram showing a typical cluster tree.

Next, by referring to FIGS. 4 to 6, the following description explains an outline of the layer clustering process carried out by the clustering apparatus 13 employed in the clustering apparatus 13 as shown in FIG. 1.

In general, many pieces of picture data obtained as a result of a photographing operation carried out by using the camera 1 are arranged in an order of photographing dates/times of the picture data. The order of photographing dates/times starts with the earliest photographing date/time sequentially followed by later photographing dates/times. This is because, if pieces of picture data are arranged in such an order of photographing dates/times, the user is capable of searching the pieces of picture data for a desired one by a sense of so-called tracing a history.

In the layer clustering process, a plurality of pieces of picture data is clustered so as to prevent changing an array obtained by typically arranging the pieces of picture data in an order of photographing dates/times.

That is to say, let us assume for example that picture data pic1 to pic7 are arranged into an array in an order from the left to right as shown in FIG. 4 as an order of photographing dates/times. In this case, in the layer clustering process, a cluster tree is generated as a tree for clustering the picture data pic1 to pic7 with the array of the picture data pic1 to pic7 kept as it is. That is to say, the layer clustering process does not generate clusters reversing the relation determined by the order of photographing dates/times of the picture data pic1 to pic7. That is to say, the layer clustering process does not generate a cluster tree having nodes corresponding to clusters reversing the relation.

Thus, let us assume for example that a plurality of pieces of picture data is arranged into an array in the left-to-right order representing an order of photographing dates/times, and a layer clustering process is carried out on the array of the pieces of picture data in order to generate a cluster tree. In this case, the following relation holds true for the cluster tree.

$$t(N_l) < t(N_r) \quad (1)$$

In the above relation, notation t(N) denotes the photographing date/time of picture data assigned to the node N, which is a leaf node. Thus, in relation (1) given above, notations $N_l$ and $N_r$ each denote a leaf node in the cluster tree. However, notation $N_l$ denotes a leaf node on the left side of the leaf node $N_r$. That is to say, notation $N_r$ denotes a leaf node on the right side of the leaf node $N_l$.

In many cases, photographing operations to produce picture data are carried out by being concentrated on a certain location and a certain time. By collecting pieces of picture data, which are time-wise or spatially close to each other, that is, by collecting pieces of picture data, which have photographing locations close to each other or photographing times/dates close to each other in the same cluster, a desired picture is rather easy to be searched.

FIG. 5 is a diagram showing a model of photographing locations at which photographing operations are carried out by using the camera 1.

In the model shown in FIG. 5, the user produces three pieces of picture data, i.e. picture data pic1, picture data pic2 and pic3, as a result of photographing operations carried out at the home of the user by using the camera 1. Then, the user moves from the home to an amusement park at which the user produces three pieces of picture data, i.e. picture data pic4, pic5, and pic6 by using the camera 1. After that, the user moves from the amusement park to a restaurant at which the user produces four pieces of picture data, i.e. picture data pic7, pic8, pic9, and pic10 by using the camera 1. Finally, the user moves from the restaurant to a hotel at which the user produces two pieces of picture data, i.e. picture data pic11 and pic12 by using the camera 1.

When the 12 pieces of picture data, i.e. picture data pic1 to pic12 are produced as a result of photographing operations as described above, the 12 picture data pic1 to pic12 may be organized by event so as to allow them to be searched for a desired piece of picture data with ease.

To put it concretely, for example, the three pieces of picture data, i.e. the picture data pic1, pic2, and pic3, which have been produced as a result of photographing operations carried out at the home, are collected in a cluster. By the same token, the three pieces of picture data, i.e. the picture data pic4, pic5, and pic6, which have produced at the amusement park, are collected in another cluster. In the same way, the four pieces of picture data, i.e. the picture data pic7, pic8, pic9, and pic10, which have been produced at the restaurant, are collected in a further cluster. Likewise, the two pieces of picture data, i.e. the picture data picture data pic11 and pic12, which have been produced at the hotel, are collected in a still further cluster.

Let us assume for example that the photographing operations to produce the three pieces of picture data, i.e. the picture data pic1 to pic3 at the home and the photographing operations to produce the three pieces of picture data, i.e. the picture data pic4 to pic6 at the amusement park are carried out on the same day. By the same token, let us assume that the photographing operations to produce the four pieces of picture data, i.e. the picture data pic7 to pic10 at the restaurant and the photographing operations to produce the two pieces of picture data, i.e. the picture data pic11 and pic12 at the hotel are operations carried out on other days. In this case, the three pieces of picture data, i.e. the picture data pic1 to pic3 produced at the home and the three pieces of picture data, i.e. the picture data pic4 to pic6 produced at the amusement park may be collected in the same cluster so as to allow them to be searched for a desired piece of picture data with ease.

Let us further assume for example that the two pieces of picture data, i.e. the picture data pic1 and pic2 among the three pieces of picture data, i.e. the picture data pic1, pic2, and pic3 produced as a result of photographing operations carried out at the home are pieces of picture data produced at photographing times close to each other and photographing locations also close to each other. That is to say, the picture data pic3 is a piece of picture data produced at a photographing time and a photographing location, which are separated from the photographing time and photographing location of the two pieces of picture data, i.e. the picture data pic1 and pic2. In this case, the three pieces of picture data, i.e. the picture data pic1, pic2, and pic3 may be collected in the same first cluster and, on the top of that, the two pieces of picture data, i.e. the picture data pic1 and pic2 produced at photographing times and photographing locations close to each other may also be collected in the same second cluster so as to allow them to be searched for a desired piece of picture data with ease.

As described above, in a layer clustering process, pieces of picture data are clustered in the same cluster on the basis of distances between the pieces of picture data. To be more specific, the pieces of picture data are separated from each other by relatively short distances being clustered in the same cluster. The distance is based on a distance scale typically representing time-wise and/or spatial nearness (or farness). To put it concretely, the distance is the degree of non-resemblance indicating time-wise or spatial dissimilarities between pieces of picture data.

When only the two picture data pic1 and pic2 exist in a layer clustering process, for example, the two pieces of picture data, i.e. the picture data pic1 and pic2 are clustered in the same cluster even if the picture data pic1 and pic2 are separated from each other by a long distance. If picture data pic3 existing at a long distance from the two picture data pic1 and pic2 is further added to the picture data pic1 and pic2, the three pieces of picture data, i.e. the picture data pic1 to pic3 are clustered in another cluster having a large size with the picture data pic1 and pic2 sustained in a state of being clustered in the same cluster as they are.

The cluster size is the magnitude of a cluster in a space defined in terms of distance scales as a space of picture data. Typically, the size of a cluster corresponds to the distance between two most separated pieces of picture data in the cluster.

If picture data pic3 with the distance thereof from the picture data pic2 shorter than the distance thereof from the picture data pic1 is further added to the picture data pic1 and pic2, on the other hand, the picture data pic2 and pic3, which are relatively close to each other, are clustered in the same cluster. In addition, with the picture data pic2 and pic3 sustained in a state of being clustered in the same cluster as they are, the picture data pic1 to pic3 are clustered in another cluster having a large size.

As described above, in a layer clustering process, with pieces of picture data sustained in a state of being arranged into an array in an order of photographing dates/times as they are, pieces of picture data separated from each other by relatively short distances are clustered in a cluster having a comparatively small size whereas pieces of picture data separated from each other by relatively long distances are clustered in another cluster having a comparatively large size.

In a layer clustering process, with pieces of picture data sustained in a state of being arranged into an array in an order of photographing dates/times as they are, pieces of picture data separated from each other by relatively short distances are clustered in the same cluster. Therefore, the distance of any two pieces of picture data adjacent to each other in the array of the pieces of picture data arranged in an order of photographing dates/times is considered. The pieces of picture data separated from each other by relatively short distances are clustered in a cluster having a comparatively small size.

As a result, in accordance with a layer clustering process, as an example, the 12 pieces of picture data, i.e. the picture data pic1 to pic12 resulting from the photographing operations explained earlier by referring to FIG. 5 are typically clustered in clusters shown in FIG. 6.

As shown in FIG. 6, the 12 pieces of picture data, i.e. the picture data pic1 to pic12 are arranged into an array in the left-to-right order representing an order of photographing dates/times and clustered in the largest-size cluster, which is the cluster corresponding to the root node $N_{11}$.

The distance between the two adjacent pieces of picture data, i.e. the picture data pic10 and pic11 is the longest among the distances between any other two adjacent pieces of picture data among the picture data pic1 to pic12, which are clustered in the cluster corresponding to the root node $N_{11}$. To be more specific, the distance between the two adjacent pieces of picture data, i.e. the picture data pic10 and pic11 is longer than the distances between any other two adjacent pieces of picture data among the 10 pieces of picture data, i.e. the picture data pic1 to pic10 on the left side of the picture data pic11. The 10 pieces of picture data, i.e. the picture data pic1 to pic10 are pieces of picture data produced at earlier photographing dates/times among the 12 pieces of picture data, i.e. the picture data pic1 to pic12. In addition, the distance between the two adjacent pieces of picture data, i.e. the picture data pic10 and pic11 is also longer than the distance between the two adjacent pieces of picture data, i.e. the picture data pic11 and pic12 on the right side of the picture data pic10. The two pieces of picture data, i.e. the picture data pic11 and pic12 are pieces of picture data produced at later photographing dates/times among the 12 pieces of picture data, i.e. the picture data pic1 to pic12.

For the reasons described above, the specific adjacent pieces of picture data, i.e. the picture data pic1 to pic10 selected among the 12 pieces of picture data, i.e. the picture data pic1 to pic12 as specific pieces of picture data with relatively short inter-picture distances are clustered in a cluster associated with a node $N_{21}$, which serves as one of the child nodes of the root node $N_{11}$, as a cluster having a size smaller than the cluster associated with the root node $N_{11}$. An inter-picture distance is defined as the distance between two pieces of picture data adjacent to each other. By the same token, particular adjacent pieces of picture data, i.e. the picture data pic11 and picture data pic12 selected among the 12 pieces of picture data, i.e. the picture data pic1 to pic12 as particular pieces of picture data with relatively short inter-picture distances are clustered in a cluster associated with a node $N_{22}$, which serves as the other child node of the root node $N_{11}$, as a cluster having a size smaller than the cluster associated with the root node $N_{11}$.

In addition, the picture data pic11 selected among the picture data pic11 and picture data pic12 clustered in the cluster associated with the node $N_{22}$ is clustered in a cluster associated with the node $N_{33}$, which corresponds to a leaf node serving as one of the child nodes of the node $N_{22}$. By the same token, the picture data pic12 selected among the picture data pic11 and pic12 is clustered in a cluster associated with the node $N_{34}$, which corresponds to a leaf node serving as the other child node of the node $N_{22}$.

The distance between adjacent pieces of picture data, i.e. the picture data pic6 and pic7 is the longest among the distances between any other two adjacent pieces of picture data among the 10 pieces of picture data, i.e. the picture data pic1 to pic10, which are clustered in a cluster corresponding to the node $N_{21}$. To be more specific, the distance between adjacent pieces of picture data, i.e. the picture data pic6 and pic7 is longer than the distances between any other two adjacent pieces of picture data among the sixth pieces of picture data, i.e. the picture data pic1 to pic6 placed on the left side of the picture data pic7. The sixth pieces of picture data, i.e. the picture data pic1 to pic6 are pieces of picture data produced at earlier photographing dates/times among the 10 pieces of picture data, i.e. the picture data pic1 to pic10. In addition, the distance between adjacent pieces of picture data, i.e. the picture data pic6 and pic7 is also longer than the distance between the four pieces of picture data, i.e. the picture data pic7 to pic10 placed on the right side of the picture data pic6. The four pieces of picture data, i.e. the picture data pic7 to pic10 are pieces of picture data produced at later photographing dates/times among the 10 pieces of picture data, i.e. the picture data pic1 to pic10.

For the reasons described above, the specific adjacent pieces of picture data, i.e. the picture data pic1 to pic6 selected among the 10 pieces of picture data, i.e. the picture data pic1 to pic10, as specific pieces of picture data with relatively short inter-picture distances are clustered in a cluster associated with a node $N_{31}$, which serves as one of the child nodes of the node $N_{21}$, as a cluster having a size smaller than the cluster associated with the node $N_{21}$. By the same token, the particular adjacent pieces of picture data, i.e. the picture data pic7 and picture data pic10 selected among the 10 pieces of picture data, i.e. the picture data pic1 to pic10, as particular pieces of picture data with relatively short inter-picture distances are clustered in a cluster associated with a node $N_{32}$, which serves as the other child node of the node $N_{21}$, as a cluster having a size smaller than the cluster associated with the node $N_{21}$.

Thereafter, in the same way, in the cluster tree shown in FIG. 6, the specific adjacent pieces of picture data, i.e. the picture data pic1 to pic3 are clustered in a cluster associated with a node $N_{41}$ as a cluster having a size smaller than the cluster associated with the node $N_{31}$. Likewise, the picture data pic4 to pic6 are clustered in a cluster associated with a node $N_{42}$ as a cluster having a size smaller than the cluster associated with the node $N_{31}$. The picture data pic7 to pic9 are clustered in a cluster associated with a node $N_{43}$ as a cluster having a size smaller than the cluster associated with the node $N_{32}$. The picture data pic10 is clustered in a cluster associated with the node $N_{44}$ as a cluster having a size smaller than the cluster associated with the node $N_{32}$.

In addition, the picture data pic1 and pic2 are clustered in a cluster associated with a node $N_{51}$ as a cluster having a smaller size. The picture data pic3 is clustered in a cluster associated with a node (leaf node) $N_{52}$ as a cluster having a smaller size. The picture data pic4 and pic5 are clustered in a cluster associated with a node $N_{53}$ as a cluster having a smaller size. The picture data pic6 is clustered in a cluster associated with a node (leaf node) $N_{54}$ as a cluster having a smaller size. The picture data pic7 is clustered in a cluster associated with a node (leaf node) $N_{55}$ as a cluster having a smaller size. The picture data pic8 and pic9 are clustered in a cluster associated with a node $N_{56}$ as a cluster having a smaller size.

Furthermore, the picture data pic1 is clustered in a cluster associated with a node (leaf node) $N_{61}$ as a cluster having a smaller size. The picture data pic2 is clustered in a cluster associated with a node (leaf node) $N_{62}$ as a cluster having a smaller size. The picture data pic4 is clustered in a cluster associated with a node (leaf node) $N_{63}$ as a cluster having a smaller size. The picture data pic5 is clustered in a cluster associated with a node (leaf node) $N_{64}$ as a cluster having a smaller size. The picture data pic8 is clustered in a cluster associated with a node (leaf node) $N_{65}$ as a cluster having a smaller size. The picture data pic9 is clustered in a cluster associated with a node (leaf node) $N_{66}$ as a cluster having a smaller size.

Thus, in the cluster tree shown in FIG. 6, the three pieces of picture data, i.e. the picture data pic1, pic2, and pic3 produced as a result of photographing operations carried out at the home are typically clustered in a cluster associated with the node $N_{41}$. The three pieces of picture data, i.e. the picture data pic4, pic5, and pic6 produced as a result of photographing operations carried out at the amusement park are typically clustered in a cluster associated with the node $N_{42}$. The four pieces of picture data, i.e. the picture data pic7, pic8, pic9, and pic10 produced as a result of photographing operations carried out at the restaurant are typically clustered in a cluster associated with the node $N_{32}$. The two pieces of picture data, i.e. the picture data pic11 and picture data pic12 produced as a result of photographing operations carried out at the hotel are typically clustered in a cluster associated with the node $N_{22}$.

In the above typical cluster tree, for example, the three specific adjacent pieces of picture data, i.e. the picture data pic7 to pic9 selected among the four pieces of picture data, i.e. the picture data pic7 to pic10, which result from photographing operations carried out at the restaurant and are clustered in a cluster associated with the node $N_{32}$, as specific pieces of picture data with relatively short inter-picture distances are clustered in a cluster associated with a node $N_{43}$ serving as one of the child nodes of the node $N_{32}$. In addition, as another example, the two particular adjacent pieces of picture data, i.e. the picture data pic8 and picture data pic9 selected among the three pieces of picture data, i.e. the picture data pic7 to pic9 clustered in a cluster associated with the node $N_{43}$ as particular pieces of picture data with relatively short inter-picture distances are clustered in a cluster associated with a node $N_{56}$ serving as one of the child nodes of the node $N_{43}$ As a distance scale used for expressing time-wise and spatial nearness between picture data pic#i and pic#j, for example, a distance scale for defining a distance dpic(i, j) in accordance with Eq. (2) or (3) can be adopted.

$$\text{dpic}(i,j) = \alpha|t(i)-t(j)| + \beta(|px(i)-px(j)|+|py(i)-py(j)|) + \gamma|v(i,j)| \quad (2)$$

$$\text{dpic}(i,j) = \sqrt{(\alpha(t(i)-t(j))^2 + \beta((px(i)-px(j))^2+(py(i)-py(j))^2) + \gamma(v(i,j))^2)} \quad (3)$$

In Eqs. (2) and (3), notation t(i) denotes the photographing date/time of picture data pic#i. Notations px(i) and py(i) denote respectively the x and y coordinates of the photographing location of picture data pic#i. Notation v(i, j) denotes the velocity of the camera 1 between a photographing operation to produce picture data pic#i and a photographing operation to produce picture data pic#j. The velocity v(i, j) is expressed by Eq. (4) as follows:

$$v(i,j) = \sqrt{((px(i)-px(j))^2+(py(i)-py(j))^2)}/(t(j)-t(i)) \quad (4)$$

Notations α, β, and γ used in Eqs. (2) and (3) each denote a weight coefficient, which is set at a proper value.

One or two of the weight coefficients α, β, and γ used in Eqs. (2) and (3) can be set at zero. If the weight coefficient α is set at zero, for example, the distance dpic(i, j) has a value independent of the term |t(i)−t(j)| representing a period (or a time-wise distance) between a photographing operation to produce picture data pic#i and a photographing operation to produce picture data pic#j. If the weight coefficient β is set at 0, on the other hand, the distance dpic(i, j) has a value independent of the term $\sqrt{((px(i)-px(j))^2+(py(i)-py(j))^2)}$ representing a spatial distance between a photographing operation to produce picture data pic#i and a photographing operation to produce picture data pic#j. If the weight coefficient γ is set at zero, the distance dpic(i, j) has a value independent of the term v(i, j) representing the velocity of the camera 1 between a photographing operation to produce picture data pic#i and a photographing operation to produce picture data pic#j.

With regard to clusters each corresponding to a node of a cluster tree obtained as a result of a layer clustering process, for example, Eq. (5) defines the distance $dC(N_i, N_j)$ between a cluster $C_i$ corresponding to a node $N_j$ and a cluster $C_j$ corresponding to another node $N_j$, which is not found by tracing down the cluster tree through arcs from the node $N_i$.

$$dC(N_i, N_j) = dpic(g, h) \quad (5)$$

Notations g and h used in Eq. (5) each denote a piece of picture data satisfying Eq. (6) as follows.

$$(g, h) = \mathrm{argmin}|t(g)-t(h)|, (g \in N_i, h \in N_j) \quad (6)$$

Notations t(g) and t(h) used in Eq. (6) denote the photographing dates/times of the picture data pic#g and pic#h respectively. Notation $g \in N_i$ indicates that picture data pic#g is picture data assigned to a leaf node, from which the node $N_i$ can be reached by tracing up the cluster tree through arcs. That is to say, the picture data pic#g is picture data pertaining to (or clustered in) a cluster $C_i$ corresponding to the node $N_i$. By the same token, notation $h \in N_j$ indicates that picture data pic#h is picture data assigned to a leaf node, from which the node $N_j$ can be reached by tracing up the cluster tree through arcs. That is to say, the picture data pic#h is picture data pertaining to (or clustered in) a cluster $C_j$ corresponding to the node $N_j$. Notation argmin |t(g)-t(h)| denotes the values of g and h that minimize the value of |t(g)-t(h)|. As is obvious from the above description, the values of g and h are numbers used for identifying the picture data pic#g and pic#h respectively.

Thus, in accordance with Eq. (5), the distance $dC(N_i, N_j)$ between a cluster $C_i$ and a cluster $C_j$ is the distance between such two pieces of picture data pertaining to the clusters $C_i$ and $C_j$ respectively that the difference in photographing date/time between the two pieces of picture data is the shortest. Let us assume for example that pieces of picture data pertaining to the cluster $C_i$ each have a photographing date/time earlier than pieces of picture data pertaining to the cluster $C_j$. In this case, the distance $dC(N_i, N_j)$ between the cluster $C_i$ and the cluster $C_j$ is the distance dpic(g, h). The distance dpic(g, h) is the distance between the picture data pic#g and pic#h. The pic#g has the latest photographing date/time in the array of pieces of picture data arranged in an order of photographing dates/times as the pieces of picture data pertaining to the cluster $C_i$. The picture data pic#h has the earliest photographing date/time in the array of pieces of picture data arranged in an order of photographing dates/times as the pieces of picture data pertaining to the cluster $C_j$.

It is to be noted that, in a cluster tree, only a piece of picture data assigned to a leaf node pertains to a cluster corresponding to the leaf node. As described above, the distance $dC(N_i, N_j)$ described by Eq. (5) is a distance between a specific piece of picture data pertaining to the cluster $C_i$ corresponding to a node $N_i$ and a particular piece of picture data pertaining to the cluster $C_j$ corresponding to another node $N_j$. Thus, if the nodes $N_i$ and $N_j$ are both a leaf node, the distance $dC(N_i, N_j)$ is the distance dpic(i, j) between the only picture data pic#i assigned to the leaf node $N_i$ and the only picture data pic#j assigned to the leaf node $N_j$. For this reason, the distance between the picture data pic#i assigned to the leaf node $N_i$ and the picture data pic#j assigned to the leaf node $N_j$ can be expressed as the distance dpic(i, j) using the picture data pic#i and pic#j or the distance $dC(N_i, N_j)$ using the node $N_i$ and the node $N_j$.

With regard to the distance $dC(N_i, N_j)$ between a cluster $C_i$ corresponding to a node $N_i$ and a cluster $C_j$ corresponding to another node $N_j$, let us assume for example a case in which the node $N_i$ is a leaf node while the node $N_j$ is not a leaf node. In this case, the distance $dC(N_i, N_j)$ expressed by Eq. (5) is the distance between the picture data pic#i assigned to the node $N_i$ and the cluster $C_j$ corresponding to the node $N_j$. The distance $dC(N_i, N_j)$ between the picture data pic#i and the cluster $C_j$ is calculated as the distance dpic(i, j) between the picture data pic#i and the picture data pic#j. The picture data pic#j is selected among pieces picture data pertaining to the cluster $C_j$ as a piece of picture data having a photographing date/time closest to the picture data pic#i.

Next, by referring to FIGS. 7 to 15, the following description explains an outline of a procedure for creating a cluster tree in a layer clustering process.

In a layer clustering process, a piece of picture data to be newly clustered is brought to attention (or selected) as attention data $pic_{new}$ and the attention data $pic_{new}$ is assigned to a new leaf node.

If there is no piece of picture data to be subjected to a layer clustering process, that is, if the attention data $pic_{new}$ is the first piece of picture data serving as an object of the layer clustering process, the selected root node of the cluster tree is also a leaf node to which the attention data $pic_{new}$ is to be assigned.

Figure 7:
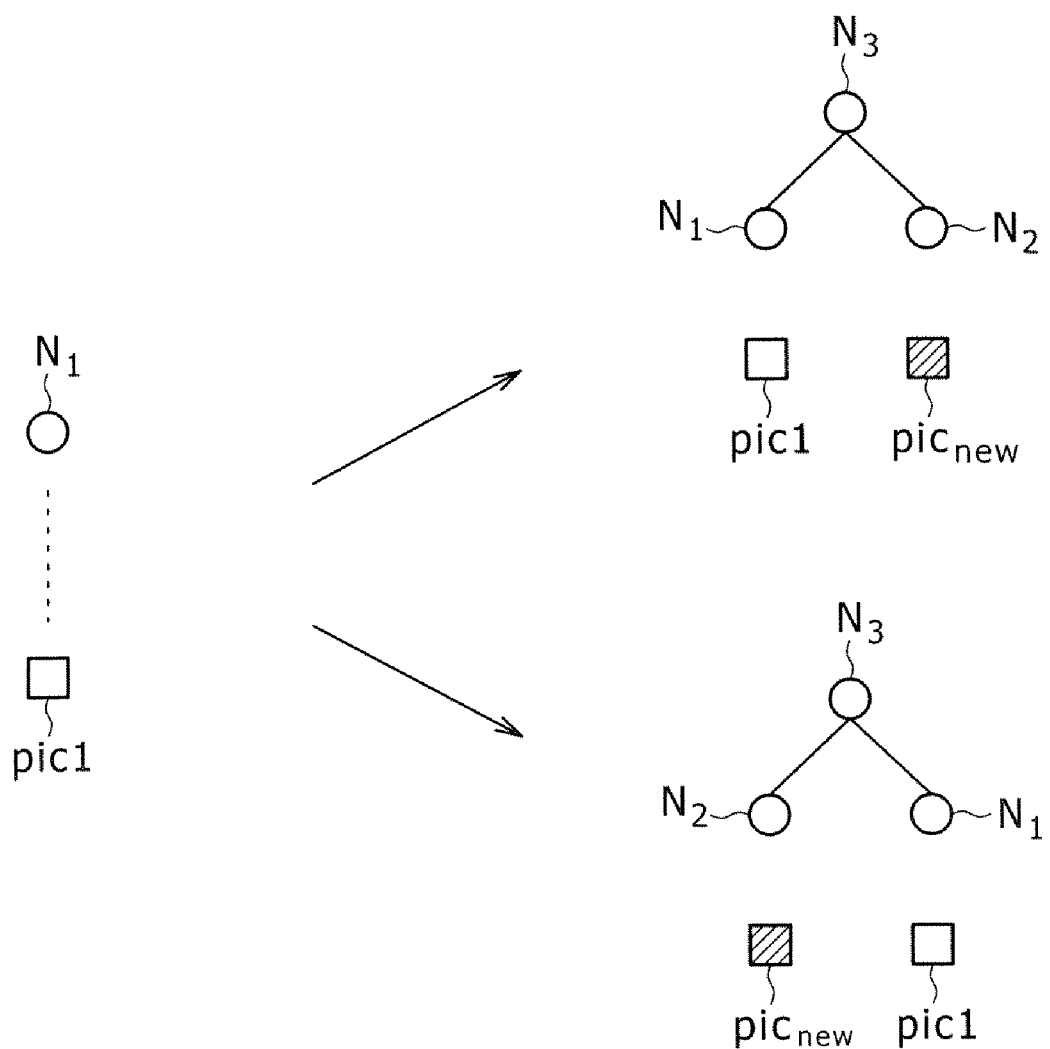
FIG. 7 is an explanatory diagram referred to in describing a procedure for generating a cluster tree.

To put it concretely, as shown on the left side of FIG. 7, picture data pic1 is the attention data $pic_{new}$. In this case, the attention data pic1 is assigned to a new leaf node $N_1$, which also serves as the root node of the cluster tree.

Also as shown on the left side of FIG. 7, there is a cluster tree including only the root node $N_1$ to which the picture data pic1 is assigned. With such a cluster tree, when new picture data $pic_{new}$ is taken as the attention data, in the layer clustering process, the position of the attention data $pic_{new}$ is detected in the array of pieces of picture data arranged in the left-to-right order representing the order of photographing dates/times. At the present time, the array of pieces of picture data includes only the picture data pic1 pertaining to the cluster tree and the attention data $pic_{new}$. The picture data pic1 has already been assigned to a leaf node in the cluster tree. In the following description, the position at which the attention data $pic_{new}$ is placed in the array is properly referred to as an attention position.

If the photographing date/time of the attention data $pic_{new}$ is later than the photographing date/time of the new picture data pic, that is, if the attention data $pic_{new}$ is more recent than the picture data pic1, the position on the right side of the picture data pic1 is the attention position as shown at the right upper portion of FIG. 7. If the photographing date/time of the attention data $pic_{new}$ is earlier than the photographing date/time of the new picture data pic1, that is, if the attention data $pic_{new}$ is less recent than the picture data pic1, on the other hand, the position on the left side of the picture data pic1 is the attention position as shown at the right lower portion of FIG. 7.

Then, in the layer clustering process, a new leaf node $N_2$ is assigned to the attention data $pic_{new}$ and located at the attention position in the cluster tree. That is to say, if the position on the right side of the picture data pic1 is the attention position as shown at the right upper portion of FIG. 7, the new leaf node $N_2$ assigned to the attention data $pic_{new}$ is placed at the position on the right side adjacent to the leaf node $N_1$ assigned to the picture data pic1. If the position on the left side of the picture data pic1 is the attention position as shown at the right lower portion of FIG. 7, on the other hand, the new leaf node $N_2$ assigned to the attention data $pic_{new}$ is placed at the position on the left side adjacent to the leaf node $N_1$ assigned to the picture data pic1.

Then, a node $N_3$ is added to the cluster tree as the parent node of the leaf node $N_1$ assigned to the picture data pic1 and the leaf node $N_2$ assigned to the attention data $pic_{new}$. As a result, as shown on the right side of FIG. 7, the layer clustering process gives a cluster tree consisting of the node $N_3$ serving as the root node, the leaf node $N_1$ assigned to the picture data pic1 to serve as one of the child nodes of the root node $N_3$, and the leaf node $N_2$ assigned to the attention data $pic_{new}$ to serve as the other child node of the root node $N_3$.

It is to be noted that, if the photographing date/time of the attention data $pic_{new}$ is later than the photographing date/time of the new picture data pic1, the new leaf node $N_2$ assigned to the attention data $pic_{new}$ is placed at the position on the right side adjacent to the leaf node $N_1$ as shown at the right upper portion of FIG. 7. Thus, the resulting cluster tree includes the leaf node $N_1$ on the left side and the leaf node $N_2$ on the right side.

If the photographing date/time of the attention data $pic_{new}$ is earlier than the photographing date/time of the new picture data pic1, on the other hand, the new leaf node $N_2$ assigned to the attention data $pic_{new}$ is placed at the position on the left side adjacent to the leaf node $N_1$ as shown at the right lower portion of FIG. 7. Thus, the resulting cluster tree includes the leaf node $N_2$ on the left side and the leaf node $N_1$ on the right side.

As explained earlier by referring to FIG. 2, in a cluster tree, all nodes except leaf nodes each have two child nodes. In the following description, the child node placed on the left side of a parent node is referred to simply as a left node. On the other hand, the child node placed on the right side of a parent node is referred to simply as a right node.

It is to be noted that, each leaf node of a cluster tree is assigned to one of pieces of picture data, which are arranged in an order of photographing dates/times. Let us pay attention to left and right nodes serving as the two child nodes of a node. In this case, the photographing date/time of a piece of picture data assigned to any leaf node reachable by tracing down the cluster tree through arcs from the left node is earlier than the photographing date/time of a piece of picture data assigned to any leaf node reachable by tracing down the cluster tree through arcs from the right node. Conversely speaking, the photographing date/time of a piece of picture data assigned to any leaf node reachable by tracing down the cluster tree through arcs from the right node is later than the photographing date/time of a piece of picture data assigned to any leaf node reachable by tracing down the cluster tree through arcs from the left node. If the left node is a leaf node, a leaf node reachable by tracing down the cluster tree through arcs from the left node is the left node itself. By the same token, if the right node is a leaf node, a leaf node reachable by tracing down the cluster tree through arcs from the right node is the right node itself.

The first cluster tree from the left end of FIG. 8 includes a node $N_1$ serving as a leaf node assigned to picture data pic1 with a relatively early photographing date/time, a node $N_2$ serving as a leaf node assigned to picture data pic2 with a relatively later photographing date/time, and a node $N_3$ serving as the root node having the leaf nodes $N_1$ and $N_2$ as left and right nodes respectively. Let us assume that the attention data $pic_{new}$ is the new picture data and placed at the attention position in the array of pieces of picture data arranged in the order of photographing dates/times. The array includes the attention data $pic_{new}$ in addition to the picture data pic1 and pic2, which have already clustered in accordance with the cluster tree. In this case, a layer clustering process is carried out to detect the attention position.

Then, in the layer clustering process, a new leaf node $N_4$ is assigned to the attention data $pic_{new}$ and placed at the detected attention position.

Let us assume for example that the photographing date/time of the attention data $pic_{new}$ is later than the photographing date/time of the picture data pic2. In this case, a position on the right side of the picture data pic2 is detected as the attention position. Thus, the leaf node $N_4$ assigned to the attention data $pic_{new}$ is placed at a position on the right side adjacent to the leaf node $N_2$ assigned to the picture data pic2 as shown in the second cluster tree from the left end of FIG. 8.

Then, in a layer clustering process, a candidate for a cluster for handling the attention data $pic_{new}$ is found. The candidate cluster is the largest cluster adjacent to the attention data $pic_{new}$ and includes the nearest piece of picture data with the shortest distance to the attention data $pic_{new}$. In the following description, the largest adjacent clusters adjacent to the attention data $pic_{new}$ are each also referred to as an adjacent cluster of the attention data $pic_{new}$. The nearest piece of picture data will be explained later.

Figure 8:
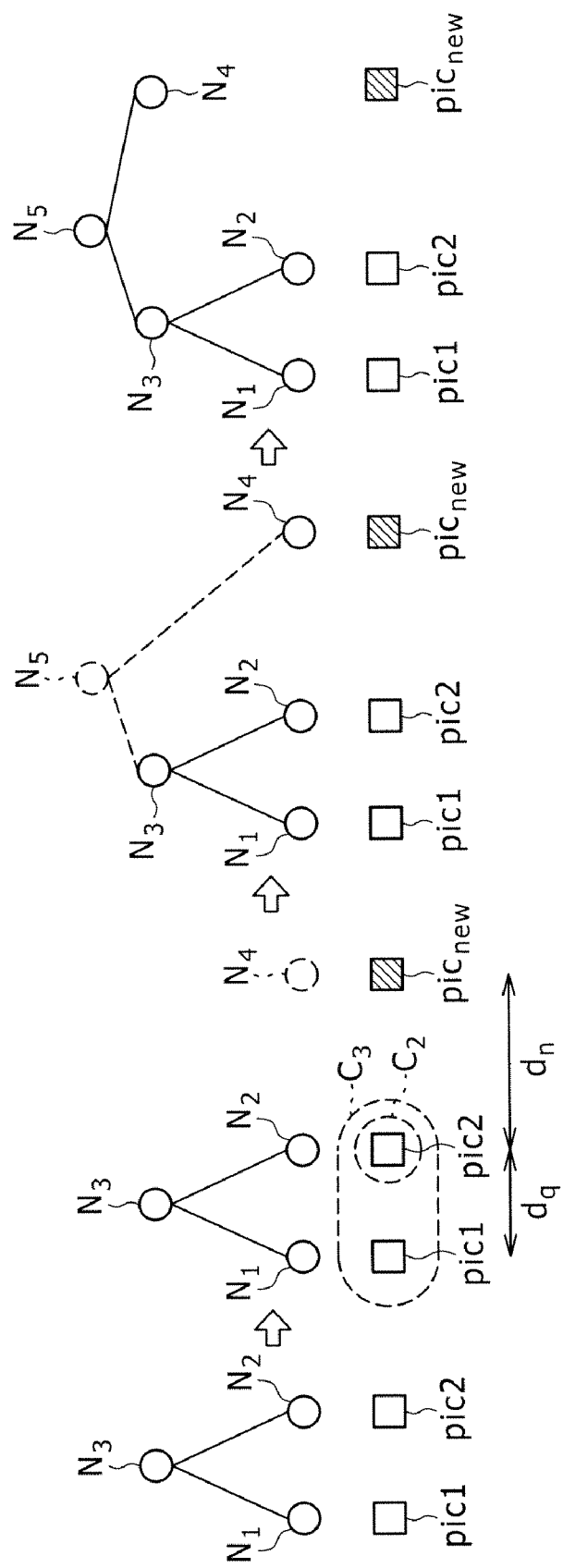
FIG. 8 is another explanatory diagram referred to in describing a procedure for generating a cluster tree.

In the second cluster tree from the left end of FIG. 8, clusters adjacent to the attention data $pic_{new}$ are a cluster $C_3$ corresponding to the node $N_3$ and a cluster $C_2$ corresponding to the leaf node $N_2$. Since the cluster $C_3$ corresponding to the node $N_3$ is the only largest adjacent cluster among the clusters adjacent to the attention data $pic_{new}$, the cluster $C_3$ is taken as the candidate cluster.

Then, the layer clustering process is carried out to find a distance $d_n$ between the attention data $pic_{new}$ and pic2 selected among pieces of picture data pertaining to the candidate cluster $C_3$ as a piece of picture data adjacent to the attention data $pic_{new}$. The layer clustering process is also carried out to find the maximum value (in the following, the maximum distance) $d_q$ of distances between any two mutually adjacent pieces of picture data pertaining to the candidate cluster $C_3$.

The piece of picture data selected among pieces of picture data pertaining to the candidate cluster $C_3$ as a piece of picture data adjacent to the attention data $pic_{new}$ is a piece of picture data having a photographing date/time closest to the photographing date/time of the attention data $pic_{new}$. In the case shown in FIG. 8, the picture data pic2 is the only nearest piece of picture data of the cluster $C_3$. Thus, the distance $d_n$ is found in accordance with Eq. (2) or Eq. (3) as the distance dpic($pic_{new}$, pic2) between the attention data $pic_{new}$ and pic2.

In addition, since the picture data pic1 and pic2 are the only pieces of picture data pertaining to the candidate cluster $C_3$, the maximum distance $d_q$ is found in accordance with Eq. (2) or Eq. (3) as the distance dpic(pic1, pic2) between the picture data pic1 and pic2.

If the distance $d_n$ between the attention data $pic_{new}$ and the nearest picture data pic2 pertaining to the candidate cluster $C_3$ is greater than (or at least equal to) the maximum distance $d_q$ in the candidate cluster $C_3$, the attention data $pic_{new}$ is clustered in a new cluster other than the candidate cluster $C_3$. In addition, the other cluster has a size larger than the cluster $C_3$.

In order to cluster the attention data $pic_{new}$ in such another cluster, a new node corresponding to the other cluster is added to the cluster tree.

That is to say, in order to cluster the attention data $pic_{new}$ in a cluster that is other than the candidate cluster $C_3$ and has a size larger than the cluster $C_3$, a new node $N_5$ is added to the cluster tree as a node having the node $N_3$ corresponding to the cluster $C_3$ as one of the child nodes and the leaf node $N_4$ assigned to the attention data $pic_{new}$ as the other child node as shown in the third cluster tree from the left end of FIG. 8.

As a result, the first cluster from the left end of FIG. 8 is updated to the fourth cluster tree from the left end of FIG. 8 or the first cluster tree from the right end of FIG. 8. The fourth cluster tree includes the node $N_5$ as the root node, the node $N_3$ as the left node of the root node $N_5$, the leaf node $N_4$ as the right node of the root node $N_5$, the leaf node $N_1$ as the left node of the node $N_3$, and the leaf node $N_2$ as the right node of the node $N_3$.

As described above, the leaf node $N_4$ assigned to the attention data $pic_{new}$ is placed at a position on the right side adjacent to the leaf node $N_2$ assigned to the picture data pic2 as shown in the second cluster tree from the left end of FIG. 8. Let us assume, however, that the distance $d_n$ between the attention data $pic_{new}$ and the nearest picture data pic2 pertaining to the candidate cluster $C_3$ is not greater (or smaller) than the maximum distance $d_q$ in the candidate cluster $C_3$ as shown in the first cluster tree from the left end of FIG. 9. In this case, a new node is added to the cluster tree as a node corresponding to a new cluster that is included in the candidate cluster $C_3$.

That is to say, if the distance $d_n$ between the attention data $pic_{new}$ and the nearest picture data pic2 pertaining to the candidate cluster $C_3$ is not greater than the maximum distance $d_q$ in the candidate cluster $C_3$, the attention data $pic_{new}$ is clustered in a new cluster that is included in the candidate cluster $C_3$. In order to cluster the attention data $pic_{new}$ in the new cluster, a new node corresponding to the new cluster is added to the cluster tree.

Figure 9:
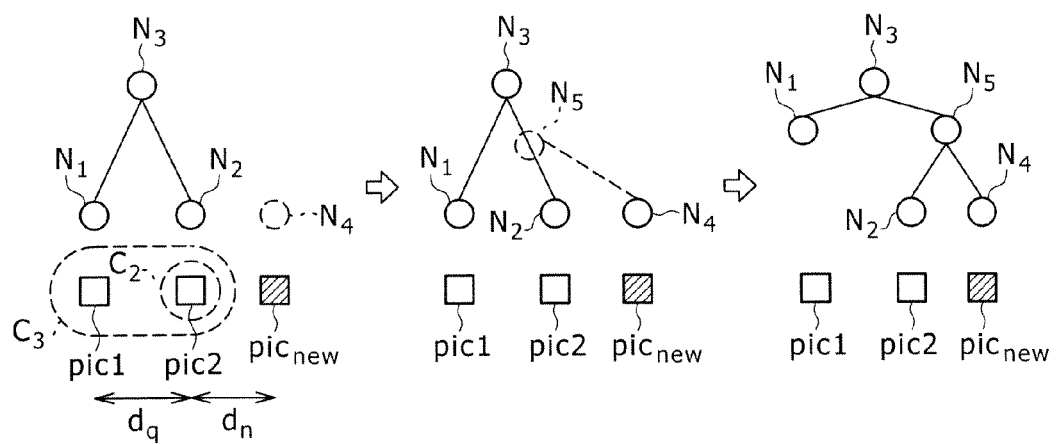
FIG. 9 is a further explanatory diagram referred to in describing a procedure for generating a cluster tree.

To put it concretely, as shown in the second cluster tree from the left end of FIG. 9, a new node $N_5$ is added to the cluster tree as a node having the leaf node $N_2$ as the left node and the leaf node $N_4$ assigned to the attention data $pic_{new}$ as the right node. The new node $N_5$ is placed at a position on the arc between the node $N_3$ corresponding to the candidate cluster $C_3$ and the leaf node $N_2$, which is one of the two child nodes of the node $N_3$. The child node $N_2$ is the side on which the leaf node $N_4$ assigned to the attention data $pic_{new}$ is located.

As a result, the first cluster from the left end of FIG. 8 is updated to the third cluster tree from the left end of FIG. 9 or the first cluster tree from the right end of FIG. 9. The third cluster tree includes the node $N_3$ as the root node, the leaf node $N_1$ as the left node of the root node $N_3$, the node $N_5$ as the right node of the root node $N_3$, the leaf node $N_2$ as the left node of the node $N_5$ and the leaf node $N_4$ as the right node of the node $N_5$.

As another example, let us assume that the photographing date/time of the attention data $pic_{new}$ is later than the photographing date/time of the picture data pic1 but earlier than the photographing date/time of the picture data pic2. In this case, a position between the picture data pic1 and pic2 is detected as the attention position. Thus, the leaf node $N_4$ assigned to the attention data $pic_{new}$ is placed at a position between the leaf node $N_1$ assigned to the picture data pic1 and the leaf node $N_2$ assigned to the picture data pic2 as shown in the first cluster tree from the left end of FIG. 10.

Then, as described earlier by referring to FIG. 8, a candidate for a cluster for handling the attention data $pic_{new}$ is found. The candidate cluster is the largest cluster adjacent to the attention data $pic_{new}$ and includes the nearest piece of picture data with the shortest distance to the attention data $pic_{new}$.

Figure 10:
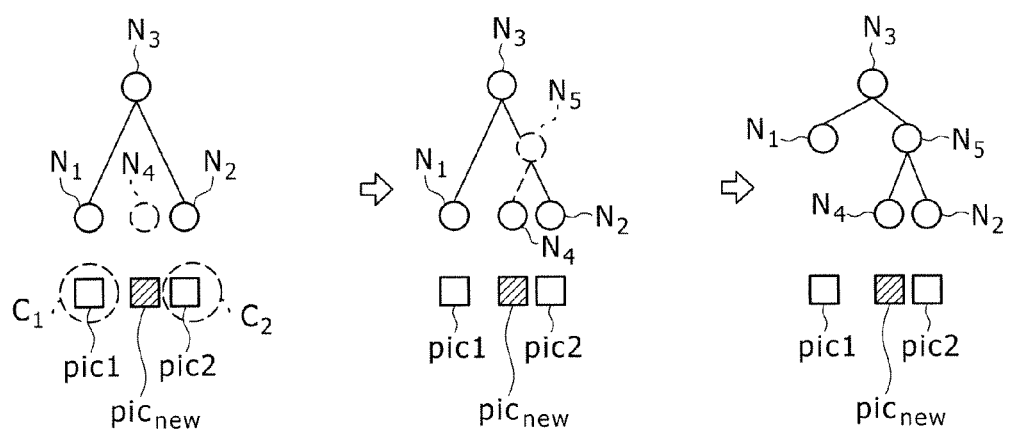
FIG. 10 is a still further explanatory diagram referred to in describing a procedure for generating a cluster tree.

In the first cluster tree from the left end of FIG. 10, clusters are a cluster $C_1$ corresponding to the leaf node $N_1$ on the left side adjacent to the attention data $pic_{new}$ and a cluster $C_2$ corresponding to the leaf node $N_2$ on the right side. In this case, the two clusters $C_1$ and $C_2$ are each having the largest adjacent cluster. Thus, a candidate cluster is selected from the clusters $C_1$ and $C_2$ as a candidate cluster including the nearest piece of picture data with a smaller distance to the attention data $pic_{new}$.

Let us assume for example that the distance between the attention data $pic_{new}$ and the nearest piece of picture data in the cluster $C_2$ is shorter than the distance between the attention data $pic_{new}$ and the nearest piece of picture data in the cluster $C_1$. In this case, the cluster $C_2$ is taken as the candidate cluster.

To put it concretely, assuming that the nearest piece of picture data in the cluster $C_1$ is the picture data pic1 whereas the nearest piece of picture data in the cluster $C_2$ is the picture data pic2, and the distance between the attention data $pic_{new}$ and pic2 is shorter than the distance between the attention data $pic_{new}$ and pic1, the cluster $C_2$ is taken as the candidate cluster.

As described above, in a layer clustering process, the distance $d_n$ between the attention data $pic_{new}$ and the nearest piece of picture data in the candidate cluster is found. Also as explained above, the nearest piece of picture data is defined as a piece of picture data selected among pieces of picture data pertaining to the candidate cluster as a piece of picture data adjacent to the attention data $pic_{new}$. Then, the maximum distance $d_q$ representing the maximum value of distances between all two pieces of picture data in the candidate cluster is found. In this case, since the cluster $C_2$ serving as the candidate cluster corresponds to a leaf node $N_2$ assigned to the picture data pic2, the picture data pic2 is the only picture data pertains to the candidate cluster $C_2$. The candidate cluster $C_2$ includes no pieces of picture data other than the picture data pic2.

In this case, a new node is added to the cluster tree as a node corresponding to a new cluster to include both the picture data pic2 pertaining to the candidate cluster $C_2$ and the attention data $pic_{new}$.

That is to say, if the node corresponding to the candidate cluster is a leaf node, a new node is added to the cluster tree as a node having the leaf node corresponding to the candidate cluster and a leaf node assigned to the attention data $pic_{new}$ as child nodes. In the cluster trees shown in FIG. 10, the new node is a node $N_5$, the leaf node corresponding to the candidate cluster $C_2$ is the leaf node $N_2$ and the leaf node assigned to the attention data $pic_{new}$ is the leaf node $N_4$.

To put it concretely, as shown in the second cluster tree from the left end of FIG. 10, the new node $N_5$ is added to the cluster tree as a node having the leaf node $N_2$ corresponding to the candidate cluster $C_2$ as the right node and the leaf node $N_4$ assigned to the attention data $pic_{new}$ as the left node. The new node $N_5$ is placed at a position on the arc between the node $N_3$ serving as the parent node of the leaf node $N_2$ so far and the leaf node $N_2$ to serve as a new parent node of the leaf node $N_2$ and a child node of the node $N_3$.

As a result, the first cluster from the left end of FIG. 8 is updated to the third cluster tree from the left end of FIG. 10 or the first cluster tree from the right end of FIG. 10. The third cluster tree includes the node $N_3$ as the root node, the leaf node $N_1$ as the left node of the root node $N_3$, the node $N_5$ as the right node of the root node $N_3$, the leaf node $N_4$ as the left node of the node $N_5$, and the leaf node $N_2$ as the right node of the node $N_5$.

As a further example, let us assume that the photographing date/time of the attention data $pic_{new}$ is again later than the photographing date/time of the picture data pic1 but earlier than the photographing date/time of the picture data pic2. In this case, however, the distance between the attention data $pic_{new}$ and the nearest piece of picture data in the cluster $C_2$ is longer than the distance between the attention data $pic_{new}$ and the nearest piece of picture data in the cluster $C_1$ as shown in the first cluster tree from the left end of FIG. 11. In this case, the cluster $C_1$ is taken as the candidate cluster.

To put it concretely, the nearest piece of picture data in the cluster $C_1$ is the picture data pic1 whereas the nearest piece of picture data in the cluster $C_2$ is the picture data pic2, the distance between the attention data $pic_{new}$ and pic1 is shorter than the distance between the attention data $pic_{new}$ and pic2. In this case, the cluster $C_1$ is taken as the candidate cluster.

In this case, since the cluster $C_1$ serving as the candidate cluster corresponds to a leaf node $N_1$ assigned to the picture data pic1, the picture data pic1 is the only picture data pertains to the candidate cluster $C_1$. Thus, a new node is added to the cluster tree as a node corresponding to a new cluster to include both the picture data pic1 pertaining to the candidate cluster $C_1$ and the attention data $pic_{new}$ in a way similar to the case explained earlier by referring to FIG. 10.

That is to say, if the node corresponding to the candidate cluster is a leaf node, a new node is added to the cluster tree as a node having the leaf node corresponding to the candidate cluster and a leaf node assigned to the attention data $pic_{new}$ as child nodes. In the cluster trees shown in FIG. 11, the new node is a node $N_5$, the leaf node corresponding to the candidate cluster $C_1$ is the leaf node $N_1$, and the leaf node assigned to the attention data $pic_{new}$ is the leaf node $N_4$.

Figure 11:
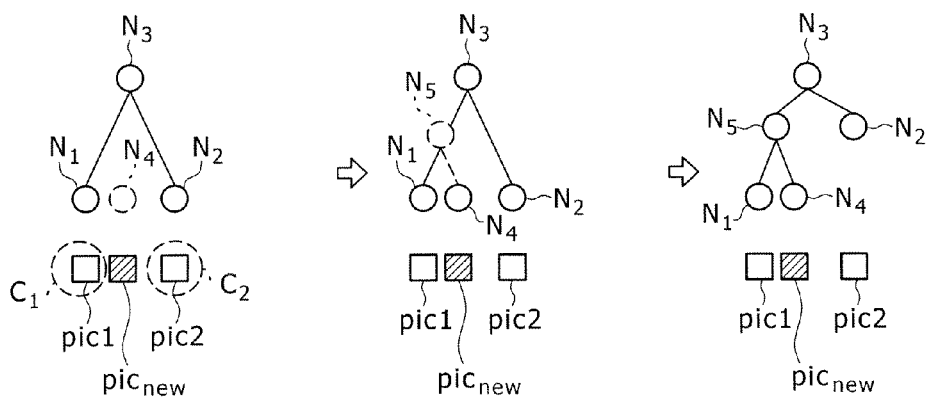
FIG. 11 is a still further explanatory diagram referred to in describing a procedure for generating a cluster tree.

To put it concretely, as shown in the second cluster tree from the left end of FIG. 11, the new node $N_5$ is added to the cluster tree as a node having the leaf node $N_1$ corresponding to the candidate cluster $C_1$ as the left node and the leaf node $N_4$ assigned to the attention data $pic_{new}$ as the right node. The new node $N_5$ is placed at a position on the arc between the node $N_3$ serving as the parent node of the leaf node $N_1$ so far and the leaf node $N_1$ to serve as a new parent node of the leaf node $N_1$ and a child node of the node $N_3$.

As a result, the first cluster from the left end of FIG. 8 is updated to the third cluster tree from the left end of FIG. 11 or the first cluster tree from the right end of FIG. 11. The third cluster tree includes the node $N_3$ as the root node, the node $N_5$ as the left node of the root node $N_3$, the leaf node $N_2$ as the right node of the root node $N_3$, the leaf node $N_1$ as the left node of the node $N_5$, and the leaf node $N_4$ as the right node of the node $N_5$.

As a still further example, let us assume that the photographing date/time of the attention data $pic_{new}$ is earlier than the photographing date/time of the picture data pic1. In this case, a position on the left side of the picture data pic1 is detected as the attention position. Thus, the leaf node $N_4$ assigned to the attention data $pic_{new}$ is placed at a position on the left side adjacent to the leaf node $N_1$ assigned to the picture data pic1 as shown in the first cluster tree from the left end of FIG. 12.

Then, in a layer clustering process, as described above, a candidate for a cluster for handling the attention data $pic_{new}$ is found. The candidate cluster is the largest cluster adjacent to the attention data $pic_{new}$ and includes the nearest piece of picture data with the shortest distance to the attention data $pic_{new}$.

Figure 12:
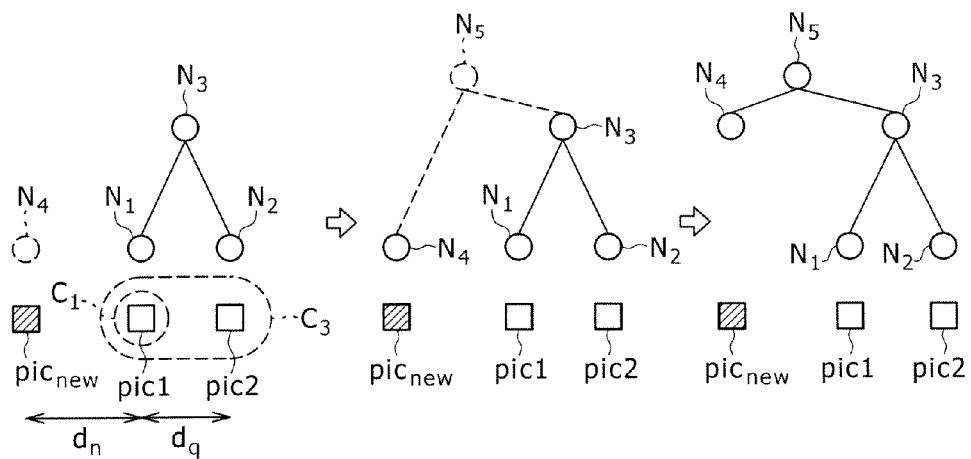
FIG. 12 is a still further explanatory diagram referred to in describing a procedure for generating a cluster tree.

In the first cluster tree from the left end of FIG. 12, clusters adjacent to the attention data $pic_{new}$ are a cluster $C_3$ corresponding to the node $N_3$ and a cluster $C_1$ corresponding to the leaf node $N_1$. Since the cluster $C_3$ corresponding to the node $N_3$ is the only largest adjacent cluster among the clusters adjacent to the attention data $pic_{new}$, the cluster $C_3$ is taken as the candidate cluster.

Then, the layer clustering process is carried out to find a distance $d_n$ between the attention data $pic_{new}$ and pic1 serving as the nearest piece of picture data in the candidate cluster $C_3$. The layer clustering process is also carried out to find the maximum distance $d_q$ between two pieces of picture data among any two pieces of picture data in the candidate cluster $C_3$. In the cluster trees shown in FIG. 12, the maximum distance $d_q$ is the distance between the picture data pic1 and pic2.

If the distance $d_n$ between the attention data $pic_{new}$ and pic1 serving as the nearest piece of picture data in the candidate cluster $C_3$ is longer than the maximum distance $d_q$ in the candidate cluster $C_3$, the attention data $pic_{new}$ is clustered in a cluster other than the candidate cluster $C_3$. The other cluster has a size larger than the cluster $C_3$ to include the cluster $C_3$ as is the case with the cluster trees shown in FIG. 8. In order to cluster the attention data $pic_{new}$ in such another cluster, a new node corresponding to the other cluster is added to the cluster tree.

That is to say, in order to cluster the attention data $pic_{new}$ in a cluster that is other than the candidate cluster $C_3$ and has a size larger than the cluster $C_3$, a new node $N_5$ is added to the cluster tree as a node having the node $N_3$ corresponding to the cluster $C_3$ as one of the child nodes and the leaf node $N_4$ assigned to the attention data $pic_{new}$ as the other child node as shown in the second cluster tree from the left end of FIG. 12.

As a result, the first cluster from the left end of FIG. 8 is updated to the third cluster tree from the left end of FIG. 12 or the first cluster tree from the right end of FIG. 12. The third cluster tree includes the node $N_5$ as the root node, the leaf node $N_4$ as the left node of the root node $N_5$, the node $N_3$ as the right node of the root node $N_5$, the leaf node $N_1$ as the left node of the node $N_3$, and the leaf node $N_2$ as the right node of the node $N_3$.

As described above, the leaf node $N_4$ assigned to the attention data $pic_{new}$ is placed at a position on the left side adjacent to the leaf node $N_1$ assigned to the picture data pic1 as shown in the first cluster tree from the left end of FIG. 12. Let us assume, however, that the distance $d_n$ between the attention data $pic_{new}$ and the nearest picture data pic1 pertaining to the candidate cluster $C_3$ is not longer than the maximum distance $d_q$ in the candidate cluster $C_3$ as shown in the first cluster tree from the left end of FIG. 13. In this case, a new node is added to the cluster tree as a node corresponding to a new cluster that is included in the candidate cluster $C_3$.

That is to say, if the distance $d_n$ between the attention data $pic_{new}$ and the nearest picture data pic1 pertaining to the candidate cluster $C_3$ is not longer than the maximum distance $d_q$ in the candidate cluster $C_3$, the attention data $pic_{new}$ is clustered in a new cluster that is included in the candidate cluster C3. In order to cluster the attention data $pic_{new}$ in the new cluster, a new node corresponding to the new cluster is added to the cluster tree.

Figure 13:
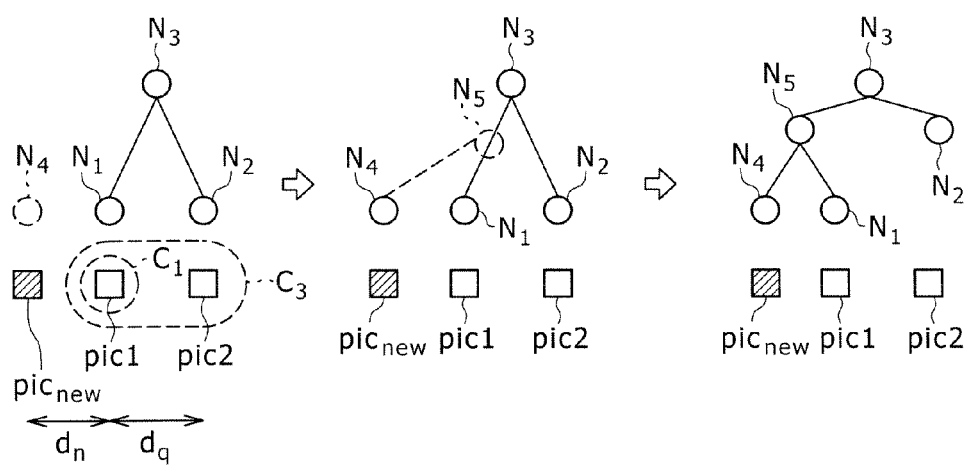
FIG. 13 is a still further explanatory diagram referred to in describing a procedure for generating a cluster tree.

To put it concretely, as shown in the second cluster tree from the left end of FIG. 13, a new node $N_5$ is added to the cluster tree as a node having the leaf node $N_1$ as the right node and the leaf node $N_4$ assigned to the attention data $pic_{new}$ as the left node. The new node $N_5$ is placed at a position on the arc between the node $N_3$ corresponding to the candidate cluster $C_3$ and the leaf node $N_1$, which is one of the two child nodes of the node $N_3$. The node $N_j$ is the child node of the side on which the leaf node $N_4$ assigned to the attention data $pic_{new}$ is located.

As a result, the first cluster from the left end of FIG. 8 is updated to the third cluster tree from the left end of FIG. 13 or the first cluster tree from the right end of FIG. 13. The third cluster tree includes the node $N_3$ as the root node, the node $N_5$ as the left node of the root node $N_3$, the leaf node $N_2$ as the right node of the root node $N_3$, the leaf node $N_4$ as the left node of the node $N_5$, and the leaf node $N_1$ as the right node of the node $N_5$.

Figure 14:
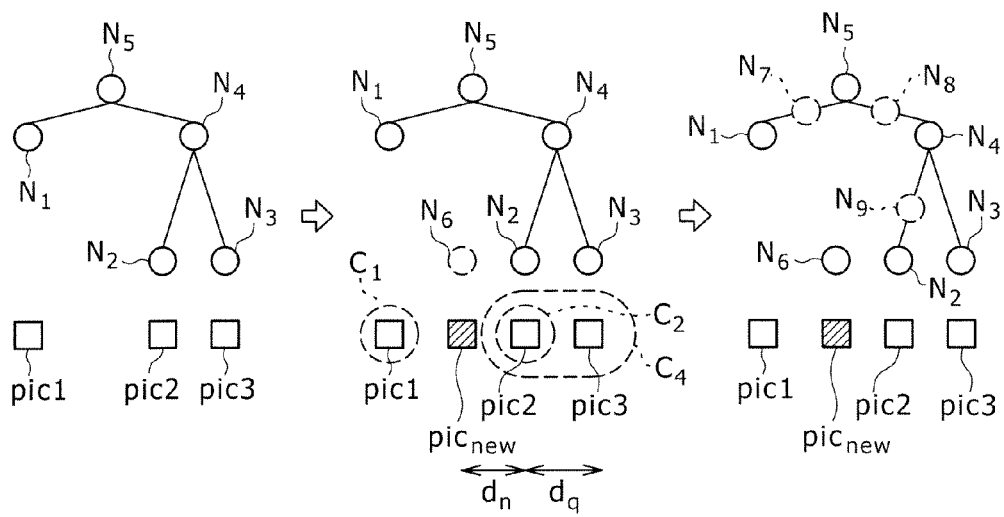
FIG. 14 is a still further explanatory diagram referred to in describing a procedure for generating a cluster tree.

Next, the first cluster tree from the left end of FIG. 14 includes nodes serving as leaf nodes $N_1$, $N_2$, and $N_3$ assigned to respectively picture data pic1 to pic3, which are arranged in the left-to-right order representing an order of photographing times/dates. The cluster tree also includes a node $N_4$ having the nodes $N_2$ and $N_3$ as the left and right nodes respectively. In addition, the cluster tree also includes a node $N_5$ serving as the root node having the nodes $N_1$ and $N_4$ as the left and right nodes respectively. Then, when new picture data is added as attention data $pic_{new}$, in a layer clustering process, the position of the attention data $pic_{new}$ is detected in the array of the attention data $pic_{new}$ and pic1 to the pic3, which have already been clustered in accordance with the cluster tree in the left-to-right order representing the order of photographing dates/times.

Then, in the layer clustering process, a new leaf node $N_6$ is assigned to the attention data $pic_{new}$ and placed at the detected attention position.

As an example, let us assume that the photographing date/time of the attention data $pic_{new}$ is later than the photographing date/time of the picture data pic1 but earlier than the photographing date/time of the picture data pic2. In this case, a position between the picture data pic1 and pic2 is detected as the attention position. Thus, the leaf node $N_6$ assigned to the attention data $pic_{new}$ is placed at a position between the leaf node $N_1$ assigned to the picture data pic1 and the leaf node $N_2$ assigned to the picture data pic2 as shown in the second cluster tree from the left end of FIG. 14.

Then, as described earlier by referring to FIG. 8, a candidate for a cluster for handling the attention data $pic_{new}$ is found. The candidate cluster is the largest cluster adjacent to the attention data $pic_{new}$ and includes the nearest piece of picture data with the shortest distance to the attention data $pic_{new}$.

In the second cluster tree from the left end of FIG. 14, clusters adjacent to the attention data $pic_{new}$ are a cluster $C_1$ corresponding to the leaf node $N_1$, a cluster $C_2$ corresponding to the node $N_2$, and a cluster $C_4$ included in the cluster $C_4$.

In the cluster tree including the nodes $N_1$, $N_2$, and $N_4$ as described above, the nodes $N_1$ and $N_4$ are nodes placed on the same layer as nodes corresponding to the largest adjacent clusters $C_1$ and $C_4$ respectively. On the other hand, the leaf node $N_2$ is a node placed on a layer at a level lower than the layer of the nodes $N_1$ and $N_4$ as a node corresponding to the cluster $C_2$. That is to say, in the cluster trees shown in FIG. 14, the cluster $C_1$ corresponding to the leaf node $N_1$ on the left side adjacent to the attention data $pic_{new}$ and the cluster $C_4$ corresponding to the node $N_4$ on the right side adjacent to the attention data $pic_{new}$ are the largest adjacent clusters adjacent to the attention data $pic_{new}$.

Thus, a candidate cluster is selected from the clusters $C_1$ and $C_4$ as a candidate cluster including the nearest piece of picture data with a smaller distance to the attention data $pic_{new}$. In the cluster trees shown in FIG. 14, the nearest piece of picture data in the cluster $C_1$ is the picture data pic1 on the left side adjacent to the attention data $pic_{new}$. On the other hand, the nearest piece of picture data in the cluster $C_4$ is the picture data pic2 on the right side adjacent to the attention data $pic_{new}$.

Let us assume for example that the distance between the attention data $pic_{new}$ and the nearest piece of picture data included in the cluster $C_1$ is shorter than the distance between the attention data $pic_{new}$ and the nearest piece of picture data included in the cluster $C_4$. That is to say, the distance between the attention data $pic_{new}$ and the pic1 included in the cluster $C_1$ is shorter (or not longer) than the distance between the attention data $pic_{new}$ and pic2 included in the cluster $C_4$. In this case, the cluster $C_1$ is taken as the candidate cluster.

Since the cluster $C_1$ serving as the candidate cluster corresponds to a leaf node $N_1$ assigned to the picture data pic1, the picture data pic1 is the only picture data pertaining to the candidate cluster $C_1$. In this case, for the same reasons described earlier by referring to FIGS. 10 and 11, a new node is added to the cluster tree as a node corresponding to a new cluster including the attention data $pic_{new}$ and pic1 pertaining to the candidate cluster $C_1$.

That is to say, a new node $N_7$ is added to the cluster tree as a node having the leaf node $N_1$ serving as a leaf node corresponding to the candidate cluster $C_1$ as one of the child nodes and the leaf node $N_6$ assigned to the attention data $pic_{new}$ as the other child node.

To put it concretely, as shown in the third cluster tree from the left end of FIG. 14, the new node $N_7$ is added to the cluster tree as a node having the leaf node $N_1$ corresponding to the candidate cluster $C_1$ as the left node and the leaf node $N_6$ assigned to the attention data $pic_{new}$ as the right node. The new node $N_7$ is placed at a position on the arc between the node $N_5$ serving as the parent node of the leaf node $N_1$ so far and the leaf node $N_1$ to serve as a new parent node of the leaf node $N_1$ and a child node of the node $N_5$.

As another example, let us assume that the distance between the attention data $pic_{new}$ and the nearest piece of picture data included in the cluster $C_1$ is longer (or not shorter) than the distance between the attention data $pic_{new}$ and the nearest piece of picture data included in the cluster $C_4$. That is to say, the distance between the attention data $pic_{new}$ and pic1 included in the cluster $C_1$ is longer (or not shorter) than the distance between the attention data $pic_{new}$ and pic2 included in the cluster $C_4$. In this case, the cluster $C_4$ is taken as the candidate cluster.

In the cluster trees shown in FIG. 14, however, the node $N_4$ corresponding to the cluster $C_4$ selected as the candidate cluster is not a leaf node. Thus, in this case, as explained earlier by referring to FIG. 9, a layer clustering process is carried out to find a distance $d_n$ between the attention data $pic_{new}$ and the nearest piece of picture data of the candidate cluster $C_4$. The layer clustering process is also carried out to find the maximum distance $d_q$ between two pieces of picture data among any two pieces of picture data in the candidate cluster $C_4$.

In the cluster trees shown in FIG. 14, the nearest piece of picture data of the candidate cluster $C_4$ is the picture data pic2. Thus, as shown in the second cluster tree from the left end of FIG. 14, the distance $d_n$ is the distance $dpic(pic_{new}, pic2)$ between the attention data $pic_{new}$ and pic2. On the other hand, the maximum distance $d_q$ is the distance $dpic(pic2, pic3)$ between the picture data pic2 and pic3 since the candidate cluster $C_4$ includes only the picture data pic2 and pic3.

If the distance $d_n$ between the attention data $pic_{new}$ and pic2 serving as the nearest piece of picture data in the candidate cluster $C_4$ is greater than the maximum distance $d_q$ in the candidate cluster $C_4$, the attention data $pic_{new}$ is clustered in a cluster other than the candidate cluster $C_4$. The other cluster has a size larger than the cluster $C_4$ as is the case with the cluster trees shown in FIG. 8. In order to cluster the attention data $pic_{new}$ in such another cluster, a new node corresponding to the other cluster is added to the cluster tree.

That is to say, in order to cluster the attention data $pic_{new}$ in a cluster that is other than the candidate cluster $C_4$ and has a size larger than the candidate cluster $C_4$, a new node $N_8$ is added to the cluster tree as a node having the node $N_4$ corresponding to the cluster $C_4$ as one of the child nodes and the leaf node $N_6$ assigned to the attention data $pic_{new}$ as the other child node as shown in the third cluster tree from the left end of FIG. 14. The added new node $N_8$ is placed at a position on an arc between the node $N_4$ corresponding to the candidate cluster $C_4$ and the node $N_5$ serving as the parent node of the node $N_4$ so far to serve as a child node of the node $N_5$ and a new parent node of the node $N_4$.

As a further example, let us assume that, in the second cluster tree from the left end of FIG. 14, the distance $d_n$ between the attention data $pic_{new}$ and pic2 serving as the nearest piece of picture data in the candidate cluster $C_4$ is not greater than the maximum distance $d_q$ in the candidate cluster $C_4$. In this case, a new node is added to the cluster tree as a node corresponding to a new cluster to include both the picture data pic2 pertaining to the candidate cluster $C_4$ and the attention data $pic_{new}$.

That is to say, if the distance $d_n$ between the attention data $pic_{new}$ and pic2 serving as the nearest piece of picture data in the candidate cluster $C_4$ is not greater than the maximum distance $d_q$ in the candidate cluster $C_4$, a new node is added to the cluster tree as a node corresponding to a cluster including the candidate cluster $C_4$ in order to cluster the attention data $pic_{new}$ in the candidate cluster $C_4$.

To put it concretely, as shown in the third cluster tree from the left end of FIG. 14, a new node $N_9$ is added to the cluster tree as a node having the leaf node $N_2$ as the right node and the leaf node $N_6$ assigned to the attention data $pic_{new}$ as the left node. The new node $N_9$ is placed at a position on the arc between the node $N_4$ corresponding to the candidate cluster $C_4$ and the leaf node $N_2$, which is one of the two child nodes of the node $N_4$. The node $N_2$ is the child node of the side on which the leaf node $N_6$ assigned to the attention data $pic_{new}$ is located.

Figure 15:
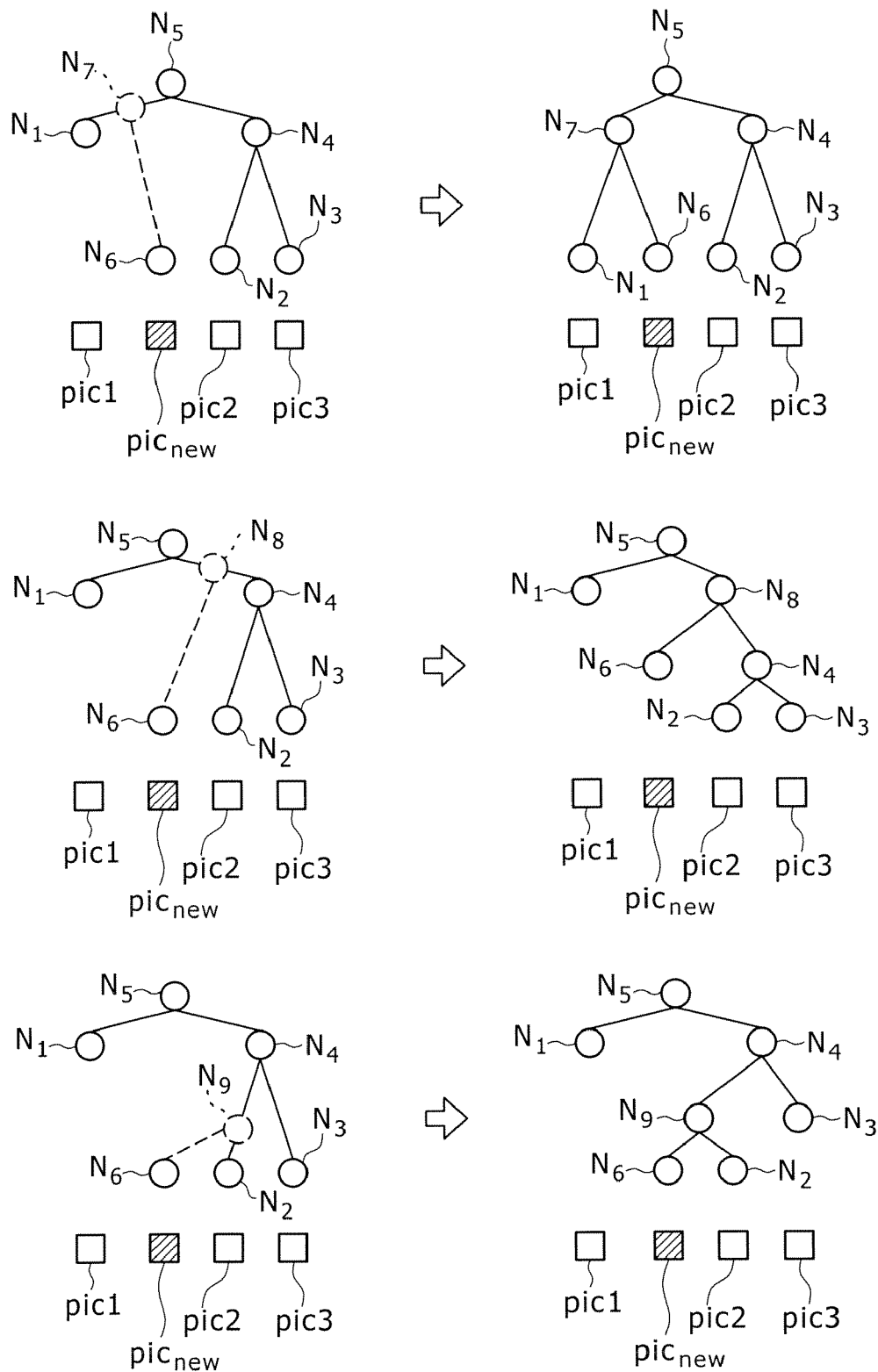
FIG. 15 is a still further explanatory diagram referred to in describing a procedure for generating a cluster tree.

FIG. 15 is a diagram showing cluster trees involved in processes to add the new nodes $N_7$, $N_8$, and $N_9$ shown in the third cluster tree from the left end of FIG. 14 to the first cluster tree from the left end of FIG. 14.

To be more specific, the first row from the top of FIG. 15 shows cluster trees involved in a process to add the new node $N_7$ shown in the third cluster tree from the left end of FIG. 14 to the first cluster tree from the left end of FIG. 15.

In this case, the new node $N_7$ is added to the cluster tree as a node having the leaf node $N_6$ assigned to the attention data $pic_{new}$ as one of the child nodes, the leaf node $N_1$ corresponding to the candidate cluster $C_1$ as the other child node, and the node $N_5$ as the parent node as shown in a cluster tree on the left side of the first row of from the top of FIG. 15.

As a result, the first cluster tree from the left end of FIG. 14 is updated to a cluster tree on the right side of the first row from the top of FIG. 15. The cluster tree on the right side of the first row from the top of FIG. 15 includes the node $N_5$ as the root node, the node $N_7$ as the left node of the root node $N_5$, the node $N_4$ as the right node of the root node $N_5$, the leaf node $N_1$ as the left node of the node $N_7$, the leaf node $N_6$ as right node of the node $N_7$, the leaf node $N_2$ as the left node of the node $N_4$, and the leaf node $N_3$ as the right node of the node $N_4$.

The second row from the top of FIG. 15 shows cluster trees involved in a process to add the new node $N_8$ shown in the third cluster tree from the left end of FIG. 14 to the first cluster tree from the left end of FIG. 14.

In this case, the new node $N_8$ is added to the cluster tree as a node having the leaf node $N_6$ assigned to the attention data $pic_{new}$ as one of the child nodes, the node $N_4$ corresponding to the candidate cluster $C_4$ as the other child node, and the node $N_5$ as the parent node as shown in a cluster tree on the left side of the second row of from the top of FIG. 15.

As a result, the first cluster tree from the left end of FIG. 14 is updated to a cluster tree on the right side of the second row from the top of FIG. 15. The cluster tree on the right side of the second row from the top of FIG. 15 includes the node $N_5$ as the root node, the leaf node $N_1$ as the left node of the root node $N_5$, the node $N_8$ as the right node of the root node $N_5$, the leaf node $N_6$ as the left node of the node $N_8$, the node $N_4$ as right node of the node $N_8$, the leaf node $N_2$ as the left node of the node $N_4$, and the leaf node $N_3$ as the right node of the node $N_4$.

The third row from the top of FIG. 15 or the first row from the bottom of FIG. 15 shows cluster trees involved in a process to add the new node $N_9$ shown in the third cluster tree from the left end of FIG. 14 to the first cluster tree from the left end of FIG. 14.

In this case, the new node $N_9$ is added to the cluster tree as a node having the leaf node $N_6$ assigned to the attention data $pic_{new}$ as one of the child nodes, the leaf node $N_2$ as the other child node, and the node $N_4$ corresponding to the candidate cluster $C_4$ as the parent node.

As a result, the first cluster tree from the left end of FIG. 14 is updated to a cluster tree on the right side of the third row from the top of FIG. 15. The cluster tree on the right side of the third row from the top of FIG. 15 includes the node $N_5$ as the root node, the leaf node $N_1$ as the left node of the root node $N_5$, the node $N_4$ as the right node of the root node $N_5$, the node $N_9$ as the left node of the node $N_4$, the leaf node $N_3$ as right node of the node $N_4$, the leaf node $N_6$ as the left node of the node $N_9$, and the leaf node $N_2$ as the right node of the node $N_9$.

Figure 16:
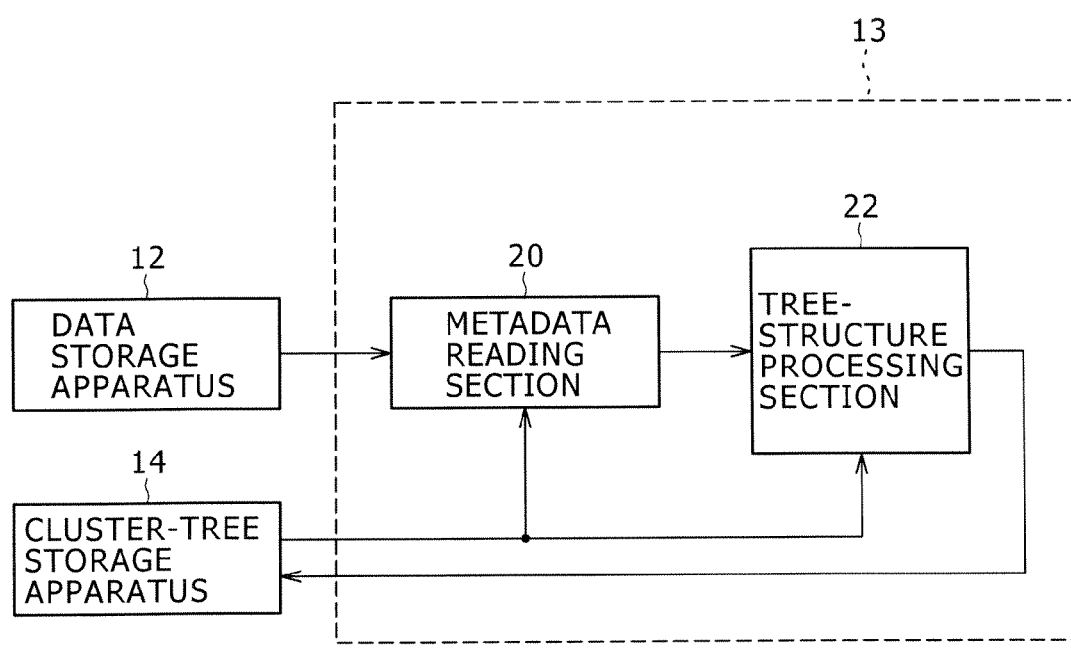
FIG. 16 is a diagram showing a typical configuration of a clustering apparatus.

FIG. 16 is a diagram showing a typical configuration of the clustering apparatus 13.

As shown in FIG. 16, the clustering apparatus 13 includes a metadata reading section 20 and a tree-structure processing section 22.

The metadata reading section 20 is a section for acquiring metadata of attention data $pic_{new}$ by reading out the metadata from the data storage apparatus 12 and supplying the acquired metadata to the tree-structure processing section 22.

The position of the attention data $pic_{new}$ in an array of processing-object pieces of picture data arranged in the left-to-right order representing the order of photographing dates/times included in the metadata is referred to as an attention position as described earlier. The processing-object pieces of picture data are an object of a layer clustering process. The processing-object pieces of picture data include pieces of picture data already clustered in accordance with a cluster tree stored in the cluster-tree storage apparatus 14 and the attention data $pic_{new}$.

The tree-structure processing section 22 is a section for carrying out a tree-structure process as follows. On the basis of the metadata, the tree-structure processing section 22 finds a second distance $d_n$ and a first distance, which is the maximum distance $d_q$ described earlier. Then, on the basis of the first distance $d_q$ and the second distance $d_n$, the tree-structure processing section 22 adds a new node $N_{in}$ to the cluster tree stored in the cluster-tree storage apparatus 14 as a node having a leaf node $N_{new}$ assigned to the attention data $pic_{new}$ as one of the child nodes thereof. In the following description, the leaf node $N_{new}$ assigned to the attention data $pic_{new}$ is properly referred to as an attention leaf node $N_{new}$. The second distance $d_n$ is the distance based on a predetermined distance scale as a distance between the attention data $pic_{new}$ and the nearest piece of picture data in a candidate cluster. A candidate cluster is selected among clusters corresponding to nodes included in the cluster tree stored in the cluster-tree storage apparatus 14 as a cluster adjacent to the attention data $pic_{new}$ placed at the attention position. The first distance $d_q$ is a maximum value of distances between any two mutually adjacent pieces of picture data pertaining to an eventually selected candidate cluster.

To put it detail, as explained earlier by referring to FIGS. 7 to 15, on the basis of metadata, the tree-structure processing section 22 recognizes the nearest piece of picture data selected among pieces of picture data pertaining to a candidate cluster as a piece of picture data adjacent to the attention data $pic_{new}$. That is to say, the nearest piece of picture data is picture data having a photographing date/time closest to the attention data $pic_{new}$. The metadata used as a basis for recognizing the nearest piece of picture data includes metadata of pieces of picture data assigned to leaf nodes of the cluster tree stored in the cluster-tree storage apparatus 14 and metadata received from the metadata reading section 20 as the metadata of the attention data $pic_{new}$. Then, the tree-structure processing section 22 finds the second distance $d_n$ as a distance dpic( ) between the nearest piece of picture data and the attention data $pic_{new}$ in accordance with Eq. (2) or (3) on the basis of the photographing date/time and photographing location of the nearest piece of picture data as well as the photographing date/time and photographing location of the attention data $pic_{new}$. The photographing date/time and photographing location of the nearest piece of picture data and the photographing date/time as well as photographing location of the attention data $pic_{new}$ are included in respectively the metadata of the nearest piece of picture data and the metadata of the attention data $pic_{new}$. The tree-structure processing section 22 also finds the first (longest) distance $d_q$ among distances between all two adjacent pieces of picture data in the candidate cluster. Each of the distances between all two adjacent pieces of picture data in the candidate cluster is found also in accordance with Eq. (2) or (3) on the basis of photographing dates/times and photographing locations. The photographing dates/times and photographing locations are included in metadata of pieces of picture data clustered in the candidate cluster. Then, on the basis of the second distance $d_n$ and first (longest) distance $d_q$, the tree-structure processing section 22 adds a new node $N_{in}$ to the present cluster tree stored in the cluster-tree storage apparatus 14 as a node having the attention leaf node $N_{new}$ assigned to the attention data $pic_{new}$ as one of its child nodes. In this way, the tree-structure processing section 22 creates a new cluster tree. That is to say, the tree-structure processing section 22 updates the present cluster tree to the new cluster tree and stores the new cluster tree over the present cluster tree in the cluster-tree storage apparatus 14.

Figure 17:
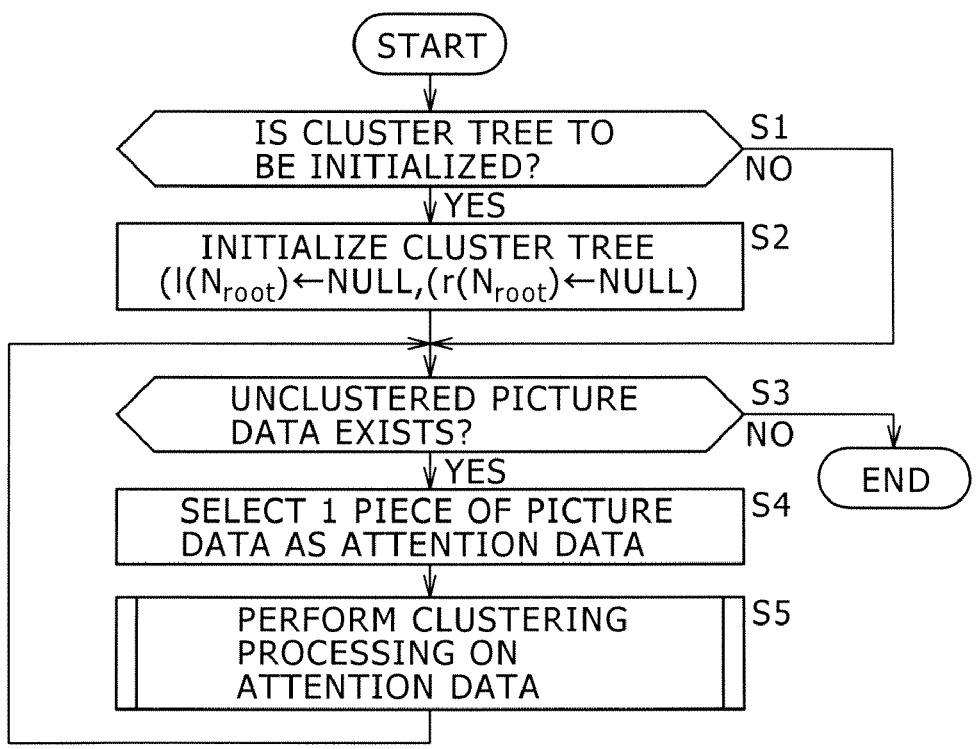
FIG. 17 shows a flowchart representing processing carried out by the clustering apparatus.

Next, the processing carried out by the clustering apparatus 13 shown in FIG. 16 is explained by referring to a flowchart shown in FIG. 17.

The flowchart begins with a step S1 at which the tree-structure processing section 22 employed in the clustering apparatus 13 produces a result of determination as to whether or not the cluster tree is to be initialized.

If the determination result produced at the step S1 indicates that the cluster tree is to be initialized for example in accordance with an operation carried out by the user on the operation unit 17 to request the information-processing apparatus 2 that the cluster tree be initialized, the flow of the processing goes on to a step S2 at which the tree-structure processing section 22 initializes the cluster tree and stores the cluster tree obtained as a result of the initialization over the pre-initialization cluster tree in the cluster-tree storage apparatus 14. Then, the flow of the processing goes on to the next step S3.

In particular, notation $N_{root}$ denotes a variable representing the root node $N_{root}$ of the cluster tree. Also notation l(N) denotes a variable representing the left node of the node N and notation r(N) denotes a variable representing the right node of the node N. In this case, at the step S2, the tree-structure processing section 22 sets each of the left node $l(N_{root})$ and right node $r(N_{root})$ of the root node $N_{root}$ at a value of NULL indicating that the left and right nodes do not exist.

If the determination result produced at the step S1 indicates that the cluster tree is not to be initialized as evidenced for example by no operation carried out by the user on the operation unit 17 to request the cluster tree be initialized, on the other hand, the flow of the processing skips the step S2, going on to a step S3 directly. At the step S3, the metadata reading section 20 refers to the cluster-tree storage apparatus 14 in order to produce a result of determination as to whether or not the data storage apparatus 12 contains picture data not clustered yet by using the cluster tree.

If the determination result produced at the step S3 indicates that the data storage apparatus 12 contains picture data not clustered yet by using the cluster tree, the flow of the processing goes on to a step S4 at which the metadata reading section 20 selects a piece of picture data stored in the data storage apparatus 12 but not clustered yet in the cluster tree as attention data $pic_{new}$. Then, the flow of the processing goes on to a step S5.

At the step S5, the clustering apparatus 13 creates a new cluster tree for clustering processing-object pieces of picture data, which are each an object of a layer clustering process. The objects of a layer clustering process are pieces of picture data already clustered using the present cluster tree stored in the cluster-tree storage apparatus 14 and the attention data $pic_{new}$. The created cluster tree is used as an updating cluster tress of the present cluster tree stored in the cluster-tree storage apparatus 14. Then, the flow of the processing goes back to the step S3.

If the determination result produced at the step S3 indicates that the data storage apparatus 12 no longer contains picture data not clustered yet by using the cluster tree, that is, if all pieces of picture data stored in the data storage apparatus 12 have been clustered by using the cluster tree, on the other hand, the execution of the processing is ended.

Figure 18:
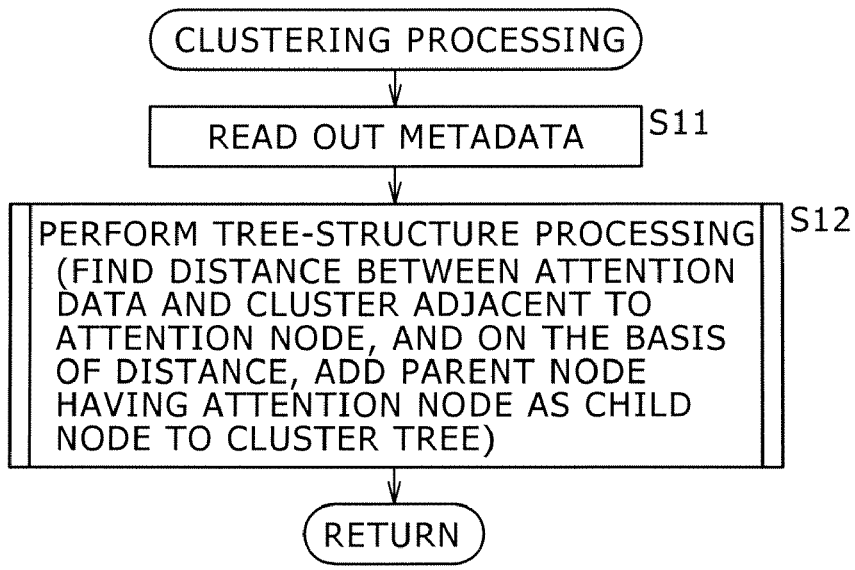
FIG. 18 shows a flowchart representing clustering processing as a part of the processing carried out by the clustering apparatus.

Next, by referring to a flowchart shown in FIG. 18, the following description explains the clustering processing carried out by the clustering apparatus 13 shown in FIG. 16 at the step S5 of the flowchart shown in FIG. 17.

The flowchart representing the clustering processing begins with a step S11 at which the metadata reading section 20 acquires the metadata of attention data $pic_{new}$ by reading out the metadata from the data storage apparatus 12 and supplies the metadata to the tree-structure processing section 22. Then, the flow of the processing goes on to a step S12.

The tree-structure processing section 22 is a section for carrying out a tree-structure process as follows. At the step S12, on the basis of the metadata of processing-object pieces of picture data, the tree-structure processing section 22 finds the distance $d_n$ and the maximum distance $d_q$ described earlier. The processing-object pieces of picture data are pieces of picture data already clustered in accordance with a cluster tree stored in the cluster-tree storage apparatus 14 and the attention data $pic_{new}$ located at an attention position in an array of the processing-object pieces of picture data arranged in the left-to-right order representing the order of photographing dates/times included in the metadata. Then, on the basis of the distance $d_q$ and the distance $d_n$, the tree-structure processing section 22 adds a new node $N_{in}$ to the cluster tree stored in the cluster-tree storage apparatus 14 as a node having an attention leaf node $N_{new}$ assigned to the attention data $pic_{new}$ as one of the child nodes thereof. The distance $d_n$ is the distance based on a predetermined distance scale as a distance between the attention data $pic_{new}$ and the nearest piece of picture data in a candidate cluster. The first distance $d_q$ is a maximum value of distances between any two mutually adjacent pieces of picture data pertaining to the selected candidate cluster. After the tree-structure process has been carried out, the control of processing is returned to a calling program. That is to say, the execution of the processing is ended.

Figure 19:
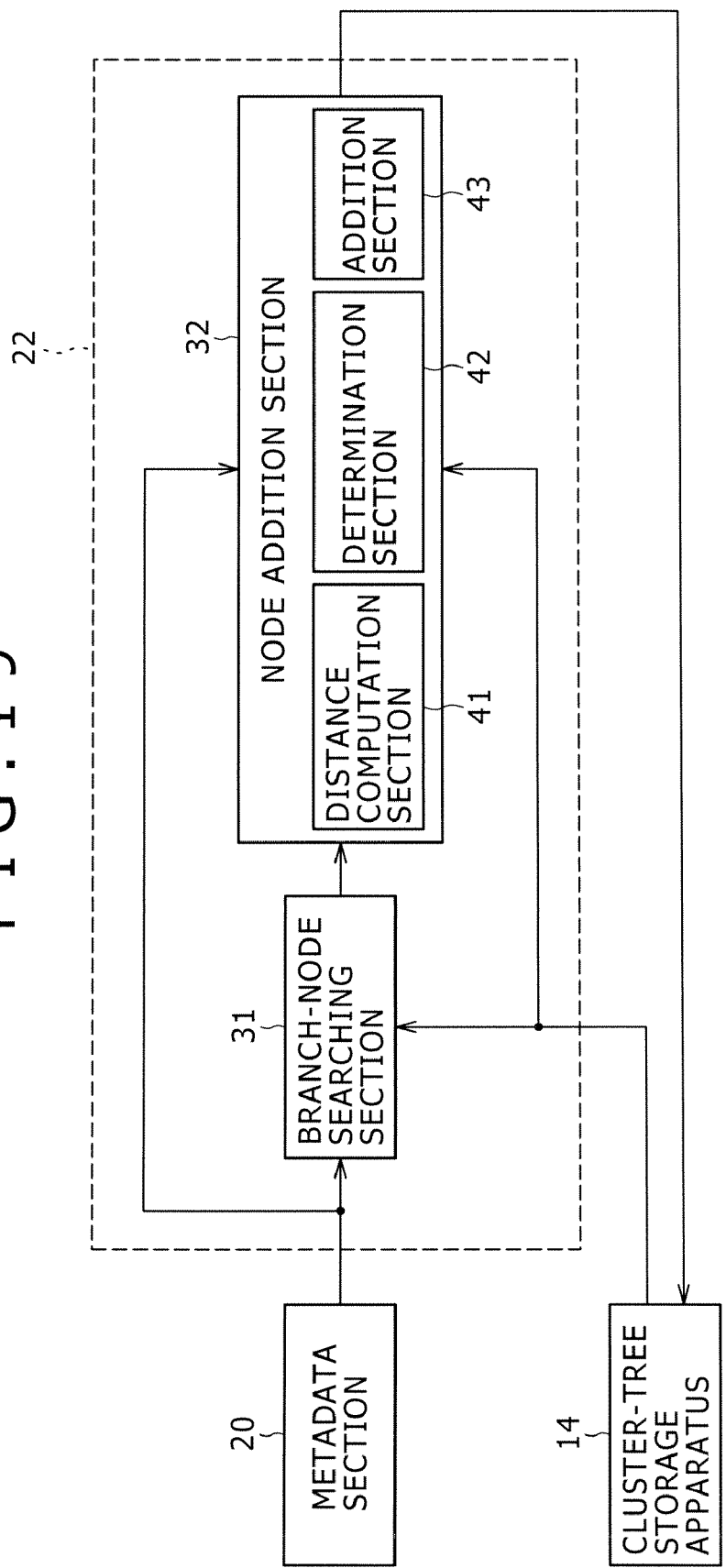
FIG. 19 is a diagram showing a typical configuration of a tree-structure processing section.

FIG. 19 is a diagram showing a typical configuration of the tree-structure processing section 22 shown in FIG. 16 as a section for carrying out the tree-structure processing at the step S12 of the flowchart shown in FIG. 18.

As shown in FIG. 19, the tree-structure processing section 22 includes a branch-node searching section 31 and a node addition section 32.

The branch-node searching section 31 is a section for carrying out a branch-node searching process to search the cluster tree for a branch node on the basis of metadata received from the metadata reading section 20 as the metadata of attention data $pic_{new}$ and a cluster tree stored in the cluster-tree storage apparatus 14, and for supplying the branch mode obtained as a result of the branch-node searching process to the node addition section 32. The branch node is a node having a node corresponding to the largest adjacent cluster as a child node. The largest adjacent cluster is a cluster on the left or right side adjacent to the attention data $pic_{new}$, which is placed at an attention position in the array of the processing-object pieces of picture data arranged in the left-to-right order representing the order of photographing dates/times.

Including a distance computation section 41, a determination section 42, and an addition section 43, the node addition section 32 is a section for carrying a node addition process to add a new node $N_{in}$ to a cluster tree stored in the cluster-tree storage apparatus 14 on the basis of a branch node received from the branch-node searching section 31 and metadata received from the metadata reading section 20 as the metadata of attention data $pic_{new}$. The new node $N_{in}$ has an attention node $N_{new}$ assigned to the attention data $pic_{new}$ as one of its child nodes.

To put it in detail, the distance computation section 41 finds a distance $d_n$ and the maximum distance $d_q$ described earlier, supplying the distance $d_n$ and the maximum distance $d_q$ to the determination section 42. The distance $d_n$ is the distance based on a predetermined distance scale as a distance between the attention data $pic_{new}$ placed at an attention position and the nearest piece of picture data in a candidate cluster selected among clusters corresponding to the child nodes of the branch node received from the branch-node searching section 31 as described above. A node corresponding to the candidate cluster is referred to as a candidate node. Thus, the candidate node is the node serving as one of the child nodes of the branch node received from the branch-node searching section 31. With the new node $N_{in}$ added to the cluster tree to serve as the parent node of an attention node $N_{new}$ corresponding to a cluster including the attention data $pic_{new}$, however, the candidate node becomes a candidate for a child node of the new node $N_{in}$ that is, a candidate node for the node corresponding to a candidate cluster to which the attention data $pic_{new}$ pertains. The distance $d_q$ is a maximum value of distances between any two mutually adjacent pieces of picture data pertaining to the candidate cluster.

The determination section 42 is a section for comparing the distance $d_n$ and the maximum distance $d_q$ received from the distance computation section 41 with each other and supplying a result of the comparison to the addition section 43. As described above, the distance $d_n$ is the distance based on a predetermined distance scale as a distance between the attention data and the nearest piece of picture data in the candidate cluster corresponding to the candidate node whereas the distance $d_q$ is a maximum value of distances between any two mutually adjacent pieces of picture data pertaining to the candidate cluster corresponding to the candidate node.

The addition section 43 is a section for adding the new node $N_{in}$ serving as the parent node of a node corresponding to a cluster including the attention data $pic_{new}$ to the present cluster tree stored in the cluster-tree storage apparatus 14 on the basis of the comparison result received from the determination section 42 in order to update the present cluster tree to a new cluster tree. The new node $N_{in}$ is placed at a position on the arc between the branch node and the candidate node, which are finally identified in dependence on the comparison result received from the determination section 42. Thus, the branch node becomes the parent node of the new node $N_{in}$ while the candidate node and the attention node $N_{new}$ become the child nodes of the new node $N_{in}$. To put it in detail, when the determination section 42 determines that the distance $d_n$ between the attention data $pic_{new}$ and the nearest piece of picture data in the candidate cluster corresponding to the candidate node is greater (or not smaller) than the distance $d_q$ representing a maximum value of distances between any two mutually adjacent pieces of picture data pertaining to the candidate cluster corresponding to the candidate node, the addition section 43 adds the new node $N_{in}$ to the present cluster tree and forms a new cluster tree. The new node $N_{in}$ is positioned on the arc so that the branch node becomes the parent node while the candidate node and the attention-receiving node New become the child nodes.

If the determination section 42 determines that the distance $d_n$ between the attention data $pic_{new}$ and the nearest piece of picture data in the candidate cluster corresponding to the candidate node is not greater (or smaller) than the maximum distance $d_q$ between any two mutually adjacent pieces of picture data pertaining to the candidate cluster corresponding to the candidate node, on the other hand, the candidate node is used as a new branch node and a child node of the candidate node is used as a new candidate node. Then, the distance computation section 41 computes the distance $d_n$ between the attention data $pic_{new}$ and the nearest piece of picture data in a candidate cluster corresponding to the new candidate node and the maximum distance $d_q$ between any two mutually adjacent pieces of picture data pertaining to the candidate cluster corresponding to the new candidate node whereas the determination section 42 compares the distance $d_n$ and maximum distance $d_q$ received from the distance computation section 41 with each other. The process to compute the distance $d_n$ and the maximum distance $d_q$ and the process to compare them with each other are repeated.

As the determination section 42 determines that the distance $d_n$ is greater (or not smaller) than the distance $d_q$, the addition section 43 adds the new node $N_{in}$ to the present cluster tree and forms a new cluster tree. The final branch node becomes the parent node while the candidate node and the attention node $N_{new}$ become the child nodes.

Figure 20:
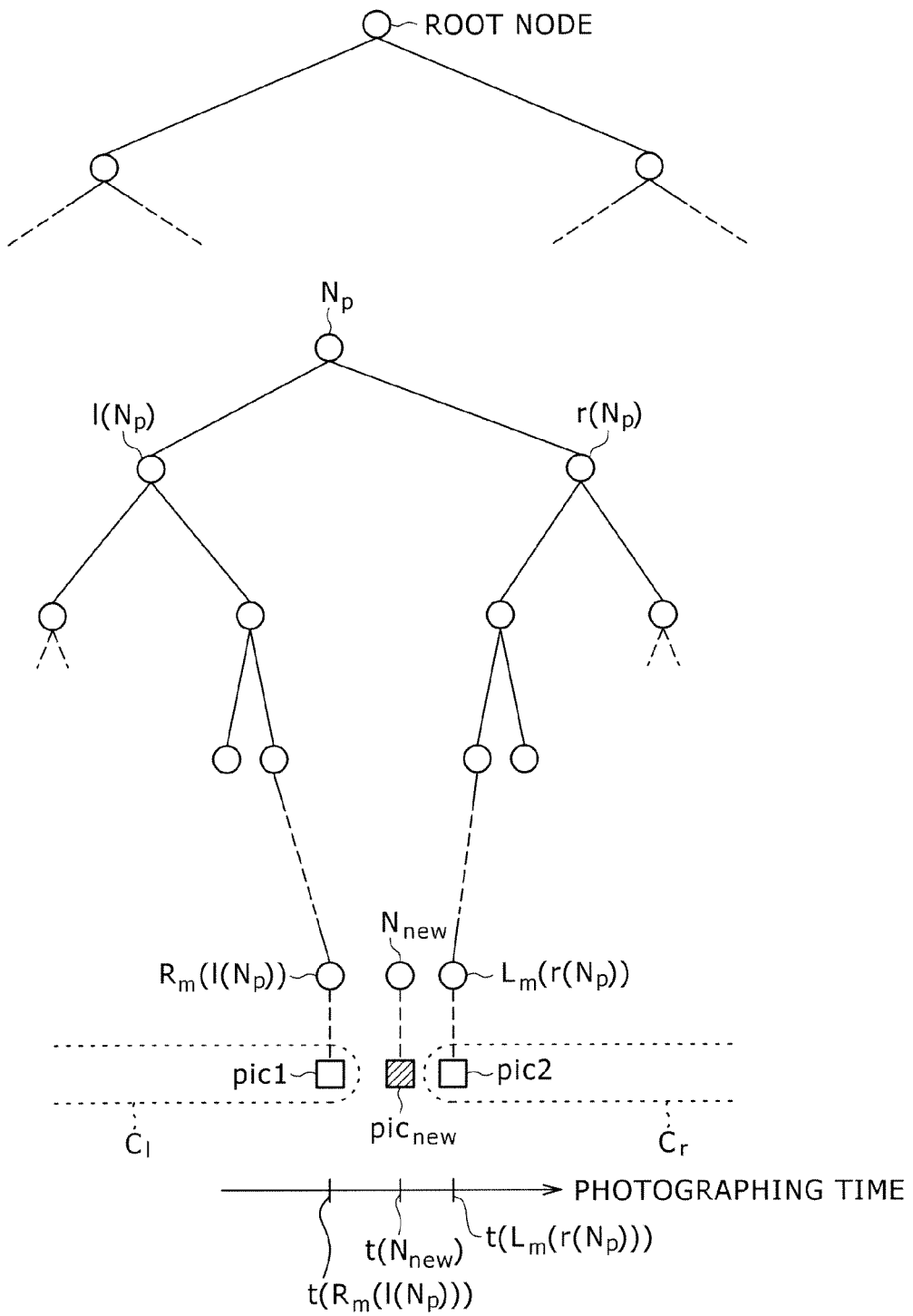
FIG. 20 is an explanatory diagram referred to in describing branch-node searching processing.

Next, by referring to FIG. 20, the following description explains a branch-node searching process carried out by the branch-node searching section 31 shown in FIG. 19 to search a cluster tree for a branch node.

FIG. 20 is a diagram showing a portion of the present cluster tree stored in the cluster-tree storage apparatus 14.

In the following description, notation $N_p$ denotes a branch node, notation $l(N_p)$ denotes the left node of the branch node $N_p$ while notation $r(N_p)$ denotes the right node of the branch node $N_p$.

As explained above, a branch node $N_p$ is a node, a child node of which is a node corresponding to the largest adjacent cluster on the left of right side adjacent to an attention data $pic_{new}$ placed at an attention position in an array of processing-object pieces of picture data arranged in the left-to-right order representing the order of photographing dates/times.

Thus, the largest adjacent cluster on the left side adjacent to an attention data $pic_{new}$ placed at an attention position is a cluster $C_l$ corresponding to the node $l(N_p)$ of the branch node $N_p$ whereas the largest adjacent cluster on the right side adjacent to an attention data $pic_{new}$ placed at an attention position is a cluster $C_r$ corresponding to the node $r(N_p)$ of the branch node $N_p$.

Let notation $R_m(N)$ denote the rightmost leaf node findable by tracing down arcs of the cluster tree from a node N and let notation $L_m(N)$ denote the leftmost leaf node findable by tracing down arcs of the cluster tree from the node N. Thus, notation $R_m(l(N_p))$ denotes the rightmost leaf node findable by tracing down arcs of the cluster tree from the left node $l(N_p)$ of a branch node $N_p$. On the other hand, notation $L_m(r(N_p))$ denotes the leftmost leaf node findable by tracing down arcs of the cluster tree from the right node $r(N_p)$ of the branch node $N_p$.

Since the node $R_m(l(N_p))$ is the rightmost leaf node findable by tracing down arcs of the cluster tree from the left node $l(N_p)$ of a branch node $N_p$, in the following description, the node $R_m(l(N_p))$ is properly referred to as a left-side rightmost leaf node $R_m(l(N_p))$. By the same token, since the node $L_m(r(N_p))$ is the leftmost leaf node findable by tracing down arcs of the cluster tree from the right node $r(N_p)$ of a branch node $N_p$, in the following description, the node $L_m(r(N_p))$ is properly referred to as a right-side leftmost leaf node $L_m(r(N_p))$.

Let us assume that picture data pic1 is picture data assigned to the left-side rightmost leaf node $R_m(l(N_p))$ In this case, the picture data pic1 is the rightmost picture data among pieces of picture data pertaining to the aforementioned cluster $C_l$ on the left side adjacent to attention data $pic_{new}$. Thus, the picture data pic1 is picture data on the left side adjacent to the attention data $pic_{new}$.

Let us assume that picture data pic2 is picture data assigned to the right-side leftmost leaf node $L_m(r(N_p))$. In this case, the picture data pic2 is the leftmost picture data among pieces of picture data pertaining to the aforementioned cluster $C_r$ on the right side adjacent to attention data $pic_{new}$. Thus, the picture data pic2 is picture data on the right side adjacent to the attention data $pic_{new}$.

Let notation $t(N)$ denotes the photographing date/time of picture data assigned to a leaf node N. In this case, notation $t(R_m(l(N_p)))$ denotes the photographing date/time of the picture data pic1 assigned to the left-side rightmost leaf node $R_m(l(N_p))$, notation $t(L_m(r(N_p)))$ denotes the photographing date/time of the picture data pic2 assigned to the right-side leftmost leaf node $L_m(r(N_p))$, and notation $t(N_{new})$ denotes the photographing date/time of the attention data $pic_{new}$ assigned to the attention node $N_{new}$. The photographing date/time $t(R_m(l(N_p)))$, $t(L_m(r(N_p)))$, and $t(N_{new})$ satisfy relation (7) given as follows.

$$t(R_m(l(N_p))) < t(N_{new}) < t(L_m(r(N_p))) \qquad (7)$$

In order to make the following description simple, it is assumed that processing-object pieces of picture data each serving as an object of the layer clustering process do not include pieces of picture data having the same photographing date/time. It is to be noted that, if pieces of picture data having the same photographing date/time exist, the existence is reflected by an operator $\leq$ including a case of equality in place of any ones of the operators < used in relation (7).

The branch-node searching section 31 searches the present cluster tree for a node $N_p$ satisfying relation (7) and takes the node $N_p$ found in the search as a branch node $N_p$. The branch-node searching section 31 searches the present cluster tree by tracing down arcs of the tree from the root node $N_{root}$ in a direction toward layers at lower levels.

It is to be noted that the branch-node searching section 31 recognizes the photographing date/time $t(R_m(l(N_p)))$ of the picture data pic1 assigned to the left-side rightmost leaf node $R_m(l(N_p))$ from metadata recorded at the left-side rightmost leaf node $R_m(l(N_p))$ of the present picture tree stored in the cluster-tree storage apparatus 14 as the metadata of the picture data pic1. By the same token, the branch-node searching section 31 identifies the photographing date/time $t(L_m(r(N_p)))$ of the picture data pic2 assigned to the right-side leftmost leaf node $L_m(r(N_p))$ from metadata recorded at the right-side leftmost leaf node $L_m(r(N_p))$ of the present picture tree as the metadata of the picture data pic2. On the other hand, the branch-node searching section 31 recognizes the photographing date/time $t(N_{new})$ of the attention data $pic_{new}$ assigned to the attention node $N_{new}$ from metadata received from the metadata reading section 20 as the metadata of the attention data $pic_{new}$.

Next, by referring to FIGS. 21 to 26, the following description explains a node addition process carried out by the node addition section 32 shown in FIG. 19 to add a new node $N_{in}$ to a cluster tree as a node having an attention node $N_{new}$ as one of its child nodes.

FIG. 21 is a diagram showing a portion of the present cluster tree stored in the cluster-tree storage apparatus 14. Also referred to as a partial tree, the portion of the present cluster tree includes nodes findable by tracing down arcs of the cluster tree from a branch node $N_p$ found by the branch-node searching section 31 as a branch node for attention data $pic_{new}$.

As described above, a piece of picture data is clustered by maintaining the array of pieces of picture data arranged in an order of photographing dates/times. Thus, since the array of leaf nodes each assigned to a piece of picture data is also kept as it is, the attention node $N_{new}$ assigned to the attention data $pic_{new}$ is not placed (or moved) to the left side of the left-side rightmost leaf node $R_m(l(N_p))$ or placed (or moved) to the right side of the right-side leftmost leaf node $L_m(r(N_p))$.

Thus, the attention data $pic_{new}$ assigned to the attention node $N_{new}$ pertains to a cluster corresponding to the branch node $N_p$.

In addition, the cluster corresponding to the branch node $N_p$ includes a cluster $C_1$ corresponding to the left node $l(N_p)$ serving as the left-side child node of the branch node $N_p$ and a cluster $C_r$ corresponding to the right node $r(N_p)$ serving as the right-side child node of the branch node $N_p$.

In the node-addition process, a new node $N_{in}$ having an attention node $N_{new}$ assigned to the attention data $pic_{new}$ as one of its child nodes is added to a cluster tree as one of the child nodes of a node findable by tracing down arcs of the cluster tree from the branch node $N_p$. In this way, a cluster corresponding to the new node $N_{in}$ is added as a cluster included in a cluster corresponding to the branch node $N_p$. As a result, the attention data $pic_{new}$ is clustered in the cluster corresponding to the new node $N_{in}$.

First of all, in the node addition section 32 shown in FIG. 19, the distance computation section 41 selects a candidate node. The selected candidate node is a node corresponding to a cluster selected from the clusters $C_l$ and $C_r$ as a cluster having the shorter distance between the nearest piece of picture data in the cluster and the attention data $pic_{new}$. The selected candidate node is a node corresponding to a candidate cluster serving as a candidate for a cluster corresponding to a child node of the new node $N_{in}$, that is, a candidate cluster serving as a candidate for a cluster corresponding to a child node of the parent node of a node corresponding to a cluster to which the attention data $pic_{new}$ pertains. As described before, the cluster $C_l$ is a cluster corresponding to the left node $l(N_p)$, which is the left-side child node of the branch node $N_p$ received from the branch-node searching section 31. On the other hand, the cluster $C_l$ is a cluster corresponding to the right node $r(N_p)$, which is the right-side child node of the branch node $N_p$.

Notation $d_l$ denote the distance between the attention data $pic_{new}$ and the nearest piece of picture data in the cluster $C_l$ corresponding to the left node $l(N_p)$ and notation $d_r$ denote the distance between the attention data $pic_{new}$ and the nearest piece of picture data in the cluster $C_r$ corresponding to the right node $r(N_p)$ as shown in FIG. 21. In this case, if the distance $d_l$ is smaller (or not greater) than the distance $d_r$, the left node $l(N_p)$ corresponding to the cluster $C_l$ is selected as the candidate node. If the distance $d_l$ is not smaller (or greater) than the distance $d_r$, on the other hand, the right node $r(N_p)$ corresponding to the cluster $C_r$ is selected as the candidate node.

In the following description, the candidate node is properly denoted by notation $N_q$ and the candidate cluster corresponding to the candidate node $N_q$ is properly denoted by notation $C_q$.

The nearest piece of picture data in the cluster $C_l$ corresponding to the left node $l(N_p)$ is picture data assigned to the left-side rightmost leaf node $R_m(l(N_q))$ or picture data pic1 shown in FIG. 21. On the other hand, the nearest piece of picture data in the cluster $C_r$ corresponding to the right node $r(N_p)$ is picture data assigned to the right-side leftmost leaf node $L_m(r(N_q))$ or picture data pic2 shown in FIG. 21.

The distance computation section 41 computes the distances $d_n$ and dr. If the computed distance $d_n$ is smaller than the computed distance $d_r$, for example, the distance computation section 41 selects the left node $l(N_p)$ corresponding to the cluster $C_l$ as the candidate node $N_q$. With the left node $l(N_p)$ selected as the candidate node $N_q$ corresponding to the candidate cluster $C_q$, the distance $d_n$ is the distance $d_n$ between the nearest piece of picture data in the candidate cluster $C_q$ corresponding to the candidate node $N_q$ and the attention data $pic_{new}$. In this case, the distance computation section 41 also computes the maximum distance $d_q$, which is the maximum value of distances between all two adjacent pieces of picture data pertaining to the candidate cluster $C_q$ corresponding to the candidate node $N_q$ as shown on the left side of FIG. 22. The pieces of picture data pertaining to the candidate cluster $C_q$ are pieces of picture data already clustered in the candidate cluster $C_r$ in accordance with the cluster tree.

In this case, the left node $l(N_p)$ of the branch node $N_p$ received from the branch-node searching section 31 serves as the candidate node $N_q$. Thus, the candidate cluster $C_q$ corresponding to the candidate node $N_q$ is the cluster $C_l$ corresponding to the left node $l(N_p)$ of the branch node $N_p$ received from the branch-node searching section 31. In addition, the distance $d_n$ between the nearest piece of picture data in the candidate cluster $C_q$ corresponding to the candidate node $N_q$ and the attention data $pic_{new}$ is the distance $d_n$ between the nearest piece of picture data in the cluster $C_l$ corresponding to the left node $l(N_p)$ and the attention data $pic_{new}$.

As described above, the distance computation section 41 computes the maximum distance $d_q$ between all two adjacent pieces of picture data pertaining to the candidate cluster $C_q$ corresponding to the candidate node $N_q$. As shown on the left side of FIG. 22, the maximum distance $d_q$ is the distance $dC(l(N_q), r(N_q))$ computed in accordance with Eq. (5) as a distance between a cluster corresponding to the left node $l(N_q)$ of the candidate $N_q$ and a cluster corresponding to the right node $r(N_q)$ of the candidate $N_q$. That is to say, the maximum distance $d_q$ is the distance between picture data assigned to the left-side rightmost leaf node $R_m(l(N_q))$ of the candidate node $N_q$ and picture data assigned to the right-side leftmost leaf node $L_m(r(N_q))$ of the candidate node $N_q$.

A later description will explain the fact that the maximum distance $d_q$ representing the maximum value of distances between all two adjacent pieces of picture data pertaining to a cluster corresponding to a node N is the distance between picture data assigned to the left-side rightmost leaf node $R_m(l(N))$ of the node N and picture data assigned to the right-side leftmost leaf node $L_m(r(N))$ of the node N.

If the relation $d_q < d_n$ (or $d_q \leq d_n$) between the distance $d_n$ and the maximum distance $d_q$, which are found as described above, holds true, the addition section 43 employed in the node addition section 32 adds a new node $N_{in}$ to the present cluster tree and creates a new cluster tree as follows. As shown on the right side of FIG. 22, the new node $N_{in}$ is placed on the arc between the branch node $N_p$ and the candidate node $N_q$ as a node having the branch node $N_p$ as the parent node and the candidate node $N_q$ as well as the attention node $N_{new}$ as the child nodes.

Thus, by adding the new node $N_{in}$ to the present cluster tree, the candidate node $N_q$ and the attention node $N_{new}$ become the child nodes of the new node $N_{in}$.

In addition, a cluster $C_{in}$ corresponding to the new node $N_{in}$ includes pieces of picture data pertaining to the candidate node $N_q$ serving as one of the child nodes of the new node $N_{in}$ and the attention data $pic_{new}$ pertaining to the attention node $N_{new}$ serving as the other child node of the new node $N_{in}$.

The distance $d_n$ between the nearest piece of picture data in the candidate cluster $C_q$ and the attention data $pic_{new}$ is computed in accordance with Eq. (2) as a distance dpic ( ) between the attention data $pic_{new}$ and a piece of picture data included in the candidate cluster $C_q$ as a piece of picture data having a photographing date/time closest to the attention data $pic_{new}$. The piece of picture data included in the candidate cluster $C_q$ as a piece of picture data having a photographing date/time closest to the attention data $pic_{new}$ is a piece of picture data adjacent to the attention data $pic_{new}$. Thus, in the cluster trees shown in FIG. 22, the distance $d_n$ is the distance between the attention data $pic_{new}$ and the picture data pic1 placed on the left side adjacent to the attention data $pic_{new}$.

As described above, if the relation $d_q < d_n$ (or $d_q \leq d_n$) between the distance $d_n$ and the maximum distance $d_q$ holds true, the addition section 43 adds a new node $N_{in}$ to the present cluster tree. Thus, the maximum distance between all two adjacent pieces of picture data pertaining to a cluster $C_{in}$ corresponding to the new node $N_{in}$ is the distance between the attention data $pic_{new}$ and the picture data pic1 placed on the left side adjacent to the attention data $pic_{new}$.

If seen from the new node $N_{in}$ the picture data pic1 on the left side adjacent to the attention data $pic_{new}$ is picture data assigned to the left-side rightmost leaf node $R_m(l(N_{in}))$ of the new node $N_{in}$ whereas the attention data $pic_{new}$ is picture data assigned to the right-side leftmost leaf node $L_m(r(N_{in}))$ of the new node $N_{in}$. Thus, the maximum value (maximum distance) between all two adjacent pieces of picture data pertaining to a cluster Cin corresponding to the new node $N_{in}$ is the distance between the picture data assigned to the left-side rightmost leaf node $R_m(l(N_{in}))$ of the new node $N_{in}$ and the picture data assigned to the right-side leftmost leaf node $L_m(r(N_{in}))$ of the new node $N_{in}$.

That is to say, the maximum distance (maximum value) between all two adjacent pieces of picture data pertaining to a cluster corresponding to a node N is the distance between picture data assigned to the left-side rightmost leaf node $R_m(l(N))$ of the node N and picture data assigned to the right-side leftmost leaf node $L_m(r(N))$ of the node N as described above.

It is to be noted that picture data assigned to the left-side rightmost leaf node $R_m(l(N))$ of a node N is picture data having a photographing date/time closest to the photographing date/time of picture data pertaining to a cluster corresponding to the right node r(N) of the node N among the photographing dates/times of all pieces of picture data pertaining to a cluster corresponding to the left node l(N) of the node N. By the same token, picture data assigned to the right-side leftmost leaf node $L_m(r(N))$ of a node N is picture data having a photographing date/time closest to the photographing date/time of picture data pertaining to a cluster corresponding to the left node l(N) of the node N among the photographing dates/times of all pieces of picture data pertaining to a cluster corresponding to the right node r(N) of the node N.

Thus, in accordance with Eq. (5) defining the distance between two clusters as the distance between two pieces of picture data included in the two clusters respectively as pieces of picture data having the closest photographing date/time among all two pieces of picture data included in the two clusters respectively, the distance between picture data assigned to the left-side rightmost leaf node $R_m(l(N))$ of a node N and picture data assigned to the right-side leftmost leaf node $L_m(r(N))$ of the node N is equivalent to the distance between the cluster corresponding to the left node l(N) of the node N and the cluster corresponding to the right node r(N) of the node N.

In addition, as is obvious from the above description, the maximum value (maximum distance) between all two adjacent pieces of picture data pertaining to a cluster corresponding to a node N is equivalent to the distance between the cluster corresponding to the left node l(N) of the node N and the cluster corresponding to the right node r(N) of the node N.

Figure 23:
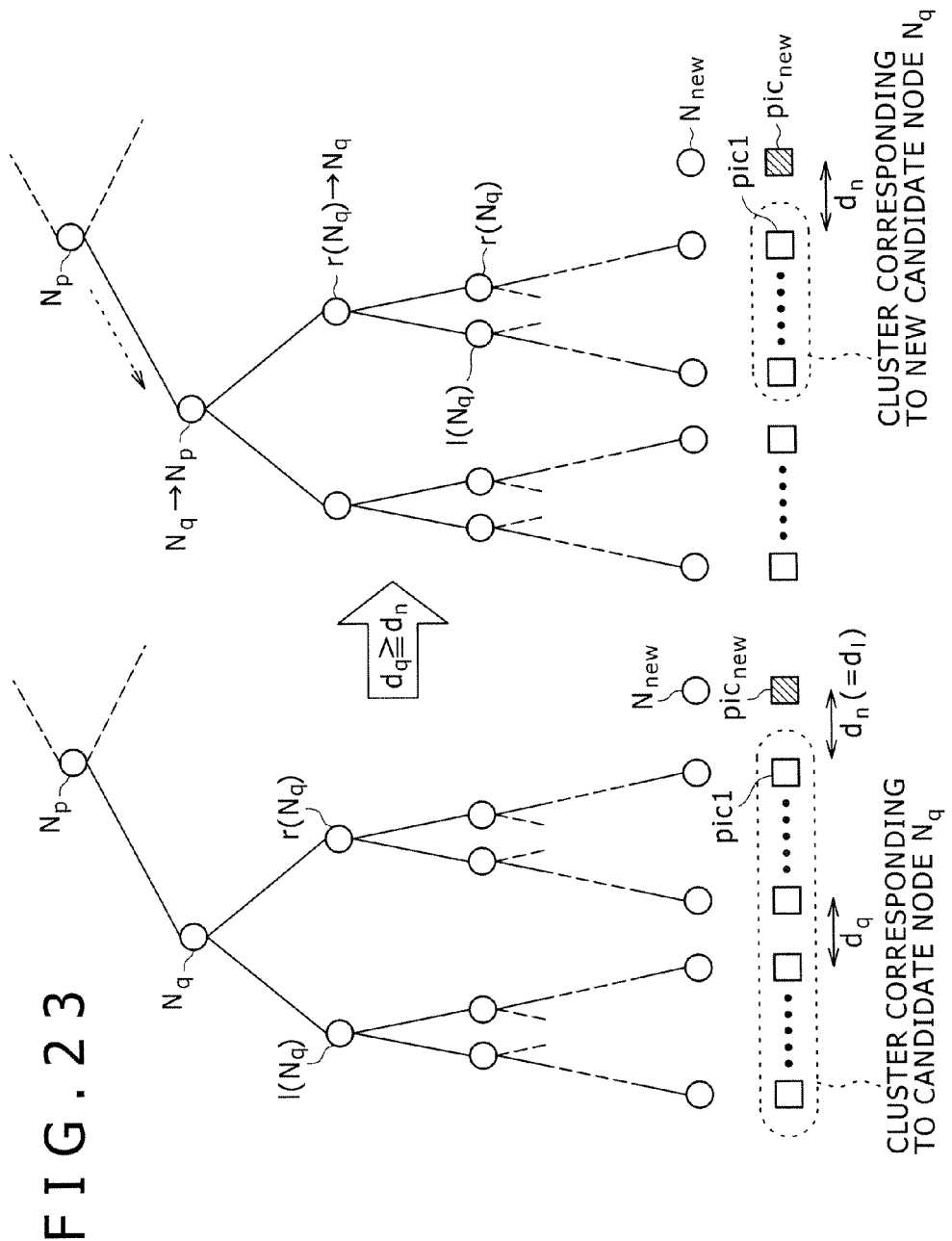
FIG. 23 is a further explanatory diagram referred to in describing node addition processing.

Let us assume that the relation $d_q \geq d_n$ (or $d_q > d_n$) between the distance $d_n$ and the maximum distance $d_q$ holds true, where, as described above, the distance $d_n$ is the distance between the nearest piece of picture data in the candidate cluster $C_q$ corresponding to the candidate node $N_q$ and the attention data $pic_{new}$ whereas the maximum distance $d_q$ represents the distance between all two adjacent pieces of picture data pertaining to the candidate cluster $C_q$. In this case, the distance computation section 41 employed in the node addition section 32 takes the candidate node $N_q$ as a new branch node $N_p$ and identifies a new candidate node $N_q$ in the new branch node $N_p$ as shown in FIG. 23 in a process to update the branch node $N_p$ and the candidate node $N_q$.

Then, as explained earlier by referring to FIG. 22, the distance computation section 41 finds the distance $d_n$ between the nearest piece of picture data in a new candidate cluster $C_q$ corresponding to the new candidate node $N_q$ and the attention data $pic_{new}$ as well as a decreasing maximum distance $d_q$ between all two adjacent pieces of picture data pertaining to the new candidate cluster $C_q$.

The distance computation section 41 repeatedly carries out the process to update the branch node $N_p$ and the candidate node $N_q$ as well as the process to compute the distance $d_n$ and the maximum distance $d_q$ till the relation $d_q < d_n$ between the distance $d_n$ and the maximum distance $d_q$ holds true.

As the relation $d_q < d_n$ (or $d_q \leq d_n$) between the distance $d_n$ and the maximum distance $d_q$ holds true, as explained earlier by referring to FIG. 22, the addition section 43 adds a new node $N_{in}$ to the present cluster tree and creates a new cluster tree. The new node $N_{in}$ is placed on the arc between the final branch node $N_p$ and the final candidate node $N_q$ as a node having the final branch node $N_p$ as the parent node and the final candidate node $N_q$ as well as the attention node $N_{new}$ as the child nodes.

Figure 24:
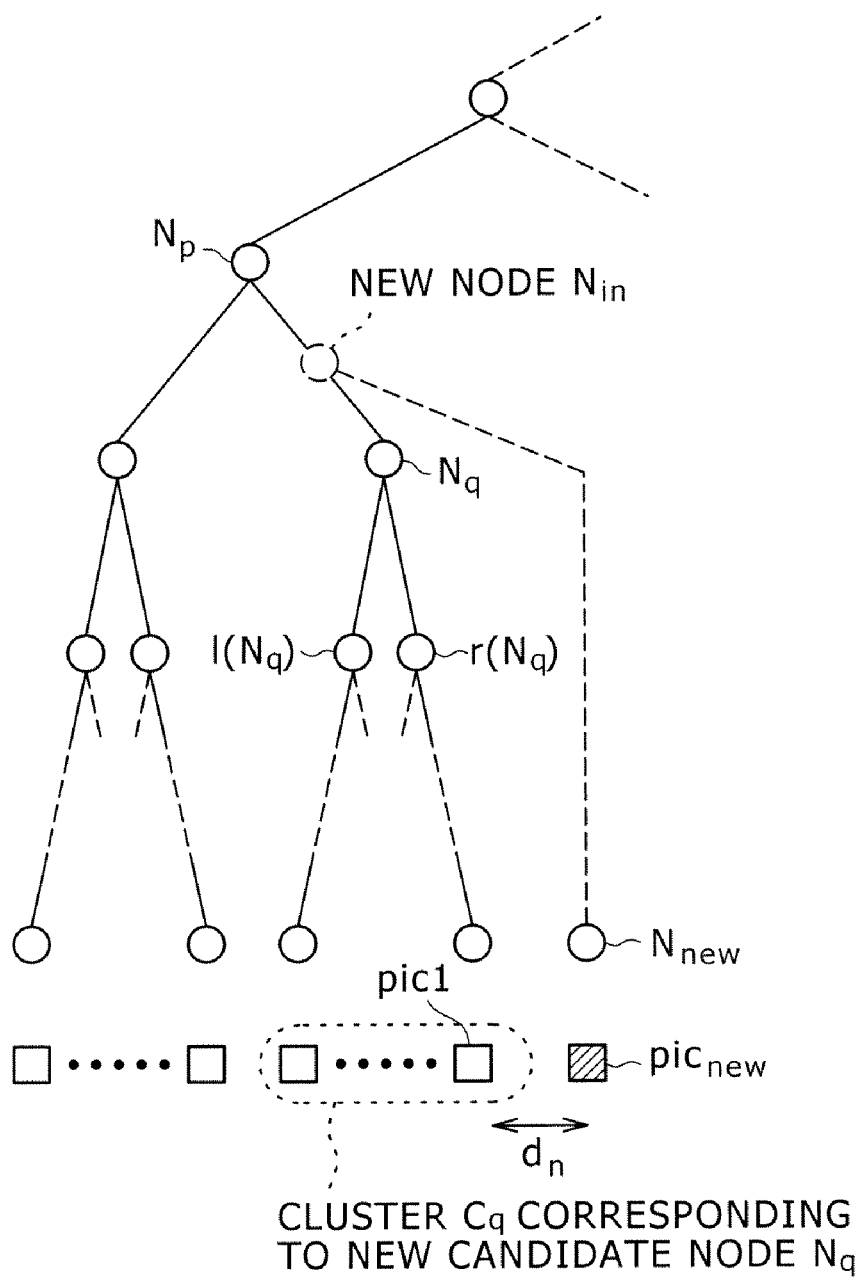
FIG. 24 is a still further explanatory diagram referred to in describing node addition processing.

That is to say, let us assume for example that a cluster tree shown on the left side of FIG. 23 is updated to a cluster tree shown on the right side and, in the cluster tree shown on the right side, the relation $d_q < d_n$ between the distance $d_n$ and the maximum distance $d_q$ holds true. In this case, the new node $N_{in}$ is placed on the arc between the final branch node $N_p$ and the final candidate node $N_q$ as a node having the final branch node $N_p$ as the parent node and the final candidate node $N_q$ as well as the attention node $N_{new}$ as the child nodes as shown in FIG. 24.

Thus, the node addition section 32 identifies a candidate node $N_q$ corresponding a candidate cluster $C_q$ adjacent to the attention data $pic_{new}$ located at the attention position by tracing down an arc from a branch node $N_p$ in a direction toward a layer at a level lower than the branch node $N_p$. Then, the node addition section 32 computes the maximum distance $d_q$ between all two adjacent pieces of picture data pertaining to the candidate cluster $C_q$ adjacent to the attention data $pic_{new}$ as well as the distance $d_n$ between the nearest piece of picture data in the candidate cluster $C_q$ and the attention data $pic_{new}$. The node addition section 32 repeatedly carries out the process to identify a candidate node $N_q$ as well as the process to compute the distance $d_n$ and the maximum distance $d_q$ till the largest candidate node $N_q$ satisfying the relation $d_q < d_n$ (or $d_q \leq d_n$) As the largest candidate node $N_q$ satisfying the relation $d_q < d_n$ (or $d_q \leq d_n$) is found, the node addition section 32 adds a new node $N_{in}$ and places the new node $N_{in}$ on the arc between the final branch node $N_p$ and the final candidate node $N_q$ as a node having the final branch node $N_p$ as the parent node and the final candidate node $N_q$ as well as the attention node $N_{new}$ as the child nodes as shown in FIG. 24.

If the distance $d_r$ between the nearest piece of picture data in the candidate cluster $C_r$ corresponding to the right node $r(N_p)$ and the attention data $pic_{new}$ is shorter (or not longer) than the distance $d_l$ between the nearest piece of picture data in the candidate cluster $C_l$ corresponding to the left node $l(N_p)$ and the attention data $pic_{new}$ in the cluster tree shown in FIG. 21, the right node $r(N_p)$ corresponding to the cluster $C_r$ is taken as a candidate node $N_q$ and processing is carried out in the same way as the process for the case in which the left node $l(N_p)$ corresponding to the cluster $C_l$ is taken as the candidate node $N_q$ as described above. That is to say, the description of the processing for the case taking the right node $r(N_p)$ corresponding to the cluster $C_r$ as a candidate node $N_q$ is the same as the description of the process for the case taking the left node $l(N_p)$ corresponding to the cluster $C_l$ as a candidate node $N_q$ except that the words 'left' and 'right' used in the description of the process for the case taking the left node $l(N_p)$ corresponding to the cluster $C_1$ as a candidate node $N_q$ are swapped with each other.

Figure 25:
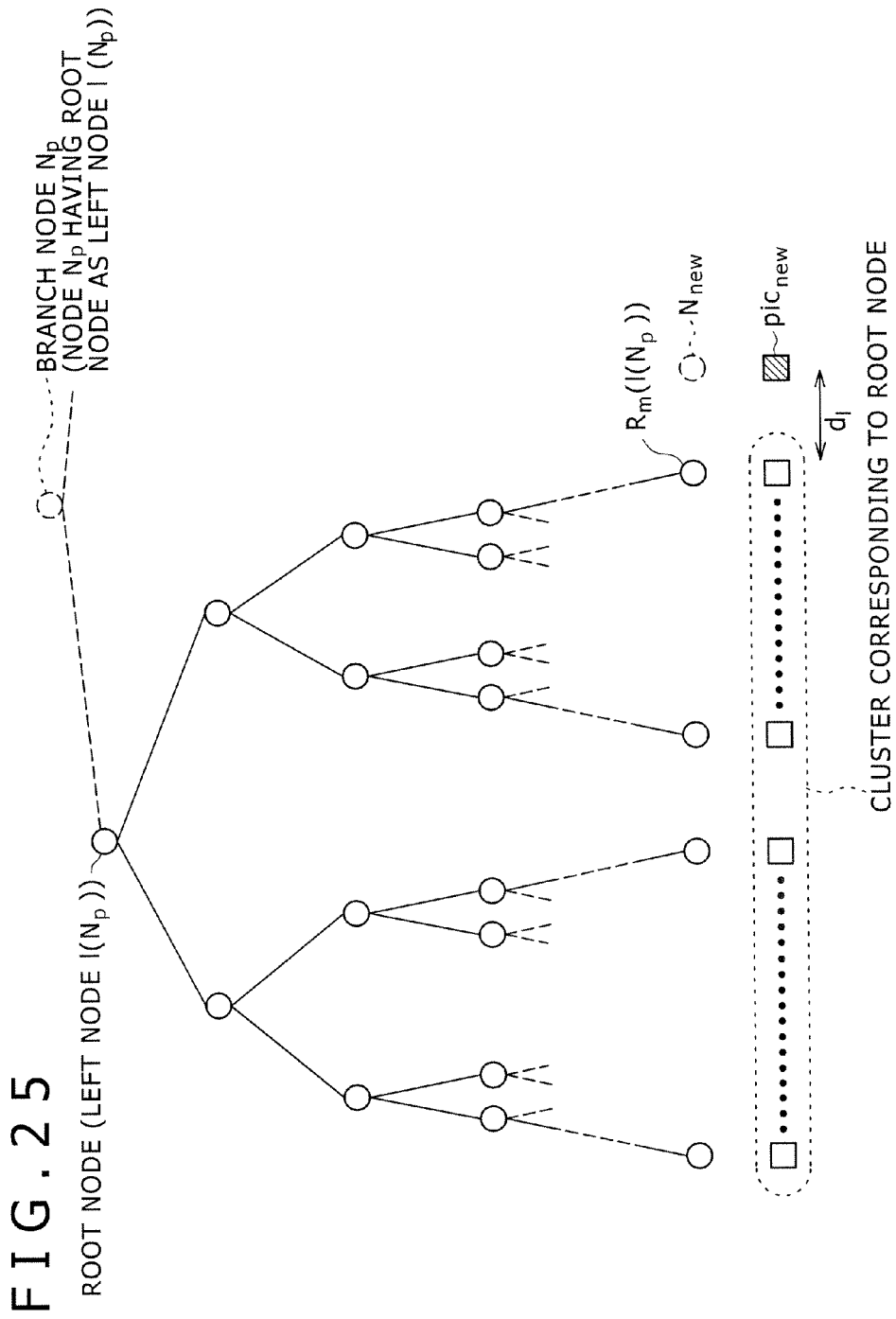
FIG. 25 is a still further explanatory diagram referred to in describing node addition processing.

In addition, let us assume for example that the attention data $pic_{new}$ is placed at the right end of an array of pieces of picture data arranged in the order of photographing dates/ times as shown in FIG. 25. That is to say, the photographing date/time of the attention data $pic_{new}$ is latest among the other pieces of picture data. In this case, there is no cluster existing on the right side of the attention data $pic_{new}$, which is placed at the attention position, and the largest cluster existing on the left side adjacent to the attention data $pic_{new}$ is the cluster corresponding to the root node. With such a tree structure, a node addition process may be carried out to add a virtual node as a branch node $N_p$ having the existing root node as the left node, which also serves as a candidate node $N_q$.

Figure 26:
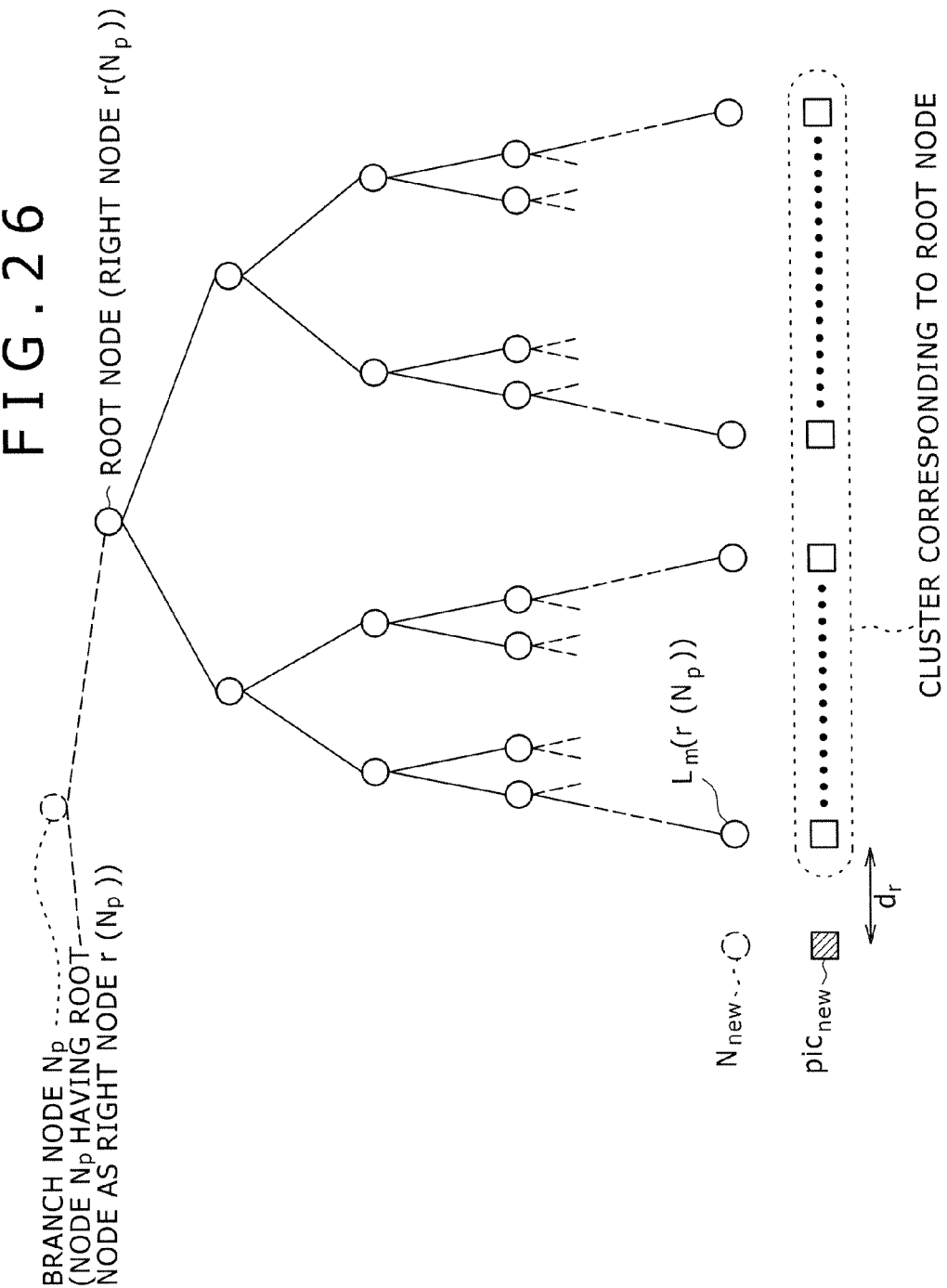
FIG. 26 is a still further explanatory diagram referred to in describing node addition processing.

By the same token, as another example, let us assume that the attention data $pic_{new}$ is placed at the left end of an array of pieces of picture data arranged in the order of photographing dates/times as shown in FIG. 26. That is to say, the photographing date/time of the attention data $pic_{new}$ is earliest among the other pieces of picture data. In this case, there is no cluster existing on the left side of the attention data $pic_{new}$, which is placed at the attention position, and the largest cluster existing on the right side adjacent to the attention data $pic_{new}$ is the cluster corresponding to the root node. With such a cluster tree, a node addition process may be carried out to add a virtual node as a branch node $N_p$ having the existing root node as the right node, which also serves as a candidate node $N_q$.

Figure 27:
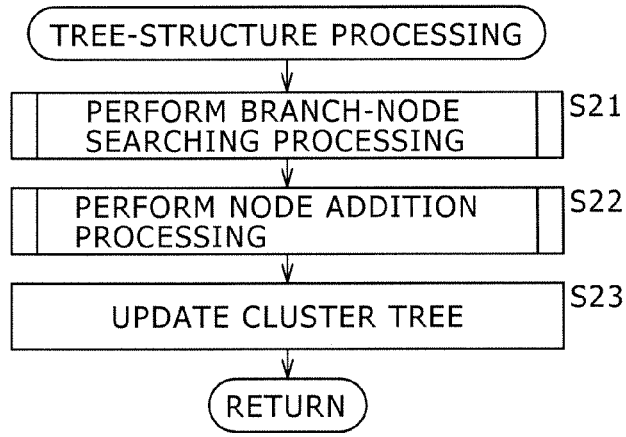
FIG. 27 shows a flowchart representing tree-structure processing.

Next, by referring to a flowchart shown in FIG. 27, the following description explains the tree-structure processing carried out by the tree-structure processing section 22 shown in FIG. 19 at the step S12 of the flowchart shown in FIG. 18.

As shown in FIG. 27, the flowchart representing the tree-structure processing begins with a step S21 at which the branch-node searching section 31 carries out a branch-node searching process to search the cluster tree for a branch node on the basis of metadata received from the metadata reading section 20 as the metadata of the attention data $pic_{new}$ and the cluster tree stored in the cluster-tree storage apparatus 14. Then, the branch-node searching section 31 supplies the branch node obtained as a result of the branch-node searching process to the node addition section 32. Then, the flow of the processing goes on to the next step S22.

At the step S22, on the basis of a branch node received from the branch-node searching section 31 and metadata received from the metadata reading section 20 as the metadata of the attention data $pic_{new}$, the node addition section 32 carries out a node addition process to add a new node $N_{in}$ to the cluster tree stored in the cluster-tree storage apparatus 14 and creates a new cluster tree. The node addition section 32 adds the new node $N_{in}$ to the cluster tree as a node having an attention node $N_{new}$ assigned to the attention data $pic_{new}$ as one of the child nodes. Then, the flow of the processing goes on to the next step S23.

At the step S23, the node addition section 32 uses the cluster tree created at the step S22 as an update of the cluster tree stored in the cluster-tree storage apparatus 14. Then, the node addition section 23 returns the control of the processing to the calling program to end the execution of the tree-structure processing.

Figure 28:
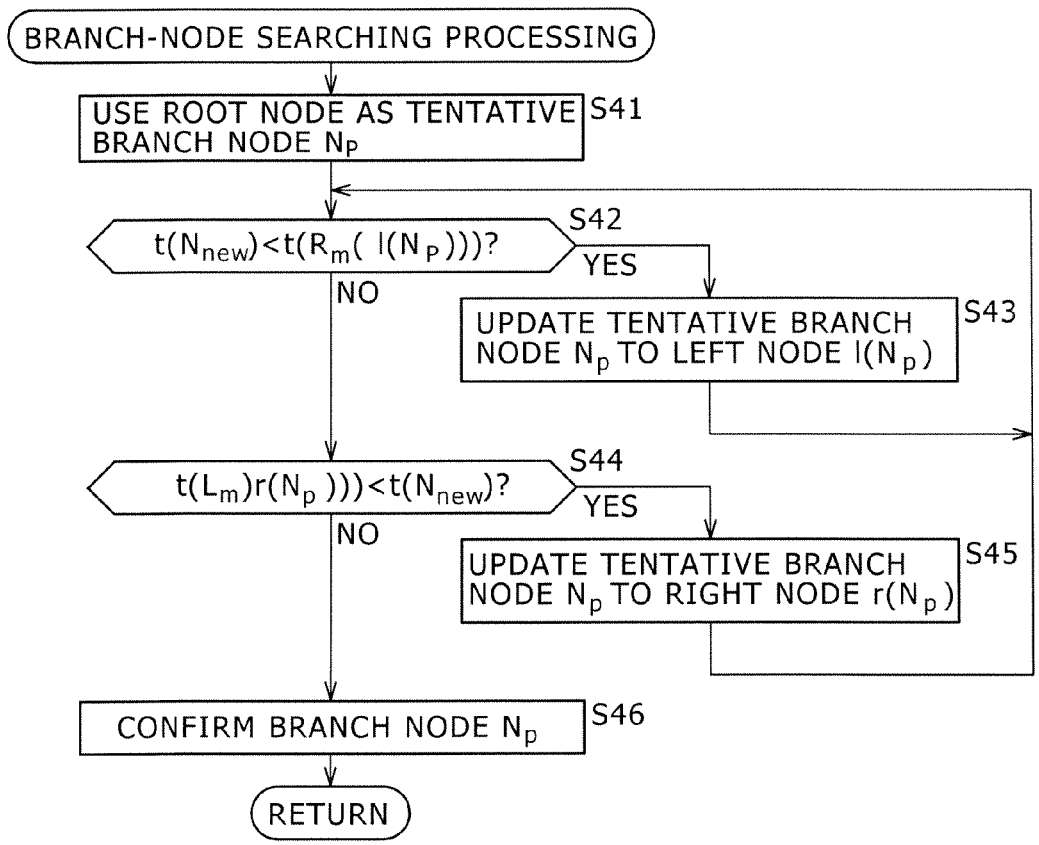
FIG. 28 shows a flowchart representing branch-node searching processing.

Next, by referring to a flowchart shown in FIG. 28, the following description explains the branch-node searching processing carried out by the branch-node searching section 31 employed in the tree-structure processing section 22 as shown in FIG. 19 at the step S21 of the flowchart shown in FIG. 27.

As shown in FIG. 28, the flowchart representing the branch-node searching processing begins with a step S41 at which the branch-node searching section 31 takes the root node of the present cluster tree stored in the cluster-tree storage apparatus 14 as a tentative branch node $N_p$. To put it concretely, the branch-node searching section 31 sets information indicating the root node in a variable representing the branch node $N_p$. Then, the flow of the processing goes on to the next step S42.

At the step S42, the branch-node searching section 31 assigns a leaf node to attention data $pic_{new}$ and stores metadata received from the metadata reading section 20 as the metadata of the attention data $pic_{new}$ in the assigned leaf node. To put it concretely, the branch-node searching section 31 assigns a leaf node to the attention data $pic_{new}$ by setting information on the attention data $pic_{new}$ in a variable representing the leaf node, which is also referred to as an attention node $N_{new}$.

At the same step S42, the branch-node searching section 31 also identifies a photographing date/time $t(N_{new})$ from the metadata held in the attention node $N_{new}$ and a photographing date/time $t(R_m(l(N_p)))$ from the left-side rightmost leaf node $R_m(l(N_p))$ of the tentative branch node $N_p$. As described before, the photographing date/time $t(N_{new})$ is the photographing date/time of the attention data $pic_{new}$ assigned to the attention node $N_{new}$. On the other hand, the photographing date/time $t(R_m(l(N_p)))$ is the photographing date/time of picture data assigned to the left-side rightmost leaf node $R_m(l(N_p))$ of the tentative branch node $N_p$. Then, the branch-node searching section 31 produces a result of determination as to whether or not the photographing date/time $t(N_{new})$ of the attention data $pic_{new}$ assigned to the attention node $N_{new}$ is earlier than the photographing date/time $t(R_m(l(N_p)))$ of picture data assigned to the left-side rightmost leaf node $R_m(l(N_p))$. That is to say, the branch-node searching section 31 produces a result of determination as to whether or not the relation $t(N_{new}) < t(R_m(l(N_p)))$ holds true.

If the determination result produced at the step S42 indicates that the photographing date/time $t(N_{new})$ is earlier than the photographing date/time $t(R_m(l(N_p)))$, the flow of the processing goes on to a step S43. The branch-node searching section 31 replaces the tentative branch node $N_p$ with a node N having the left-side rightmost leaf node $R_m(l(N))$ thereof further shifted to the left side in comparison with the left-side rightmost leaf node $R_m(l(N_p))$ in the cluster tree since the tentative branch point $N_p$ is not the branch point $N_p$ for the attention data $pic_{new}$ assigned to the attention node $N_{new}$. This is because the left-side rightmost leaf node $R_m(l(N_p))$ of the tentative branch point $N_p$ is a node placed on the right side of the attention node $N_{new}$ in spite of the fact that picture data assigned to the left-side rightmost leaf node $R_m(l(N_p))$ of the tentative branch node $N_p$ should be placed on the left side adjacent to the attention data $pic_{new}$ assigned to the attention node $N_{new}$ as shown in FIG. 20.

To put it concretely, at the step S43, the branch-node searching section 31 replaces the present tentative branch node $N_p$ with a new tentative branch node $N_p$, which is the left node $l(N_p)$ of the present tentative node $N_p$. Then, the flow of the processing goes back from the step S43 to the step S41 to repeat the processes described above.

If the determination result produced at the step S42 indicates that the photographing date/time $t(N_{new})$ is not earlier than the photographing date/time $t(R_m(l(N_p)))$, that is if the left-side rightmost leaf node $R_m(l(N_p))$ of the tentative branch point $N_p$ is not positioned on the right side of the attention node $N_{new}$, on the other hand, the flow of the processing goes on to a step S44. The branch-node searching section 31 identifies the photographing date/time $t(L_m(r(N_p)))$ of picture data assigned to the right-side leftmost leaf node $L_m(r(N_p))$ from the metadata held by the right-side leftmost leaf node $L_m(r(N_p))$. The branch-node searching section 31 produces a result of determination as to whether or not the photographing date/time $t(N_{new})$ of the attention data $pic_{new}$ assigned to the attention node $N_{new}$ is later than the photographing date/time $t(L_m(r(N_p)))$ of picture data assigned to the right-side leftmost leaf node $L_m(r(N_p))$ That is to say, the branch-node searching section 31 produces a result of determination as to whether or not the relation $t(N_{new}) > t(L_m(r(N_p)))$ holds true.

If the determination result produced at the step S44 indicates that the photographing date/time $t(N_{new})$ is later than the photographing date/time $t(L_m(r(N_p)))$, the flow of the processing goes on to a step S45. The branch-node searching section 31 replaces the tentative branch node $N_p$ with a node N having the right-side leftmost leaf node $L_m(r(N))$ thereof further shifted to the right side in comparison with the right-side leftmost leaf node $L_m(r(N_p))$ in the cluster tree since the tentative branch point $N_p$ is not the branch node $N_p$ for the attention data $pic_{new}$ assigned to the attention node $N_{new}$. This is because the right-side leftmost leaf node $L_m(r(N_p))$ of the tentative branch point $N_p$ is a node placed on the left side of the attention node $N_{new}$ in spite of the fact that picture data assigned to the right-side leftmost leaf node $L_m(r(N_p))$ of the tentative branch node $N_p$ should be placed on the right side adjacent to the attention data $pic_{new}$ assigned to the attention node $N_{new}$ as shown in FIG. 20.

To put it concretely, at the step S45, the branch-node searching section 31 replaces the present tentative branch node $N_p$ with a new tentative branch node $N_p$, which is the right node $r(N_p)$ of the present tentative node $N_p$. Then, the flow of the processing goes back from the step S45 to the step S42 at which the branch-node searching section 31 starts repetition of the processes described above.

If the determination result produced at the step S44 indicates that the photographing date/time $t(N_{new})$ is not later than the photographing date/time $t(L_m(r(N_p)))$, that is, if the photographing date/time $t(N_{new})$ are earlier than the photographing date/time $t(R_m(l(N_p)))$ but later than the photographing date/time $t(L_m(r(N_p)))$ and are satisfying relation (7), on the other hand, the flow of the processing goes on to a step S46. The branch-node searching section 31 confirms the tentative branch node $N_p$ as the final branch node of the attention node $N_{new}$ and supplies the final branch node to the node addition section 32. Then, the branch-node searching section 31 returns the control of processing to the calling program and ends the execution of the branch-node searching processing.

Figure 29:
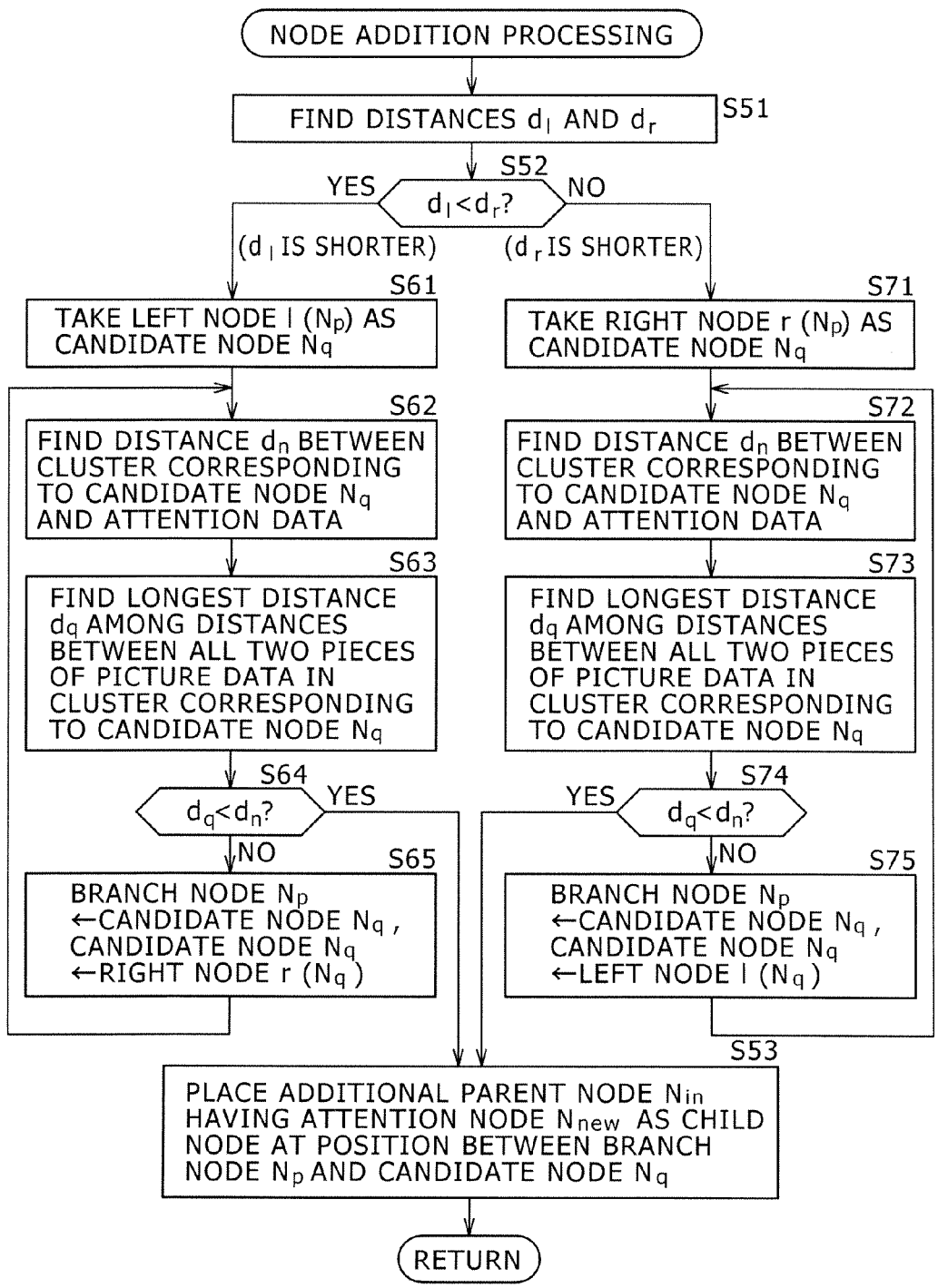
FIG. 29 shows a flowchart representing node addition processing.

Next, by referring to a flowchart shown in FIG. 29, the following description explains the node addition processing carried out by the node addition section 32 employed in the tree-structure processing section 22 as shown in FIG. 19 at the step S22 of the flowchart shown in FIG. 27.

As shown in FIG. 29, the flowchart begins with a step S51 at which, on the basis of a branch $N_p$ received from the branch-node searching section 31 and a cluster tree stored in the cluster-tree storage apparatus 14, the distance computation section 41 employed in the node addition section 32 (FIG. 19) computes a distance $d_l$ between the nearest piece of picture data in a cluster $C_l$ corresponding to the left node $l(N_p)$ of the branch node $N_p$ in the cluster tree like the one shown in FIG. 21 and the attention data $pic_{new}$ assigned to the attention node $N_{new}$. In the following description, the distance $d_l$ is referred to as a left cluster distance. The distance computation section 41 also computes a distance $d_r$ between the nearest piece of picture data in a cluster $C_r$ corresponding to the right node $r(N_p)$ of the branch node $N_p$ in the cluster tree and the attention data $pic_{new}$. In the following description, the distance $d_r$ is referred to as a right cluster distance. Then, the flow of the processing goes on to the next step S52.

At the step S52, the distance computation section 41 produces a result of determination as to whether or not the left cluster distance $d_l$ is shorter (or not longer) than the right cluster distance $d_r$.

If the determination result produced at the step S52 indicates that the left cluster distance $d_l$ is shorter than the right cluster distance $d_r$, the flow of the processing goes on to a step S61. If the determination result produced at the step S52 indicates that the left cluster distance $d_l$ is not shorter than the right cluster distance $d_r$, on the other hand, the flow of the processing goes on to a step S71.

At the step S61, the distance computation section 41 takes the left node $l(N_p)$ of the branch node $N_p$ as a candidate node $N_q$. Then, the flow of the processing goes on to the next step S62. At the step S62, the distance computation section 41 computes a distance $d_n$ between the nearest piece of picture data in a candidate cluster $C_q$ corresponding to the candidate node $N_q$ and the attention data $pic_{new}$ assigned to the attention node $N_{new}$. As explained earlier by referring to FIGS. 22 to 24, the nearest piece of picture data in the candidate cluster $C_q$ is the rightmost picture data among pieces of picture data pertaining to the candidate cluster $C_q$, and the rightmost picture data among pieces of picture data pertaining to the candidate cluster $C_q$ is picture data on the left side adjacent to the attention data $pic_{new}$. The distance computation section 41 then supplies the distance $d_n$ to the determination section 42. Then, the flow of the processing goes on to the next step S63.

At the step S63, the distance computation section 41 computes the maximum distance $d_q$ representing the maximum value of distances between all two adjacent pieces of picture data pertaining to the candidate cluster $C_q$ corresponding to the candidate node $N_q$ (the pieces of picture data already clustered in the cluster tree) and supplies the maximum distance $d_q$ to the determination section 42. Then, the flow of the processing goes on to the next step S64.

At the step S64, the determination section 42 compares the distance $d_n$ received from the distance computation section 41 as the distance between the nearest piece of picture data in the candidate cluster $C_q$ and the attention data $pic_{new}$ with the maximum distance $d_q$ received from the distance computation section 41 representing distances between all two adjacent pieces of picture data pertaining to the candidate cluster $C_q$ in order to produce a result of determination as to whether or not the distance $d_n$ is longer (or not shorter) than the maximum distance $d_q$.

If the determination result produced at the step S64 indicates that the distance $d_n$ between the nearest piece of picture data in the candidate cluster $C_q$ and the attention data $pic_{new}$ is not longer than (or neither equal to nor longer than) the maximum distance $d_q$ between all two adjacent pieces of picture data pertaining to the candidate cluster $C_q$ the flow of the processing goes on to a step S65. That is, if the distances between all two adjacent pieces of picture data pertaining to the candidate cluster $C_q$ include a distance longer (or not shorter) than the distance $d_n$ between the attention data $pic_{new}$ and the nearest piece of picture data in a candidate cluster $C_q$, the attention data $pic_{new}$ is included in the candidate cluster $C_q$. The distance computation section 41 replaces the branch $N_p$ and the candidate node $N_q$ with respectively a new branch $N_p$ and a new candidate node $N_q$ in order to further identify a smaller-size cluster included in the present candidate cluster $C_q$ as a cluster including the attention data $pic_{new}$.

That is to say, at the step S65, the distance computation section 41 updates the branch $N_p$ and the candidate node $N_q$ by taking the present candidate cluster $N_q$ as a new branch cluster $N_p$ and taking the right node $r(N_q)$ serving as one of the two child nodes of the present candidate cluster $N_q$ as a new candidate cluster $N_q$.

After the distance computation section 41 updates the branch $N_p$ and the candidate node $N_q$ at the step S65, the flow of the processing goes back to the step S62 to repeat the processes described above.

It is to be noted that, this time, at the step S62, the distance computation section 41 computes a distance $d_n$ between the nearest piece of picture data in a candidate cluster $C_q$ corresponding to the new candidate node $N_q$ and the attention data $pic_{new}$ assigned to the attention node $N_{new}$. The nearest piece of picture data in the candidate cluster $C_q$ corresponding to the candidate node $N_q$ is picture data on the left side adjacent to the attention data $pic_{new}$ when the left node $l(N_p)$ is taken as the candidate node $N_q$ at the step S61. That is to say, even if the distance computation section 41 updates the branch $N_p$ and the candidate node $N_q$ at the step S65, the picture data on the left side adjacent to the attention data $pic_{new}$ remains the same. Thus, since the distance $d_n$ is the distance between the picture data on the left side adjacent to the attention data $pic_{new}$ and the attention data $pic_{new}$, the distance $d_n$ remains unchanged even if the distance computation section 41 updates the branch $N_p$ and the candidate node $N_q$.

Accordingly, it is possible to skip the process carried out at the step S62 to find the distance $d_n$ for the attention data $pic_{new}$ in the second and subsequent iterations of the flowchart.

If the determination result produced at the step S64 indicates that the distance $d_n$ between the nearest piece of picture data in the candidate cluster $C_q$ and the attention data $pic_{new}$ is longer (or not shorter) than the maximum distance $d_q$ between all two adjacent pieces of picture data pertaining to the candidate cluster $C_q$, the flow of the processing goes on to a step S53. That is, if the distances between all two adjacent pieces of picture data pertaining to the candidate cluster $C_q$ include no distance longer (or not shorter) than the distance $d_n$ between the attention data $pic_{new}$ and the nearest piece of picture data in a candidate cluster $C_q$, the attention data $pic_{new}$ may not be pertained to a cluster included in the present candidate cluster $C_q$ corresponding to the present candidate node $N_q$. In other words, the attention data $pic_{new}$ may be pertained to a cluster corresponding to the present branch node $N_p$ or the candidate node $N_q$ right before the process carried out at the step S65 of the previous iteration, but may not be pertained to a cluster corresponding to the present candidate node $N_q$. Thus, the addition section 43 adds a new node $N_{in}$ to the cluster tree so that the attention data $pic_{new}$ may be pertained to a cluster corresponding to the present branch node $N_p$ or the candidate node $N_q$ right before the previous iteration process.

That is to say, at the step S53, the addition section 43 updates the present cluster tree in order to create a new cluster tree by adding the new node $N_{in}$ to the present tree as a node placed at a position on an arc between the branch node $N_p$ and the candidate node $N_q$. In this way, the new node $N_{in}$ has the branch node $N_p$ as the parent node and the candidate node $N_q$ as one of the child nodes. On the other hand, the attention node $N_{new}$ serves as the other child node of the new node $N_{in}$. Finally, the control of the processing is returned to the calling program to end the node addition processing.

As described above, if the determination result produced at the step S52 indicates that the left cluster distance $d_l$ is not smaller than the right cluster distance $d_r$, on the other hand, the flow of the processing goes on to a step S71. At the step S71, the distance computation section 41 takes the right node $r(N_p)$ of the branch node $N_p$ as a candidate node $N_q$. Then, the flow of the processing goes on to the next step S72. At the step S72, the distance computation section 41 computes a distance $d_n$ between the nearest piece of picture data in a candidate cluster $C_q$ corresponding to the candidate node $N_q$ and the attention data $pic_{new}$ assigned to the attention node $N_{new}$. The distance computation section 41 then supplies the distance $d_n$ to the determination section 42.

With the distance computation section 41 taking the right node $r(N_p)$ of the branch node $N_p$ as a candidate node $N_q$ at the step S71, the nearest piece of picture data in the candidate cluster $C_q$ corresponding to the candidate node $N_q$ is the leftmost picture data among pieces of picture data pertaining to the candidate cluster $C_q$ and is picture data on the right side adjacent to the attention data $pic_{new}$. Then, the processing goes to the step S73.

At the step S73, the distance computation section 41 computes the maximum distance $d_q$ between all two adjacent pieces of picture data pertaining to the candidate cluster $C_q$ corresponding to the candidate node $N_q$ (the pieces of picture data already clustered in the candidate cluster $C_q$) and supplies the maximum distance $d_q$ to the determination section 42. Then, the flow of the processing goes on to a step S74.

At the step S74, the determination section 42 compares the distance $d_n$ received from the distance computation section 41 as the distance between the nearest piece of picture data in the candidate cluster $C_q$ and the attention data $pic_{new}$ with the maximum distance $d_q$ received from the distance computation section 41 as a distance representing distances between all two adjacent pieces of picture data pertaining to the candidate cluster $C_q$ in order to produce a result of determination as to whether or not the distance $d_n$ is longer (or not shorter) than the maximum distance $d_q$.

If the determination result produced at the step S74 indicates that the distance $d_n$ between the nearest piece of picture data in the candidate cluster $C_q$ and the attention data $pic_{new}$ is not longer than (or neither equal to nor longer than) the maximum distance $d_q$ between all two adjacent pieces of picture data pertaining to the candidate cluster $C_q$, the flow of the processing goes on to a step S75. That is, if the distances between all two adjacent pieces of picture data pertaining to the candidate cluster $C_q$ include a distance longer (or not shorter) than the distance $d_n$ between the attention data $pic_{new}$ and the nearest piece of picture data in a candidate cluster $C_q$, the attention data $pic_{new}$ may be included in a cluster included in the present candidate cluster $C_q$. The distance computation section 41 replaces the branch $N_p$ and the candidate node $N_q$ with a new branch $N_p$ and a new candidate node $N_q$ respectively in order to further identify a smaller-size cluster included in the present candidate cluster $C_q$ as a cluster including the attention data $pic_{new}$.

That is to say, at the step S75, the distance computation section 41 updates the branch $N_p$ and the candidate node $N_q$ by taking the present candidate node $N_q$ as a new branch cluster $N_p$ and taking the left node $l(N_q)$ serving as one of the two child nodes of the present candidate node $N_q$ as a new candidate node $N_q$.

After the distance computation section 41 updates the branch $N_p$ and the candidate node $N_q$ at the step S75, the flow of the processing goes back to the step S72 to repeat the processes described above.

It is to be noted that, this time, at the step S72, the distance computation section 41 computes a distance $d_n$ between the nearest piece of picture data in a candidate cluster $C_q$ corresponding to the new candidate node $N_q$ and the attention data $pic_{new}$ assigned to the attention node $N_{new}$. The nearest piece of picture data in the candidate cluster $C_q$ corresponding to the candidate node $N_q$ is picture data on the right side adjacent to the attention data $pic_{new}$. Thus, the nearest piece of picture data in the candidate cluster $C_q$ is the same nearest piece of picture data as the first candidate cluster $C_q$ of the step S71 at which the right node $r(N_p)$ is taken as the first candidate node $N_q$ corresponding to the first candidate cluster $C_q$. That is to say, even if the distance computation section 41 updates the branch $N_p$ and the candidate node $N_q$ at the step S75, the picture data on the right side adjacent to the attention data $pic_{new}$ remains the same. Thus, since the distance $d_n$ and the attention data $pic_{new}$ is the distance between the picture data on the right side adjacent to the attention data $pic_{new}$ and the attention data $pic_{new}$, the distance $d_n$ remains unchanged even if the distance computation section 41 updates the branch $N_p$ and the candidate node $N_q$.

Accordingly, it is possible to skip the process carried out at the step S72 to find the distance $d_n$ for the attention data $pic_{new}$ in the second and subsequent iterations.

If the determination result produced at the step S74 indicates that the distance $d_n$ between the nearest piece of picture data in the candidate cluster $C_q$ and the attention data $pic_{new}$ is longer (or not shorter) than the maximum distance $d_q$ between all two adjacent pieces of picture data pertaining to the candidate cluster $C_q$, the flow of the processing goes on to the step S53. That is, if the distances between all two adjacent pieces of picture data pertaining to the candidate cluster $C_q$ include no distance longer (or not shorter) than the distance $d_n$ between the attention data $pic_{new}$ and the nearest piece of picture data in a candidate cluster $C_q$, the attention data $pic_{new}$ may not be pertained to a cluster included in the present candidate cluster $C_q$ corresponding to the present candidate node $N_q$. In other words, the attention data $pic_{new}$ may be pertained to a cluster corresponding to the present branch node $N_p$ or the candidate node $N_q$ right before the process carried out at the step S75 of the previous iteration, but may not be pertained to a cluster included in a cluster corresponding to the present candidate node $N_q$. Thus, the addition section 43 adds a new node $N_{in}$ to the cluster tree so that the attention data $pic_{new}$ may be pertained to a cluster corresponding to the present branch node $N_p$ or the candidate node $N_q$ right before the previous iteration process.

That is to say, at the step S53, the addition section 43 updates the present cluster tree in order to create a new cluster tree by adding the new node $N_{in}$ to the present tree as a node placed at a position on an arc between the branch node $N_p$ and the candidate node $N_q$. In this way, the new node $N_{in}$ has the branch node $N_p$ as the parent node and the candidate node $N_q$ as one of the child holes. On the other hand, the attention node $N_{new}$ serves as the other child node of the new node $N_{in}$. Finally, the control of the processing is returned to the calling program to end the node addition processing.

Next, by referring to flowcharts shown in FIGS. 30 to 35, the following description explains another embodiment of the clustering processing carried out by the clustering apparatus 13 as shown in FIG. 1 at the step S5 of the flowchart shown in FIG. 17.

The clustering apparatus 13 reads out metadata of attention data $pic_{new}$ from the data storage apparatus 12 and generates an attention node $N_{new}$ assigned to the attention data $pic_{new}$. Then, the clustering apparatus 13 stores information used for identifying the attention data $pic_{new}$ and metadata of the attention data $pic_{new}$ stored in the data storage apparatus 12 in a variable representing the attention node $N_{new}$. Subsequently, at the first step S101 of the flowchart shown in FIG. 30, the clustering apparatus 13 counts the number of pieces of picture data each assigned to a leaf node of the present cluster tree stored in the cluster-tree storage apparatus 14.

If the number of pieces of picture data each assigned to a leaf node of the present cluster tree is found to be zero at the step S101, the flow of the processing goes on to a step S102 at which the clustering apparatus 13 generates a new cluster tree having its root node $N_{root}$ serving as the attention node $N_{new}$ assigned to the attention data $pic_{new}$. To put it concretely, the clustering apparatus 13 copies the contents of the variable representing the attention node $N_{new}$ to a variable representing the root node $N_{root}$. Then, the clustering apparatus 13 stores the new cluster tree in the cluster-tree storage apparatus 14 over the existing cluster tree. Finally, the control of the processing is returned to the calling program to end the execution of the clustering processing.

If the number of pieces of picture data each assigned to a leaf node of the present cluster tree is found to be one at the step S101, that is, if the present cluster tree includes the root node $N_{root}$ only and a piece of picture data has been assigned to the root node $N_{root}$, the flow of the processing goes on to a step S103. The clustering apparatus 13 recognizes the photographing date/time $t(N_{root})$ of the piece of picture data assigned to the root node $N_{root}$ of the cluster tree from metadata held in the root node $N_{root}$ and the photographing date/time $t(N_{new})$ of the attention data $pic_{new}$ assigned to the attention node $N_{new}$ from metadata held in the attention node $N_{new}$. Then, the clustering apparatus 13 produce a result of determination as to whether or not the photographing date/time $t(N_{root})$ of the piece of picture data assigned to the root node $N_{root}$ is earlier than the photographing date/time $t(N_{new})$ of the attention data $pic_{new}$ assigned to the attention node $N_{new}$.

If the determination result produced at the step S103 indicates that the photographing date/time $t(N_{root})$ of the piece of picture data assigned to the root node $N_{root}$ is earlier than the photographing date/time $t(N_{new})$ of the attention data $pic_{new}$ assigned to the attention node $N_{new}$, he flow of the processing goes on to a step S104. That is, if the piece of picture data assigned to the root node $N_{root}$ is a piece of picture data obtained in a photographing operation carried out at a time earlier than the attention data $pic_{new}$, the flow of the processing goes on to a step S104. The clustering apparatus 13 generates a new cluster tree and stores the new cluster tree in the cluster-tree storage apparatus 14. In the new cluster tree, the previous root node is used as the left node $l(N_{root})$ of a new root node $N_{root}$ and the attention node $N_{new}$ is used as the right node $r(N_{root})$ of the new root node $N_{root}$. Then, control of the processing is returned to the calling program.

If the determination result produced at the step S103 indicates that the photographing date/time $t(N_{root})$ of the piece of picture data assigned to the root node $N_{root}$ is not earlier than the photographing date/time $t(N_{new})$ of the attention data $pic_{new}$ assigned to the attention node $N_{new}$, the flow of the processing goes on to a step S105. That is, if the piece of picture data assigned to the root node $N_{root}$ is a piece of picture data obtained in a photographing operation carried out at the same time as or at a time later than the attention data $pic_{new}$, the flow of the processing goes on to a step S105. The clustering apparatus 13 generates a new cluster tree and stores the new cluster tree in the cluster-tree storage apparatus 14. In the new cluster tree, the previous root node is used as the right node $r(N_{root})$ of a new root node $N_{root}$ and the attention node $N_{new}$ is used as the left node $l(N_{root})$ of the new root node $N_{root}$. Then, control of the processing is returned to the calling program.

If the number of pieces of picture data each assigned to a leaf node of the present cluster tree is found to be at least two at the step S101, the flow of the processing goes on to a step S106 at which the clustering apparatus 13 searches nodes findable by tracing down through arcs of the present cluster tree from the root node $N_{root}$ for a node $R_m(N_{root})$ placed at the right end of the cluster tree. In the following description, the node $R_m(N_{root})$ placed at the right end of the cluster tree is properly referred to as a rightmost leaf node $R_m(N_{root})$.

The rightmost leaf node $R_m(N_{root})$ placed at the right end of the cluster tree as a node found in the search process of tracing down through arcs of the present cluster tree from the root node $N_{root}$ is found by calling a function $R_m(N_{root})$ by using the root node $N_{root}$ as an argument.

Figure 31:
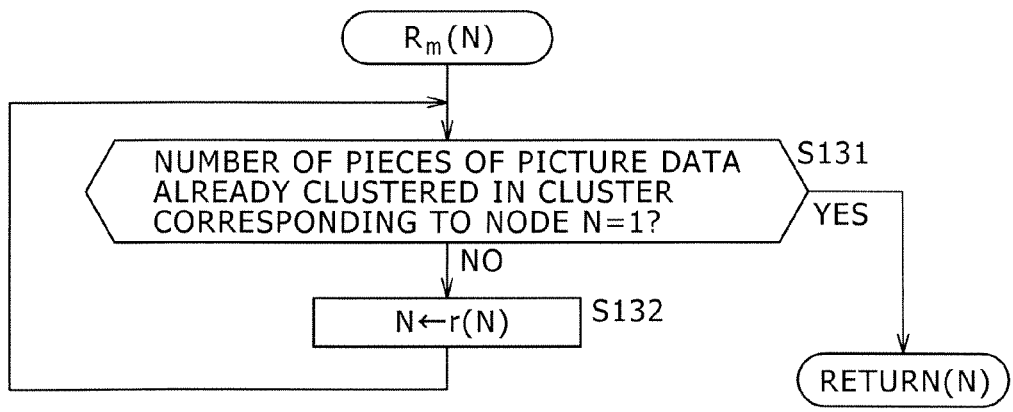
FIG. 31 shows a flowchart representing processing of a function $R_m(N)$.

By referring to the flowchart shown in FIG. 31, the following description explains the processing of a function $R_m(N)$ using a node N of a cluster tree as the argument to search nodes findable by tracing down the cluster tree through arcs from the node N for the rightmost leaf node $R_m(N)$.

The flowchart shown in FIG. 31 begins with a step S131 at which the clustering apparatus 13 produces a result of determination as to whether or not the number of pieces of picture data already clustered in (or pertaining to) a cluster corresponding to the node N of the cluster tree is one.

If the determination result produced at the step S131 indicates that the number of pieces of picture data already clustered in (or pertaining to) a cluster corresponding to the node N of the cluster tree is not one, that is, if the node N is not a leaf node, the flow of the processing goes on to a step S132. The clustering apparatus 13 replaces the node N used as the argument with the right node r(N) of the node N. Then, the flow of the processing goes back to the step S131 to repeat the processes of this step and the step S132.

As the determination result produced at the step S131 indicates that the number of pieces of picture data already clustered in (or pertaining to) a cluster corresponding to the node N of the cluster tree is one, that is, if the node N is a leaf node, the clustering apparatus 13 returns the node N to the calling program as the return value of the function $R_m(N)$ and ends the processing of the function $R_m(N)$.

Figure 30:
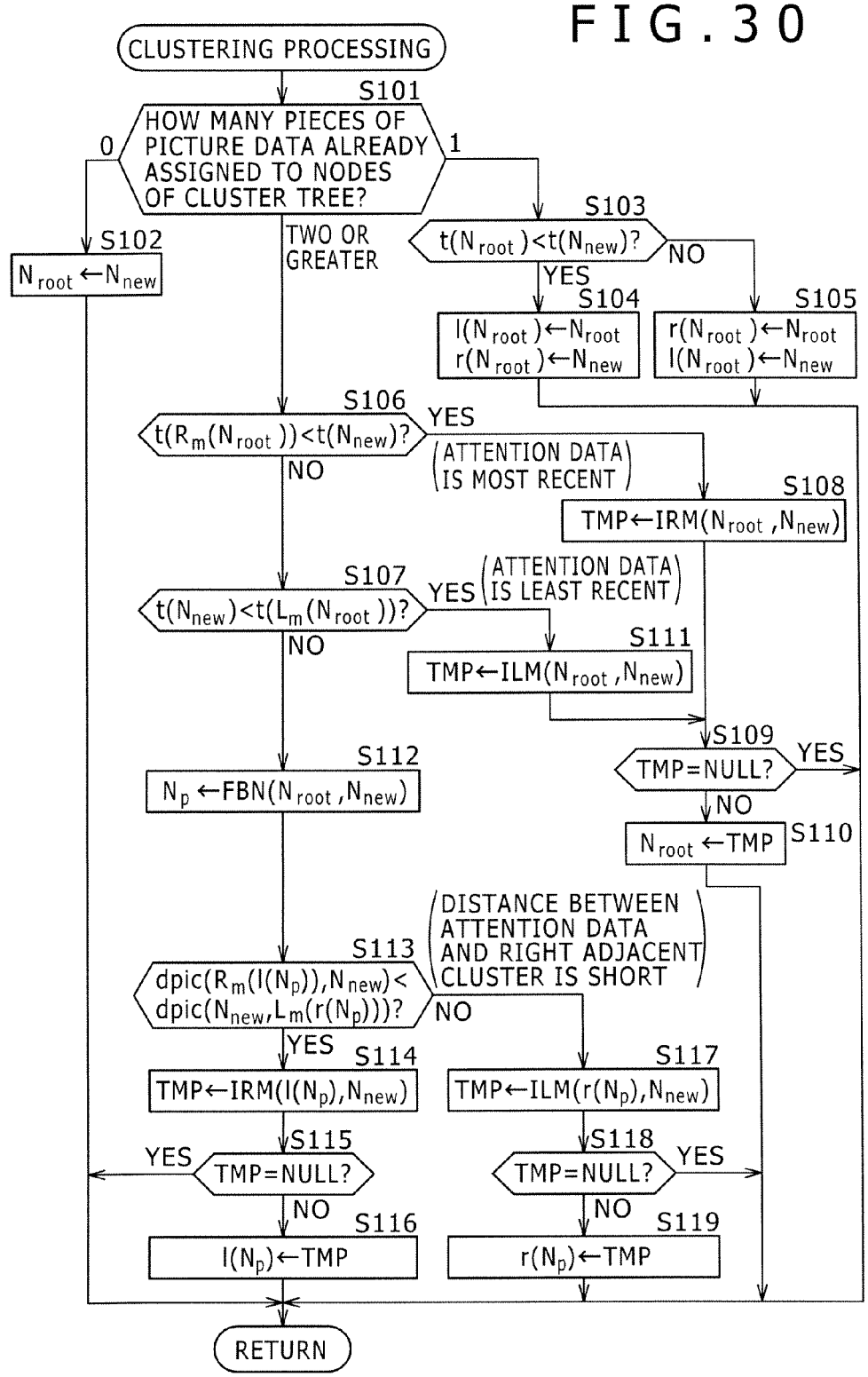
FIG. 30 shows a flowchart representing clustering processing.

Let us refer back to the flowchart shown in FIG. 30. As described above, at the step S106, the clustering apparatus 13 searches nodes findable by tracing down through arcs of the present cluster tree from the root node $N_{root}$ for a rightmost leaf node $R_m(N_{root})$ placed at the right end of the cluster tree, that is, for the leaf node $R_m(N_{root})$ at the right end of the cluster tree. Then, the clustering apparatus 13 produces a result of determination as to whether or not the photographing date/time $t(R_m(N_{root}))$ of a piece of picture data assigned to the rightmost leaf node $R_m(N_{root})$ is earlier than the photographing date/time $t(N_{new})$ of the attention data $pic_{new}$ assigned to the attention node $N_{new}$.

The piece of picture data assigned to the rightmost leaf node $R_m(N_{root})$ findable by tracing down through arcs of the present cluster tree from the root node $N_{root}$ is a piece of picture data having the latest photographing date/time among all pieces of picture data clustered by using the present cluster tree.

If the determination result produced at the step S106 indicates that the photographing date/time $t(R_m(N_{root}))$ of a piece of picture data assigned to the rightmost leaf node $R_m(N_{root})$ is earlier than the photographing date/time $t(N_{new})$ of the attention data $pic_{new}$ assigned to the attention node $N_{new}$, that is, if the attention data $pic_{new}$ is piece of picture data having the latest photographing date/time among all processing-object pieces of picture data, the flow of the processing goes on to a step S108. The processing-object pieces of picture data are pieces of picture data each serving as an object of the layer clustering process. The processing-object pieces of picture data include all pieces of picture data already clustered by using the present cluster tree and the attention data $pic_{new}$.

If the determination result produced at the step S106 indicates that the photographing date/time $t(R_m(N_{root}))$ of a piece of picture data assigned to the rightmost leaf node $R_m(N_{root})$ is not earlier than the photographing date/time $t(N_{new})$ of the attention data $pic_{new}$ assigned to the attention node $N_{new}$, the flow of the processing goes on to a step S107. That is, if the photographing date/time $t(N_{new})$ of the attention data $pic_{new}$ assigned to the attention node $N_{new}$ is earlier than the photographing date/time $t(R_m(N_{root}))$ of a piece of picture data assigned to the rightmost leaf node $R_m(N_{root})$ as a piece of picture data having the latest photographing date/time among all pieces of picture data clustered by using the present cluster tree, the flow of the processing goes on to a step S107. The clustering apparatus 13 searches nodes findable by tracing down through arcs of the present cluster tree from the root node $N_{root}$ for a node $L_m(N_{root})$ placed at the left end of the cluster tree. In the following description, the node $L_m(N_{root})$ is properly referred to as a leftmost leaf node $L_m(N_{root})$.

The leftmost leaf node $L_m(N_{root})$ placed at the left end of the cluster tree as a node found in the search process of tracing down through arcs of the present cluster tree from the root node $N_{root}$ is found by calling a function $L_m(N_{root})$ by using the root node $N_{root}$ as an argument.

Figure 32:
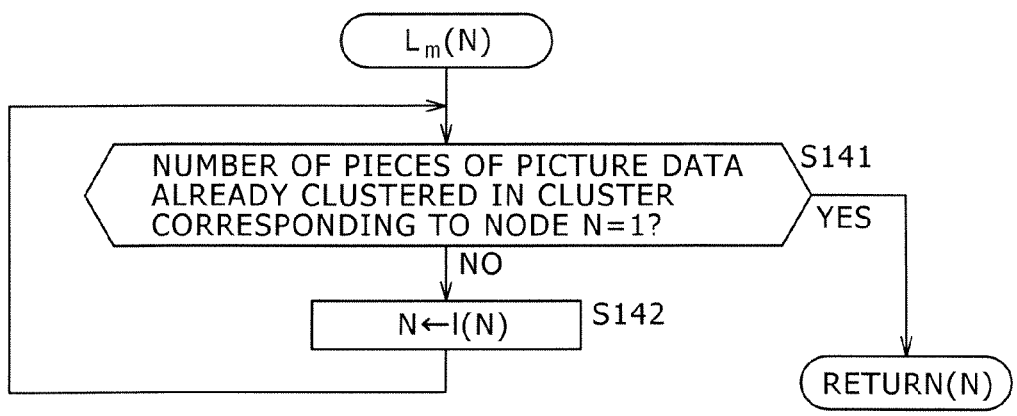
FIG. 32 shows a flowchart representing processing of a function $L_m(N)$.

By referring to the flowchart shown in FIG. 32, the following description explains the processing of a function $L_m(N)$ using a node N of a cluster tree as the argument to search nodes findable by tracing down the cluster tree through arcs from the node N for the leftmost leaf node $L_m(N)$.

The flowchart shown in FIG. 32 begins with a step S141 at which the clustering apparatus 13 produces a result of determination as to whether or not the number of pieces of picture data already clustered in (or pertaining to) a cluster corresponding to the node N of the cluster tree is one.

If the determination result produced at the step S141 indicates that the number of pieces of picture data already clustered in (or pertaining to) a cluster corresponding to the node N of the cluster tree is not one, that is, if the node N is not a leaf node, the flow of the processing goes on to a step S142 at which the clustering apparatus 13 replaces the node N used as the argument with the left node l(N) of the node N. Then, the flow of the processing goes back to the step S141 to repeat the processes of this step and the step S142.

As the determination result produced at the step S141 indicates that the number of pieces of picture data already clustered in (or pertaining to) a cluster corresponding to the node N of the cluster tree is one, that is, if the node N is a leaf node, the clustering apparatus 13 returns the node N to the calling program as the return value of the function $L_m(N)$ and ends the processing of the function $L_m(N)$.

Let us refer back to the flowchart shown in FIG. 30. As described above, at the step S107, the clustering apparatus 13 searches nodes findable by tracing down through arcs of the present cluster tree from the root node $N_{root}$ for a leftmost leaf node $L_m(N_{root})$ placed at the left end of the cluster tree, that is, for the leaf node $L_m(N_{root})$ at the left end of the cluster tree. Then, the clustering apparatus 13 produces a result of determination as to whether or not the photographing date/time $t(L_m(N_{root}))$ of a piece of picture data assigned to the leftmost leaf node $L_m(N_{root})$ is later than the photographing date/time $t(N_{new})$ of the attention data $pic_{new}$ assigned to the attention node $N_{new}$.

The piece of picture data assigned to the leftmost leaf node $L_m(N_{root})$ findable by tracing down through arcs of the present cluster tree from the root node $N_{root}$ is piece of picture data having the earliest photographing date/time among all pieces of picture data clustered by using the present cluster tree.

If the determination result produced at the step S107 indicates that the photographing date/time $t(L_m(N_{root}))$ of a piece of picture data assigned to the leftmost leaf node $L_m(N_{root})$ is later than the photographing date/time t($N_{new}$) of the attention data pic$_{new}$ assigned to the attention node $N_{new}$, that is, if the attention data pic$_{new}$ is a piece of picture data having the earliest photographing date/time among all processing-object pieces of picture data, the flow of the processing goes on to a step S111. The processing-object pieces of picture data include all pieces of picture data already clustered by using the present cluster tree and the attention data pic$_{new}$.

If the determination result produced at the step S107 indicates that the photographing date/time t($L_m(N_{root})$) of a piece of picture data assigned to the leftmost leaf node $L_m(N_{root})$ is not later than the photographing date/time t($N_{new}$) of the attention data pic$_{new}$ assigned to the attention node $N_{new}$, the flow of the processing goes on to a step S112. In other words, if the photographing date/time t($N_{new}$) of the attention data pic$_{new}$ assigned to the attention node $N_{new}$ is newer than the photographing date/time t($L_m(N_{root})$) of a piece of picture data assigned to the leftmost leaf node $L_m(N_{root})$ as a piece of picture data having the earliest photographing date/time among all pieces of picture data clustered by using the present cluster tree, the flow of the processing goes on to a step S112.

The processes of the steps S106 and S107 are carried out to produce a result of determination as to whether the attention data pic$_{new}$ is placed at the left end, the right end, or a position other than the left and right ends of an array of processing-object pieces of picture data arranged in the left-to-right order representing an order of photographing dates/times. The processing-object pieces of picture data include all pieces of picture data already clustered by using the present cluster tree and the attention data pic$_{new}$. If the attention data pic$_{new}$ is placed at the right end of the array, the flow of the processing goes on from the step S106 to the step S108. If the attention data pic$_{new}$ is placed at the left end of the array, the flow of the processing goes on from the step S107 to the step S111. If the attention data pic$_{new}$ is placed at a position other than the left and right ends of the array, the flow of the processing goes on from the step S107 to the step S112. The following description explains processes carried out at the steps S108, S111, and S112.

If the attention data pic$_{new}$ is placed at the right end of the array of processing-object pieces of picture data arranged in the left-to-right order representing an order of photographing dates/times as a piece of picture data having the latest photographing date/time among the processing-object pieces of picture data, the flow of the processing goes on from the step S106 to the step S108. The clustering apparatus 13 calls a function IRM($N_{root}$, $N_{new}$) having variables representing the root node $N_{root}$ and the attention node $N_{new}$ as its arguments and stores the return value of the function IRM($N_{root}$, $N_{new}$) in a variable TMP.

In general, a function IRM($N_q$, $N_{new}$) is a function having a candidate node $N_q$ and an attention node $N_{new}$ as arguments. By execution of the function IRM($N_q$, $N_{new}$), processing is carried out to add a new node $N_{in}$ to the cluster tree as a node having the attention node $N_{new}$ as one of the child nodes and the candidate node $N_q$ as the other child node. If the root node $N_{root}$ is used as the $N_q$ argument, the processing to add a new node $N_{in}$ to the cluster tree is similar to the processing to add a branch node $N_p$ as shown in FIG. 25. In the processing shown in his figure, the root node $N_{root}$ becomes the left node $l(N_p)$ of the added branch node $N_p$.

Figure 33:
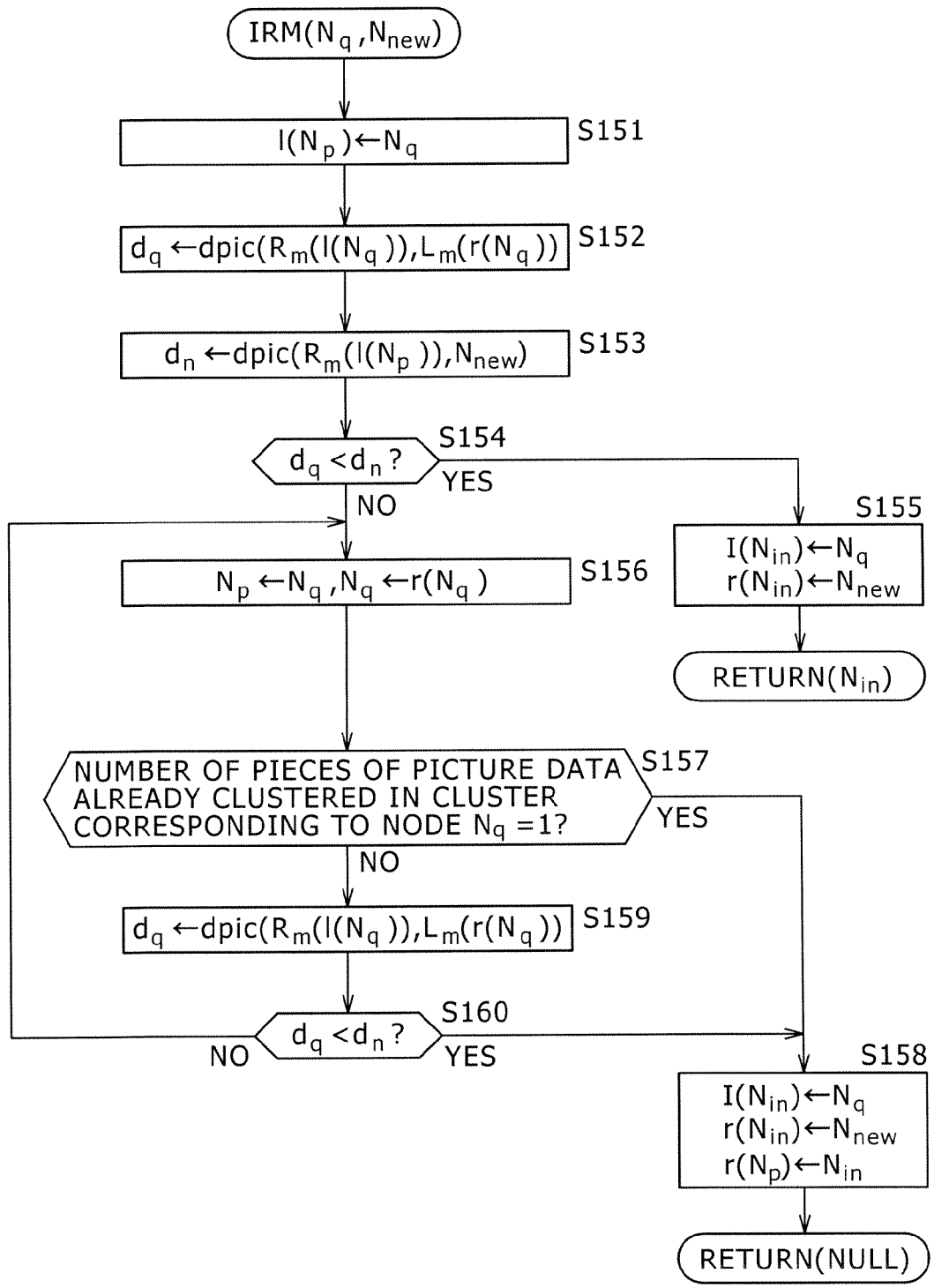
FIG. 33 shows a flowchart representing processing of a function $IRM(N_q, N_{new})$.

FIG. 33 shows a flowchart representing the processing of the function IRM($N_q$, $N_{new}$).

As shown in the figure, the flowchart begins with a step S151 at which the clustering apparatus 13 takes a node as a branch node $N_p$ meeting the following condition. The branch node $N_p$ has the candidate node $N_q$, which is specified as an argument of the function IRM($N_q$, $N_{new}$), as the left node $l(N_p)$ Then, the flow of the processing goes on to the next step S152 at which the clustering apparatus 13 computes the maximum distance $d_q$ representing the maximum value of distances between all two adjacent pieces of picture data pertaining to a candidate cluster $C_q$ corresponding to the candidate node $N_q$.

As described earlier, the maximum distance $d_q$ between all two adjacent pieces of picture data pertaining to a cluster corresponding to a node N is the distance between a cluster corresponding to the left node l(N) of the node N and a cluster corresponding to the right node r(N) of the node N. Also as described before, the distance between a cluster $C_i$ and another cluster $C_j$ is the distance between a first piece of picture data pertaining to the cluster $C_i$ and a second piece of picture data pertaining to the other cluster $C_j$ the shortest distance among distances of other pairs of pieces of picture data.

Thus, the maximum distance $d_q$ between all two adjacent pieces of picture data pertaining to a cluster corresponding to a node N is the distance between a piece of picture data clustered in a cluster corresponding to the left node l(N) of the node N as the rightmost piece of picture data and a piece of picture data clustered in a cluster corresponding to the right node r(N) of the node N as the leftmost piece of picture data.

In accordance with the above description, the maximum distance $d_q$ between all two adjacent pieces of picture data pertaining to the candidate cluster $C_q$ corresponding to the candidate node $N_q$ can be found by using Eq. (2) or (3) as a distance dpic($R_m(l(N_q))$, $L_m(r(N_q))$) between picture data assigned to the left-side rightmost leaf node $R_m(l(N_q))$ of the candidate node $N_q$ and picture data assigned to the right-side leftmost leaf node $L_m(r(N_q))$ of the candidate node $N_q$.

After the process carried out at the step S152 is completed, the flow of the processing goes on to a step S153 at which the clustering apparatus 13 computes a distance $d_n$ between the nearest piece of picture data in the candidate cluster $C_q$ and the attention data pic$_{new}$ assigned to the attention node $N_{new}$.

In this case, if the left node $l(N_p)$ of the branch node $N_p$ is used as the candidate node $N_q$ as described above, the nearest piece of picture data in the candidate cluster $C_q$ is the picture data on the left side adjacent to the attention data pic$_{new}$. This picture data are also picture data assigned to the left-side rightmost leaf node $R_m(l(N_p))$ of the branch node $N_p$.

Thus, the distance found at the step S153 as the distance $d_n$ between the nearest piece of picture data in the candidate cluster $C_q$ and the attention data pic$_{new}$ can be computed by using Eq. (2) or (3) as a distance dpic($R_m(l(N_p))$, $N_{new}$) between picture data assigned to the left-side rightmost leaf node $R_m(l(N_p))$ of the branch node $N_p$ and the attention data pic$_{new}$ assigned to the attention node $N_{new}$.

After the process carried out at the step S153 is completed, the flow of the processing goes on to a step S154. The clustering apparatus 13 produces a result of determination as to whether or not the distance $d_n$ between the nearest piece of picture data in the candidate cluster $C_q$ corresponding to the candidate node $N_q$ and the attention data pic$_{new}$ is longer (or not shorter) than the maximum distance $d_q$ between all two adjacent pieces of picture data pertaining to the candidate cluster $C_q$ corresponding to the candidate node $N_q$.

If the determination result produced at the step S154 indicates the distance $d_n$ is longer (or not shorter) than the maximum distance $d_q$, the flow of the processing goes on to a step S155. The clustering apparatus 13 adds a new node $N_{in}$ to the cluster tree stored in the cluster-tree storage apparatus 14 and returns the new node $N_{in}$ to the calling program as the return value of the function IRM($N_q$, $N_{new}$) before ending the execution of the processing of the function IRM($N_q$, $N_{new}$). The clustering apparatus 13 places the new node $N_{in}$ at such a position in the cluster tree that the left node $l(N_{in})$ becomes the candidate node $N_q$ and the right node $r(N_{in})$ becomes the attention node $N_{new}$. This is because the attention data $pic_{new}$ should not pertain to a cluster (the present candidate cluster $C_q$) corresponding to the present candidate node $N_q$.

If the determination result produced at the step S154 indicates the distance $d_n$ is not longer than (or neither equal to nor longer than) the maximum distance $d_q$, the flow of the processing goes on to a step S156. In other words, if the distances between all two adjacent pieces of picture data pertaining to the candidate cluster $C_q$ include a distance longer (or not shorter) than the distance $d_n$ between the attention data $pic_{new}$ and the picture data assigned to the left-side rightmost leaf node $R_m(l(N_p))$ of the branch node $N_p$ (the distance between the attention data $pic_{new}$ and the picture data on the left side adjacent to the attention data $pic_{new}$), the flow of the processing goes on to a step S156. The clustering apparatus 13 updates the branch node $N_p$ and the candidate node $N_q$. This is because the attention data $pic_{new}$ are pertained to the candidate cluster $C_q$, and the attention data $pic_{new}$ may be pertained to a cluster included in the candidate cluster $C_q$.

That is to say, at the step S156, the clustering apparatus 13 takes the present candidate node $N_q$ as a new branch node $N_p$ and the right node $r(N_q)$ of the present candidate node $N_q$ as a new candidate node $N_q$.

After the process carried out at the step S156 is completed, the flow of the processing goes on to a step S157 at which the clustering apparatus 13 produces a result of determination as to whether or not the candidate cluster $C_q$ corresponding to the new candidate node $N_q$ contains only a piece of picture data.

If the determination result produced at the step S157 indicates that the candidate cluster $C_q$ corresponding to the new candidate node $N_q$ contains a plurality of pieces of picture data, that is, if the candidate node $N_q$ is not a leaf node but a parent node having child nodes, the flow of the processing goes on to a step S159. In the same way as the process carried out at the step S152, the clustering apparatus 13 finds the maximum distance $d_q$ between all two adjacent pieces of picture data pertaining to the candidate cluster $C_q$ corresponding to the new candidate node $N_q$ obtained as a result of the process carried out at the step S156 immediately preceding the step S157. Then, the flow of the processing goes on to the next step S160.

In the same way as the step S154, at the step S160, the clustering apparatus 13 produces a result of determination as to whether or not the distance $d_n$ between the nearest piece of picture data in the candidate cluster $C_q$ corresponding to the candidate node $N_q$ (the picture data on the left side adjacent to the attention data $pic_{new}$) and the attention data $pic_{new}$ is longer (or not shorter) than the maximum distance $d_q$ between all two adjacent pieces of picture data pertaining to the candidate cluster $C_q$ corresponding to the candidate node $N_q$.

If the determination result produced at the step S160 indicates the distance $d_n$ is not longer than (or neither equal to nor longer than) the maximum distance $d_q$, that is, if the distances between all two adjacent pieces of picture data pertaining to the candidate cluster $C_q$ include a distance longer (or not shorter) than the distance $d_n$ between the attention data $pic_{new}$ and the picture data assigned to the left-side rightmost leaf node $R_m(l(N_p))$ of the branch node $N_p$ (the picture data on the left side adjacent to the attention data $pic_{new}$), the flow of the processing goes back to the step S156. The clustering apparatus 13 updates the branch node $N_p$ and the candidate node $N_q$. This is because the attention data $pic_{new}$ are pertained to the candidate cluster $C_q$, and the attention data $pic_{new}$ may be pertained to a cluster included in the candidate cluster $C_q$. The processes of the step S156 and the subsequent steps are carried out repeatedly.

As the determination result produced at the step S157 indicates that the candidate cluster $C_q$ corresponding to the new candidate node $N_q$ contains only one piece of picture data or as the determination result produced at the step S160 indicates the distance $d_n$ is longer (or not shorter) than the maximum distance $d_q$, the flow of the processing goes on to a step S158. The clustering apparatus 13 adds a new node $N_{in}$ to the cluster tree stored in the cluster-tree storage apparatus 14 and returns a value of NULL to the calling program as the return value of the function IRM($N_q$, $N_{new}$) before ending the execution of the processing of the function IRM($N_q$, $N_{new}$). The clustering apparatus 13 places the new node $N_{in}$ at such a position in the cluster tree that the new node $N_{in}$ serves as the right node $r(N_p)$ of the branch node $N_p$, the left node $l(N_{in})$ becomes the candidate node $N_q$, and the right node $r(N_{in})$ becomes the attention node $N_{new}$. This is because the new candidate node $N_q$ is a leaf node or the attention data $pic_{new}$ should not be pertained to the candidate cluster $C_q$ corresponding to the present candidate node $N_q$.

Let us refer back to the flowchart shown in FIG. 30. At the step S108, the clustering apparatus 13 receives a return value returned in the processing represented by the flowchart shown in FIG. 33 as the return value of the function IRM($N_q$, $N_{new}$) and stores the value in the variable TMP. Then, the flow of the processing goes on to the next step S109.

At the step S109, the clustering apparatus 13 produces a result of determination as to whether or not the variable TMP has a value of NULL. If the determination result produced at the step S109 indicates that the variable TMP has a value of NULL, the clustering apparatus 13 ends the execution of the clustering processing.

If the determination result produced at the step S109 indicates that the variable TMP has a value other than NULL, that is, if the variable TMP contains a new node $N_{in}$ received from the processing, which is represented by the flowchart shown in FIG. 33 as the processing of the function IRM($N_q$, $N_{new}$), as the return value of the function IRM($N_q$, $N_{new}$), the flow of the processing goes on to a step S110. The clustering apparatus 13 updates the cluster tree stored in the cluster-tree storage apparatus 14 such that the root node $N_{root}$ becomes the new node $N_{in}$ set in the variable TMP. Finally, the clustering apparatus 13 ends the execution of the clustering processing.

As described above, if the attention data $pic_{new}$ is a piece of picture data having the earliest photographing date/time among all processing-object pieces of picture data, that is, if the attention data $pic_{new}$ is a piece of picture data placed at the left end of an array of processing-object pieces of picture data arranged in the left-to-right order representing an order of photographing dates/times, the flow of the processing represented by the flowchart shown in FIG. 30 goes on from the step S107 to the step S111. At the step S111, the clustering apparatus 13 calls a function ILM($N_{root}$, $N_{new}$) having variables representing the root node $N_{root}$ and the attention node $N_{new}$ as its arguments, and stores the return value of the function ILM($N_{root}$, $N_{new}$) in a variable TMP.

In general, a function ILM($N_q$, $N_{new}$) is a function having a candidate node $N_q$ and an attention node $N_{new}$ as arguments. By execution of the function ILM ($N_q$, $N_{new}$), processing is carried out to add a new node $N_{in}$ to the cluster tree as a node having the attention node $N_{new}$ as one of the child nodes and the candidate node $N_q$ as the other child node. If the root node $N_{root}$ is used as the $N_q$ argument, the processing to add a new node $N_{in}$ to the cluster tree is similar to the processing to add a branch node $N_p$ as shown in FIG. 26. In the processing shown in his figure, the root node $N_{root}$ becomes the right node $r(N_p)$ of the added branch node $N_p$.

Figure 34:
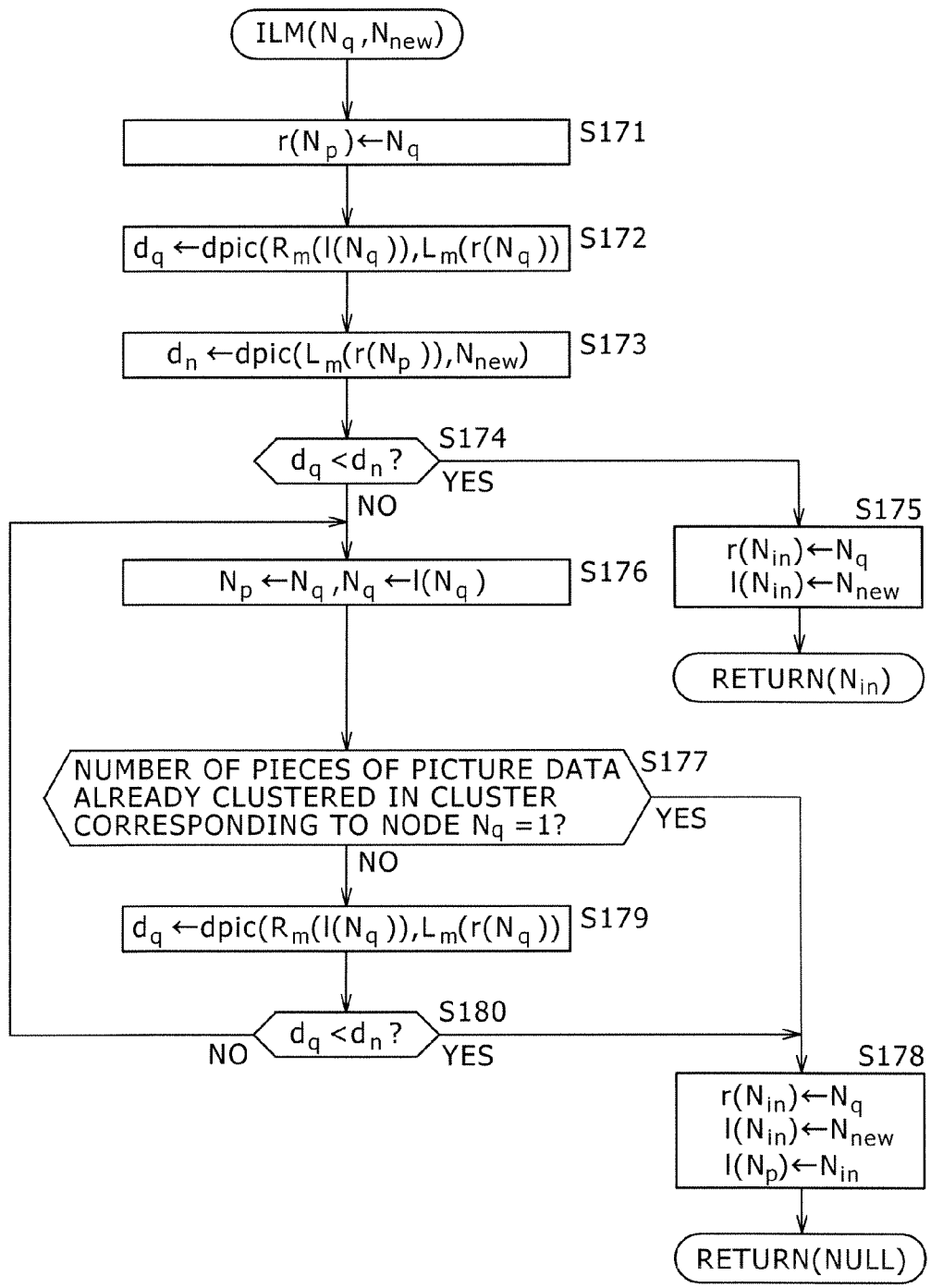
FIG. 34 shows a flowchart representing processing of a function $ILM(N_q, N_{new})$.

FIG. 34 shows a flowchart representing the processing of the function $ILM(N_q, N_{new})$.

As shown in the figure, the flowchart begins with a step S171 at which the clustering apparatus 13 takes a node as a branch node $N_p$ meeting the following condition. The branch node $N_p$ has the candidate node $N_q$, which is specified as an argument of the function $ILM(N_q, N_{new})$, as the right node $r(N_p)$. Then, the flow of the processing goes on to the next step S172 at which the clustering apparatus 13 computes the maximum distance $d_q$ representing the maximum value of distances between all two adjacent pieces of picture data pertaining to a candidate cluster $C_q$ corresponding to the candidate node $N_q$ in the same way as the step S152 of the flowchart shown in FIG. 33.

After the process carried out at the step S172 is completed, the flow of the processing goes on to a step S173 at which the clustering apparatus 13 computes a distance $d_n$ between the nearest piece of picture data in the candidate cluster $C_q$ and the attention data $pic_{new}$ assigned to the attention node $N_{new}$.

In this case, if the right node $r(N_p)$ of the branch node $N_p$ is used as the candidate node $N_q$ as described above, the nearest piece of picture data in the candidate cluster $C_q$ is the picture data on the right side adjacent to the attention data $pic_{new}$. This picture data are also picture data assigned to the right-side leftmost leaf node $L_m(r(N_p))$ of the branch node $N_p$.

Thus, the distance found at the step S173 as the distance $d_n$ between the nearest piece of picture data in the candidate cluster $C_q$ and the attention data $pic_{new}$ can be computed by using Eq. (2) or (3) as a distance $dpic(L_m(r(N_p)), N_{new})$ between picture data assigned to the right-side leftmost leaf node $L_m(l(N_p))$ of the branch node $N_p$ and the attention data $pic_{new}$ assigned to the attention node $N_{new}$.

After the process carried out at the step S173 is completed, the flow of the processing goes on to a step S174 at which the clustering apparatus 13 produces a result of determination as to whether or not the distance $d_n$ between the nearest piece of picture data in the candidate cluster $C_q$ corresponding to the candidate node $N_q$ and the attention data $pic_{new}$ is longer (or not shorter) than the maximum distance $d_q$ between all two adjacent pieces of picture data pertaining to the candidate cluster $C_q$ corresponding to the candidate node $N_q$.

If the determination result produced at the step S174 indicates the distance $d_n$ is longer (or not shorter) than the maximum distance $d_q$, the flow of the processing goes on to a step S175. The clustering apparatus 13 adds a new node $N_{in}$ to the cluster tree stored in the cluster-tree storage apparatus 14 and returns the new node $N_{in}$ to the calling program as the return value of the function $ILM(N_q, N_{new})$ before ending the execution of the processing of the function $ILM(N_q, N_{new})$ The clustering apparatus 13 places the new node $N_{in}$ at such a position in the cluster tree that the right node $r(N_{in})$ becomes the candidate node $N_q$ and the left node $l(N_{in})$ becomes the attention node $N_{new}$. This is because the attention data $pic_{new}$ should not be pertained to a candidate cluster $C_q$ corresponding to the present candidate node $N_q$.

If the determination result produced at the step S174 indicates the distance $d_n$ is not longer than the maximum distance $d_q$, that is, if the distances between all two adjacent pieces of picture data pertaining to the candidate cluster $C_q$ include a distance longer (or not shorter) than the distance $d_n$ between the attention data $pic_{new}$ and the picture data assigned to the right-side leftmost leaf node $L_m(r(N_p))$ of the branch node $N_p$ (the picture data on the right side adjacent to the attention data $pic_{new}$), the flow of the processing goes on to a step S176. The clustering apparatus 13 updates the branch node $N_p$ and the candidate node $N_q$. This is because the attention data $pic_{new}$ are pertained to the candidate cluster $C_q$, and the attention data $pic_{new}$ may be pertained to a cluster included in the candidate cluster $C_q$.

That is to say, at the step S176, the clustering apparatus 13 takes the present candidate node $N_q$ as a new branch node $N_p$ and the left node $l(N_q)$ of the present candidate node $N_q$ as a new candidate node $N_q$.

After the process carried out at the step S176 is completed, the flow of the processing goes on to a step S177 at which the clustering apparatus 13 produces a result of determination as to whether or not the candidate cluster $C_q$ corresponding to the new candidate node $N_q$ contains only a piece of picture data.

If the determination result produced at the step S177 indicates that the candidate cluster $C_q$ corresponding to the new candidate node $N_q$ contains a plurality of pieces of picture data, that is, if the candidate node $N_q$ is not a leaf node but a parent node having child nodes, the flow of the processing goes on to a step S179. In the same way as the process carried out at the step S172, the clustering apparatus 13 finds the maximum distance $d_q$ between all two adjacent pieces of picture data pertaining to the candidate cluster $C_q$ corresponding to the new candidate node $N_q$ obtained as a result of the process carried out at the step S176 immediately preceding the step S177. Then, the flow of the processing goes on to the next step S180.

In the same way as the step S174, at the step S180, the clustering apparatus 13 produces a result of determination as to whether or not the distance $d_n$ between the nearest piece of picture data in the candidate cluster $C_q$ corresponding to the candidate node $N_q$ and the attention data $pic_{new}$ is longer (or not shorter) than the maximum distance $d_q$ between all two adjacent pieces of picture data pertaining to the candidate cluster $C_q$ corresponding to the candidate node $N_q$.

If the determination result produced at the step S180 indicates the distance $d_n$ is not longer than the maximum distance $d_q$, that is, if the distances between all two adjacent pieces of picture data pertaining to the candidate cluster $C_q$ include a distance longer (or not shorter) than the distance $d_n$ between the attention data $pic_{new}$ and the picture data assigned to the right-side leftmost leaf node $L_m(r(N_p))$ of the branch node $N_p$ (the picture data on the right side adjacent to the attention data $pic_{new}$), the flow of the processing goes back to the step S176. This is because the attention data $pic_{new}$ are pertained to the candidate cluster $C_q$, and the attention data $pic_{new}$ may be pertained to a cluster included in the candidate cluster $C_q$. The processes of the step S176 and the subsequent steps are carried out repeatedly.

As the determination result produced at the step S177 indicates that the candidate cluster $C_q$ corresponding to the new candidate node $N_q$ contains only one piece of picture data or as the determination result produced at the step S180 indicates the distance $d_n$ is longer than the maximum distance $d_q$, the flow of the processing goes on to a step S178. The clustering apparatus 13 adds a new node $N_{in}$ to the cluster tree stored in the cluster-tree storage apparatus 14 and returns a value of NULL to the calling program as the return value of the function $ILM(N_q, N_{new})$ before ending the execution of the processing of the function $ILM(N_q, N_{new})$. The clustering apparatus 13 places the new node $N_{in}$ at such a position in the cluster tree that the new node $N_{in}$ serves as the left node $l(N_p)$ of the branch node $N_p$, the right node $r(N_{in})$ becomes the candidate node $N_q$, and the left node $l(N_{in})$ becomes the attention node $N_{new}$. This is because the new candidate node $N_q$ is a leaf node or the attention data $pic_{new}$ is not pertained to the candidate cluster $C_q$ corresponding to the present candidate node $N_q$.

Let us refer back to the flowchart shown in FIG. 30. At the step S111, the clustering apparatus 13 receives a return value returned in the processing represented by the flowchart shown in FIG. 34 as the return value of the function $ILM(N_q, N_{new})$ and stores the value in the variable TMP. Then, the flow of the processing goes on to the next step S109.

At the step S109, the clustering apparatus 13 produces a result of determination as to whether or not the variable TMP has a value of NULL. If the determination result produced at the step S109 indicates that the variable TMP has a value of NULL, the clustering apparatus 13 ends the execution of the clustering processing.

If the determination result produced at the step S109 indicates that the variable TMP has a value other than NULL, that is, if the variable TMP contains a new node $N_{in}$ received from the processing, which is represented by the flowchart shown in FIG. 34 as the processing of the function $ILM(N_q, N_{new})$, as the return value of the function $ILM(N_q, N_{new})$, the flow of the processing goes on to a step S110. The clustering apparatus 13 updates the cluster root stored in the cluster-tree storage apparatus 14 to a new cluster root by using the $N_{in}$ set in the variable TMP as the root node $N_{root}$ of the new cluster tree. Finally, the clustering apparatus 13 ends the execution of the clustering processing.

The following description explains a case in which the attention data $pic_{new}$ is neither the least recent picture data nor the most recent picture data among processing-object pieces of picture data. That is to say, the attention data $pic_{new}$ is a piece of picture data neither placed at the left end nor placed at the right end of an array of processing-object pieces of picture data arranged in the left-to-right order representing an order of photographing dates/times. In this case, the flow of the clustering processing represented by the flowchart shown in FIG. 30 goes on from the step S107 to the step S112 as described earlier. At the step S112, the clustering apparatus 13 calls a function $FBN(N_{root}, N_{new})$ having the root node $N_{root}$ and the attention node $N_{new}$ as its arguments and receives a value as the return value of the function $FBN(N_{root}, N_{new})$. Then, the clustering apparatus 13 takes the return value as a branch node $N_p$. To put it concretely, the clustering apparatus 13 stores the return value in a variable representing the branch node $N_p$.

The clustering apparatus 13 calls a function $FBN(N_{root}, N_{new})$ having the root node $N_{root}$ and the attention node $N_{new}$ as its arguments in order to carry out processing to find a branch node for the given attention node $N_{new}$, to which the attention data $pic_{new}$ is assigned, in the same way as the branch-node searching processing explained earlier by referring to the flowchart shown in FIG. 28.

Figure 35:
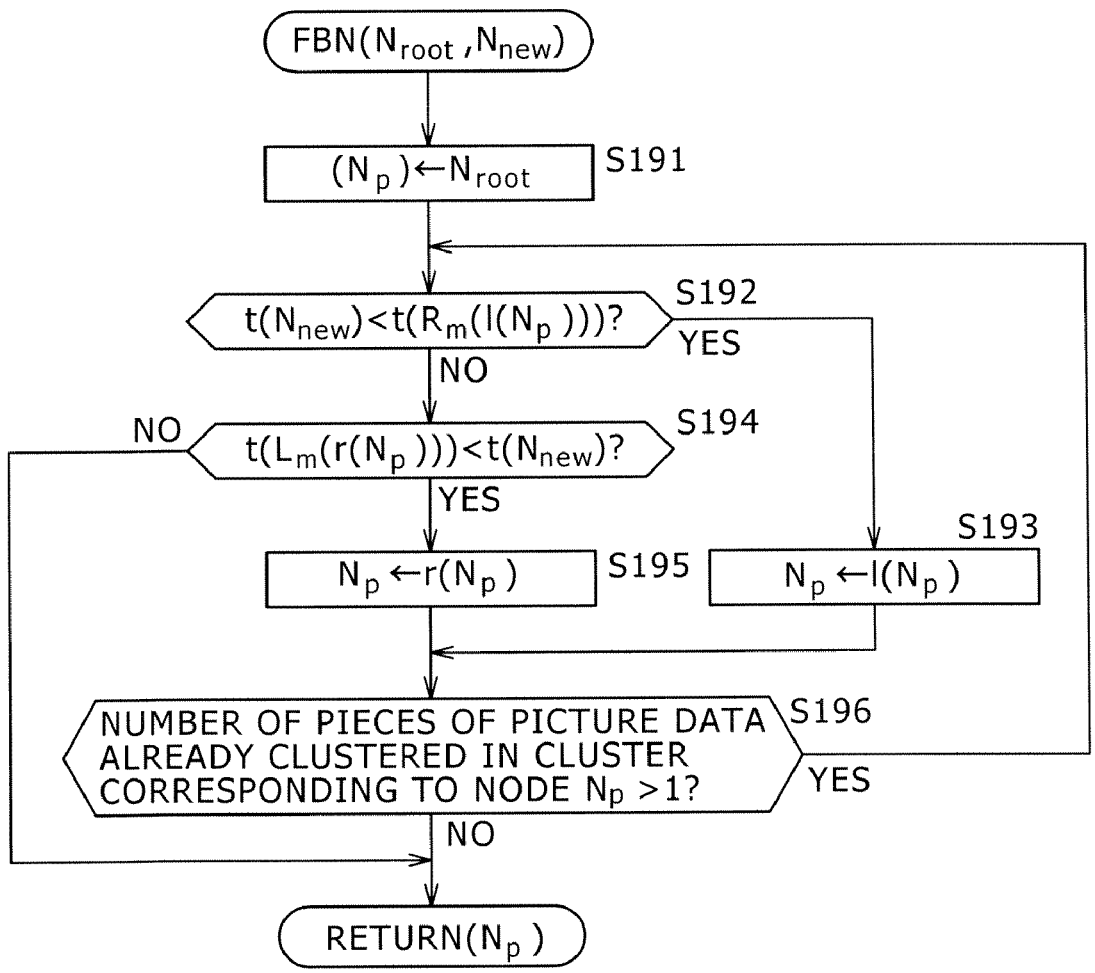
FIG. 35 shows a flowchart representing processing of a function $FBN(N_q, N_{new})$.

FIG. 35 shows a flowchart representing the processing of the function $FBN(N_{root}, N_{new})$.

As shown in the figure, the flowchart begins with a step S191 at which the clustering apparatus 13 takes the root node $N_{root}$ of the present cluster tree stored in the cluster-tree storage apparatus 14 as a tentative branch node $N_p$. Then, the flow of the processing goes on to the next step S192.

At the step S192, the clustering apparatus 13 identifies a photographing date/time $t(N_{new})$ from metadata held in the attention node $N_{new}$ and a photographing date/time $t(R_m(l(N_p)))$ from metadata held in the left-side rightmost leaf node $R_m(l(N_p))$. As described before, the photographing date/time $t(N_{new})$ is the photographing date/time of the attention data $pic_{new}$ assigned to the attention node $N_{new}$. On the other hand, the photographing date/time $t(R_m(l(N_p)))$ is the photographing date/time of picture data assigned to the left-side rightmost leaf node $R_m(l(N_p))$ of the tentative branch node $N_p$. Then, the clustering apparatus 13 produces a result of determination as to whether or not the photographing date/time $t(N_{new})$ of the attention data $pic_{new}$ assigned to the attention node $N_{new}$ is earlier than the photographing date/time $t(R_m(l(N_p)))$ of picture data assigned to the left-side rightmost leaf node $R_m(l(N_p))$. That is to say, the clustering apparatus 13 produces a result of determination as to whether or not the relation $t(N_{new})<t(R_m(l(N_p)))$ holds true.

If the determination result produced at the step S192 indicates that the photographing date/time $t(N_{new})$ is earlier than the photographing date/time $t(R_m(l(N_p)))$ of picture data, the flow of the processing goes on to a step S193. The clustering apparatus 13 replaces the tentative branch node $N_p$ with a node having the left-side rightmost leaf node $R_m(l(N))$ thereof placed on the left side of the left-side rightmost leaf node $R_m(l(N_p))$ in the cluster tree since the tentative branch point $N_p$ is not the branch point $N_p$ for the attention data $pic_{new}$ assigned to the attention node $N_{new}$. This is because the left-side rightmost leaf node $R_m(l(N_p))$ of the tentative branch point $N_p$ is currently placed on the right side of the attention node $N_{new}$ in spite of the fact that picture data assigned to the left-side rightmost leaf node $R_m(l(N_p))$ of the tentative branch point $N_p$ should be picture data placed on the left side adjacent to the attention data $pic_{new}$ assigned to the attention node $N_{new}$ as shown in FIG. 20.

To put it concretely, at the step S193, the clustering apparatus 13 replaces the present tentative branch node $N_p$ with a new tentative branch node $N_p$, which is the left node $l(N_p)$ of the present tentative node $N_p$. Then, the flow of the processing goes on from the step S193 to a step S196.

If the determination result produced at the step S192 indicates that the photographing date/time $t(N_{new})$ is not earlier than the photographing date/time $t(R_m(l(N_p)))$ of picture data, on the other hand, the flow of the processing goes on to a step S194. The clustering apparatus 13 identifies the photographing date/time $t(L_m(r(N_p)))$ assigned to the right-side leftmost leaf node $L_m(r(N_p))$ of the tentative branch node $N_p$ from the metadata held by the right-side leftmost leaf node $L_m(r(N_p))$. The clustering apparatus 13 produces a result of determination as to whether or not the photographing date/time $t(N_{new})$ of the attention data $pic_{new}$ assigned to the attention node $N_{new}$ is later than the photographing date/time $t(L_m(r(N_p)))$ of picture data assigned to the right-side leftmost leaf node $L_m(r(N_p))$. That is to say, the clustering apparatus 13 produces a result of determination as to whether or not the relation $t(L_m(r(N_p)))<t(N_{new})$ holds true.

If the determination result produced at the step S194 indicates that the photographing date/time $t(N_{new})$ is not later than the photographing date/time $t(L_m(r(N_p)))$, that is, if the photographing date/time $t(N_{new})$ are later than the photographing date/time $t(R_m(l(N_p)))$ but earlier than the photographing date/time $t(L_m(r(N_p)))$, and are satisfying relation (7), the clustering apparatus 13 ends the execution of the processing by returning the branch node $N_p$ to the calling program as the return value of the function $FBN(N_{root}, N_{new})$. To put it concretely, the clustering apparatus 13 returns a variable representing a node taken as the present tentative branch node $N_p$.

If the determination result produced at the step S194 indicates that the photographing date/time $t(N_{new})$ is later than the photographing date/time $t(L_m(r(N_p)))$, the flow of the processing goes on to a step S195. The clustering apparatus 13 replaces the tentative branch node $N_p$ with a node having the right-side leftmost leaf node $L_m(r(N))$ thereof placed on the right side of the right-side leftmost leaf node $L_m(r(N_p))$ in the cluster tree since the tentative branch point $N_p$ is not the branch point $N_p$ for the attention data $pic_{new}$ assigned to the attention node $N_{new}$. This is because the right-side leftmost leaf node $L_m(r(N_p))$ of the tentative branch point $N_p$ is currently placed on the left side of the attention node $N_{new}$ in spite of the fact that picture data assigned to the right-side leftmost leaf node $L_m(r(N_p))$ of the tentative branch point $N_p$ should be picture data placed on the right side adjacent to the attention data $pic_{new}$ assigned to the attention node $N_{new}$ as shown in FIG. 20.

To put it concretely, at the step S195, the clustering apparatus 13 replaces the present tentative branch node $N_p$ with a new tentative branch node $N_p$, which is the right node $r(N_p)$ of the present tentative node $N_p$.

Then, the flow of the processing goes on from the step S195 to a step S196 at which the clustering apparatus 13 produces a result of determination as to whether or not a cluster corresponding to the tentative branch node $N_p$ includes more than one piece of picture data.

If the determination result produced at the step S196 indicates that the cluster corresponding to the tentative branch node $N_p$ includes more than one piece of picture data, that is, if the tentative branch node $N_p$ is not a leaf node, the flow of the processing goes back to the step S192 to repeat the processes described above.

If the determination result produced at the step S196 indicates that the cluster corresponding to the tentative branch node $N_p$ includes only one piece of picture data, that is, if the tentative branch node $N_p$ is a leaf node, on the other hand, the clustering apparatus 13 ends the execution of the processing by returning the branch node $N_p$ to the calling program as the return value of the function FBN ($N_{root}$, $N_{new}$). To put it concretely, the clustering apparatus 13 returns a variable representing a node taken as the present tentative branch node $N_p$.

Let us refer back to the flowchart shown in FIG. 30. At the step S112, the clustering apparatus 13 receives a value resulting from the processing represented by the flowchart shown in FIG. 35 as the return value of the function FBN ($N_{root}$, $N_{new}$). Then, the clustering apparatus 13 takes the return value as a branch node $N_p$. To put it concretely, the clustering apparatus 13 stores the return value in a variable representing the branch node $N_p$. Then, the flow of the processing goes on to the next step S113.

At the step S113, the clustering apparatus 13 finds a left cluster distance $d_l$ and a right cluster distance $d_r$. As described earlier, the left cluster distance $d_l$ is the distance between the nearest piece of picture data in the cluster $C_l$ corresponding to the left node $l(N_p)$ of the branch node $N_p$ found at the step S112 and the attention data $pic_{new}$ assigned to the attention node $N_{new}$. On the other hand, the right cluster distance $d_r$ is the distance between the nearest piece of picture data in the cluster $C_r$ corresponding to the right node $r(N_p)$ of the branch node $N_p$ and the attention data $pic_{new}$.

The nearest piece of picture data in the cluster $C_l$ corresponding to the left node $l(N_p)$ of the branch node $N_p$ is a piece of picture data having a photographing data/time closest to the attention data $pic_{new}$ among all pieces of picture data pertaining to the cluster $C_l$ corresponding to the left node $l(N_p)$ of the branch node $N_p$.

The piece of picture data having a photographing data/time closest to the attention data $pic_{new}$ among all pieces of picture data pertaining to the cluster $C_l$ corresponding to the left node $l(N_p)$ of the branch node $N_p$ is a piece of picture data placed at the right end of an array in the pieces of picture data pertaining to the cluster $C_l$, that is, a piece of picture data assigned to the left-side rightmost leaf node $R_m(l(N_p))$ of the branch node $N_p$ or a piece of picture data located on the left side adjacent to the attention data $pic_{new}$.

Thus, the left cluster distance $d_l$ between the nearest piece of picture data in the cluster $C_l$ corresponding to the left node $l(N_p)$ of the branch node $N_p$ and the attention data $pic_{new}$ assigned to the attention node $N_{new}$ can be found by computing a distance $dpic(R_m(l(N_p)), N_{new})$ in accordance with Eq. (2) or (3) as the distance between the piece of picture data assigned to the left-side rightmost leaf node $R_m(l(N_p))$ of the branch node $N_p$ and the attention data $pic_{new}$ assigned to the attention node $N_{new}$.

By the same token, the right cluster distance $d_r$ between the nearest piece of picture data in the cluster $C_l$ corresponding to the right node $r(N_p)$ of the branch node $N_p$ and the attention data $pic_{new}$ assigned to the attention node $N_{new}$ can be found by computing a distance $dpic(L_m(r(N_p)), N_{new})$ (=$dpic(N_{new}, L_m(r(N_p)))$) in accordance with Eq. (2) or (3) as the distance between the piece of picture data assigned to the right-side leftmost leaf node $L_m(r(N_p))$ of the branch node $N_p$ and the attention data $pic_{new}$ assigned to the attention node $N_{new}$.

That is to say, at the step S113, the clustering apparatus 13 finds the left cluster distance $d_l$ (=$dpic(R_m(l(N_p)), N_{new})$) and the right cluster distance $d_r$ (=$dpic(N_{new}, L_m(r(N_p)))$) as described above, and produces a result of determination as to whether or not the left cluster distance $d_l$ is shorter (or not longer) than the right cluster distance $d_r$.

If the determination result produced at the step S113 indicates that the left cluster distance $d_l$ is shorter than the right cluster distance $d_r$, that is, if the attention data $pic_{new}$ is closer to the nearest piece of picture data in a cluster corresponding to the left node $l(N_p)$ of the branch node $N_p$ so that the left node $l(N_p)$ should be taken as the candidate node $N_q$, the flow of the processing goes on to a step S114. The clustering apparatus 13 takes the left node $l(N_p)$ of the branch node $N_p$ as the candidate node $N_q$. Then, the clustering apparatus 13 calls the function IRM($l(N_p)$, $N_{new}$), which takes the branch node $N_p$ and the attention node $N_{new}$ as arguments and receives a return value returned by the function IRM ($l(N_p)$, $N_{new}$) as described earlier by referring to a flowchart shown in FIG. 33. Then, the clustering apparatus 13 stores the return value in a variable TMP.

Then, the flow of the processing goes on from the step S114 to a step S115 at which the clustering apparatus 13 produces a result of determination as to whether or not the variable TMP has a value of NULL. If the result of the determination indicates that the variable TMP has a value of NULL, the clustering apparatus 13 ends the execution of the processing.

If the determination result produced at the step S115 indicates that the variable TMP has a value other than NULL, that is, if the variable TMP has a value representing a new node $N_{in}$ received as the return value of the function IRM($N_q$, $N_{new}$) from the function IRM($N_q$, $N_{new}$) as described earlier by referring to a flowchart shown in FIG. 33, the flow of the processing goes on to a step S116. The clustering apparatus 13 updates the cluster tree stored in the cluster-tree storage apparatus 14 to a new cluster tree including the node $N_{in}$ stored in the variable TMP as the left node $l(N_p)$ of the branch node $N_p$. Finally, the control of the processing is returned to the calling program.

If the determination result produced at the step S113 indicates that the left cluster distance $d_l$ is not shorter than the right cluster distance $d_r$, that is, if the attention data $pic_{new}$ is closer to the nearest piece of picture data in a cluster corresponding to the right node $r(N_p)$ of the branch node $N_p$ so that the right node $r(N_p)$ should be taken as the candidate node $N_q$, on the other hand, the flow of the processing goes on to a step S117. The clustering apparatus 13 takes the right node r($N_p$) of the branch node $N_p$ as the candidate node $N_q$. Then, the clustering apparatus 13 calls the function ILM(r($N_p$), $N_{new}$), which takes the branch node $N_p$ and the attention node $N_{new}$ as arguments and receives a return value returned by the function ILM(r($N_p$), $N_{new}$) as described earlier by referring to a flowchart shown in FIG. 34. Then, the clustering apparatus 13 stores the return value in the variable TMP.

Then, the flow of the processing goes on from the step S117 to a step S118 at which the clustering apparatus 13 produces a result of determination as to whether or not the variable TMP has a value of NULL. If the result of the determination indicates that the variable TMP has a value of NULL, the clustering apparatus 13 ends the execution of the processing.

If the determination result produced at the step S118 indicates that the variable TMP has a value other than NULL, that is, if the variable TMP has a value representing a new node $N_{in}$ received as the return value of the function ILM($N_q$, $N_{new}$) from the function ILM($N_q$, $N_{new}$) as described earlier by referring to a flowchart shown in FIG. 34, the flow of the processing goes on to a step S119. The clustering apparatus 13 updates the cluster tree stored in the cluster-tree storage apparatus 14 to a new cluster tree including the $N_{in}$ stored in the variable TMP as the right node r($N_p$) of the branch node $N_p$. Finally, the control of the processing is returned to the calling program.

Next, by referring to FIGS. 36 to 42, the following description explains examples of a cluster tree generated by the clustering processing carried out by the clustering apparatus 13 in accordance with the flowchart shown in FIG. 30.

It is to be noted that the photographing location of picture data is expressed in terms of coordinates (x, y) of an x and y coordinate system taking a certain position as the origin, and the photographing date/time of the picture data are expressed in terms of t seconds, which are obtained as a result of measurement taking a certain date/time as a reference. An example of the certain position taken as the origin of the x and y coordinate system is the location of the home owned by a user of the camera 1. In this case, the unit of the x and y coordinates used for expressing a photographing position (x, y) can be the meter or another distance scale.

In the following description, photographing information (x, y, t) of picture data is used for collectively representing the photographing position (x, y) and photographing date/time t of the picture data.

The distance dpic(i, j) between picture data pic#i and picture data pic#j is found by using typically Eq. (2). In addition, weight coefficients α, β, and γ in Eq. (2) are set as follows: α=β=1 and γ=0. Thus, assuming that photographing information (x, y, t) of picture data pic#1 is ($x_1$, $y_1$, $t_1$) and photographing information (x, y, t) of picture data pic#2 is ($x_2$, $y_2$, $t_2$), the distance dpic(i, j) between picture data pic#i and picture data pic#j is expressed as follows:

$$d\text{pic}(i, j) = |t_1 - t_2| + |x_1 - x_2| + |y_1 - y_2|$$

Figure 36:
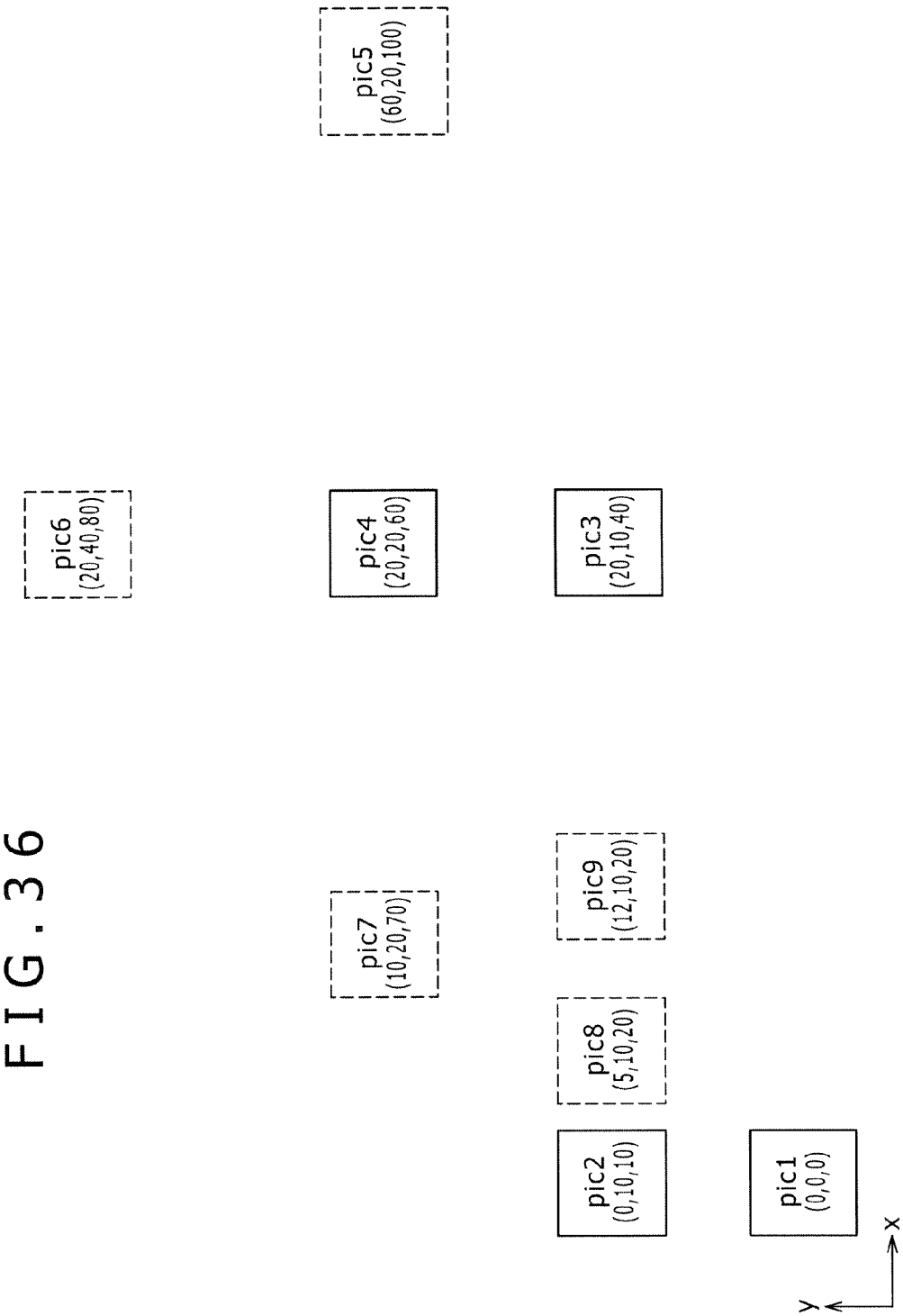
FIG. 36 is a diagram showing typical pieces of picture data obtained by using the camera.

FIG. 36 is a diagram showing typical pieces of picture data obtained by using the camera 1.

To be more specific, FIG. 36 shows nine pieces of picture data, i. e., picture data pid1, pic2, pic3, pic4, pic5, pic6, pic7, pic8, and pic9.

It is to be noted that, in FIG. 36, each of the pieces of picture data pic#i where (i=1, 2, ..., and 9) is shown as a square mark. Notation (x, y, t) in the square mark of each piece of picture data denotes the photographing information of the picture data. In addition, in FIG. 36, the square mark of picture data pic#i is placed at the photographing position (x, y) of the picture data pic#i.

In FIG. 36, the photographing position (x, y) of the picture data pic1 is (0, 0) and the photographing date/time t of the picture data pic1 is 0. The photographing position (x, y) of the picture data pic2 is (0, 10) and the photographing date/time t of the picture data pic2 is 10. The photographing position (x, y) of the picture data pic3 is (20, 10) and the photographing date/time t of the picture data pic3 is 40. The photographing position (x, y) of the picture data pic4 is (20, 20) and the photographing date/time t of the picture data pic4 is 60. The photographing position (x, y) of the picture data pic5 is (60, 20) and the photographing date/time t of the picture data pic5 is 100. The photographing position (x, y) of the picture data pic6 is (20, 40) and the photographing date/time t of the picture data pic6 is 80. The photographing position (x, y) of the picture data pic7 is (10, 20) and the photographing date/time t of the picture data pic7 is 70. The photographing position (x, y) of the picture data pic8 is (5, 10) and the photographing date/time t of the picture data pic8 is 20. The photographing position (x, y) of the picture data pic9 is (12, 10) and the photographing date/time t of the picture data pic9 is 20.

Figure 37:
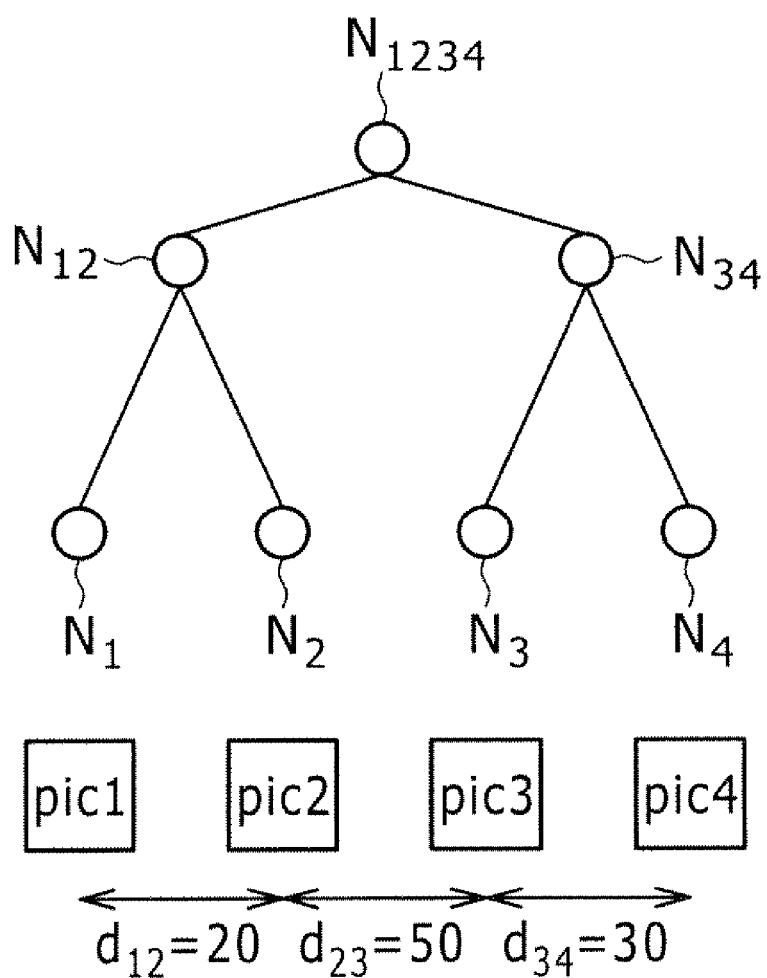
FIG. 37 is a diagram showing a typical cluster tree.

FIG. 37 is a diagram showing a cluster tree obtained by carrying out the clustering processing represented by the flowchart shown in FIG. 30. In the cluster tree shown in FIG. 37, the specific attention data $\text{pic}_{new}$ selected one after another from the nine pieces of picture data, i. e., the picture data pic1 to pic9, which are shown in FIG. 36, are four pieces of picture data, i. e., the picture data pic1 to pic4.

The photographing dates/times of the picture data pic1 to pic4 are 0, 10, 40, and 60 respectively as shown in FIG. 36. Thus, the picture data pic1 to pic4 are arranged in an order of photographing dates/times as pic1, pic2, pic3, and pic4 in this order.

In the array including the picture data pic1 to pic4, which are arranged in the order of photographing dates/times in the cluster tree shown in FIG. 37, a leaf node $N_1$ is assigned to the picture data pic1, a leaf node $N_2$ is assigned to the picture data pic2, a leaf node $N_3$ is assigned to the picture data pic3, and a leaf node $N_4$ is assigned to the picture data pic4. The leaf nodes $N_1$ and $N_2$ serve respectively as the left and right nodes of a node $N_{12}$. On the other hand, the leaf nodes $N_3$ and $N_4$ serve respectively as the left and right nodes of a node $N_{34}$. The nodes $N_{12}$ and $N_{34}$ serve respectively as the left and right nodes of the root node $N_{1234}$.

In the following description, notation $d_{ij}$ denotes the distance dpic(i, j) between picture data pic#i and picture data pic#j.

The distance $d_{ij}$ between picture data pic#i and picture data pic#(i+1) adjacent to each other in the array including the picture data pic1 to pic4, which are arranged in the order of photographing dates/times in the cluster tree, is found as follows.

The distance $d_{12}$ between the picture data pic1 and the picture data pic2 is |0-0|+|0-10|+|0-20|=20. The distance $d_{23}$ between the picture data pic2 and the picture data pic3 is |0-20|+|10-10|+|10-40|=50. The distance $d_{34}$ between the picture data pic3 and the picture data pic4 is |20-20|+10-20|+ |40-60|=30.

Figure 38:
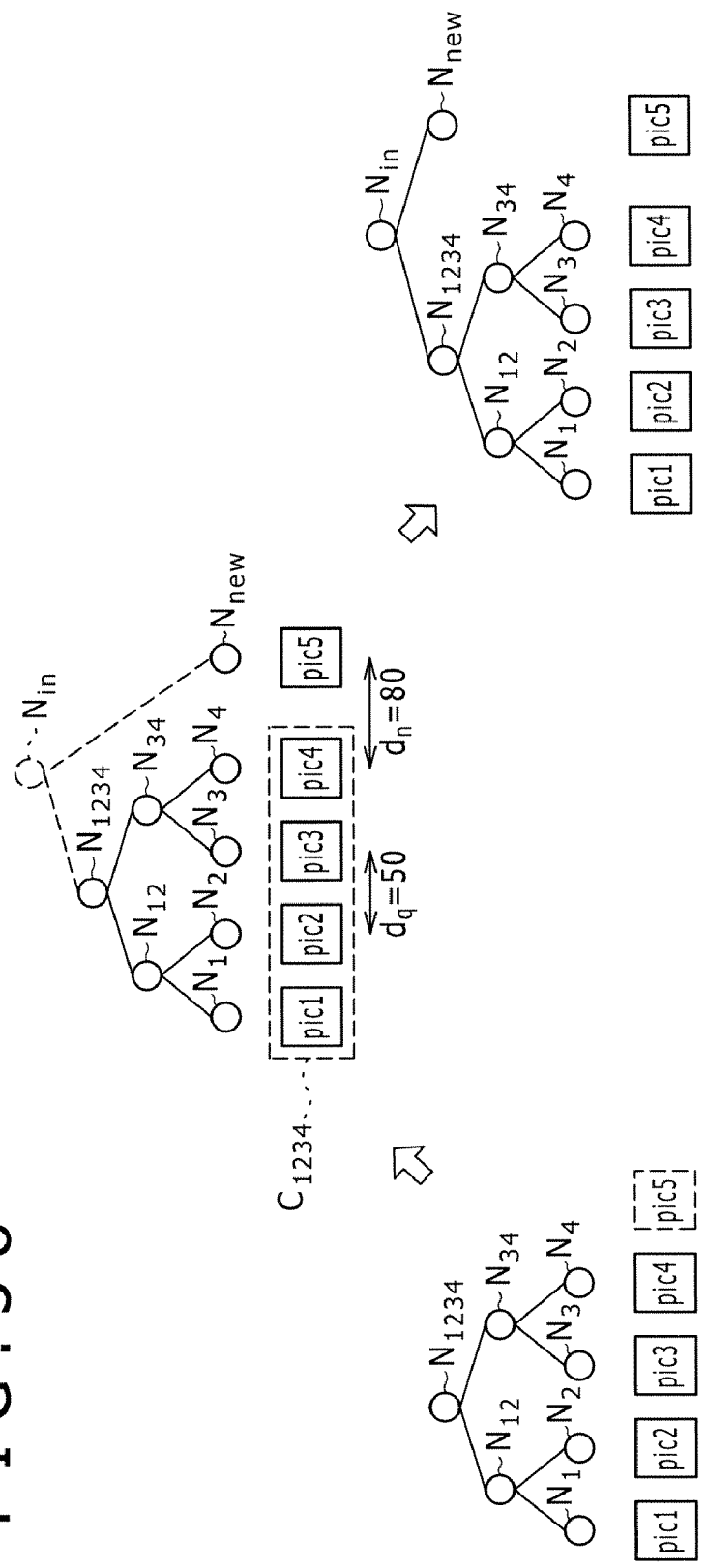
FIG. 38 is a diagram showing other typical cluster trees.

Next, by referring to FIG. 38, the following description explains a cluster tree obtained by carrying out the clustering processing represented by the flowchart shown in FIG. 30. The picture data pic5 serve as the attention data $\text{pic}_{new}$, and attention data $\text{pic}_{new}$ and the picture data pic1 to pic4, which have already been clustered, serve as processing-object pieces of picture data.

As described above, the photographing dates/times t of the picture data pic1 to pic4, which have already been clustered, are 0, 10, 40, and 60 respectively. On the other hand, the photographing date/time t of the picture data pic5 used as the attention data $pic_{new}$ is 100. Thus, the photographing dates/times of the picture data pic1 to pic5, which serve as processing-object pieces of picture data, are arranged in the order of pic1, pic2, pic3, pic4, and pic5 with the first picture data pic1 placed at the left end of FIG. 38.

The number of pieces of picture data, i. e. the picture data pic1 to pic4, which have already been assigned to leaf nodes of the present cluster tree, is four. Thus, when the clustering processing represented by the flowchart shown in FIG. 30 is started with the picture data pic5 used as the attention data $pic_{new}$, the flow of the processing goes on from the step S101 to the step S106. At the step S106, nodes is searched by tracing down through arcs of the present cluster tree from the root node $N_{root}(N_{1234})$ for a rightmost leaf node $R_m(N_{root})$ placed at the right end, that is, for the leaf node $R_m(N_{root})$ at the right end of the cluster tree. Then the result of determination is produced as to whether or not the photographing date/time $t(R_m(N_{root}))$ of a piece of picture data assigned to the rightmost leaf node $R_m(N_{root})$ is earlier than the photographing date/time $t(N_{new})$ of the attention data $pic_{new}$ assigned to the attention node $N_{new}$ as described above.

In this case, the piece of picture data assigned to the rightmost leaf node $R_m(N_{root})$ of the cluster tree is the picture data pic4 and the photographing date/time t of the picture data pic4 is 60. On the other hand, the photographing date/time t of the picture data pic5 used as the attention data $pic_{new}$ is 100.

Thus, the determination result produced at the step S106 indicates that the photographing date/time $t(R_m(N_{root}))$ of a piece of picture data assigned to the rightmost leaf node $R_m(N_{root})$ is earlier than the photographing date/time $t(N_{new})$ of the attention data $pic_{new}$ assigned to the attention node $N_{new}$. This is because the photographing date/time $t(R_m(N_{root}))$ is 60 and the photographing date/time $t(N_{new})$ is 100. In this case, the flow of the processing goes on from the step S106 to the step S108 to call a function $IRM(N_q, N_{new})$ represented by the flowchart shown in FIG. 33 as a function having variables representing the root node $N_{root}(N_{1234})$ and the attention node $N_{new}$ as the $N_q$ and $N_{new}$ arguments respectively.

At the step S152 of the processing of the function $IRM(N_q, N_{new})$ represented by the flowchart shown in FIG. 33, as described above, the maximum distance $d_q$ between all two adjacent pieces of picture data pertaining to the candidate cluster $C_q$ corresponding to the candidate node $N_q$ is computed as a distance $dpic(R_m(l(N_q)), L_m(r(N_q))$ between picture data assigned to the left-side rightmost leaf node $R_m(l(N_q))$ of the candidate node $N_q$ and picture data assigned the right-side leftmost leaf node $L_m(r(N_q))$ of the candidate node $N_q$.

In this case, since the candidate node $N_q$ is the root node $N_{1234}$, the picture data assigned to the left-side rightmost leaf node $R_m(l(N_q))$ is the picture data pic2 whereas the picture data assigned to the right-side leftmost leaf node $L_m(r(N_q))$ is the picture data pic3. Thus, at the step S152, the distance between the picture data pic2 and the picture data pic3 is found as the maximum distance $d_q$.

As shown in FIG. 37, the distance between the picture data pic2 and the picture data pic3 is 50. Thus, the maximum distance $d_q$ is found to be 50 as shown in the second cluster tree from the left end of FIG. 38.

Then, at the step S153 of the processing of the function $IRM(N_q, N_{new})$ represented by the flowchart shown in FIG. 33, as described above, the distance $d_n$ between the nearest piece of picture data in the candidate cluster $C_q$ corresponding to the candidate node $N_q$ and the attention data $pic_{new}$ assigned to the attention node $N_{new}$ is computed as a distance $dpic(R_m(l(N_p)), N_{new})$ between picture data assigned to the left-side rightmost leaf node $R_m(l(N_p))$ of the branch node $N_p$ and the attention data $pic_{new}$.

At the step S151 of the processing of the function $IRM(N_q, N_{new})$ represented by the flowchart shown in FIG. 33, the branch node $N_q$ is the root node $N_{1234}$ and a node having the candidate node $N_q$ as the left node $l(N_p)$ is used as a branch node $N_p$. In this case, picture data assigned to the left-side rightmost leaf node $R_m(l(N_p))$ of the branch node $N_p$ is picture data assigned to the rightmost leaf node $R_m(N_q)$ of leaf nodes reachable by tracing down the cluster tree through arcs from the candidate node $N_q$, which is the left node $l(N_p)$, and the picture data assigned to the rightmost leaf node $R_m(N_q)$ is picture data on the left side adjacent to the attention data $pic_{new}$.

The picture data on the left side adjacent to the picture data pic5 serving as the attention data $pic_{new}$ is the picture data pic4. The photographing information (x, y, t) of the picture data pic4 is (20, 20, 60). On the other hand, the photographing information (x, y, t) of the picture data pic5 is (60, 20, 100). Thus, the distance $d_n$ between the nearest picture data in the candidate cluster $C_q$ and the attention data $pic_{new}$ assigned to the attention node $N_{new}$ is the distance between the picture data pic4 and the picture data pic5, and the distance between the picture data pic4 and the picture data pic5 is |20-60|+|20-20|+|60-100|=80 as shown in the second cluster tree from the left end of FIG. 38.

As is obvious from the above description, the determination result produced at the step S154 of the processing of the function $IRM(N_q, N_{new})$ represented by the flowchart shown in FIG. 33 indicates that the distance $d_n$ (=80) is longer than the maximum distance $d_q$ (=50), causing the flow of the processing to go on to the step S155. A new node $N_{in}$ is added to the cluster tree and is placed at such a position that the left node $l(N_{in})$ serves as the candidate node $N_q$ and the right node $r(N_{in})$ serves as the attention node $N_{new}$.

That is to say, in the present case where the candidate node $N_q$ is the root node $N_{1234}$, the new node $N_{in}$ is added to the cluster tree and is placed at such a position that the root node $N_{1234}$ becomes the left node $l(N_{in})$ and the attention node $N_{new}$ becomes the right node $r(N_{in})$ as shown in the second cluster tree from the left end of FIG. 38.

Then, the control of the processing is returned from the processing of the function $IRM(N_q, N_{new})$ represented by the flowchart shown in FIG. 33 to the step S108 of the flowchart shown in FIG. 30. At the step S110, the new node $N_{in}$ of the root node is added to the cluster tree. As a result, a cluster tree like the third cluster tree from the left end of FIG. 38 or the first cluster tree from the right end of FIG. 38 is obtained with the $N_{in}$ serving as the root node thereof.

Figure 39:
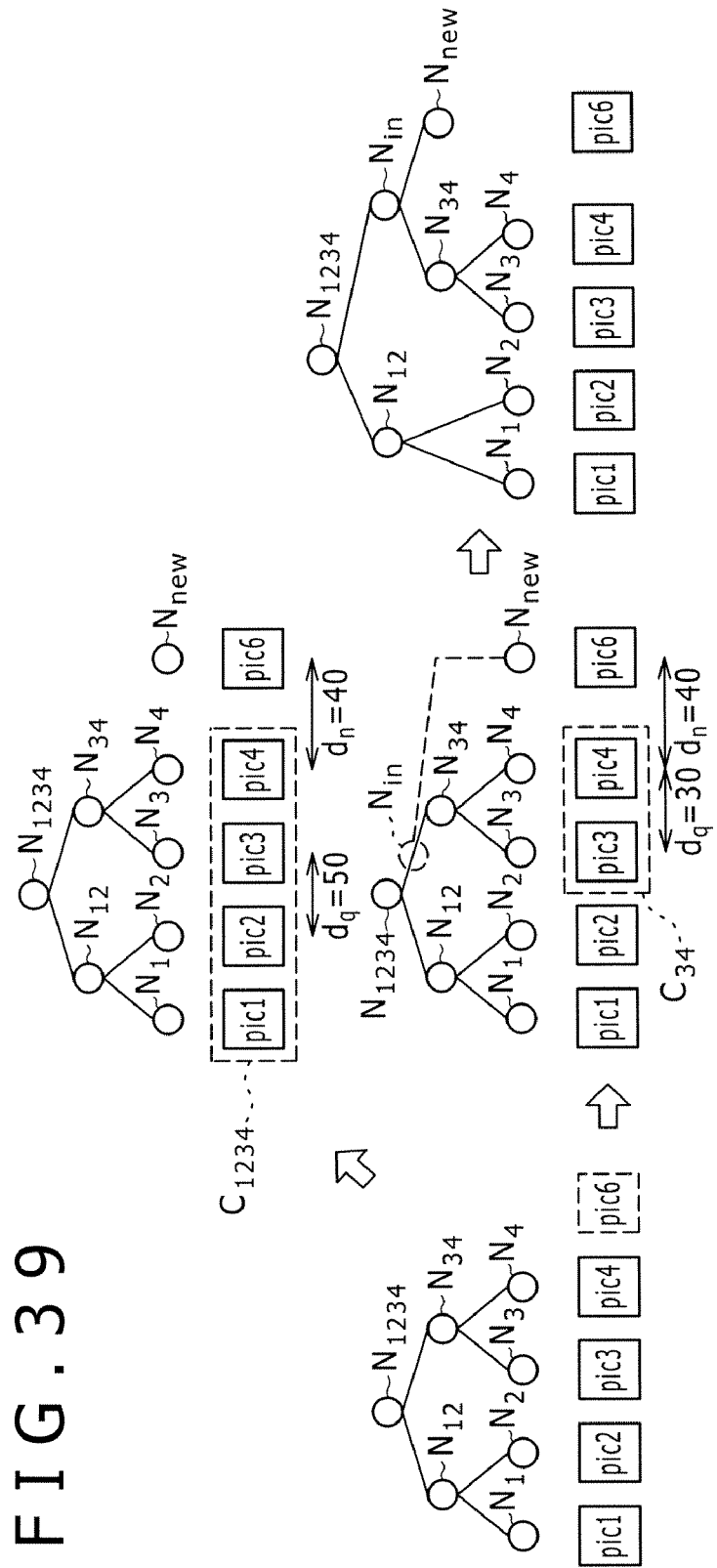
FIG. 39 is a diagram showing further typical cluster trees.

Next, by referring to FIG. 39, the following description explains a cluster tree obtained by carrying out the clustering processing represented by the flowchart shown in FIG. 30. The picture data pic6 serve as the attention data $pic_{new}$, and the picture data pic1 to pic4, which have already been clustered, and the attention data $pic_{new}$ serve as processing-object pieces of picture data.

As described above, the photographing dates/times t of the picture data pic1 to pic4, which have already been clustered, are 0, 10, 40, and 60 respectively. On the other hand, the photographing date/time t of the picture data pic6 used as the attention data $pic_{new}$ is 80. Thus, the photographing dates/times of the picture data pic1 to pic6, which serve as processing-object pieces of picture data, are arranged in the order of pic1, pic2, pic3, pic4, and pic6 with the first picture data pic1 placed at the left end of FIG. 39.

The number of pieces of picture data, i.e. the picture data pic1 to pic4, which have already been assigned to leaf nodes of the present cluster tree, is four. Thus, when the clustering processing represented by the flowchart shown in FIG. 30 is started with the picture data pic6 used as the attention data $pic_{new}$, the flow of the processing goes on from the step S101 to the step S106. At the step S106, Nodes is searched by tracing down through arcs of the present cluster tree from the root node $N_{root}(N_{1234})$ for a rightmost leaf node $R_m(N_{root})$ placed at the right end, that is, for the leaf node $R_m(N_{root})$ at the right end of the cluster tree. Then the result of determination is produced as to whether or not the photographing date/time $t(R_m(N_{root}))$ of a piece of picture data assigned to the rightmost leaf node $R_m(N_{root})$ is earlier than the photographing date/time $t(N_{new})$ of the attention data $pic_{new}$ assigned to the attention node $N_{new}$ as described above.

In this case, the piece of picture data assigned to the rightmost leaf node $R_m(N_{root})$ of the cluster tree is the picture data pic4 and the photographing date/time t of the picture data pic4 is 60. On the other hand, the photographing date/time t of the picture data pic6 used as the attention data $pic_{new}$ is 80.

Thus, the determination result produced at the step S106 indicates that the photographing date/time $t(R_m(N_{root}))$ of a piece of picture data assigned to the rightmost leaf node $R_m(N_{root})$ is earlier than the photographing date/time $t(N_{new})$ of the attention data $pic_{new}$ assigned to the attention node $N_{new}$. This is because the photographing date/time $t(R_m(N_{root}))$ is 60 and the photographing date/time $t(N_{new})$ is 80. In this case, the flow of the processing goes on from the step S106 to the step S108 to call a function $IRM(N_q, N_{new})$ represented by the flowchart shown in FIG. 33 as a function having variables representing the root node $N_{root}(N_{1234})$ and the attention node $N_{new}$ as the $N_q$ and $N_{new}$ arguments respectively.

At the step S152 of the processing of the function $IRM(N_q, N_{new})$ represented by the flowchart shown in FIG. 33, as described above, the maximum distance $d_q$ between all two adjacent pieces of picture data pertaining to the candidate cluster $C_q$ corresponding to the candidate node $N_q$ is computed as a distance $dpic(R_m(l(N_q)) L_m(r(N_q))$ between picture data assigned to the left-side rightmost leaf node $R_m(l(N_q))$ of the candidate node $N_q$ and picture data assigned the right-side leftmost leaf node $L_m(r(N_q))$ of the candidate node $N_q$.

In this case, since the candidate node $N_q$ is the root node $N_{1234}$, the picture data assigned to the left-side rightmost leaf node $R_m(l(N_q))$ is the picture data pic2 whereas the picture data assigned to the right-side leftmost leaf node $L_m(r(N_q))$ is the picture data pic3. Thus, at the step S152, the distance between the picture data pic2 and the picture data pic3 is found as the maximum distance $d_q$.

As shown in FIG. 37, the distance between the picture data pic2 and the picture data pic3 is 50. Thus, the maximum distance $d_q$ is found to be 50 as shown in the top cluster tree above the second cluster tree from the left end of FIG. 39.

Then, at the step S153 of the processing of the function $IRM(N_q, N_{new})$ represented by the flowchart shown in FIG. 33, as described above, the distance $d_n$ between the nearest piece of picture data in the candidate cluster $C_q$ and the attention data $pic_{new}$ assigned to the attention node $N_{new}$ is computed as a distance $dpic(R_m(l(N_p)), N_{new})$ between picture data assigned to the left-side rightmost leaf node $R_m(l(N_p))$ of the branch node $N_p$ and the attention data $pic_{new}$.

At the step S151 of the processing of the function $IRM(N_q, N_{new})$ represented by the flowchart shown in FIG. 33, the branch node $N_q$ is the root node $N_{1234}$ and a node having the candidate node $N_q$ as the left node 1 ($N_p$) is used as a branch node $N_p$. In this case, picture data assigned to the left-side rightmost leaf node $R_m(l(N_p))$ of the branch node $N_p$ is picture data assigned to the rightmost leaf node $R_m(N_q)$ of leaf nodes reachable by tracing down the cluster tree through arcs from the candidate node $N_q$, which is the left node $l(N_p)$, and picture data assigned to the rightmost leaf node $R_m(N_q)$ is picture data on the left side adjacent to the attention data $pic_{new}$.

The picture data on the left side adjacent to the picture data pic6 serving as the attention data $pic_{new}$ is the picture data pic4. The photographing information (x, y, t) of the picture data pic4 is (20, 20, 60). On the other hand, the photographing information (x, y, t) of the picture data pic6 is (20, 40, 80). Thus, the distance $d_n$ between the nearest picture data in the candidate cluster $C_q$ and the attention data $pic_{new}$ assigned to the attention node $N_{new}$ is the distance between the picture data pic4 and the picture data pic6, and the distance between the picture data pic4 and the picture data pic6 is |20-20|+|20-40|+|60-80|=40 as shown in the second cluster tree from the left end of FIG. 39.

As is obvious from the above description, the determination result produced at the step S154 of the processing of the function $IRM(N_q, N_{new})$ represented by the flowchart shown in FIG. 33 indicates that the distance $d_n$ (=40) is not longer than the maximum distance $d_q$ (=50), causing the flow of the processing to go on to the step S156. The branch node $N_p$ is replaced by the candidate node $N_p$ and the candidate node $N_q$ is replaced by the right node $r(N_q)$ of the candidate node $N_q$. Since the root node $N_{1234}$ serves as the candidate node $N_q$, the root node $N_{1234}$ is used as a new branch node $N_p$ and the node $N_{34}$ serving as the right node of the root node $N_{1234}$ is used as a new candidate node $N_q$.

As shown in the second cluster tree from the top of FIG. 39 and also from the left end of the same figure, a cluster $C_{34}$ corresponding to the node $N_{34}$ serving as a new candidate node $N_q$ includes two pieces of picture data, i.e. the picture data pic3 and pic4. After the candidate node $N_q$ and the branch node $N_p$ are updated at the step S156, the flow of the processing goes on to the step S159 by way of the step S157. At the step S159, the distance $dpic(R_m(l(N_p)), L_m(r(N_q)))$ between the picture data assigned to the left-side rightmost leaf node $R_m(l(N_q))$ of the new candidate node $N_q$ and the picture data assigned to the right-side leftmost leaf node $L_m(r(N_q))$ of the new candidate node $N_q$ is found as the maximum distance $d_q$ between all two adjacent pieces of picture data pertaining to the candidate cluster $C_q$ corresponding to the candidate node $N_q$ in the same way as the step S152.

In this case, since the new candidate node $N_q$ is the node $N_{34}$, the picture data assigned to the left-side rightmost leaf node $R_m(l(N_q))$ is the picture data pic3 whereas the picture data assigned to the right-side leftmost leaf node $L_m(r(N_q))$ is the picture data pic4. Thus, at the step S159, the distance between the picture data pic3 and pic4 is found as the maximum distance $d_q$.

As shown in FIG. 37, the distance between the picture data pic3 and the picture data pic4 is 30. Thus, the maximum distance $d_q$ is found to be 30 as shown in the second cluster tree from the top of FIG. 39 and also from the left end of the same figure.

After the maximum distance $d_q$ is found at the step S159 as described above, the flow of the processing goes on to the next step S160 at which the distance $d_n$ is compared with the maximum distance $d_q$ in order to produce a result of determination as to whether or not the distance $d_n$ is longer than the maximum distance $d_q$. In this case, since the distance $d_n$ is 40 and the maximum distance $d_q$ is 30, the result of the determination indicates that the distance $d_n$ is longer than the maximum distance $d_q$, causing the flow of the processing to go on to the step S158. A new node $N_{in}$ is added to the cluster tree and is placed at such a position in the cluster tree that the new node $N_{in}$ serves as the right node $r(N_p)$ of the branch node $N_p$, the left node $l(N_{in})$ becomes the candidate node $N_q$ and the right node $r(N_{in})$ becomes the attention node $N_{new}$.

In this case, since the new candidate node $N_q$ is the node $N_{34}$ and the branch node $N_p$ is the root node $N_{1234}$, as shown in the second cluster tree from the top of FIG. 39 and from the left end of the same figure, the new node $N_{in}$ is added to the cluster tree and is placed at such a position in the cluster tree that the new node $N_{in}$ serves as the right node $r(N_p)$ of the root node $N_{1234}$, the left node $l(N_{in})$ becomes the node $N_{34}$, and the right node $r(N_{in})$ becomes the attention node $N_{new}$.

Then, the control of the processing is returned from the processing of the function $IRM(N_q, N_{new})$ represented by the flowchart shown in FIG. 33 to the step S108 of the flowchart shown in FIG. 30. As a result, a cluster tree like the third cluster tree from the left end of FIG. 39 or the first cluster tree from the right end of FIG. 39 is obtained with the node $N_{1234}$ serving as the root node thereof as it is.

Figure 40:
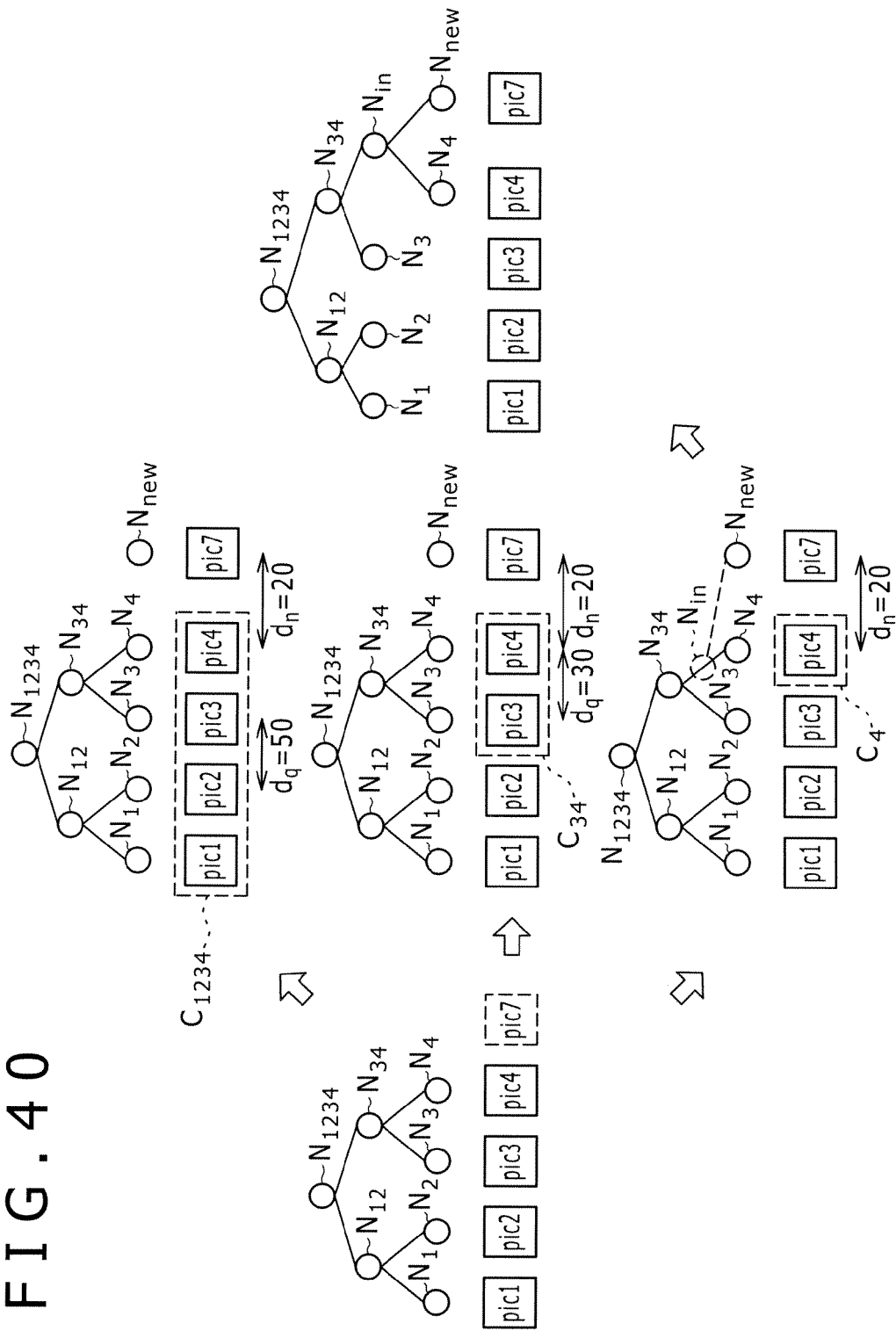
FIG. 40 is a diagram showing still further typical cluster trees.

Next, by referring to FIG. 40, the following description explains a cluster tree obtained by carrying out the clustering processing represented by the flowchart shown in FIG. 30 on the picture data pic7 serving as the attention data $pic_{new}$ and processing-object pieces of picture data including the attention data $pic_{new}$ and the picture data pic1 to pic4, which have already been clustered.

As described above, the photographing dates/times t of the picture data pic1 to pic4, which have already been clustered, are 0, 10, 40, and 60 respectively. On the other hand, the photographing date/time t of the picture data pic7 used as the attention data $pic_{new}$ is 70. Thus, the photographing dates/times t of the picture data pic1 to pic7, which serve as processing-object pieces of picture data, are arranged in the order of pic1, pic2, pic3, pic4, and pic7 with the first picture data pic1 placed at the left end of FIG. 40.

The number of pieces of picture data, i. e. the picture data pic1 to pic4, which have already been assigned to leaf nodes of the present cluster tree, is four. Thus, when the clustering processing represented by the flowchart shown in FIG. 30 is started with the picture data pic7 used as the attention data $pic_{new}$, the flow of the processing goes on from the step S101 to the step S106. Nodes findable by tracing down through arcs of the present cluster tree is searched from the root node $N_{root}(N_{1234})$ for a rightmost leaf node $R_m(N_{root})$ placed at the right end, that is, for the leaf node $R_m(N_{root})$ at the right end of the cluster tree. Then a result of determination is produced as to whether or not the photographing date/time $t(R_m(N_{root}))$ of a piece of picture data assigned to the rightmost leaf node $R_m(N_{root})$ is earlier than the photographing date/time $t(N_{new})$ of the attention data $pic_{new}$ assigned to the attention node $N_{new}$ as described above.

In this case, the piece of picture data assigned to the rightmost leaf node $R_m(N_{root})$ of the cluster tree is the picture data pic4 and the photographing date/time t of the picture data pic4 is 60. On the other hand, the photographing date/time t of the picture data pic7 used as the attention data $pic_{new}$ is 70.

Thus, the determination result produced at the step S106 indicates that the photographing date/time $t(R_m(N_{root}))$ of a piece of picture data assigned to the rightmost leaf node $R_m(N_{root})$ is earlier than the photographing date/time $t(N_{new})$ of the attention data $pic_{new}$ assigned to the attention node $N_{new}$. This is because the photographing date/time $t(R_m(N_{root}))$ is 60 and the photographing date/time $t(N_{new})$ is 70. In this case, the flow of the processing goes on from the step S106 to the step S108 to call a function $IRM(N_q, N_{new})$ represented by the flowchart shown in FIG. 33 as a function having variables representing the root node $N_{root}(N_{1234})$ and the attention node $N_{new}$ as the $N_q$ and $N_{new}$ arguments respectively.

At the step S152 of the processing of the function $IRM(N_q, N_{new})$ represented by the flowchart shown in FIG. 33, as described above, the maximum distance $d_q$ between all two adjacent pieces of picture data pertaining to the candidate cluster $C_q$ corresponding to the candidate node $N_q$ is computed as a distance $dpic(R_m(l(N_q)), L_m(r(N_q)))$ between picture data assigned to the left-side rightmost leaf node $R_m(l(N_q))$ of the candidate node $N_q$ and picture data assigned the right-side leftmost leaf node $L_m(r(N_q))$ of the candidate node $N_q$.

In this case, the candidate node $N_q$ is the root node $N_{1234}$. Thus, much like the cases shown in FIGS. 38 and 39, the distance between the picture data pic2 and the picture data pic3, which is 50, is found as the maximum distance $d_q$ as shown in a cluster tree above the second cluster tree from the left end of FIG. 40.

Then, at the step S153 of the processing of the function $IRM(N_q, N_{new})$ represented by the flowchart shown in FIG. 33, as described above, the distance $d_n$ between the nearest piece of picture data in the candidate cluster $C_q$ and the attention data $pic_{new}$ is computed between picture data assigned to the left-side rightmost leaf node $R_m(l(N_p))$ of the branch node $N_p$ and the attention data $pic_{new}$.

At the step S151 of the processing of the function $IRM(N_q, N_{new})$ represented by the flowchart shown in FIG. 33, the candidate node $N_q$ is the root node $N_{1234}$ and a node having the candidate node $N_q$ as the left node $l(N_p)$ is used as a branch node $N_p$. In this case, picture data assigned to the left-side rightmost leaf node $R_m(l(N_p))$ of the branch node $N_p$ is picture data assigned to the rightmost leaf node $R_m(N_p)$ of leaf nodes reachable by tracing down the cluster tree through arcs from the candidate node $N_q$, which is the left node $l(N_p)$, and the picture data assigned to the rightmost leaf node $R_m(N_p)$ is picture data on the left side adjacent to the attention data $pic_{new}$.

The picture data on the left side adjacent to the picture data pic7 serving as the attention data $pic_{new}$ is the picture data pic4. The photographing information (x, y, t) of the picture data pic4 is (20, 20, 60). On the other hand, the photographing information (x, y, t) of the picture data pic7 is (10, 20, 70). Thus, the distance $d_n$ between the nearest picture data in the candidate cluster $C_q$ and the attention data $pic_{new}$ assigned to the attention node $N_{new}$ is the distance between the picture data pic4 and the picture data pic7, and the distance between the picture data pic4 and the picture data pic7 is |20-10|+|20-20|+|60-70|=20 as shown in the second cluster tree from the left end of FIG. 40.

As is obvious from the above description, the determination result produced at the step S154 of the processing of the function $IRM(N_q, N_{new})$ represented by the flowchart shown in FIG. 33 indicates that the distance $d_n$ (=20) is not longer than the maximum distance $d_q$ (=50), causing the flow of the processing to go on to the step S156. The branch node $N_p$ is replaced by the candidate node $N_q$ and the candidate node $N_q$ is replaced by the right node $r(N_q)$ of the candidate node $N_q$. Since the root node $N_{1234}$ serves as the candidate node $N_q$, the root node $N_{1234}$ is used as a new branch node $N_p$ and the node $N_{34}$ serving as the right node of the root node $N_{1234}$ is used as a new candidate node $N_q$.

As shown in the second cluster tree from the top of FIG. 40 and from the left end of the same figure, a cluster $C_{34}$ corresponding to the node $N_{34}$ serving as a new candidate node $N_q$ includes two pieces of picture data, i. e. the picture data pic3 and pic4. After the candidate node $N_q$ and the branch node $N_p$ are updated at the step S156, the flow of the processing goes on to the step S159 by way of the step S157. At the step S159, the distance $dpic(R_m(l(N_p)), L_m(r(N_q)))$ between the picture data assigned to the left-side rightmost leaf node $R_m(l(N_q))$ of the new candidate node $N_q$ and the picture data assigned to the right-side leftmost leaf node $L_m(r(N_q))$ of the new candidate node $N_q$ is found as the maximum distance $d_q$ between all two adjacent pieces of picture data pertaining to the candidate cluster $C_q$ corresponding to the candidate node $N_q$ in the same way as the step S152.

In this case, since the new candidate node $N_q$ is the node $N_{34}$, the picture data assigned to the left-side rightmost leaf node $R_m(l(N_q))$ is the picture data pic3 whereas the picture data assigned to the right-side leftmost leaf node $L_m(r(N_q))$ is the picture data pic4. Thus, at the step S159, the distance between the picture data pic3 and pic4 is found as the maximum distance $d_q$.

As shown in FIG. 37, the distance between the picture data pic3 and pic4 is 30. Thus, the maximum distance $d_q$ is found to be 30 as shown in the second cluster tree from the top of FIG. 40 and from the left end of the same figure.

After the maximum distance $d_q$ is found at the step S159 as described above, the flow of the processing goes on to the next step S160 at which the distance $d_n$ is compared with the maximum distance $d_q$ in order to produce a result of determination as to whether or not the distance $d_n$ is longer than the maximum distance $d_q$. In this case, since the distance $d_n$ is 20 and the maximum distance $d_q$ is 30, the result of the determination indicates that the distance $d_l$ is not longer than the maximum distance $d_q$, causing the flow of the processing to go back to the step S156. The branch node $N_p$ is replaced by the candidate node $N_q$ and the candidate node $N_q$ is replaced by the right node $r(N_q)$ of the candidate node $N_q$ as described above.

Since the node $N_{34}$ serves as the candidate node $N_q$, the node $N_{34}$ is used as a new branch node $N_p$ and a node $N_4$ serving as the right node of the root node $N_{34}$ is used as a new candidate node $N_q$.

As shown in the cluster tree placed at the bottom of the figure to serve as the second cluster tree from the left end of FIG. 40, a cluster $C_4$ corresponding to the new candidate node $N_4$ includes only one picture data pic4. After the candidate node $N_q$ and the branch node $N_p$ are updated at the step S156, the flow of the processing goes on to the step S158 by way of the step S157. At the step S158, a new node $N_{in}$ is added to the cluster tree, being placed at such a position in the cluster tree that the new node $N_{in}$ serves as the right node $r(N_p)$ of the branch node $N_p$, the left node $l(N_{in})$ of the new node $N_{in}$ becomes the candidate node $N_q$, and the right node $r(N_{in})$ of the new node $N_{in}$ becomes the attention node $N_{new}$.

In this case, since the new candidate node $N_q$ is the node $N_4$ and the branch node $N_p$ is the node $N_{34}$, as shown in the cluster tree placed at the bottom of the figure to serve as the second cluster tree from the left end of FIG. 40, the new node $N_{in}$ is added to the cluster tree, being placed at such a position in the cluster tree that the new node $N_{in}$ serves as the right node $r(N_p)$ of the node $N_{34}$, the left node $l(N_{in})$ of the new node $N_{in}$ becomes the node $N_4$, and the right node $r(N_{in})$ of the new node $N_{in}$ becomes the attention node $N_{new}$.

Then, the control of the processing is returned from the processing of the function $IRM(N_q, N_{new})$ represented by the flowchart shown in FIG. 33 to the step S108 of the flowchart shown in FIG. 30. As a result, a cluster tree like the third cluster tree from the left end of FIG. 40 or the first cluster tree from the right end of FIG. 40 is obtained with the node $N_{1234}$ serving as the root node thereof as it is.

Figure 41:
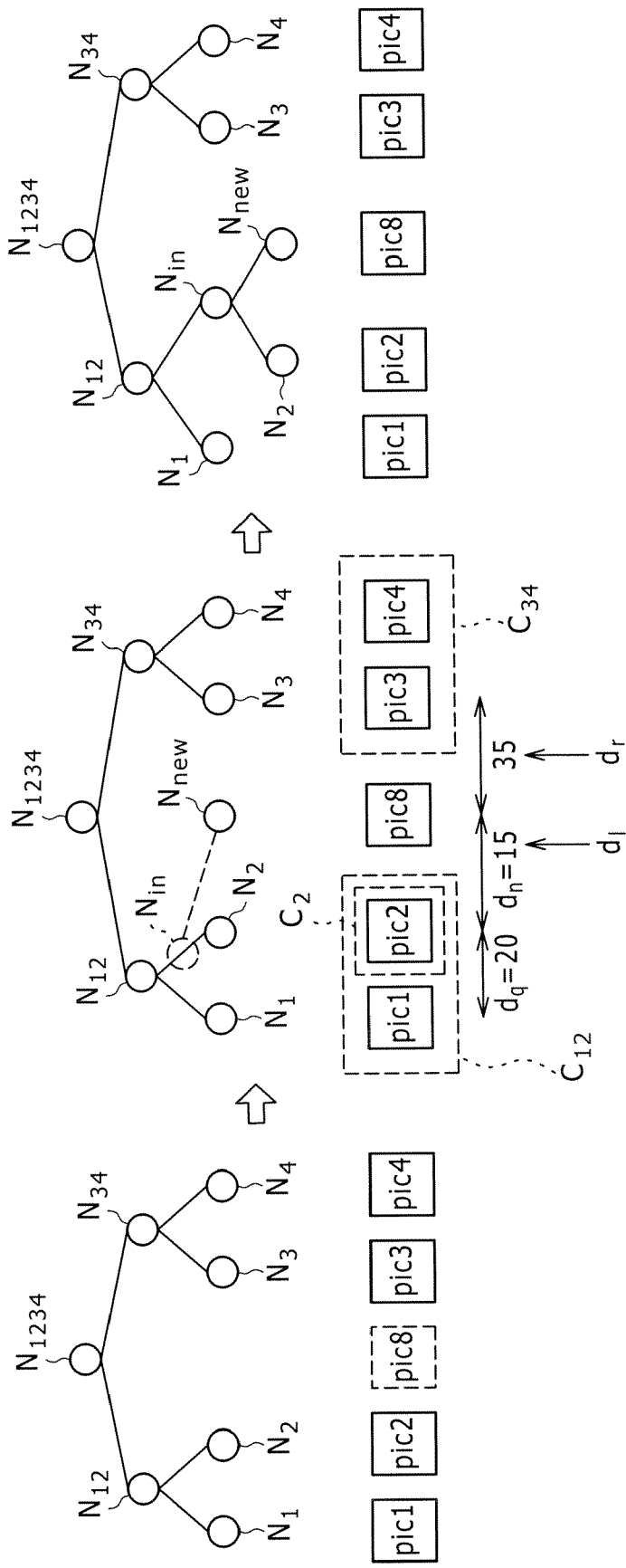
FIG. 41 is a diagram showing still further typical cluster trees.

Next, by referring to FIG. 41, the following description explains a cluster tree obtained by carrying out the clustering processing represented by the flowchart shown in FIG. 30 on the picture data pic8 serving as the attention data $pic_{new}$ and processing-object pieces of picture data including the attention data $pic_{new}$ and the picture data pic1 to pic4, which have already been clustered.

As described above, the photographing dates/times t of the picture data pic1 to pic4, which have already been clustered, are 0, 10, 40, and 60 respectively. On the other hand, the photographing date/time t of the picture data pic8 used as the attention data $pic_{new}$ is 20. Thus, the photographing dates/times t of the picture data pic1 to pic8, which serve as processing-object pieces of picture data, are arranged in the order of pic1, pic2, pic8, pic3, and pic4 with the first picture data pic1 placed at the left end of FIG. 41.

The number of pieces of picture data, i. e. the picture data pic1 to pic4, which have already been assigned to leaf nodes of the present cluster tree, is four. Thus, when the clustering processing represented by the flowchart shown in FIG. 30 is started with the picture data pic8 used as the attention data $pic_{new}$, the flow of the processing goes on from the step S101 to the step S106. Nodes findable by tracing down through arcs of the present cluster tree is searched from the root node $N_{root}(N_{1234})$ for a rightmost leaf node $R_m(N_{root})$ placed at the right end, that is, for the leaf node $R_m(N_{root})$ at the right end of the cluster tree. Then a result of determination is produced as to whether or not the photographing date/time $t(R_m(N_{root}))$ of a piece of picture data assigned to the rightmost leaf node $R_m(N_{root})$ is earlier than the photographing date/time $t(N_{new})$ of the attention data $pic_{new}$ assigned to the attention node $N_{new}$ as described above.

In this case, the piece of picture data assigned to the rightmost leaf node $R_m(N_{root})$ of the cluster tree is the picture data pic4 and the photographing date/time t of the picture data pic4 is 60. On the other hand, the photographing date/time t of the picture data pic8 used as the attention data $pic_{new}$ is 20.

Thus, the determination result produced at the step S106 indicates that the photographing date/time $t(R_m(N_{root}))$ of a piece of picture data assigned to the rightmost leaf node $R_m(N_{root})$ is not earlier than the photographing date/time $t(N_{new})$ of the attention data $pic_{new}$ assigned to the attention node $N_{new}$. This is because the photographing date/time $t(R_m(N_{root}))$ is 60 and the photographing date/time $t(N_{new})$ is 20. In this case, the flow of the processing goes on from the step S106 to the step S107 to produce a result of determination as to whether or not the photographing date/time $t(N_{new})$ of the attention data $pic_{new}$ assigned to the attention node $N_{new}$ is earlier than the photographing date/time $t(L_m(N_{root}))$ of a piece of picture data assigned to the leftmost leaf node $L_m(N_{root})$ as described above. Also referred to as the leaf node $L_m(N_{root})$ at the left end of the cluster tree, the leftmost leaf node $L_m(N_{root})$ can be found by tracing down through arcs of the present cluster tree from the root node $N_{root}$.

The piece of picture data assigned to the leftmost leaf node $L_m(N_{root})$ is the picture data pic, which has a photographing date/time t of zero. On the other hand, the picture data serving as the attention data $pic_{new}$ is the picture data pic8, which has a photographing date/time t of 20.

Thus, the determination result produced at the step S107 indicates that the photographing date/time $t(N_{new})$ of the attention data $pic_{new}$ assigned to the attention node $N_{new}$ is not earlier than the photographing date/time $t(L_m(N_{root}))$ of a piece of picture data assigned to the leftmost leaf node $L_m(N_{root})$. This is because the photographing date/time $t(N_{new})$ is 20 while the photographing date/time $t(L_m(N_{root}))$ is zero. In this case, the flow of the processing goes on to the step S112 to call a function FBN ($N_{root}$, $N_{new}$) represented by the flowchart shown in FIG. 35.

At the step S191 of the function FBN ($N_{root}$, $N_{new}$) represented by the flowchart shown in FIG. 35, the root node $N_{root}$ (or $N_{1234}$) of the present cluster tree is taken as a tentative branch node $N_p$. Then, the flow of the processing goes on to the next step S192 to produce a result of determination as to whether or not the photographing date/time $t(N_{new})$ of the attention data $pic_{new}$ assigned to the attention node $N_{new}$ is earlier than the photographing date/time $t(R_m(l(N_p)))$ of picture data assigned to the left-side rightmost leaf node $R_m(l(N_p))$. That is to say, the determination result produced at the step S192 is a result of determination as to whether or not the relation $t(N_{new}) < t(R_m(l(N_p)))$ holds true.

In this case, the photographing date/time $t(N_{new})$ of the attention data $pic_{new}$, which is the picture data pic8, is 20. The branch node $N_p$ is the root node $N_{1234}$ and, thus, the left-side rightmost leaf node $R_m(l(N_p))$ is the leaf node $N_2$ assigned to the picture data pic2, which has the photographing date/time $t(R_m(l(N_p)))$ of 10.

Accordingly, the determination result produced at the step S192 indicates that the photographing date/time $t(N_{new})$ of the attention data $pic_{new}$ assigned to the attention node $N_{new}$ is not earlier than the photographing date/time $t(R_m(l(N_p)))$ of picture data assigned to the left-side rightmost leaf node $R_m(l(N_p))$. This is because the photographing date/time $t(N_{new})$ is 20 while the photographing date/time $t(R_m(l(N_p)))$ is 10. In this case, the flow of the processing goes on to the step S194 to produce a result of determination as to whether or not the photographing date/time $t(N_{new})$ of the attention data $pic_{new}$ assigned to the attention node $N_{new}$ is later than the photographing date/time $t(L_m(r(N_p)))$ of picture data assigned to the right-side leftmost leaf node $L_m(r(N_p))$. That is to say, the determination result produced at the step S194 is a result of determination as to whether or not the relation $t(L_m(r(N_p))) < t(N_{new})$ holds true.

In this case, the tentative branch node $N_p$ is the root node $N_{1234}$ and, thus, the right-side leftmost leaf node $L_m(r(N_p))$ is the leaf node $N_3$ assigned the picture data pic3, which has the photographing date/time $t(L_m(r(N_p)))$ of 40.

Accordingly, the determination result produced at the step S194 indicates that the photographing date/time $t(N_{new})$ is not later than the photographing date/time $t(L_m(r(N_p)))$ of picture data assigned to the right-side leftmost leaf node $L_m(r(N_p))$. This is because the photographing date/time $t(N_{new})$ is 20 while the photographing date/time $t(L_m(r(N_p)))$ is 40. In this case, as the return value of the function FBN ($N_{root}$, $N_{new}$), the root node $N_{1234}$ serving as the present tentative branch node $N_p$ is returned to the calling program, which implements the clustering processing represented by the flowchart shown in FIG. 30.

As a result, at the step S112 of the flowchart shown in FIG. 30, the root node $N_{1234}$ is taken as a branch node $N_p$. Then, the flow of the processing goes on to the next step S113 to compare a left cluster distance $d_l$ with a right cluster distance $d_r$. As described earlier, the left cluster distance $d_l$ is the distance between the nearest piece of picture data in the cluster $C_l$ corresponding to the left node $l(N_p)$ of the branch node $N_p$ and the attention data $pic_{new}$ assigned to the attention node $N_{new}$. On the other hand, the right cluster distance $d_r$ is the distance between the nearest piece of picture data in the cluster Cr corresponding to the right node $r(N_p)$ of the branch node $N_p$ and the attention data $pic_{new}$.

Thus, the left cluster distance $d_l$ between the nearest piece of picture data in the cluster $C_l$ corresponding to the left node $l(N_p)$ of the branch node $N_p$ and the attention data $pic_{new}$ assigned to the attention node $N_{new}$ is also the distance dpic ($R_m(l(N_p))$, $N_{new}$) between the piece of picture data assigned to the left-side rightmost leaf node $R_m(l(N_p))$ of the branch node $N_p$ and the attention data $pic_{new}$ assigned to the attention node $N_{new}$.

In this case, since the branch node $N_p$ is the root node $N_{1234}$, the left cluster distance $d_l$ is the distance dpic($R_m(l(N_p))$, $N_{new}$) between the piece of picture data assigned to the left-side rightmost leaf node $R_m(l(N_p))$ of the root node $N_{1234}$ and the attention data $pic_{new}$ assigned to the attention node $N_{new}$ or the distance between the picture data pic2 and the picture data pic8.

The photographing information (x, y, t) of the picture data pic2 is (0, 10, 10) whereas the photographing information (x, y, t) of the picture data pic8 is (5, 10, 20). Thus, the left cluster distance $d_l$ representing the distance between the picture data pic2 and the picture data pic8 is |0-5|+|10-10|+|10-20|=15.

By the same token, the right cluster distance $d_r$ is also the distance dpic($L_m(r(N_p))$, $N_{new}$) or the distance dpic($N_{new}$, $L_m(r(N_p))$) between the piece of picture data assigned to the right-side leftmost leaf node $L_m(r(N_p))$ of the root node $N_{1234}$ and the attention data $pic_{new}$ assigned to the attention node $N_{new}$.

The photographing information (x, y, t) of the picture data pic3 is (20, 10, 40) whereas the photographing information (x, y, t) of the picture data pic8 is (5, 10, 20). Thus, the right cluster distance $d_r$ representing the distance between the picture data pic3 and the picture data pic8 is |20-5|+|10-10|+|40-20|=35.

Accordingly, the determination result produced at the step S113 of the flowchart shown in FIG. 30 indicates that the left cluster distance $d_l(=15)$ is shorter than the right cluster distance $d_r(=35)$, causing the flow of the processing to go on to the step S114 to call the function IRM($N_q$, $N_{new}$) represented by the flowchart shown in FIG. 33 by setting the $N_q$ argument at the left node $l(N_p)$ of the branch node $N_p$, which happens to be root node $N_{1234}$, that is, by setting the $N_q$ argument at the node $N_{12}$.

At the step S152 of the processing of the function IRM($N_q$, $N_{new}$) represented by the flowchart shown in FIG. 33, as described above, the maximum distance $d_q$ between all two adjacent pieces of picture data pertaining to the candidate cluster $C_q$ corresponding to the candidate node $N_q$ is computed as a distance dpic($R_m(l(N_q))$, $L_m(r(N_q))$) between picture data assigned to the left-side rightmost leaf node $R_m(l(N_q))$ of the candidate node $N_q$ and picture data assigned the right-side leftmost leaf node $L_m(r(N_q))$ of the candidate node $N_q$.

In this case, since the candidate node $N_q$ is the node $N_{12}$, the picture data assigned to the left-side rightmost leaf node $R_m(l(N_q))$ of the candidate node $N_q$ is the picture data pic1 whereas the picture data assigned to the right-side leftmost leaf node $L_m(r(N_q))$ of the candidate node $N_q$ is the picture data pic2. Thus, at the step S152, the distance between the picture data pic1 and the pic2 is found as the maximum distance $d_q$.

As shown in FIG. 37, the distance between the picture data pic1 and a pic2 is 20. Thus, the maximum distance $d_q$ is found to be 20 as shown in the second cluster tree from the left end of FIG. 41.

Then, at the step S153 of the processing of the function IRM($N_q$, $N_{new}$) represented by the flowchart shown in FIG. 33, as described above, the distance $d_n$ between the nearest piece of picture data in the candidate cluster $C_q$ corresponding to the candidate node $N_q$ and the attention data $pic_{new}$ assigned to the attention node $N_{new}$ is computed as a distance dpic ($R_m(l(N_p))$, $N_{new}$) between picture data assigned to the left-side rightmost leaf node $R_m(l(N_p))$ of the branch node $N_p$ and the attention data $pic_{new}$.

At the step S151 of the processing of the function IRM($N_q$, $N_{new}$) represented by the flowchart shown in FIG. 33, the candidate node $N_q$ is the node $N_{12}$ and a node having the candidate node $N_q$ as the left node $l(N_p)$ is used as a branch node $N_p$. Since the candidate node $N_q$ is the node $N_{12}$, the node having the node $N_{12}$ as the left node $l(N_p)$ is thus the root node $N_{1234}$. In this case, picture data assigned to the left-side rightmost leaf node $R_m(l(N_p))$ of the branch node $N_p$ is picture data assigned to the rightmost leaf node $R_m(N_q)$ of leaf nodes reachable by tracing down the cluster tree through arcs from the candidate node $N_q$, which is the left node $l(N_p)$, and the picture data assigned to the rightmost leaf node $R_m(N_q)$ is picture data on the left side adjacent to the attention data $pic_{new}$.

The picture data on the left side adjacent to the picture data pic8 serving as the attention data $pic_{new}$ is the picture data pic2 and the photographing information (x, y, t) of the picture data pic2 is (0, 10, 10). On the other hand, the photographing information (x, y, t) of the picture data pic8 is (5, 10, 20). Thus, the distance $d_n$ between the nearest picture data in the candidate cluster $C_q$ and the attention data $pic_{new}$ assigned to the attention node $N_{new}$ is the distance between the picture data pic2 and pic8, and the distance between the picture data pic4 and pic8 is |0−5|+|10−10|+|10−20|=15 as shown in the second cluster tree from the left end of FIG. 41.

As is obvious from the above description, the determination result produced at the step S154 of the processing of the function IRM($N_q$, $N_{new}$) represented by the flowchart shown in FIG. 33 indicates that the distance $d_n$ (=15) is not longer than the maximum distance $d_q$ (=20) causing the flow of the processing to go on to the step S156. The branch node $N_p$ is replaced by the candidate node $N_q$ and the candidate node $N_q$ is replaced by the right node $r(N_q)$ of the candidate node $N_q$ as described above. That is to say, since the node $N_{12}$ serves as the candidate node $N_q$, the node $N_{12}$ is used as a new branch node $N_p$ and a node $N_2$ serving as the right node of the root node $N_{12}$ is used as a new candidate node $N_q$.

As shown in the second cluster tree from the left end of FIG. 41, a cluster $C_2$ corresponding to the node $N_2$ serving as the new candidate node includes only one picture data pic2. Thus, after the candidate node $N_q$ and the branch node $N_p$ are updated at the step S156, the flow of the processing goes on to the step S158 by way of the step S157. At the step S158, a new node $N_{in}$ is added to the cluster tree, being placed at such a position in the cluster tree that the new node $N_{in}$ serves as the right node $r(N_p)$ of the branch node $N_p$, the left node $l(N_{in})$ of the new node $N_{in}$ becomes the candidate node $N_q$, and the right node $r(N_{in})$ of the new node $N_{in}$ becomes the attention node $N_{new}$.

That is to say, in the present case where the candidate node $N_q$ is the leaf node $N_2$ and the branch node $N_p$ is the node $N_{12}$, the new node $N_{in}$ is added to the cluster tree, being placed at such a position that the leaf node $N_2$ becomes the left node $l(N_{in})$ of the new node $N_{in}$, the attention node $N_{new}$ becomes the right node $r(N_{in})$ of the new node $N_{in}$, and the new node $N_{in}$ becomes the right node $r(N_p)$ of the node $N_{12}$ as shown in the second cluster tree from the left end of FIG. 41.

Then, the control of the processing is returned from the processing of the function IRM($N_q$, $N_{new}$) represented by the flowchart shown in FIG. 33 to the step S108 of the flowchart shown in FIG. 30. As a result, a cluster tree like the third cluster tree from the left end of FIG. 41 or the first cluster tree from the right end of FIG. 41 is obtained with the root node $N_{1234}$ serving as the root node thereof as it is.

Figure 42:
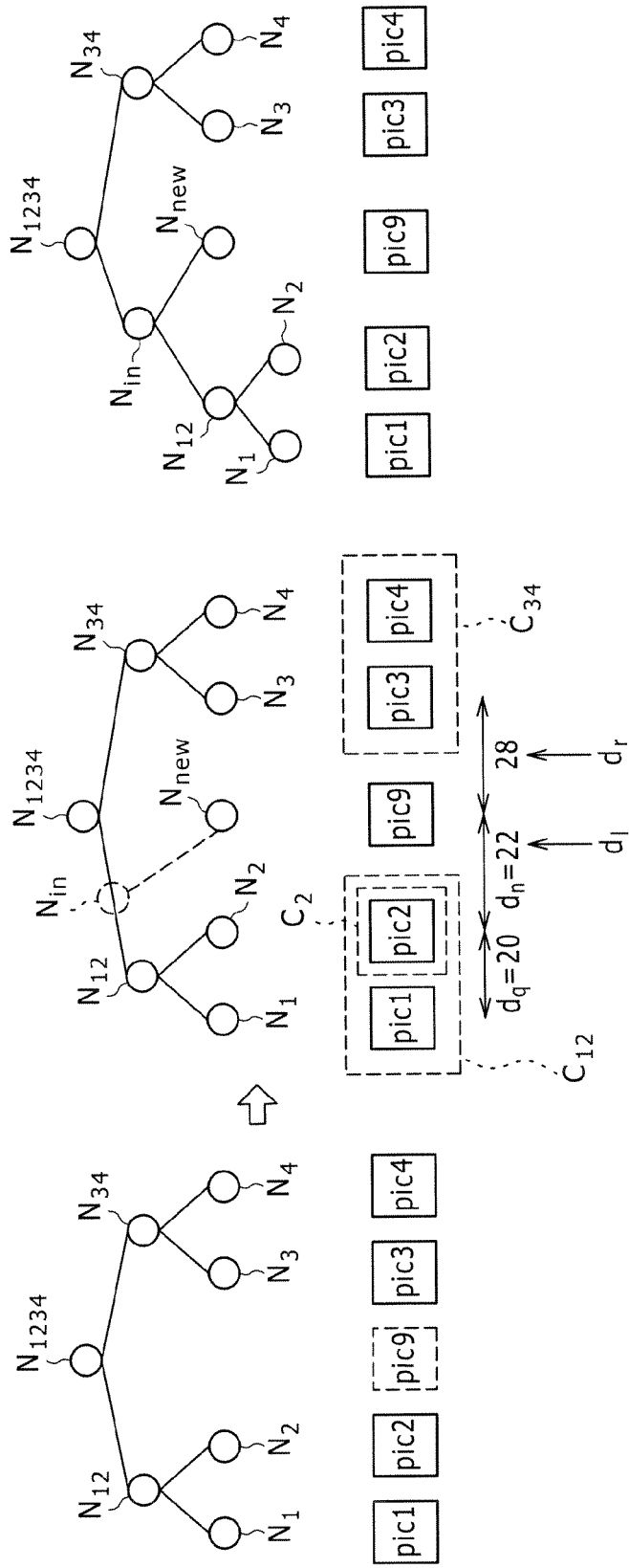
FIG. 42 is a diagram showing still further typical cluster trees.

Next, by referring to FIG. 42, the following description explains a cluster tree obtained by carrying out the clustering processing represented by the flowchart shown in FIG. 30 on the picture data pic9 serving as the attention data $pic_{new}$ and processing-object pieces of picture data including the attention data $pic_{new}$ and the picture data pic1 to pic4, which have already been clustered.

As described above, the photographing dates/times t of the picture data pic1 to pic4, which have already been clustered, are 0, 10, 40, and 60 respectively. On the other hand, the photographing date/time t of the picture data pic9 used as the attention data $pic_{new}$ is 20. Thus, the photographing dates/times t of the picture data pic1 to pic9, which serve as processing-object pieces of picture data, are arranged in the order of pic1, pic2, pic9, pic3, and pic4 with the first picture data pic1 placed at the left end of FIG. 42.

The number of pieces of picture data, i. e. the picture data pic1 to pic4, which have already been assigned to leaf nodes of the present cluster tree, is four. Thus, when the clustering processing represented by the flowchart shown in FIG. 30 is started with the picture data pic9 used as the attention data $pic_{new}$, the flow of the processing goes on from the step S101 to the step S106. Nodes findable by tracing down through arcs of the present cluster tree is searched from the root node $N_{root}(N_{1234})$ for a rightmost leaf node $R_m(N_{root})$ placed at the right end, that is, for the leaf node $R_m(N_{root})$ at the right end of the cluster tree. Then a result of determination is produced as to whether or not the photographing date/time $t(R_m(N_{root}))$ of a piece of picture data assigned to the rightmost leaf node $R_m(N_{root})$ is earlier than the photographing date/time $t(N_{new})$ of the attention data $pic_{new}$ assigned to the attention node $N_{new}$ as described above.

In this case, the piece of picture data assigned to the rightmost leaf node $R_m(N_{root})$ of the cluster tree is the picture data pic4 and the photographing date/time t of the picture data pic4 is 60. On the other hand, the photographing date/time t of the picture data pic9 used as the attention data $pic_{new}$ is 20.

Thus, the determination result produced at the step S106 indicates that the photographing date/time $t(R_m(N_{root}))$ of a piece of picture data assigned to the rightmost leaf node $R_m(N_{root})$ is not earlier than the photographing date/time $t(N_{new})$ of the attention data $pic_{new}$ assigned to the attention node $N_{new}$. This is because the photographing date/time $t(R_m(N_{root}))$ is 60 and the photographing date/time $t(N_{new})$ is 20. In this case, the flow of the processing goes on from the step S106 to the step S107 to produce a result of determination as to whether or not the photographing date/time $t(N_{new})$ of the attention data $pic_{new}$ assigned to the attention node $N_{new}$ is earlier than the photographing date/time $t(L_m(N_{root}))$ of a piece of picture data assigned to the leftmost leaf node $L_m(N_{root})$ as described above. Also referred to as the leaf node $L_m(N_{root})$ at the left end of the cluster tree, the leftmost leaf node $L_m(N_{root})$ can be found by tracing down through arcs of the present cluster tree from the root node $N_{root}$.

The piece of picture data assigned to the leftmost leaf node $L_m(N_{root})$ is the picture data pic1, which has a photographing date/time t of zero. On the other hand, the picture data serving as the attention data $pic_{new}$ is the picture data pic9, which has a photographing date/time t of 20.

Thus, the determination result produced at the step S107 indicates that the photographing date/time $t(N_{new})$ of the attention data $pic_{new}$ assigned to the attention node $N_{new}$ is not earlier than the photographing date/time $t(L_m(N_{root}))$ of a piece of picture data assigned to the leftmost leaf node $L_m(N_{root})$. This is because the photographing date/time $t(N_{new})$ is 20 while the photographing date/time $t(L_m(N_{root}))$ is 0. In this case, the flow of the processing goes on to the step S112 to call a function FBN ($N_{root}$, $N_{new}$) represented by the flowchart shown in FIG. 35.

At the step S191 of the function FBN ($N_{root}$, $N_{new}$) represented by the flowchart shown in FIG. 35, the root node $N_{root}$ (or $N_{1234}$) of the present cluster tree is taken as a tentative branch node $N_p$. Then, the flow of the processing goes on to the next step S192 to produce a result of determination as to whether or not the photographing date/time $t(N_{new})$ of the attention data $pic_{new}$ assigned to the attention node $N_{new}$ is earlier than the photographing date/time $t(R_m(l(N_p)))$ of picture data assigned to the left-side rightmost leaf node $R_m(l(N_p))$. That is to say, the determination result produced at the step S192 is a result of determination as to whether or not the relation $t(N_{new}) < t(R_m(l(N_p)))$ holds true.

In this case, the photographing date/time $t(N_{new})$ of the attention data $pic_{new}$, which is the picture data pic9, is 20. The branch node $N_p$ is the root node $N_{1234}$ and, thus, the left-side rightmost leaf node $R_m(l(N_p))$ is the leaf node $N_2$ assigned to the picture data pic2, which has the photographing date/time $t(R_m(l(N_p)))$ of 10.

Accordingly, the determination result produced at the step S192 indicates that the photographing date/time $t(N_{new})$ of the attention data $pic_{new}$ assigned to the attention node $N_{new}$ is not earlier than the photographing date/time $t(R_m(l(N_p)))$ of picture data assigned to the left-side rightmost leaf node $R_m(l(N_p))$. This is because the photographing date/time $t(N_{new})$ is 20 while the photographing date/time $t(R_m(l(N_p)))$ is 10. In this case, the flow of the processing goes on to the step S194 to produce a result of determination as to whether or not the photographing date/time $t(N_{new})$ of the attention data $pic_{new}$ assigned to the attention node $N_{new}$ is later than the photographing date/time $t(L_m(r(N_p)))$ of picture data assigned to the right-side leftmost leaf node $L_m(r(N_p))$. That is to say, the determination result produced at the step S194 is a result of determination as to whether or not the relation $t(L_m(r(N_p))) < t(N_{new})$ holds true.

In this case, the tentative branch node $N_p$ is the root node $N_{1234}$ and, thus, the right-side leftmost leaf node $L_m(r(N_p))$ is the leaf node $N_3$ assigned the picture data pic3, which has the photographing date/time $t(L_m(r(N_p)))$ of 40.

Accordingly, the determination result produced at the step S194 indicates that the photographing date/time $t(N_{new})$ is not later than the photographing date/time $t(L_m(r(N_p)))$. This is because the photographing date/time $t(N_{new})$ is 20 while the photographing date/time $t(L_m(r(N_p)))$ is 40. In this case, as the return value of the function FBN ($N_{root}$, $N_{new}$), the root node $N_{1234}$ serving as the present tentative branch node $N_p$ is returned to the calling program, which implements the clustering processing represented by the flowchart shown in FIG. 30.

As a result, at the step S112 of the flowchart shown in FIG. 30, the root node $N_{1234}$ is taken as a branch node $N_p$. Then, the flow of the processing goes on to the next step S113 to compare a left cluster distance $d_l$ with a right cluster distance $d_r$. As described earlier, the left cluster distance $d_l$ is the distance between the nearest piece of picture data in the cluster $C_l$ corresponding to the left node $l(N_p)$ of the branch node $N_p$ and the attention data $pic_{new}$ assigned to the attention node $N_{new}$. On the other hand, the right cluster distance $d_r$ is the distance between the nearest piece of picture data in the cluster Cr corresponding to the right node $r(N_p)$ of the branch node $N_p$ and the attention data $pic_{new}$.

Thus, the left cluster distance $d_l$ is also the distance dpic($R_m(l(N_p))$, $N_{new}$) between the piece of picture data assigned to the left-side rightmost leaf node $R_m(l(N_p))$ of the branch node $N_p$ and the attention data $pic_{new}$ assigned to the attention node $N_{new}$.

In this case, since the branch node $N_p$ is the root node $N_{1234}$, the left cluster distance $d_l$ is the distance dpic($R_m(l(N_p))$, $N_{new}$) between the piece of picture data assigned to the left-side rightmost leaf node $R_m(l(N_p))$ of the root node $N_{1234}$ and the attention data $pic_{new}$ assigned to the attention node $N_{new}$ or the distance between the picture data pic2 and the picture data pic9.

The photographing information (x, y, t) of the picture data pic2 is (0, 10, 10) whereas the photographing information (x, y, t) of the picture data pic9 is (12, 10, 20). Thus, the left cluster distance $d_l$ representing the distance between the picture data pic2 and the picture data pic9 is |0-12|+|10-10|+|10-20|=22.

By the same token, the right cluster distance $d_r$ is also the distance dpic($L_m(r(N_p))$, $N_{new}$) between the piece of picture data assigned to the right-side leftmost leaf node $L_m(r(N_p))$ of the root node $N_{1234}$ and the attention data $pic_{new}$ assigned to the attention node $N_{new}$. The right cluster distance $d_r$ is the distance dpic($L_m(r(N_p))$, $N_{new}$) or the distance dpic($N_{new}$, $L_m(r(N_p))$), that is the distance between the picture data pic3 and pic9.

The photographing information (x, y, t) of the picture data pic3 is (20, 10, 40) whereas the photographing information (x, y, t) of the picture data pic9 is (12, 10, 20). Thus, the right cluster distance $d_r$ representing the distance between the picture data pic3 and pic9 is |20-12|+|10-10|+|40-20|=28.

Accordingly, the determination result produced at the step S113 of the flowchart shown in FIG. 30 indicates that the left cluster distance $d_l$ (=22) is shorter than the right cluster distance $d_r$ (=28), causing the flow of the processing to go on to the step S114 to call the function IRM($N_q$, $N_{new}$) represented by the flowchart shown in FIG. 33 by setting the $N_q$ argument at the left node $l(N_p)$ of the branch node $N_p$, which happens to be root node $N_{1234}$, that is, by setting the $N_q$ argument at the node $N_{12}$.

At the step S152 of the processing of the function IRM($N_q$, $N_{new}$) represented by the flowchart shown in FIG. 33, as described above, the maximum distance $d_q$ between all two adjacent pieces of picture data pertaining to the candidate cluster $C_q$ corresponding to the candidate node $N_q$ is computed as a distance dpic($R_m(l(N_q))$, $L_m(r(N_q))$) between picture data assigned to the left-side rightmost leaf node $R_m(l(N_q))$ of the candidate node $N_q$ and picture data assigned the right-side leftmost leaf node $L_m(r(N_q))$ of the candidate node $N_q$.

In this case, since the candidate node $N_q$ is the node $N_{12}$, the picture data assigned to the left-side rightmost leaf node $R_m(l(N_q))$ of the candidate node $N_q$ is the picture data pic1 whereas the picture data assigned to the right-side leftmost leaf node $L_m(r(N_q))$ of the candidate node $N_q$ is the picture data pic2. Thus, at the step S152, the distance between the picture data pic1 and the picture data pic2 is found as the maximum distance $d_q$.

As shown in FIG. 37, the distance between the picture data pic1 and the picture data pic2 is 20. Thus, the maximum distance $d_q$ is found to be 20 as shown in the second cluster tree from the left end of FIG. 42.

Then, at the step S153 of the processing of the function IRM($N_q$, $N_{new}$) represented by the flowchart shown in FIG. 33, as described above, the distance $d_n$ between the nearest piece of picture data in the candidate cluster $C_q$ corresponding to the candidate node $N_q$ and the attention data $pic_{new}$ assigned to the attention node $N_{new}$ is computed as a distance dpic($R_m(l(N_p))$, $N_{new}$) between picture data assigned to the left-side rightmost leaf node $R_m(l(N_p))$ of the branch node $N_p$ and the attention data $pic_{new}$ assigned to the attention node $N_{new}$.

At the step S151 of the processing of the function IRM($N_q$, $N_{new}$) represented by the flowchart shown in FIG. 33, the candidate node $N_q$ is the node $N_{12}$ and a node having the candidate node $N_q$ as the left node $l(N_p)$ is used as a branch node $N_p$. Since the candidate node $N_q$ is the node $N_{12}$, the node having the node $N_{12}$ as the left node $l(N_p)$ is thus the root node $N_{1234}$. In this case, picture data assigned to the left-side rightmost leaf node $R_m(l(N_p))$ of the branch node $N_p$ is picture data assigned to the rightmost leaf node $R_m(N_p)$ of leaf nodes reachable by tracing down the cluster tree through arcs from the candidate node $N_q$, which is the left node $l(N_p)$, and the picture data assigned to the rightmost leaf node $R_m(N_p)$ is picture data on the left side adjacent to the attention data $pic_{new}$.

The picture data on the left side adjacent to the picture data pic9 serving as the attention data $pic_{new}$ is the picture data pic2 and the photographing information (x, y, t) of the picture data pic2 is (0, 10, 10). On the other hand, the photographing information (x, y, t) of the picture data pic9 is (12, 10, 20). Thus, the distance $d_n$ between the nearest picture data in the candidate cluster $C_q$ and the attention data $pic_{new}$ assigned to the attention node $N_{new}$ is the distance between the picture data pic2 and the picture data pic9, and the distance between the picture data pic4 and pic9 is $|0-12|+|10-10|+|10-20|=22$ as shown in the second cluster tree from the left end of FIG. 42.

As is obvious from the above description, the determination result produced at the step S154 of the processing of the function $IRM(N_q, N_{new})$ represented by the flowchart shown in FIG. 33 indicates that the distance $d_n$ (=22) is longer than the maximum distance $d_q$ (=20), causing the flow of the processing to go on to the step S155. A new node $N_{in}$ is added to the cluster tree, being placed at such a position that the left node $l(N_{in})$ of the new node $N_{in}$ serves as the candidate node $N_q$ and the right node $r(N_{in})$ of the new node $N_{in}$ serves as the attention node $N_{new}$.

That is to say, in the present case where the candidate node $N_q$ is the node $N_{12}$, the new node $N_{in}$ is added to the cluster tree, being placed at such a position that the node $N_{12}$ becomes the left node $l(N_{in})$ of the new node $N_{in}$ and the attention node $N_{new}$ becomes the right node $r(N_{in})$ of the new node $N_{in}$ as shown in the second cluster tree from the left end of FIG. 42.

Then, the control of the processing is returned from the processing of the function $IRM(N_q, N_{new})$ represented by the flowchart shown in FIG. 33 to the step S114 of the flowchart shown in FIG. 30. Later on, at the step S116, the cluster tree is updated to a new cluster tree including the new node $N_{in}$ as the left node $l(N_p)$ of the branch node $N_p$, which is the root node $N_{1234}$ in this case. As a result, a cluster tree like the third cluster tree from the left end of FIG. 42 or the first cluster tree from the right end of the figure is obtained.

Next, by referring to FIGS. 43 to 47, the following description explains typical displays appearing on the display apparatus 16 shown in FIG. 1 as displays of picture data.

When the user operates the operation section 17 to display picture data on the display apparatus 16, for example, the display control apparatus 15 refers to a cluster tree stored in the cluster-tree storage apparatus 14 and displays thumb nails of pieces of picture data on the display apparatus 16 on the basis of the cluster tree.

Let us assume for example that the cluster tree shown in FIG. 6 is a cluster tree stored in the cluster-tree storage apparatus 14. In this case, the display control apparatus 15 displays (a symbol representing) the root node $N_{11}$ of the cluster tree shown in FIG. 6 typically in a parent-node area 16U, which is the upper-half area of the display screen of the display apparatus 16 as shown on the top side of FIG. 43.

Figure 43:
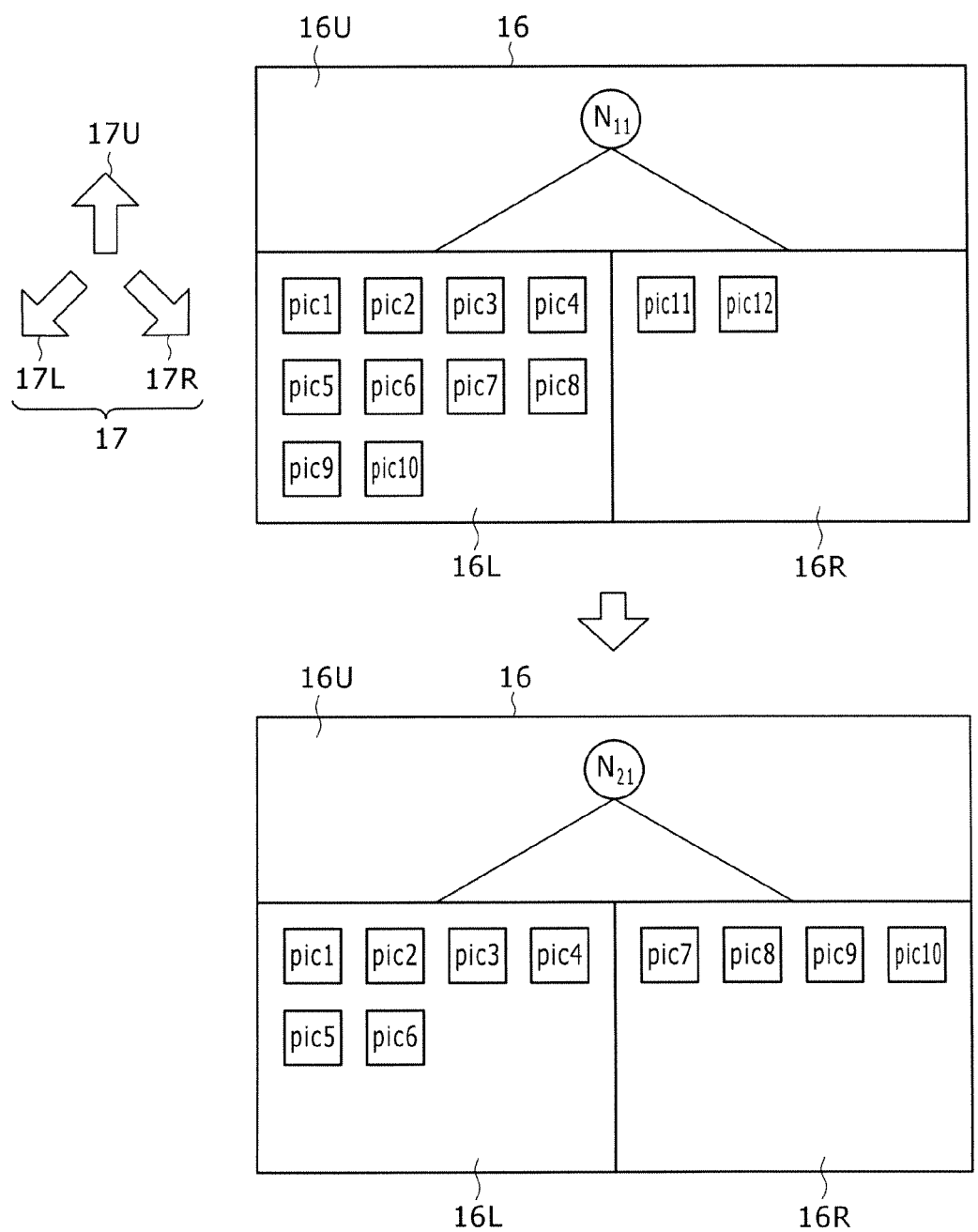
FIG. 43 is a diagram showing a typical display of pieces of picture data clustered by using a cluster tree.

In addition, the display control apparatus 15 displays the thumbnails of picture data pic1 to pic10 in a left-node area 16L and the thumbnails of picture data pic11 and pic12 in a right-node area 16R as shown in the lower half of the display screen of the display apparatus 16 on the top side of FIG. 43. The picture data pic1 to pic10 are pieces of picture data, which pertain to a cluster corresponding to a node $N_{21}$ serving as the left node of the root node $N_{11}$ displayed in the parent-node area 16U. On the other hand, the picture data pic11 and pic12 are pieces of picture data, which pertain to a cluster corresponding to a node $N_{22}$ serving as the right node of the root node $N_{11}$ displayed in the parent-node area 16U. The left-node area 16L is an area on the left side of the lower half of the display screen appearing on the display apparatus 16. On the other hand, the right-node area 16R is an area on the right side of the lower half of the same display screen.

It is to be noted that the display control apparatus 15 generates a thumbnail of each picture data stored in the data storage apparatus 12 from the metadata of the picture data.

As shown in FIG. 43, the operation section 17 has a top button 17U, a left button 17L, and a right button 17R. Let us assume for example that the user operates the left button 17L once with a display state appearing on the top side of FIG. 43 as the display state of the display apparatus 16 in order to redisplay the picture data pic1 to pic10, the thumbnails of which have already been displayed on the left-node area 16L. In this case, the display state of the display apparatus 16 is changed to a display state shown on the bottom side of FIG. 43.

To put in detail, as shown in the display state seen on the bottom side of the figure, the display control apparatus 15 displays (a symbol representing) the left node $N_{21}$ of the root node $N_{11}$ in the parent-node area 16U shown in the upper half of the display screen of the display apparatus 16 as well as the thumbnails of the picture data pic1 to pic6 in the left-node area 16L and the thumbnails of the picture data pic7 to pic10 in the right-node area 16R as shown in the lower half of the display screen of the display apparatus 16. The picture data pic1 to pic6 are pieces of picture data, which pertain to a cluster corresponding to a node $N_{31}$ serving as the left node of the node $N_{21}$ displayed in the parent-node area 16U. On the other hand, the picture data pic7 to pic10 are pieces of picture data, which pertain to a cluster corresponding to a node $N_{32}$ serving as the right node of the node $N_{21}$.

Figure 44:
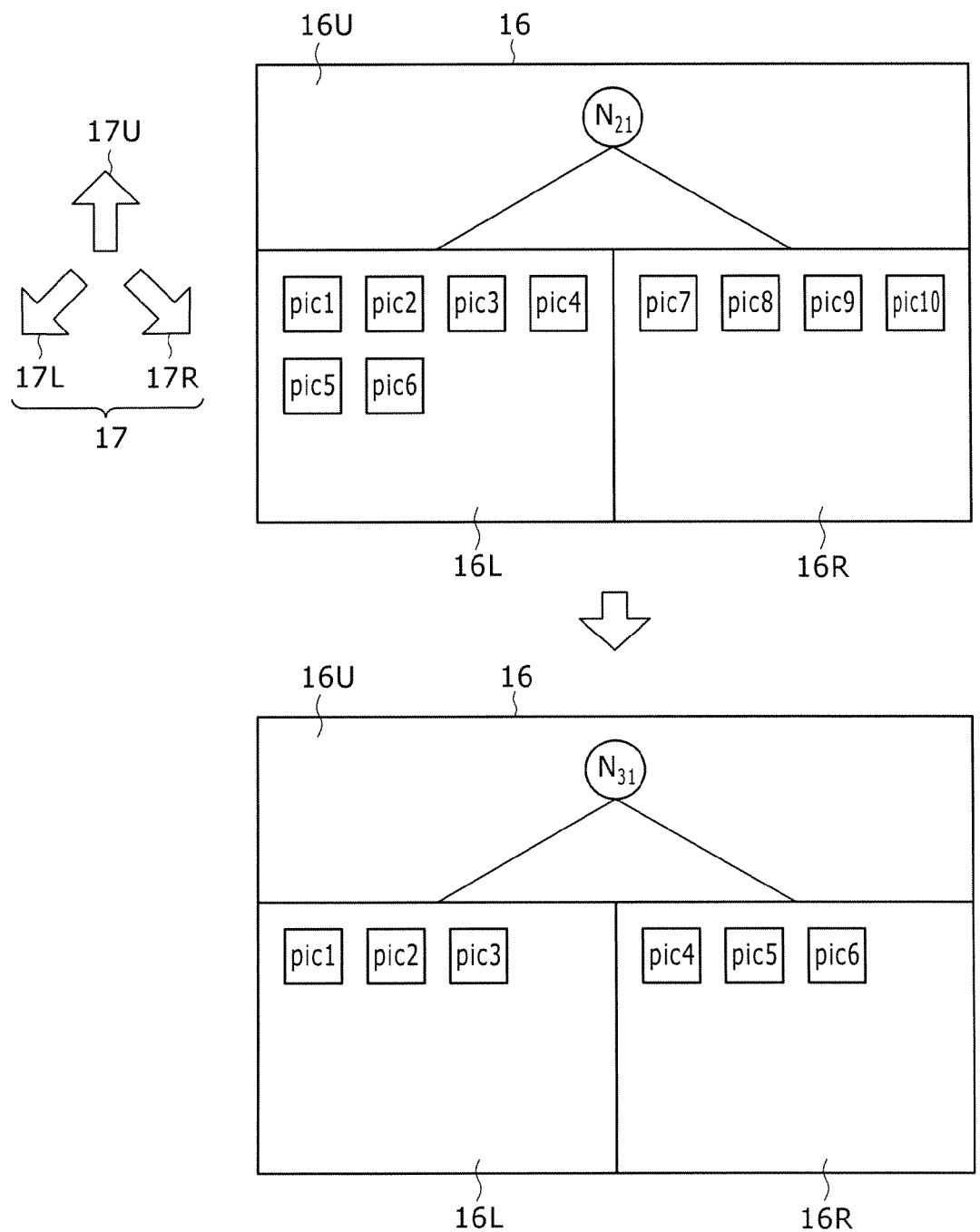
FIG. 44 is a diagram showing another typical display of pieces of picture data clustered by using a cluster tree.

As another example, let us assume that the user operates the left button 17L once again with a display state appearing on the bottom side of FIG. 43 or the top side of FIG. 44 as the display state of the display apparatus 16 in order to redisplay the picture data pic1 to pic6, the thumbnails of which have already been displayed on the left-node area 16L. In this case, the display state of the display apparatus 16 is changed to a display state shown on the bottom side of FIG. 44.

To put in detail, as shown in the display state seen on the bottom side of FIG. 44, the display control apparatus 15 displays (a symbol representing) the left node $N_{31}$ of the node $N_{21}$ in the parent-node area 16U shown in the upper half of the display screen of the display apparatus 16 as well as the thumbnails of the picture data pic1 to pic3 in the left-node area 16L and the thumbnails of the picture data pic4 to pic6 in the right-node area 16R as shown in the lower half of the display screen of the display apparatus 16. The picture data pic1 to pic3 are pieces of picture data, which pertain to a cluster corresponding to a node $N_{41}$ serving as the left node of the node $N_{31}$ displayed in the parent-node area 16U. On the other hand, the picture data pic4 to pic6 are pieces of picture data, which pertain to a cluster corresponding to a node $N_{42}$ serving as the right node of the node $N_{31}$.

It is to be noted that, as a further example, let us assume that the user operates the top button 17U once with a display state appearing on the bottom side of FIG. 44 as the display state of the display apparatus 16 in order to display the layer on a level above the node $N_{31}$ displayed in the parent-node area 16U. In this case, the display state of the display apparatus 16 is changed to a display state shown on the top side of FIG. 44 or the bottom side of FIG. 43.

Figure 45:
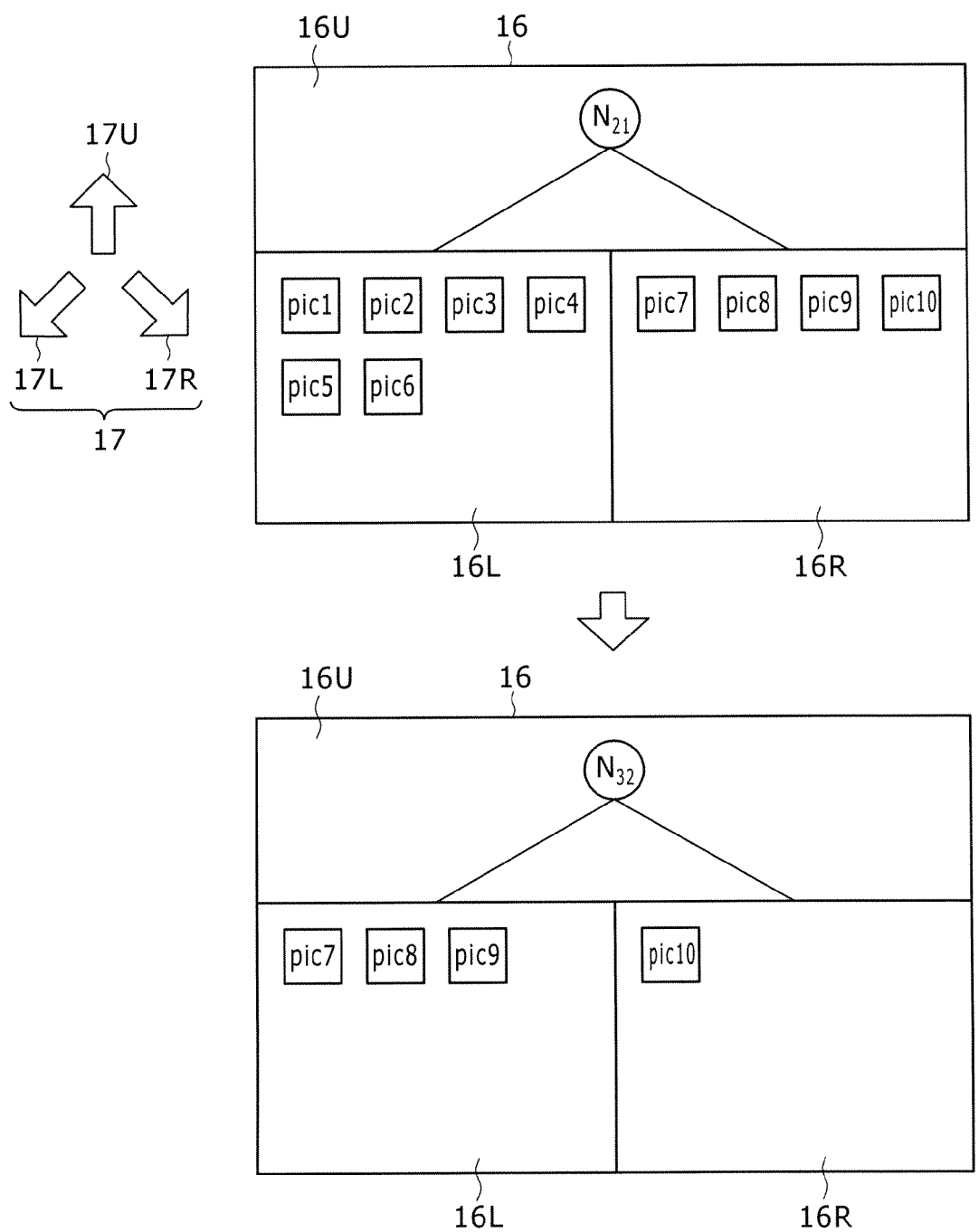
FIG. 45 is a diagram showing a further typical display of pieces of picture data clustered by using a cluster tree.

As a still further example, let us assume that the user operates the right button 17R once with a display state appearing on the bottom side of FIG. 43, the top side of FIG. 44, or the top side of FIG. 45 as the display state of the display apparatus 16 in order to redisplay the picture data pic7 to pic10, the thumbnails of which have already been displayed on the right-node area 16R. In this case, the display state of the display apparatus 16 is changed to a display state shown on the bottom side of FIG. 45.

To put in detail, as shown in the display state seen on the bottom side of FIG. 45, the display control apparatus 15 displays (a symbol representing) the right node $N_{32}$ of the node $N_{21}$ in the parent-node area 16U shown in the upper half of the display screen of the display apparatus 16 as well as the thumbnails of the picture data pic7 to pic9 in the left-node area 16L and the thumbnail of the picture data pic10 in the right-node area 16R as shown in the lower half of the display screen of the display apparatus 16. The picture data pic7 to pic9 are pieces of picture data, which pertain to a cluster corresponding to a node $N_{43}$ serving as the left node of the node $N_{32}$ displayed in the parent-node area 16U. On the other hand, the picture data pic10 is a piece of picture data, which pertains to a cluster corresponding to a node $N_{44}$ serving as the right node of the node $N_{32}$.

It is to be noted that, as a further example, let us assume that the user operates the top button 17U once with a display state appearing on the bottom side of FIG. 45 as the display state of the display apparatus 16 in order to display the layer on a level above the node $N_{32}$ displayed in the parent-node area 16U. In this case, the display state of the display apparatus 16 is changed to a display state shown on the top side of FIG. 45, the top side of FIG. 44, or the bottom side of FIG. 43.

As described above, (a symbol representing) a node is displayed in the parent-node area 16U of the display apparatus 16. In addition, the thumbnail of each piece of picture data pertaining to a cluster corresponding to the left node of a node displayed in the parent-node area 16U is displayed in the left-node area 16L. On the other hand, the thumbnail of each piece of picture data pertaining to a cluster corresponding to the right node of a node displayed in the parent-node area 16U is displayed in the right-node area 16R.

Then, when the user presses the left button 17L, the left node of a node displayed in the parent-node area 16U is displayed in the parent-node area 16U. In addition, the thumbnail of each piece of picture data pertaining to a cluster corresponding to the left node of a node displayed in the parent-node area 16U is displayed in the left-node area 16L. On the other hand, the thumbnail of each piece of picture data pertaining to a cluster corresponding to the right node of a node displayed in the parent-node area 16U is displayed in the right-node area 16R.

When the user presses the right button 17R, on the other hand, the right node of a node displayed in the parent-node area 16U is displayed in the parent-node area 16U. In addition, the thumbnail of each piece of picture data pertaining to a cluster corresponding to the left node of a node displayed in the parent-node area 16U is displayed in the left-node area 16L. On the other hand, the thumbnail of each piece of picture data pertaining to a cluster corresponding to the right node of a node displayed in the parent-node area 16U is displayed in the right-node area 16R.

When the user presses the top button 17U, a node having a node displayed in the parent-node area 16U as a child node, that is, the parent node of the node displayed in the parent-node area 16U is displayed in the parent-node area 16U. In addition, the thumbnail of each piece of picture data pertaining to a cluster corresponding to the left node of a node displayed in the parent-node area 16U is displayed in the left-node area 16L. On the other hand, the thumbnail of each piece of picture data pertaining to a cluster corresponding to the right node of a node displayed in the parent-node area 16U is displayed in the right-node area 16R.

Thus, by properly operating the top button 17U, right button 17R, or left button 17L of the operation section 17, the user can find a desired piece of picture data with ease.

Figure 46:
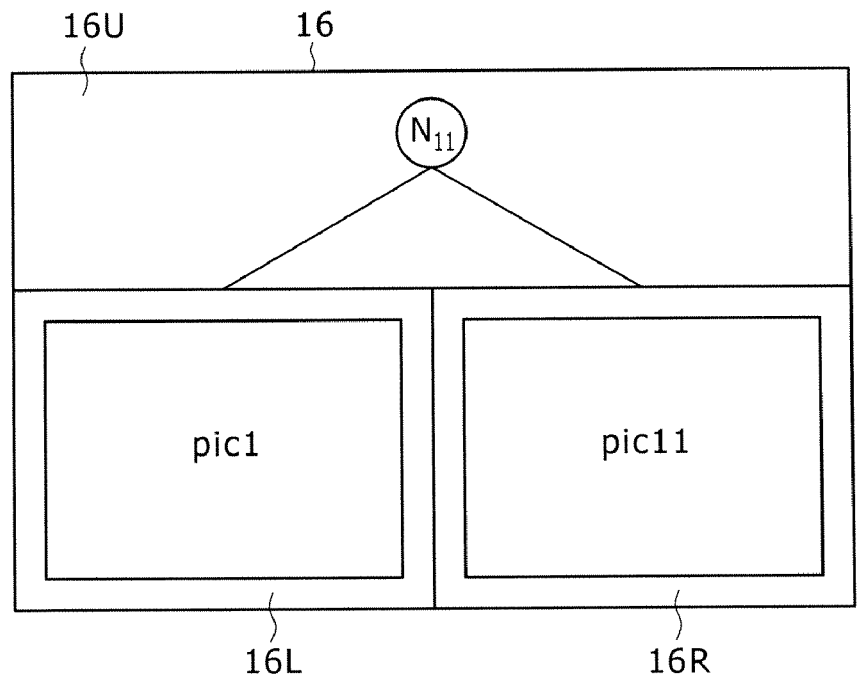
FIG. 46 is a diagram showing a still further typical display of pieces of picture data clustered by using a cluster tree.
Figure 47:
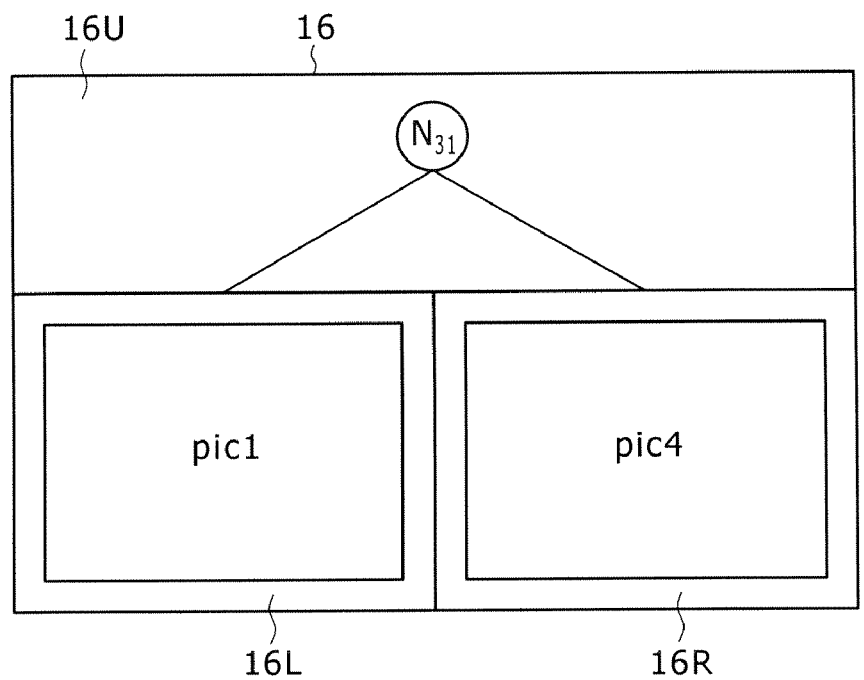
FIG. 47 is a diagram showing a still further typical display of pieces of picture data clustered by using a cluster tree.

It is to be noted that, in FIGS. 43 to 45, the thumbnails shown in the left-node area 16L are the thumbnails of all pieces of picture data pertaining to a cluster corresponding to the left node of a node displayed in the parent-node area 16U. On the other hand, the thumbnails shown in the right-node area 16R are the thumbnails of all pieces of picture data pertaining to a cluster corresponding to the right node of a node displayed in the parent-node area 16U. As an alterative, as shown in FIGS. 46 and 47, thumbnails shown in the left-node area 16L are only representative thumbnails of all pieces of picture data pertaining to a cluster corresponding to the left node of a node displayed in the parent-node area 16U. On the other hand, thumbnails shown in the right-node area 16R are only representative thumbnails of all pieces of picture data pertaining to a cluster corresponding to the right node of a node displayed in the parent-node area 16U.

To put it in detail, in FIG. 46, a node $N_{11}$ is displayed in the parent-node area 16U. In addition, only a representative piece of picture data of the picture data pic1 to pic10, which pertain to a cluster corresponding to the left node $N_{21}$ of the node $N_{11}$ displayed in the parent-node area 16U, is displayed in the left-node area 16L. For example, the representative piece of picture data is the picture data pic1, which has the earliest photographing date/time among the picture data pic1 to pic10. By the same token, only a representative piece of picture data of the picture data pic11 and pic12, which pertain to a cluster corresponding to the right node $N_{22}$ of the node $N_{11}$ displayed in the parent-node area 16U, is displayed in the right-node area 16R. For example, the representative piece of picture data is the picture data pic11, which has the earlier photographing date/time between the picture data pic11 and pic12.

As another example, in FIG. 47, a node $N_{31}$ is displayed in the parent-node area 16U. In addition, only a representative piece of picture data of the picture data pic1 to pic3, which pertain to a cluster corresponding to the left node $N_{41}$ of the node $N_{31}$ displayed in the parent-node area 16U, is displayed in the left-node area 16L. For example, the representative piece of picture data is the picture data pic1, which has the earliest photographing date/time among the picture data pic1 to pic3. By the same token, only a representative piece of picture data of the picture data pic4 to pic6, which pertain to a cluster corresponding to the right node $N_{42}$ of the node $N_{31}$ displayed in the parent-node area 16U, is displayed in the right-node area 16R. For example, the representative piece of picture data is the picture data pic4, which has the earliest photographing date/time among the picture data pic4 to pic6.

It is to be noted that the user can typically operate the operation section 17 to establish setting in which either thumbnails are displayed as is the case with FIGS. 43 to 45 or a representative piece of picture data is displayed as is the case with FIGS. 46 and 47.

As explained earlier, the series of processes described previously can be carried out by using hardware and/or execution of software. If the series of processes described above is carried out by execution of software, programs composing the software can be installed into a general-purpose computer or the like.

FIG. 48 is a diagram showing a typical embodiment implementing the computer into which programs for the series of processes described above are installed.

The programs can also be recorded in advance in either of a hard disk 105 or a ROM 103, which each serve as a recording medium embedded in the computer.

As another alternative, the programs can also be stored (recorded) temporarily or permanently in a removable recording medium 111, which can be a flexible disc, a CD-ROM (Compact Disc Read Only Memory), an MO (Magneto Optical) disc, a DVD (Digital Versatile Disc), a magnetic disc, or a semiconductor. Such a removable recording medium 111 can be provided to the user as a package software recording medium from which the programs are installed into the computer.

In addition to installation of the programs from the removable recording medium 111 to the computer, the programs can be transmitted to the computer from a download site by way of an artificial satellite for digital satellite broadcasting through radio transmission or by way of a network such as a LAN (Local Area Network) or the Internet through wire transmission. In the computer, a communication section 108 receives the programs and stores the programs in the hard disk 105 in the so-called program installation process.

The computer has an embedded CPU (Central Processing Unit) 102. The CPU 102 is connected to an input/output interface 110 through a bus 101. When the CPU 102 receives a command supplied by an input section 107, which includes a keyboard, a mouse, and a microphone, by way of the input/output interface 110 as a command typically representing an operation carried out by the user on the input section 107, the CPU 102 executes a program stored in advance in the ROM (Read Only Memory) 103 in accordance with the command. As an alternative, in accordance with a command, the CPU 102 executes a program loaded into a RAM (Random Access Memory) 104 from the hard disk 105. The program loaded into the RAM 104 from the hard disk 105 can be a program stored in advance in the hard disk 105 or a program installed into the hard disk 105. As described above, a program installed into the hard disk 105 can be a program downloaded from the download site serving as a provider of programs by way of a satellite or a network and received by the communication section 108 or a program read out from the removable recording medium 111 mounted on a drive 109. By execution of such a program, the CPU 102 carries out processing according to any of the flowcharts explained earlier or processing in accordance with a configuration shown in a block diagram described before. Then, if necessary, the CPU 102 typically supplies a result of the processing to an output section 106 including an LCD (Liquid Crystal Display) section and a speaker, transmits the processing result to an external destination by way of the communication section 108 or stores the result in the hard disk 105.

It is also worth noting that, in this specification, steps of the flowchart described above can be carried out not only in a pre-prescribed order along the time axis, but also concurrently or individually.

In addition, a program can be executed by one computer or a plurality of computers in the so-called distributed processing. As an alternative, a program can be transmitted to a computer installed at a remote location to be executed by such a computer.

As described above, in a layer clustering process carried out by the information processing apparatus 2 shown in FIG. 1, while an array of pieces of picture data arranged in the order of photographing dates/times on all layers is being sustained, a new piece of data can be clustered.

In addition, in the layer processing process, by tracing down nodes of a cluster tree through arcs from the root node of the cluster tree or, to be more specific, by updating a branch node $N_p$ and a candidate node $N_q$ at the step S156 of the flowchart shown in FIG. 33 or the step S176 of the flowchart shown in FIG. 34, a new node $N_{in}$ can be added to the cluster tree, being placed at such a position that an attention node $N_{new}$ assigned to attention data $pic_{new}$ becomes one of the nodes of the new node $N_{in}$.

On the top of that, in the layer processing process, it is necessary to find only the distance between any two adjacent pieces of picture data in an array of pieces of picture data arranged in the order of photographing dates/times. That is to say, it is not necessary to find the distance between any two pieces of picture data in an array. Thus, a piece of data can be clustered at a small amount of computation.

A layer clustering process is carried out by collecting or combining elements separated by shortest distances from each other among elements each serving an object of clustering in accordance with any of the shortest distance method, the maximum distance method, or the ward method, which are commonly known data clustering methods.

In accordance with the shortest distance method, the maximum distance method, or the ward method, however, it is necessary to find the distance between two adjacent pieces of picture data of any combination. Let us assume that the number of pieces of picture data each serving as an object of the clustering process is n. In this case, it is necessary to find the distance between two adjacent pieces of picture data of any of $n(n-1)/2$ combinations. Thus, if the number of pieces of picture data each serving as an object of the clustering process according to the shortest distance method, the maximum distance method, or the ward method increases, the amount of the processing to compute distances also rises in proportion to the second power of n representing the number of pieces of picture data each serving as an object of the clustering process.

In a layer clustering process carried out by the information processing apparatus 2, on the other hand, it is necessary to find only the distance between any two adjacent pieces of picture data in an array of pieces of picture data arranged in the order of photographing dates/times as described above. Even though the amount of the processing to compute distances is dependent on the property of the picture data serving as the object of the layer clustering process, the amount of distance computation is relatively small. Let us assume that the picture data serving as the object of the layer clustering process is random data and the number of pieces of picture data is n. In this case, the height of the cluster tree or the number of layers having different levels is $\log_2(n)$ and the amount of the processing to compute distances is of the order of $0(n \times \log_2(n))$.

It is to be noted that, in a layer clustering process to cluster picture data in accordance with this embodiment, pieces of picture data are arranged in an order of photographing dates/times. However, the pieces of picture data can also be arranged in an order of photographing locations. To put it concretely, taking the home of the user as a reference, for example, the pieces of picture data are arranged in an order of photographing locations, which are each expressed in terms of the distance from the home.

In addition, in this embodiment, picture data, which is a still image, is used as an object of a layer clustering process. However, picture data of other kinds can also be used as an object of a layer clustering process. Examples of the picture data of other kinds are data of a moving-picture file containing a moving picture and pieces of picture data that can be arranged in accordance with a predetermined rule and have computable adjacent-data distances based on a predetermined scale.

It is to be noted that the distance between two adjacent pieces of picture data can be computed by letting factors such as photographing dates/times, photographing locations, and a movement velocity contribute to the computation as shown by Eqs. (2) and (3) in order to carry out a clustering process for clustering the pieces of picture data more properly.

That is to say, let us assume for example that the weight coefficients $\alpha$ and $\beta$ are set at one whereas the weight coefficient $\gamma$ is set at zero. In this case, the distance dpic(i, j) between picture data pic#i and pic#j is found in accordance with Eq. (2) without letting the movement velocity contribute to the computation. Let us further assume a first case in which, after the picture data pic#i was obtained as a result of a photographing operation, the photographer walked for 1000 seconds along a distance of 500 m to a location at which the picture data pic#j was obtained as a result of another photographing operation. In this case, the distance dpic(i, j) between the picture data pic#i and pic#j is 1000+500=1500. Let us further assume a second case in which, after the picture data pic#i was obtained as a result of a photographing operation, the photographer drove a car for 500 seconds along a distance of 1000 m to a location at which the picture data pic#j was obtained as a result of another photographing operation. In this case, the distance dpic(i, j) between the picture data pic#i and pic#j is 1000+500=1500, which is the same distance as the first case.

If the weight coefficient $\gamma$ is set at one, on the other hand, the distance dpic(i, j) between the picture data pic#i and the picture data pic#j is 1000+500+500/1000=1500.5 for the first case in which the photographer walked. For the second case in which the photographer drove a car, on the other hand, the distance dpic(i, j) between the picture data pic#i and pic#j is 1000+500+1000/500=1502.

Thus, the distance dpic(i, j) between the picture data pic#i and pic#j for the first case in which the photographer walked is different from the distance dpic(i, j) between the picture data pic#i and pic#j for the second case in which the photographer drove a car. To be more specific, the distance dpic(i, j) between the picture data pic#i and pic#j for the first case in which the photographer walked is shorter than the distance dpic(i, j) between the picture data pic#i and pic#j for the second case in which the photographer drove a car.

As a result, the picture data pic#i and pic#j for the first case in which the photographer walked are more likely clustered in a cluster with a small size than the picture data pic#i and pic#j for the second case in which the photographer drove a car.

That is to say, let us assume that, in a clustering process carried out by letting the movement velocity contribute to the computation of a distance, two pieces of picture data pertaining to a first pair and having a first difference in photographing date/time (or a time-wise distance) are clustered, and two other pieces of picture data pertaining to a second pair and having a second difference in photographing date/time equal to the first difference are also clustered. In this case, the pair of pieces of picture data having photographing locations closer to each other is more likely clustered in a cluster with a smaller size. On the other hand, let us also assume that two pieces of picture data pertaining to a first pair and having a first difference in photographing location (or a spatial distance) are clustered, and two other pieces of picture data pertaining to a second pair and having a second difference in photographing location equal to the first difference are also clustered. In this case, the pair of pieces of picture data having photographing dates/times closer to each other is more likely clustered in a cluster with a smaller size.

In many cases, a person (or the user) generally tends to cluster two pieces of picture data pertaining to a first pair having photographing locations relatively close to each other in a cluster having a smaller size than a cluster for clustering two other pieces of picture data pertaining to a second pair having photographing locations relatively far from each other provided that the pieces of picture data pertaining to the first pair have a difference in photographing date/time equal to the difference in photographing date/time between the two other pieces of picture data pertaining to the second pair. By the same token, a person (or the user) generally tends to cluster two pieces of picture data pertaining to a first pair having photographing dates/times relatively close to each other in a cluster having a smaller size than a cluster for clustering two other pieces of picture data pertaining to a second pair having photographing dates/times relatively far from each other provided that the pieces of picture data pertaining to the first pair have a difference in photographing location equal to the difference in photographing location between the two other pieces of picture data pertaining to the second pair. Thus, by carrying out a clustering process carried out by letting the movement velocity contribute to the computation of a distance, it is possible to implement clustering, which matches subjective classification according to the person (or the user).

It is to be noted that, in this embodiment, the layer clustering process is carried out by the information processing apparatus 2, which is an apparatus different from the camera 1 as shown in FIG. 1. However, the layer clustering process can also be carried out internally in the camera 1.

In addition, it should be understood by those skilled in the art that a variety of modifications, combinations, sub-combinations and alterations may occur in dependence on design requirements and other factors insofar as they are within the scope of the appended claims or the equivalents thereof.

What is claimed is:

1. An information processing apparatus for clustering a plurality of pieces of data in clusters corresponding respectively to nodes on layers in a tree structure by assigning each of said pieces of data to a leaf node of said tree structure, said information processing apparatus comprising:

metadata acquisition means for acquiring metadata of said pieces of data; and tree-structure processing means for finding a first distance and a second distance on the basis of said metadata and adding a new node to said tree structure on the basis of said first and second distances as a node having an attention node, which is assigned to attention data placed at an attention-receiving position in an array of said pieces of data arranged on the basis of said metadata of said pieces of data, as a child node where, said first distance is a distance based on a predetermined distance scale as the distance between two adjacent pieces of data selected among pieces of data pertaining to a cluster selected among clusters corresponding to nodes of said tree structure as a cluster adjacent to said attention data placed at said attention-receiving position, and said second distance is a distance based on said predetermined distance scale as the distance between said attention data and a piece of data selected among said pieces of data pertaining to said cluster adjacent to said attention data as a piece of data adjacent to said attention data.

2. The information processing apparatus according to claim 1, wherein said data is picture data obtained by using a photographing apparatus, said metadata of said data includes the photographing date/time and photographing location of said picture data, said attention-receiving position is a position included in an array of pieces of data arranged on the basis of photographing dates/times as the position of said attention data, and said tree-structure processing means finds said first and second distances on the basis of photographing dates/times and photographing locations.

3. The information processing apparatus according to claim 2, wherein said tree-structure processing means finds said first and second distances on the basis of photographing dates/times, photographing locations and the velocity of a movement made by said photographing apparatus as a movement from the photographing location of any specific picture data to the photographing location of next picture data immediately following said specific picture data.

4. The information processing apparatus according to claim 1, wherein said tree structure is a two-node structure including nodes each perceived as a parent node having two child nodes and said tree-structure processing means comprises:

branch-node searching means for searching said tree structure for a branch node defined as a node, one of the child nodes of which is either a node corresponding to a largest adjacent cluster located on one of the sides adjacent to said attention data placed at said attention-receiving position or a node corresponding to a largest adjacent cluster located on the other side adjacent to said attention data;

distance computation means for computing first and second distances where, said first distance is a maximum of distances each based on a predetermined distance scale as the distance between any two adjacent pieces of data selected among pieces of data pertaining to a cluster corresponding to a candidate node, said second distance is a distance based on said predetermined distance scale as the distance between said attention data and a piece of data selected among said pieces of data pertaining to said cluster corresponding to said candidate node as a piece of data adjacent to said attention data, and said candidate node sharing the same parent node with a node corresponding to a cluster including said attention data is a node corresponding to a cluster selected among said largest adjacent clusters each corresponding to said child node of said branch node as a largest adjacent cluster including a piece of data having a distance based on said predetermined distance scale as the shortest distance to said attention data placed at said attention-receiving position among all pieces of data pertaining to said selected largest adjacent cluster, distance determination means for comparing said first and second distances with each other in order to produce a determination result indicating a relation between the magnitudes of said first and second distances, and node addition means for adding a new node to said tree structure on the basis of a comparison result produced by said distance determination means and placing said new node between said branch node and said candidate node as a node having said branch node as a parent node and said candidate node as well as said node corresponding to said cluster including said attention data as child nodes.

5. The information processing apparatus according to claim 4, wherein if a comparison result produced by said distance determination means indicates that said second distance is longer than said first distance, said node addition means adds a new node to said tree structure, placing said new node between said branch node and said candidate node as a node having said branch node as a parent node and said candidate node as well as said node corresponding to said cluster including said attention data as child nodes, or if a comparison result produced by said distance determination means indicates that said second distance is not longer than said first distance, on the other hand, as long as said comparison result produced by said distance determination means indicates that said second distance is not longer than said first distance, said information processing apparatus repeatedly executes the steps of:

replacing said branch node with said candidate node to serve as a new branch node and replacing said candidate node with one of the child nodes of said candidate node to serve as a new candidate node;

driving said distance computation node to compute a first distance representing a maximum of distances between any two adjacent pieces of data selected among pieces of data pertaining to a cluster corresponding to said new candidate node and compute a second distance between said attention data and a piece of data selected among said pieces of data pertaining to said cluster corresponding to said new candidate node as a piece of data adjacent to said attention data; and driving said distance determination means to compare said first and second distances with each other in order to produce a determination result indicating a relation between the magnitudes of said first and second distances.

6. The information processing apparatus according to claim 1, wherein said tree-structure processing means:

performs a search process to search nodes pertaining to said cluster adjacent to said attention data by tracing said nodes in a direction from a layer at a higher level to a layer at a lower level for a node corresponding to a largest adjacent cluster in which a first distance representing a maximum of distances between any two adjacent pieces of data selected among pieces of data pertaining to said largest adjacent cluster is shorter than a second distance between said attention data and a piece of data selected among said pieces of data pertaining to said largest adjacent cluster as a piece of data adjacent to said attention data; and adds a new node to said tree structure as a node having said node found in said search process and a node corresponding to a cluster including said attention data as child nodes.

7. An information processing method of clustering a plurality of pieces of data in clusters corresponding respectively to nodes on layers in a tree structure by assigning each of said pieces of data to a leaf node of said tree structure, said information processing method comprising the steps of:

acquiring metadata of said pieces of data; and finding a first distance and a second distance on the basis of said metadata and adding a new node to said tree structure on the basis of said first and second distances as a node having an attention node, which is assigned to attention data placed at an attention-receiving position in an array of said pieces of data arranged on the basis of said metadata of said pieces of data, as a child node where, said first distance is a distance based on a predetermined distance scale as the distance between two adjacent pieces of data selected among pieces of data pertaining to a cluster selected among clusters corresponding to nodes of said tree structure as a cluster adjacent to said attention data placed at said attention-receiving position, and said second distance is a distance based on said predetermined distance scale as the distance between said attention data and a piece of data selected among said pieces of data pertaining to said cluster adjacent to said attention data as a piece of data adjacent to said attention data.

8. A program on a computer readable medium to be executed by a computer for carrying out information processing to cluster a plurality of pieces of data in clusters corresponding respectively to nodes on layers in a tree structure by assigning each of said pieces of data to a leaf node of said tree structure, said program causing a computer to execute an information processing comprising the steps of:

acquiring metadata of said pieces of data; and finding a first distance and a second distance on the basis of said metadata and adding a new node to said tree structure on the basis of said first and second distances as a node having an attention node, which is assigned to attention data placed at an attention-receiving position in an array of said pieces of data arranged on the basis of said metadata of said pieces of data, as a child node where, said first distance is a distance based on a predetermined distance scale as the distance between two adjacent pieces of data selected among pieces of data pertaining to a cluster selected among clusters corresponding to nodes of said tree structure as a cluster adjacent to said attention data placed at said attention-receiving position, and said second distance is a distance based on said predetermined distance scale as the distance between said attention data and a piece of data selected among said pieces of data pertaining to said cluster adjacent to said attention data as a piece of data adjacent to said attention data.

9. An information processing apparatus for clustering a plurality of pieces of data in clusters corresponding respectively to nodes on layers in a tree structure by assigning each of said pieces of data to a leaf node of said tree structure, said information processing apparatus comprising:

a metadata acquisition section configured to acquire metadata of said pieces of data; and a tree-structure processing section configured to find a first distance and a second distance on the basis of said metadata and adding a new node to said tree structure on the basis of said first and second distances as a node having an attention node, which is assigned to attention data placed at an attention-receiving position in an array of said pieces of data arranged on the basis of said metadata of said pieces of data, as a child node where, said first distance is a distance based on a predetermined distance scale as the distance between two adjacent pieces of data selected among pieces of data pertaining to a cluster selected among clusters corresponding to nodes of said tree structure as a cluster adjacent to said attention data placed at said attention-receiving position, and said second distance is a distance based on said predetermined distance scale as the distance between said attention data and a piece of data selected among said pieces of data pertaining to said cluster adjacent to said attention data as a piece of data adjacent to said attention data.

* * * * *